United States Patent
Ohtaka et al.

(10) Patent No.: US 6,947,195 B2
(45) Date of Patent: Sep. 20, 2005

(54) OPTICAL MODULATOR, OPTICAL MODULATOR MANUFACTURING METHOD, LIGHT INFORMATION PROCESSING APPARATUS INCLUDING OPTICAL MODULATOR, IMAGE FORMATION APPARATUS INCLUDING OPTICAL MODULATOR, AND IMAGE PROJECTION AND DISPLAY APPARATUS INCLUDING OPTICAL MODULATOR

(75) Inventors: Kouichi Ohtaka, Tokyo (JP); Seiichi Katoh, Tokyo (JP); Takeshi Nanjyo, Tokyo (JP); Masanori Horike, Tokyo (JP); Eiichi Ohta, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 162 days.

(21) Appl. No.: 10/050,865

(22) Filed: Jan. 18, 2002

(65) Prior Publication Data

US 2002/0109899 A1 Aug. 15, 2002

(30) Foreign Application Priority Data

Jan. 18, 2001 (JP) .................................. 2001-010870
Mar. 13, 2001 (JP) .................................. 2001-070303
Mar. 19, 2001 (JP) .................................. 2001-077614
Mar. 29, 2001 (JP) .................................. 2001-097590
Apr. 27, 2001 (JP) .................................. 2001-133709

(51) Int. Cl.[7] .................................................. G02B 26/00
(52) U.S. Cl. ................................... 359/290; 359/291
(58) Field of Search ............................ 359/290, 291, 359/292, 293, 295, 298, 322, 323, 231, 324, 245

(56) References Cited

U.S. PATENT DOCUMENTS 5,017,987 A  5/1991  Nanjoh et al.
5,108,843 A  4/1992  Ohtaka et al.
5,304,357 A  4/1994  Sato et al.

(Continued)

FOREIGN PATENT DOCUMENTS

| JP | 6-138403 | 5/1994 |
| JP | 7-218845 | 8/1995 |
| JP | 10-510374 | 10/1998 |
| JP | 2941952 | 8/1999 |
| JP | 2000-2842 | 1/2000 |
| JP | 3016871 | 3/2000 |
| WO | WO 96/41217 | 12/1996 |
| WO | WO 96/41224 | 12/1996 |
| WO | WO 96/41226 | 12/1996 |

OTHER PUBLICATIONS

K. E. Petersen, Applied Physics Letters, vol. 31, No. 8, pp. 521–523, "Micromechanical Light Modulator Array Fabricated on Silicon", Oct. 15, 1977.

(Continued)

*Primary Examiner*—Hung Xuan Dang
*Assistant Examiner*—Tuyen Tra
(74) *Attorney, Agent, or Firm*—Oblon, Spivak, McClelland, Maier & Neustadt, P.C.

(57) ABSTRACT

A center beam which is formed out of a thin film constituted to be combined with a light reflection film provided on one surface of the center beam, which has both ends fixed and which is deformed by an electronic force; a substrate electrode which is opposed to the center beam through a gap formed on the other surface of the center beam; an opposed surface which is a surface of the substrate electrode opposed to the center beam modulating the incident light on the light reflection film, the opposed surface restricting deformation of the center beam due to application of a driving voltage to the substrate electrode by abutting on the center beam; and a substrate which has the substrate electrode having the opposed surface, formed in a concave section, and which holds a to-be-held section of the center beam, are provided. As a result, the structure of modulating light by changing the reflection direction of the incident light is simple, response is fast, the wavelength of the incident light to be used is not limited, operation is stable, reliability is high, the number of manufacturing steps is small and cost reduction can be achieved.

95 Claims, 116 Drawing Sheets

U.S. PATENT DOCUMENTS

| | | | |
|---|---|---|---|
| 5,408,113 | A | 4/1995 | Kanno et al. |
| 5,448,113 | A | 9/1995 | Suzuki et al. |
| 5,633,523 | A | 5/1997 | Kato |
| 5,661,591 | A * | 8/1997 | Lin et al. .................... 359/290 |
| 5,668,413 | A | 9/1997 | Nanjo |
| 5,751,469 | A * | 5/1998 | Arney et al. ................ 359/291 |
| 5,793,519 | A * | 8/1998 | Furlani et al. .............. 359/291 |
| 5,811,353 | A | 9/1998 | Nanjo |
| 5,999,303 | A * | 12/1999 | Drake ........................ 359/224 |
| 6,147,789 | A * | 11/2000 | Gelbart ...................... 359/231 |
| 6,150,698 | A | 11/2000 | Ohtsuka et al. |
| 6,268,948 | B1 * | 7/2001 | Gelbart ...................... 359/231 |
| 6,272,304 | B1 * | 8/2001 | Saito et al. ................. 399/237 |
| 6,312,108 | B1 | 11/2001 | Kato |
| 6,324,149 | B1 | 11/2001 | Mifune et al. |
| 6,332,669 | B1 | 12/2001 | Kato et al. |
| 6,367,914 | B1 | 4/2002 | Ohtaka et al. |
| 6,509,995 | B1 | 1/2003 | Suzuki et al. |
| 6,677,695 | B2 * | 1/2004 | Dhuler et al. ............... 310/309 |

OTHER PUBLICATIONS

O. Solgaard, et al., Optics Letters, vol. 17, No. 9, pp. 688–690, "Deformable Grating Optical Modulator", May 1, 1992.

Larry J. Hornbeck, SPIE Critical Reviews Series, vol. 1150, pp. 86–102, "Deformable–Mirror Spatial Light Modulators", Aug., 1989.

* cited by examiner

OPTICAL MODULATOR, OPTICAL MODULATOR MANUFACTURING METHOD, LIGHT INFORMATION PROCESSING APPARATUS INCLUDING OPTICAL MODULATOR, IMAGE FORMATION APPARATUS INCLUDING OPTICAL MODULATOR, AND IMAGE PROJECTION AND DISPLAY APPARATUS INCLUDING OPTICAL MODULATOR

FIELD OF THE INVENTION

The present invention relates to a light modulator, a light modulator manufacturing method, a light information processing apparatus including the light modulator, an image formation apparatus including the light modulator and an image projection and display apparatus including the light modulator. More particularly, the present invention relates to a light modulator which modulates light by changing the reflection direction of incident light, a method of manufacturing the light modulator, an light information processing apparatus which includes the light modulator and performs an light information processing using the light modulator which performs light modulation by changing the reflection direction of incident light, an image formation apparatus which includes the light modulator and forms an image by writing optical data by an electrophotographic process, and an image projection and display apparatus which includes the light modulator and projects and displays an image.

BACKGROUND OF THE INVENTION

A light modulator which performs light modulation by changing the reflection direction of incident light on an optical switch device using an electrostatic force, is employed in an light information processing apparatus which processes light information, an image formation apparatus which writes optical data by an electrophotographic process and forms an image, an image projection and display apparatus which projects and displays an image, or the like.

As for the light modulator which performs light modulation by changing the reflection direction of incident light on an optical switch device using an electrostatic force, a device which bends a cantilever by an electrostatic force and changes and switches the reflection direction of the incident light and a light modulation system using the switch device are well known. The cantilever oscillates when the electrostatic force is released and the bending of the cantilever is recovered. This is because the free oscillation of the cantilever is generated by fixing only one end of the cantilever.

In addition, if the cantilever is formed out of a thin film, a residual stress is generated. The cantilever is deformed by the residual stress. Further, since the residual stress is reduced with the passage of time, the deformation state of the cantilever changes with the passage of time. For these reasons, the cantilever has low stability.

Furthermore, in case of the cantilever, signal response is deteriorated due to the free oscillation thereof.

Therefore, it is disadvantageously difficult to ensure the stability of the cantilever and the natural frequency of the cantilever is low, with the result that the response speed cannot be disadvantageously accelerated.

A device which holds a mirror by a thin torsion bar, changes the direction of the mirror by an electrostatic force and changes the reflection direction of light to thereby switch light is also well known. However, since the structure of the device is too complicated, it is difficult to improve yield. In addition, since the mirror is held by the thin torsion bar, the service life of the device cannot be lengthened.

Further, a device which drives a diffraction grating by an electrostatic force and switches light is well known (see Japanese Patent Nos. 2941952 and 3016871 and Japanese Patent Application National Publication (Laid-Open) No. 10-510374 and the like).

However, the device which drives a diffraction grating by an electrostatic force and switches light, has a disadvantage in that the wavelength of incident light to be used is limited.

Furthermore, a device which bends a beam by an electrostatic force, adjusts the focus of reflection light and passes the reflection light through a slit to thereby switch light is well known (see Japanese Patent Application Laid-Open No. 2000-2842).

However, with the device which bends a beam by an electrostatic force, adjusts the focus of reflection light and passes the reflection light through a slit to thereby switch light, the bending degree of the beam becomes often unstable, disadvantageously deteriorating the reliability of the device.

As explained above, the conventional light modulators each of which modulates light by changing the reflection direction of an incident light beam, a light information processing apparatus which includes the conventional light modulator, an image formation apparatus which includes the conventional light modulator and an image projection and display apparatus which includes the conventional light modulator have disadvantages in that the structure of changing the reflection direction of an incident light beam and thereby modulating light is complex, response is slow, the wavelength of the incident light to be used is limited, operation is unstable and reliability deteriorates.

SUMMARY OF THE INVENTION

It is an object of the present invention to provide a light modulator, a method of manufacturing a light modulator, a light information processing apparatus which includes the light modulator, an image formation apparatus which includes the light modulator and an image projection and display apparatus which includes the light modulator wherein a structure of changing the reflection direction of incident light to be used and thereby modulating light is simple, response is fast, the wavelength of the incident light is not limited, stable operation is ensured, reliability is high, the number of manufacturing steps is small and manufacturing yield is high.

According to one aspect of the invention, there is provided a light modulator modulating light by changing a reflection direction of incident light, comprising: a light reflection film regularly reflecting incident light; a center beam which is formed out of a thin film constituted to be combined with the light reflection film, which has both ends fixed, and which is deformed by an electronic force, the reflection film provided on one surface of the center beam; a substrate electrode which is opposed to the center beam through a gap formed on the other surface of the center beam; an opposed surface which is a surface of the substrate electrode opposed to the center beam modulating the incident light on the light reflection film, the opposed surface restricting deformation of the center beam due to application of a driving voltage to the substrate electrode by abutting on the center beam; and a substrate which has the substrate electrode having the opposed surface, formed in a concave section, and which holds a to-be-held section of the center beam.

According to this aspect, the light modulator consists of the substrate in which the concave section is formed, the substrate electrode which is formed on the inner surface of the concave section, the thin film type center beam which is provided at the position opposed to the substrate electrode through the gap in the concave section and the both ends of which are fixed, and the light reflection film and the beam electrode which are formed on the upper surface of the center beam. The concave section is formed so that the center beam which is deformed by applying a driving voltage to the substrate electrode and the beam electrode is abutted on the inner surface of the concave section, to thereby restrict the deformation of the center beam.

According to another aspect of the present invention, there is provided a light modulator modulating light by changing a reflection direction of incident light, comprising: a reflection unit which regularly reflects light; a thin film, both-end-fixed beam which is formed out of a thin film constituted to be combined with the reflection unit provided on one side surface of the thin film, both-end-fixed beam, which has both ends fixed, and which is deformed by an electronic force; a substrate electrode which is opposed to the thin film, both-end-fixed beam, and which applies a driving voltage; a gap which is formed by opposing the substrate electrode to the thin film, both-end-fixed beam, and which is formed on the other side surface of the thin film, both-end-fixed beam; a substrate which has the substrate electrode formed on a bottom of the gap, formed in a concave section and which holds and fixes the both ends of the thin film, both-end-fixed beam; and a hole section which is formed in the thin film, both-end-fixed beam above the gap, and which makes a section of the thin film, both-end-fixed beam corresponding to the hole section deformed more easily than remaining sections of the hole section.

According to still another aspect of the present invention, there is provided a light modulator modulating light by deforming a beam which reflects light, by an electrostatic force, wherein an electrode acting the electrostatic force on the beam is provided inside a recess of a substrate opened to an upper surface of the substrate, the beam held by the substrate at a position opposed to the electrode so as to be projected from the upper surface of the substrate; and a non-parallel gap is formed between the beam and the recess in a state in which no electrostatic force acts on the beam, the non-parallel gap being generally rectangular between a plane including the upper surface of the substrate and the beam.

According to still another aspect of the present invention, there is provided a light modulator, wherein a fixed electrode, a beam which is opposed to the fixed electrode through a gap and which has a light reflection surface, and a light emission element are formed in a same package; the beam is held to be deformable toward the fixed electrode by an electrostatic force when the beam is driven, light emitted from the light emission element is reflected by the light reflection surface on the beam in different directions between a case in which the beam is driven and a case in which the beam is not driven, and reflection light from the reflection surface is outputted to an outside of the package when the beam is driven or not driven.

According to still another aspect of the present invention, there is provided a light modulator modulating light by changing a reflection direction of incident light, comprising: a reflection unit which regularly reflects the incident light; a thin film, both-end-fixed beam which is formed out of a thin film constituted to be combined with the reflection unit, which has both ends fixed, and which is deformed by an electronic force, the light reflection unit provided on one surface of the thin film, both-end-fixed beam; a substrate electrode which is opposed to the other side surface of the thin film, both-end-fixed beam, and which applies a driving voltage; a gap which is formed by opposing the substrate electrode to the thin film, both-end-fixed beam; a substrate which has the substrate electrode formed in a bottom of the gap, and which holds both ends of the thin film, both-end-fixed beam; and a cover member which is formed to be attached onto the substrate, which includes the thin film, both-end-fixed beam and the gap in a vacuum space, and which is made of a light transmission material.

Other objects and features of this invention will become understood from the following description with reference to the accompanying drawings.

BRIEF DESCRIPTION OF THE DRAWINGS

FIG. 120A and FIG. 120B are a schematic cross-sectional view and a schematic plan view which explain the manufacturing step of the light modulator in the second example of the third embodiment, respectively;

FIG. 121A and FIG. 121B are a schematic cross-sectional view and a schematic plan view which explain the manufacturing step of the light modulator in the second example of the third embodiment, respectively;

FIG. 122 is an enlarged, schematic cross-sectional view which explains the fixed end and the support of a beam;

FIG. 123A and FIG. 123B are schematic cross-sectional views which explain the beam before and after the removable of a sacrificial layer according to the conventional art;

FIG. 124A and FIG. 124B are schematic cross-sectional views which explain the beam before and after the removable of a sacrificial layer according to the present invention;

FIG. 125A and FIG. 125B are schematic cross-sectional views which explain the modification of the first example of the third embodiment;

FIG. 126A, FIG. 126B, FIG. 126C and FIG. 126D are schematic cross-sectional views which explain the operations of the light modulator according to the present invention;

FIG. 127A and FIG. 127B are schematic cross-sectional views which show a light modulator in a driven state and a non-driven state, respectively, and which explain a first example of a fourth embodiment of the light modulator according to the present invention;

FIG. 128A, FIG. 128B, FIG. 128C and FIG. 128D are schematic cross-sectional views which explain the manufacturing steps of the light modulator in the first example of the fourth embodiment;

FIG. 129A and FIG. 129B are a schematic cross-sectional view and a schematic plan view which explain the manufacturing step of the light modulator in the first example of the fourth embodiment, respectively;

FIG. 130A and FIG. 130B are a schematic cross-sectional view and a schematic plan view which explain the manufacturing step of the light modulator in the first example of the fourth embodiment, respectively;

FIG. 131A, FIG. 131B, FIG. 131C, FIG. 131D and FIG. 131E are schematic cross-sectional views which explain the manufacturing steps of the light modulator in the first example of the fourth embodiment;

Figure 132A:
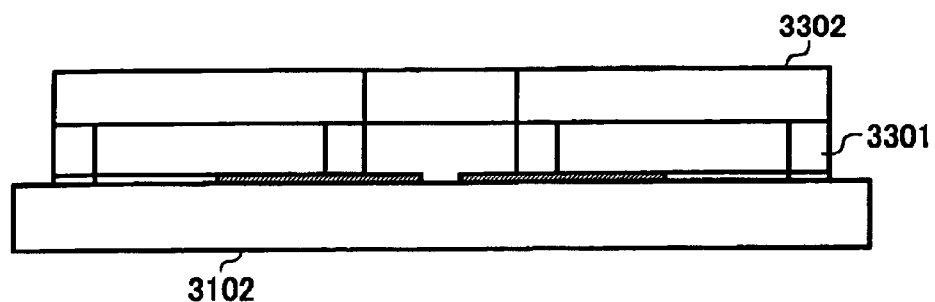
Figure 132B:
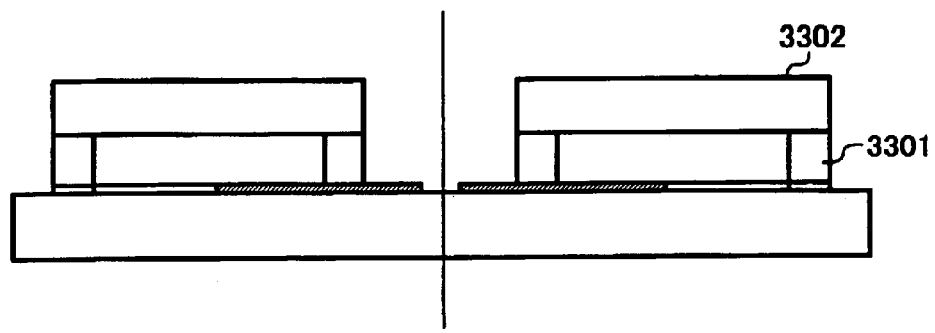
Figure 132C:
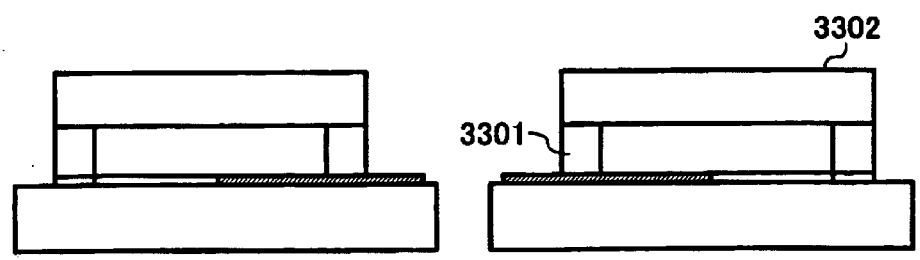
Figure 133A:
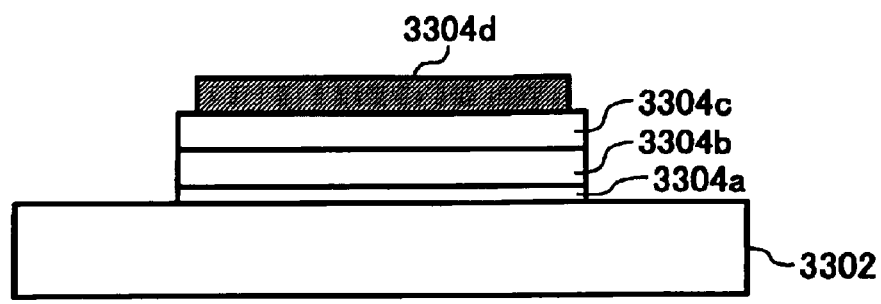
Figure 133B:
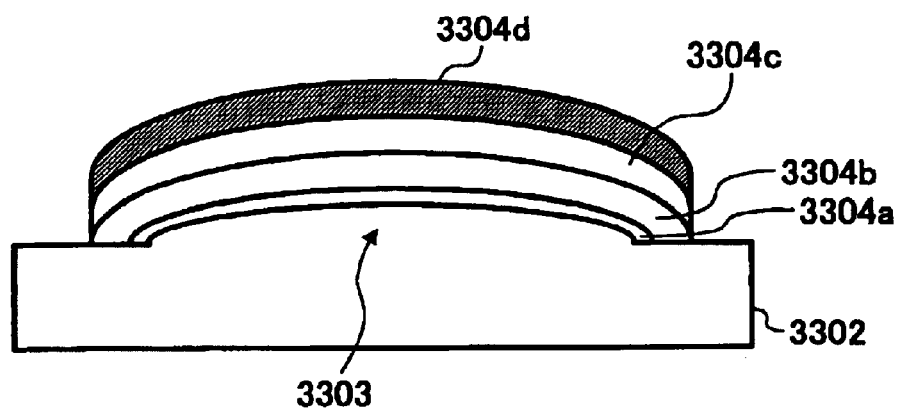
Figure 134A:
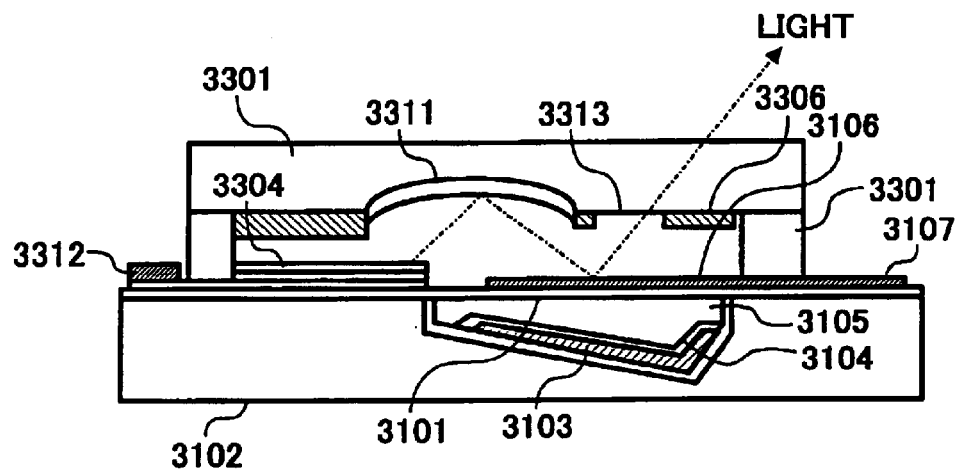
Figure 134B:
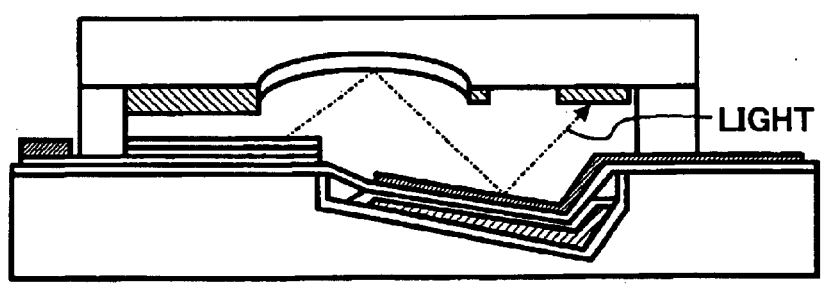
Figure 138A:
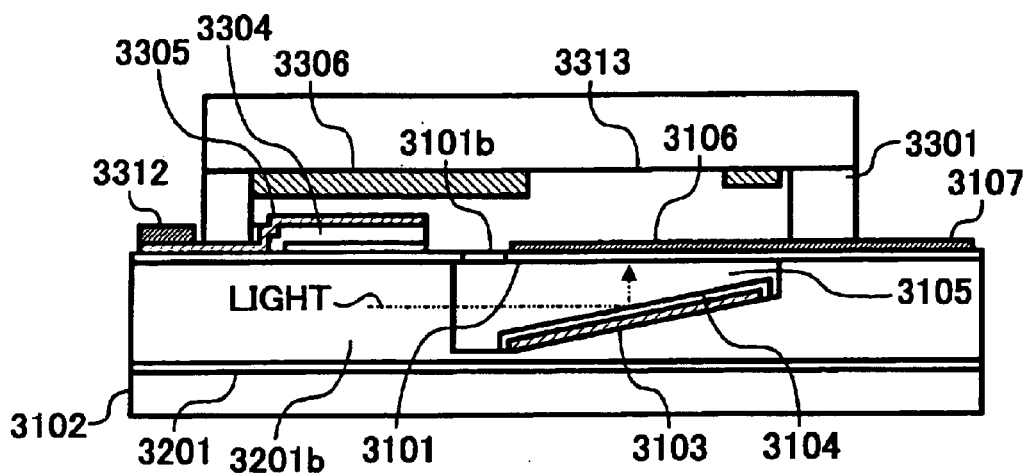
Figure 138B:
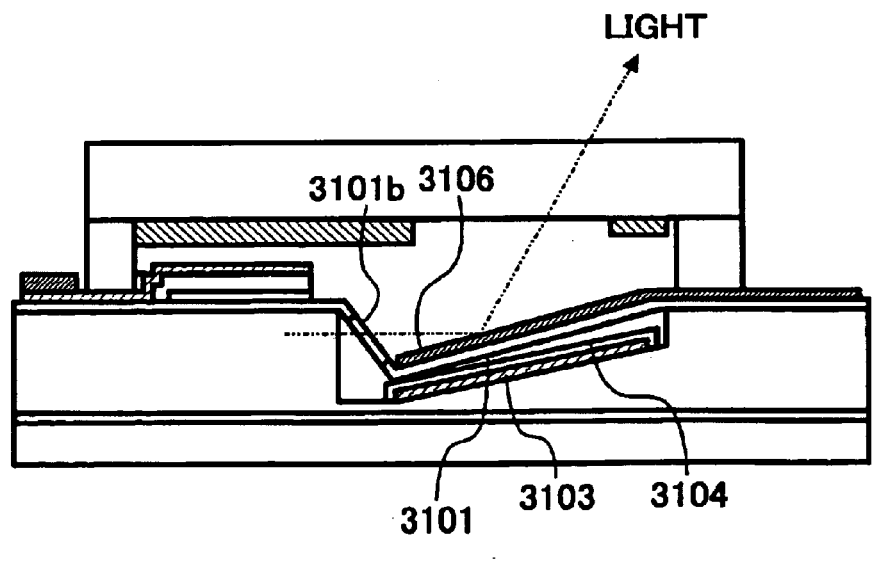
Figure 142:
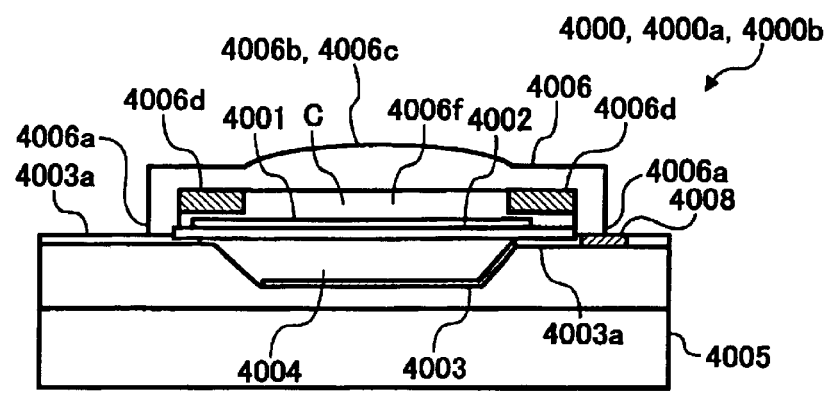
Figure 143:
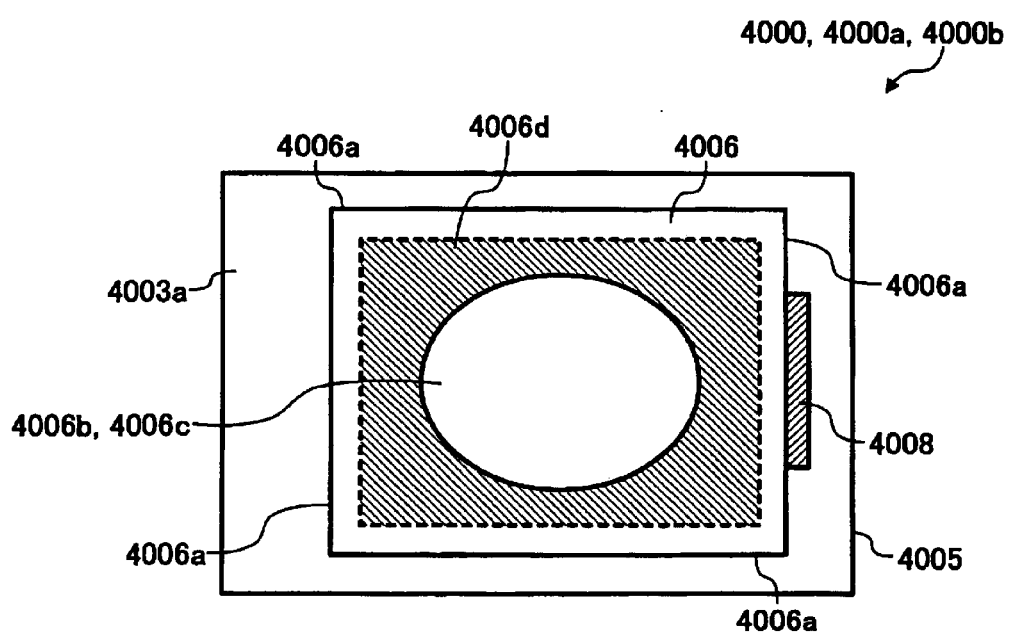
Figure 144:
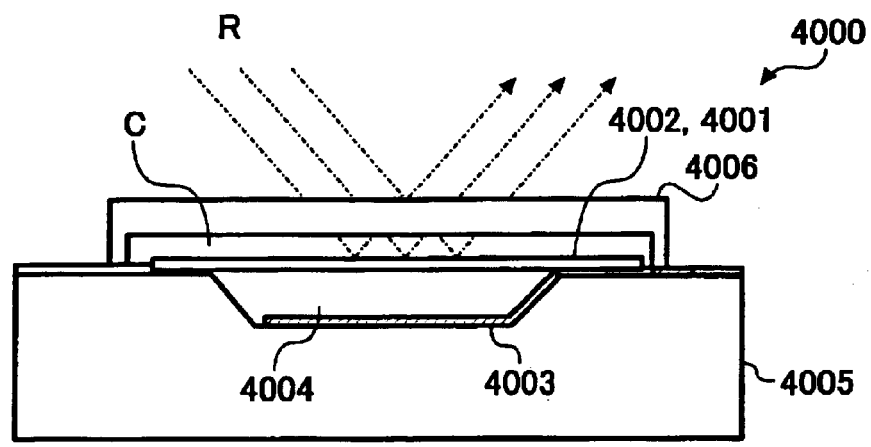
Figure 145:
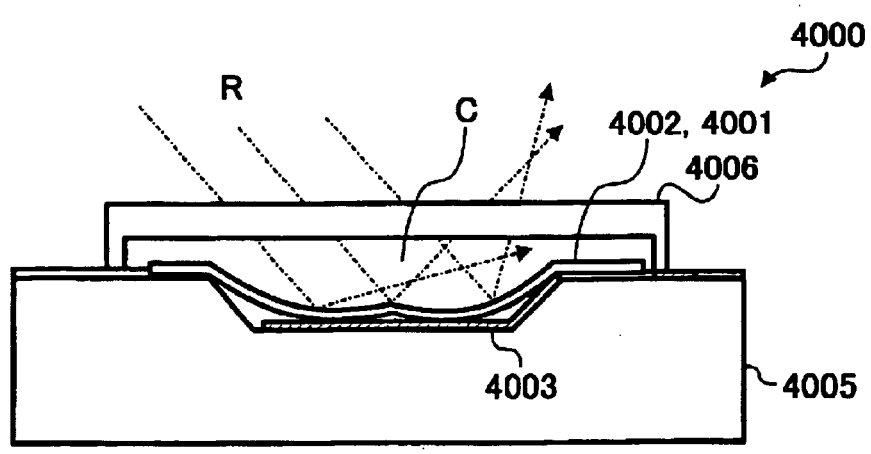
Figure 146:
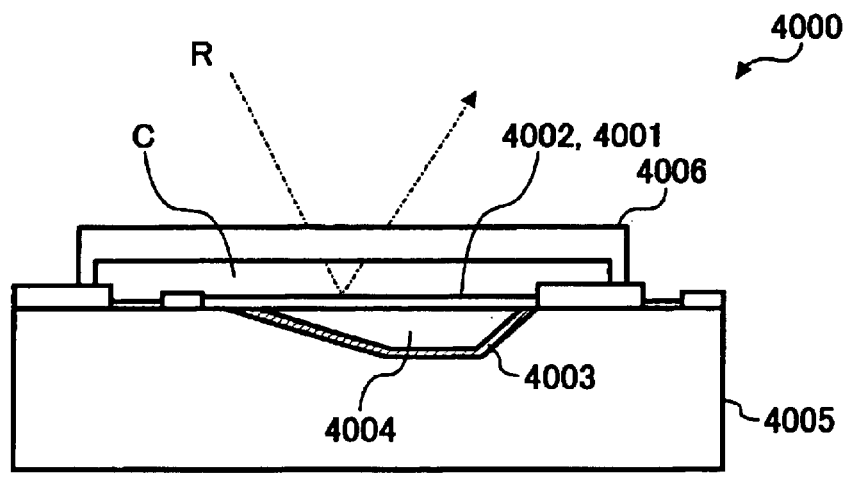
Figure 147:
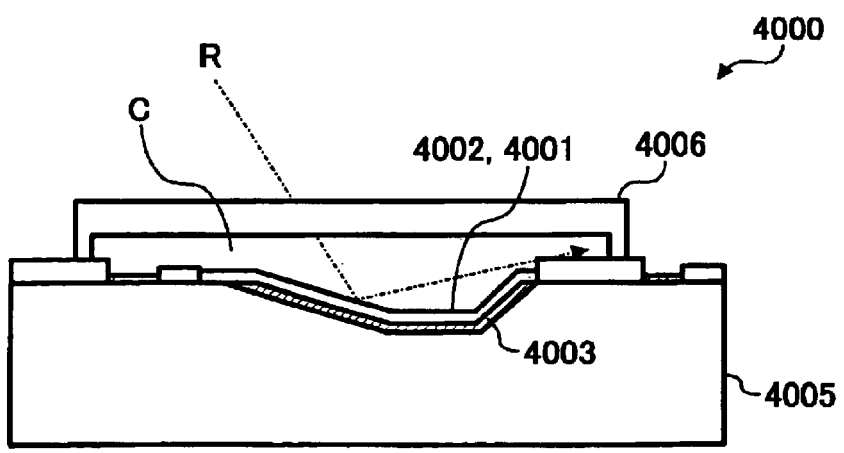
Figure 148:
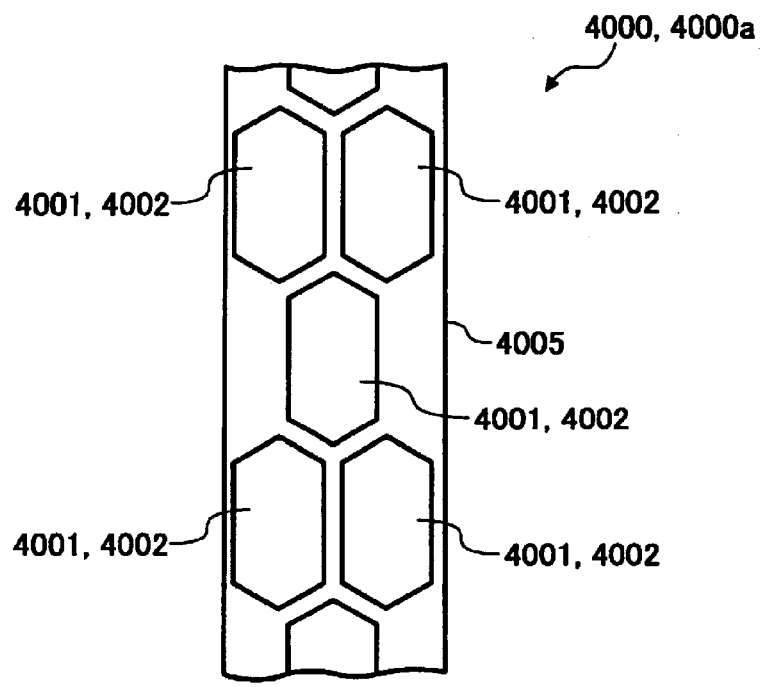
Figure 149:
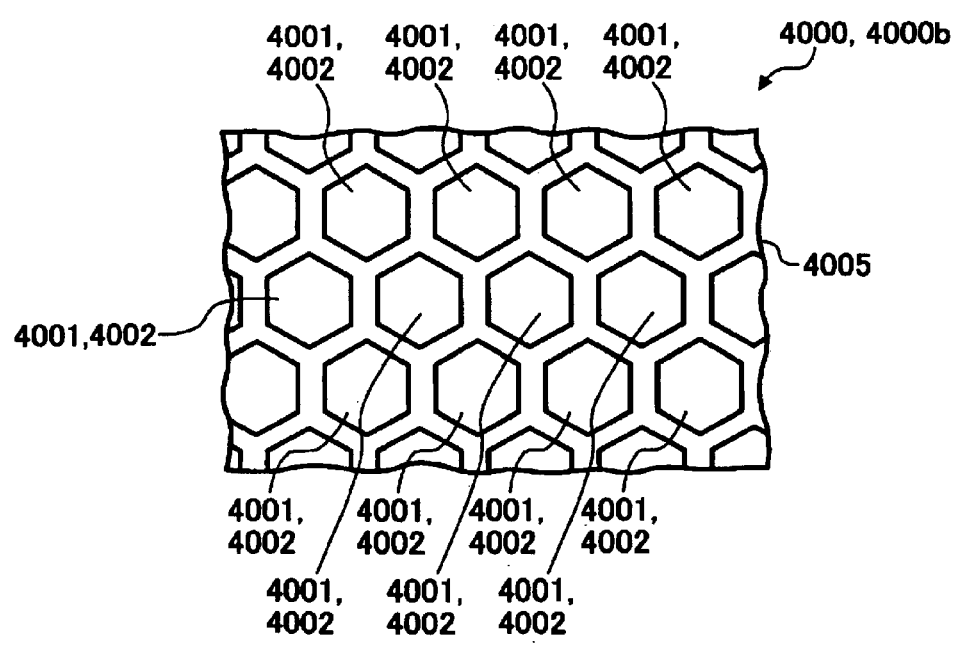
Figure 150:
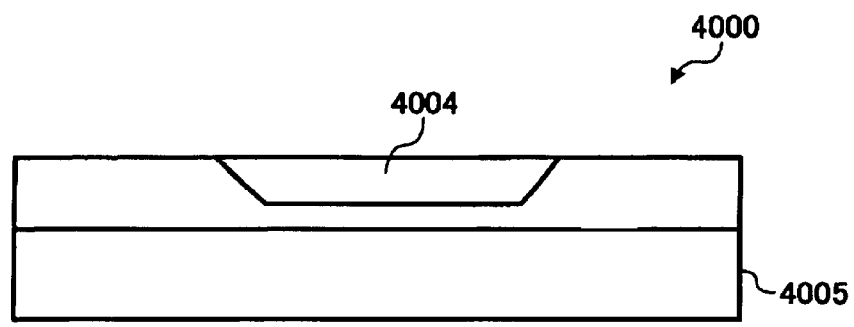
Figure 151:
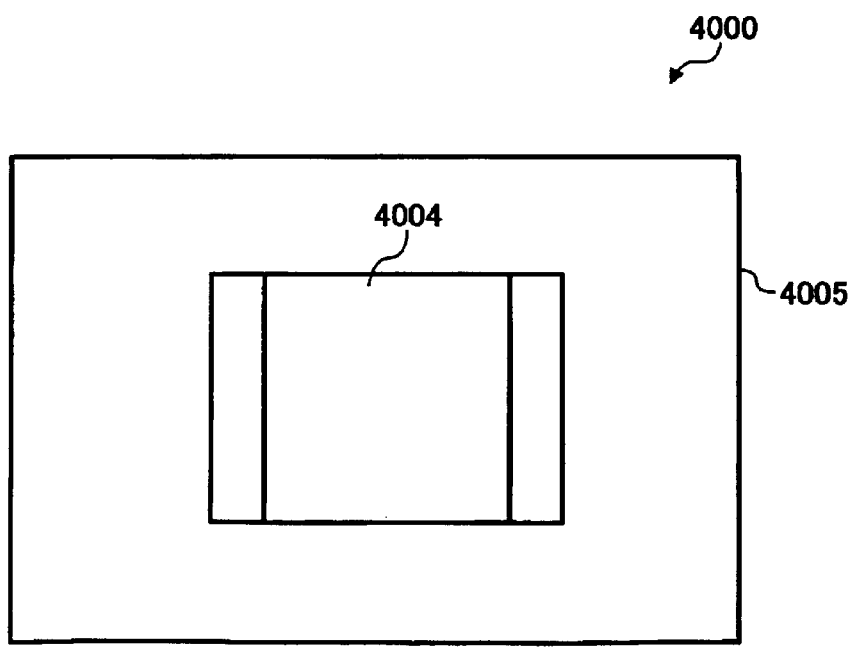
Figure 152:
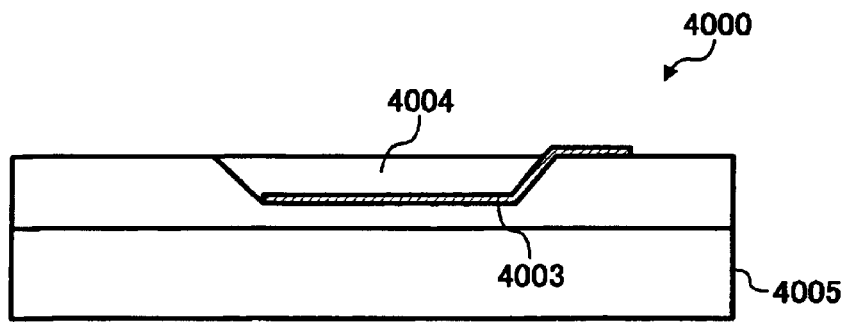
Figure 153:
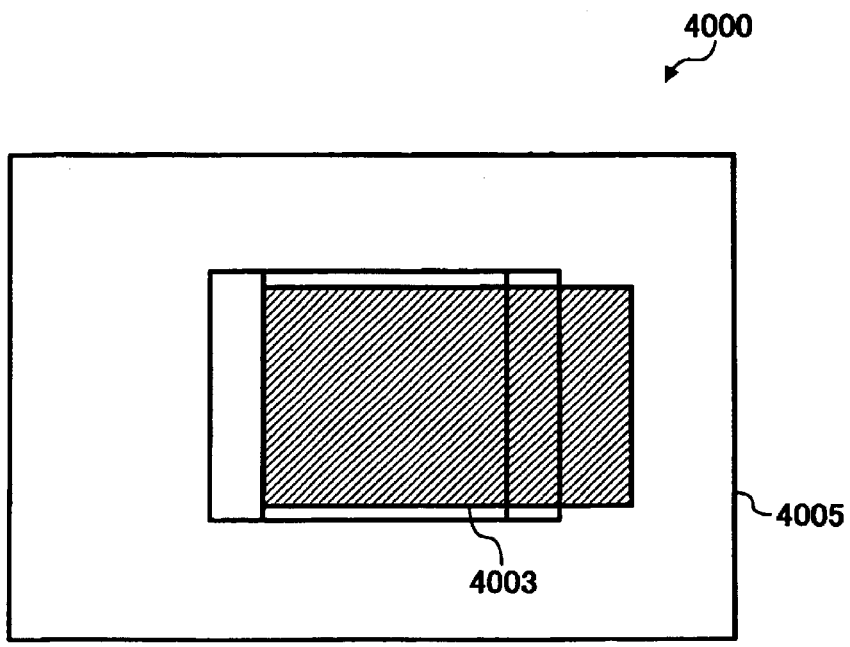
Figure 154:
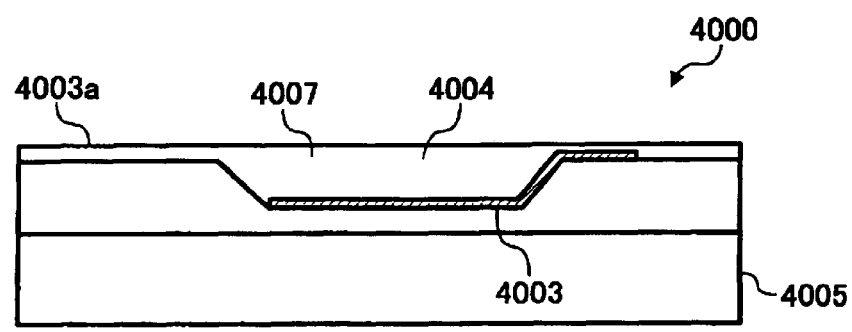
Figure 155:
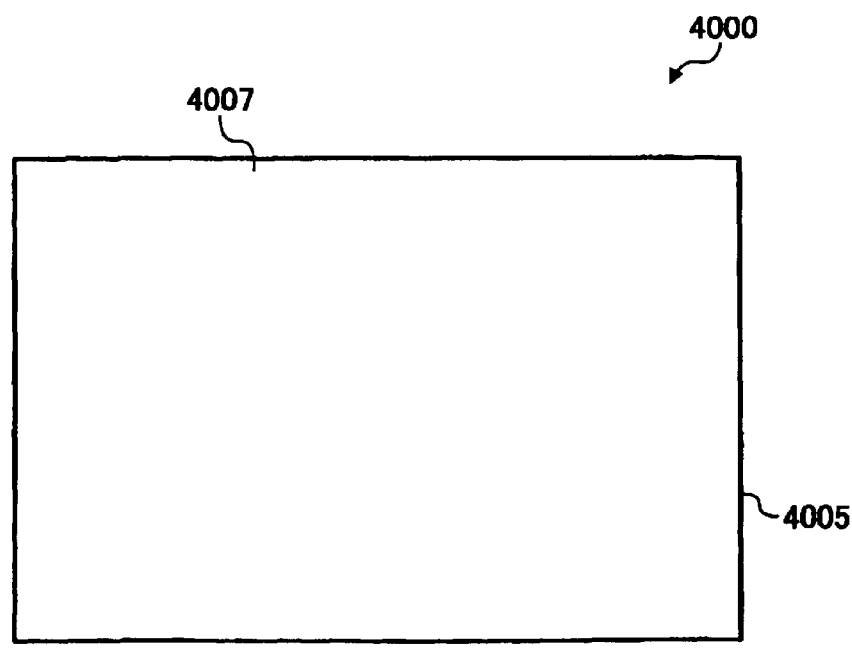
Figure 156:
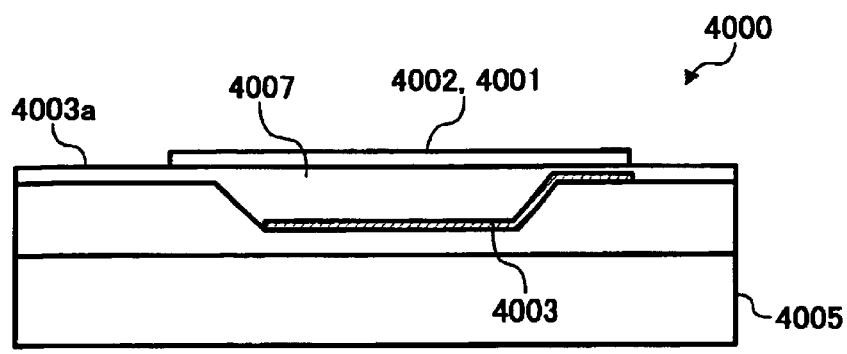
Figure 157:
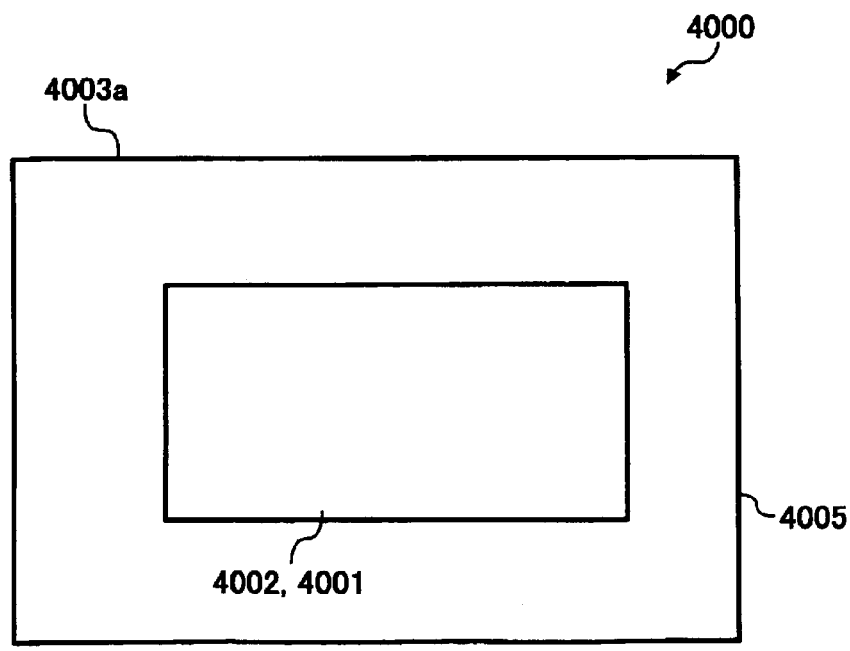
Figure 158:
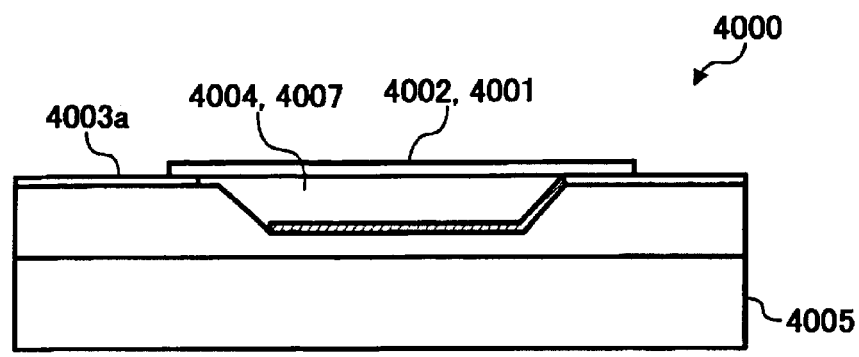
Figure 159:
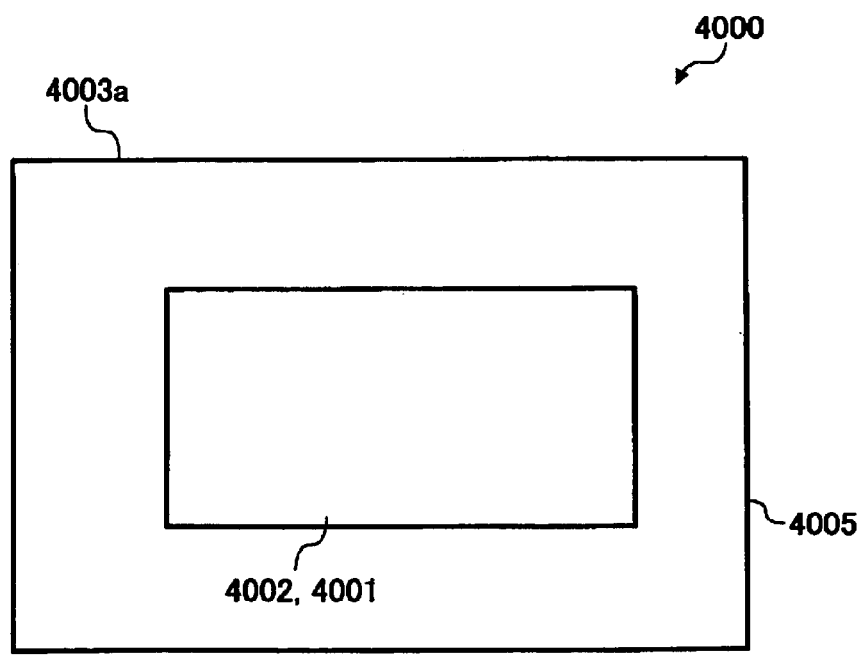
Figure 160:
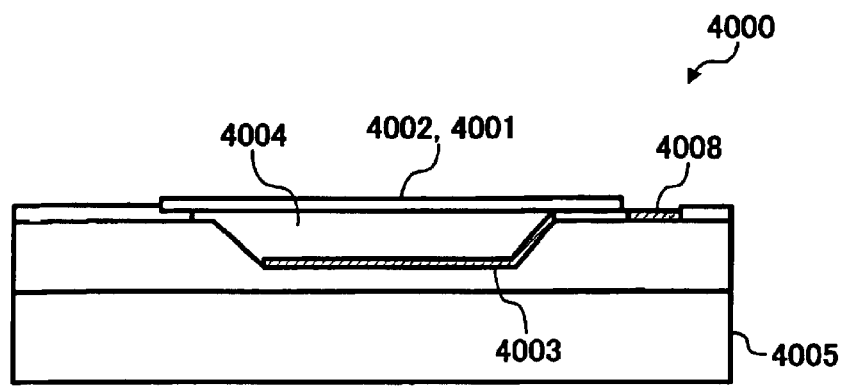
Figure 161:
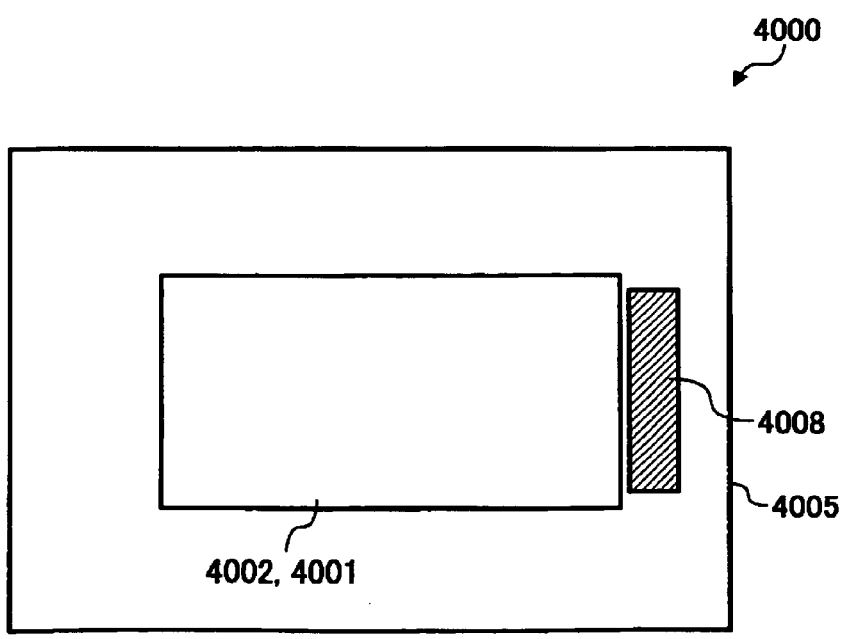
Figure 162:
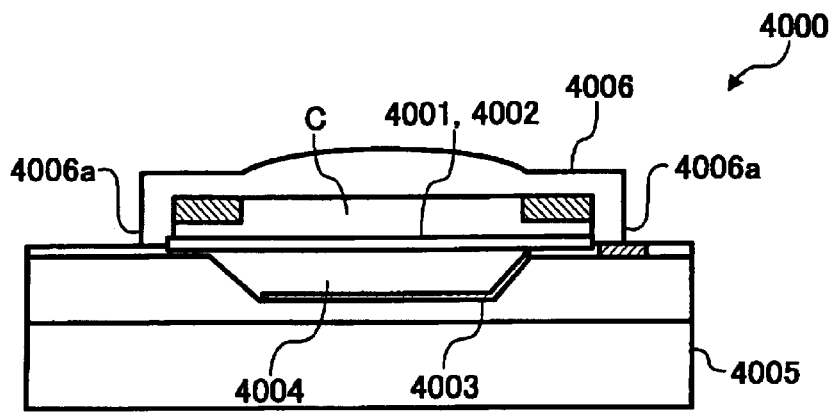
Figure 163:
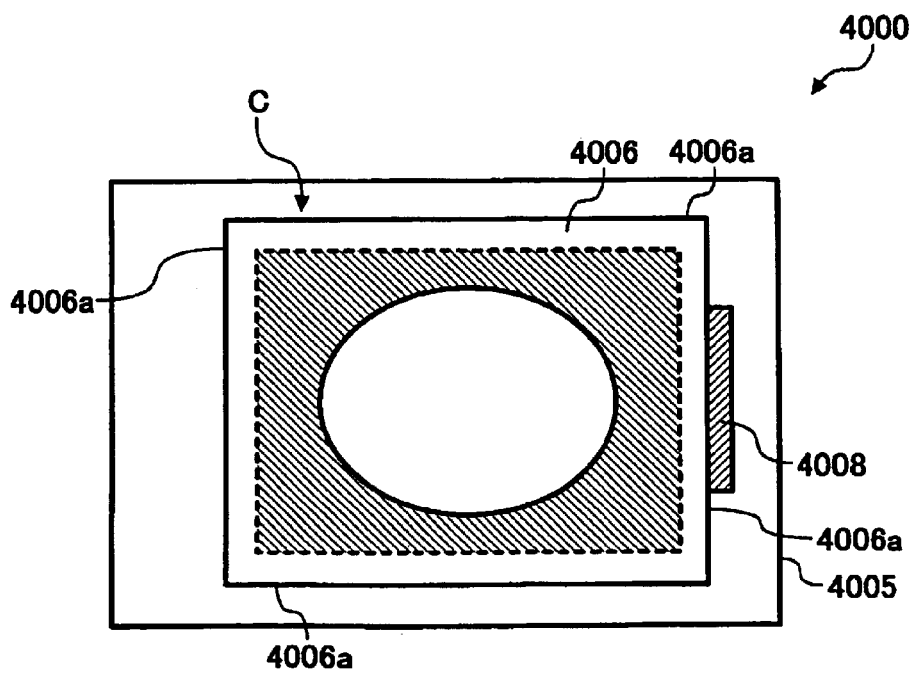
Figure 164:
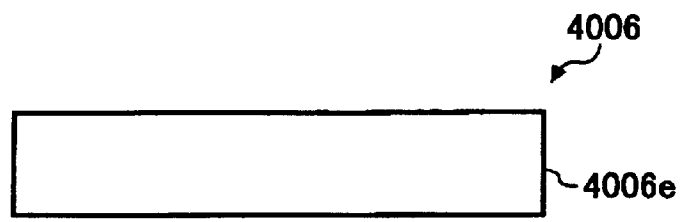
Figure 165:
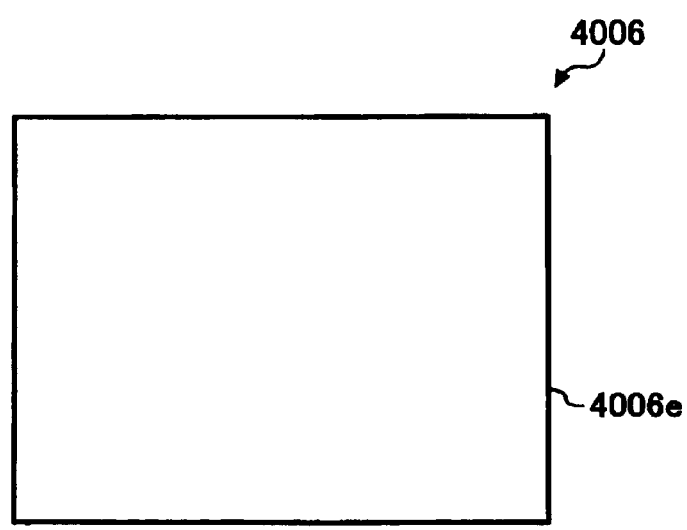
Figure 166:
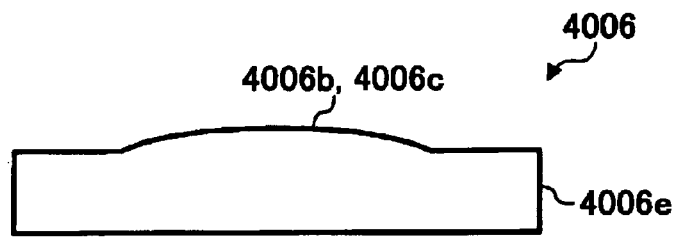
Figure 167:
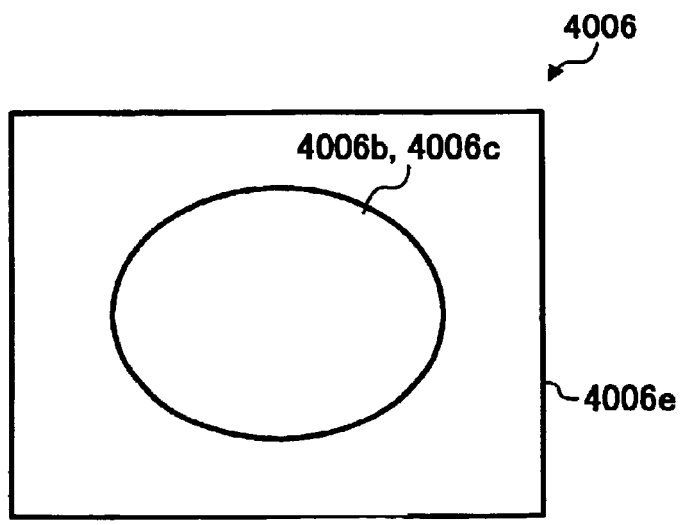
Figure 168:
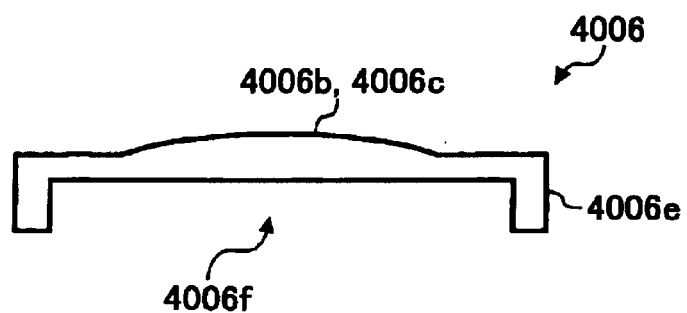
Figure 169:
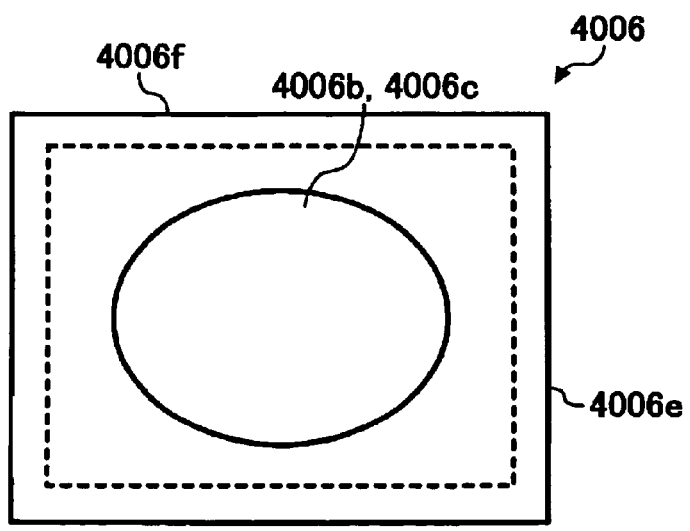
Figure 170:
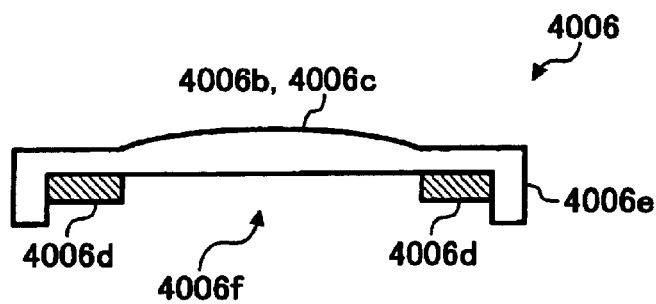
Figure 171:
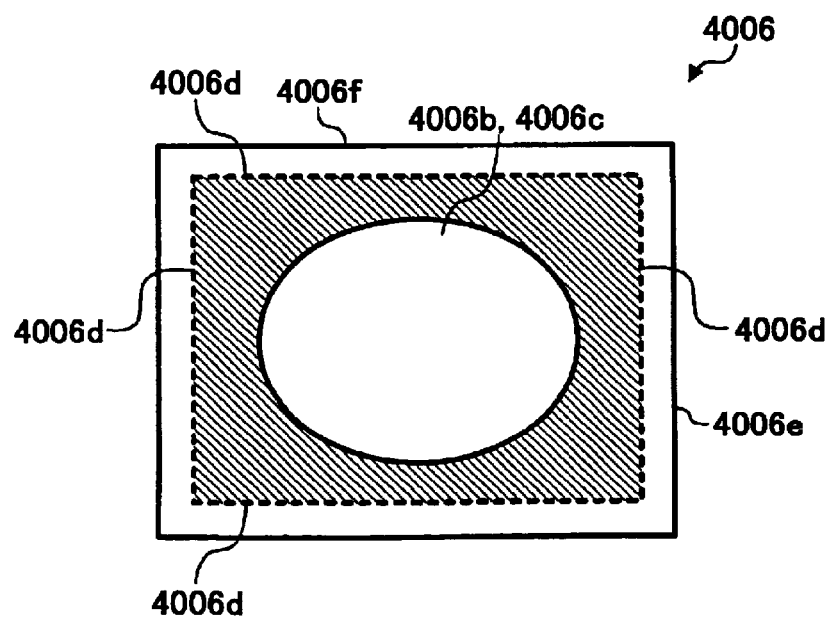
Figure 172:
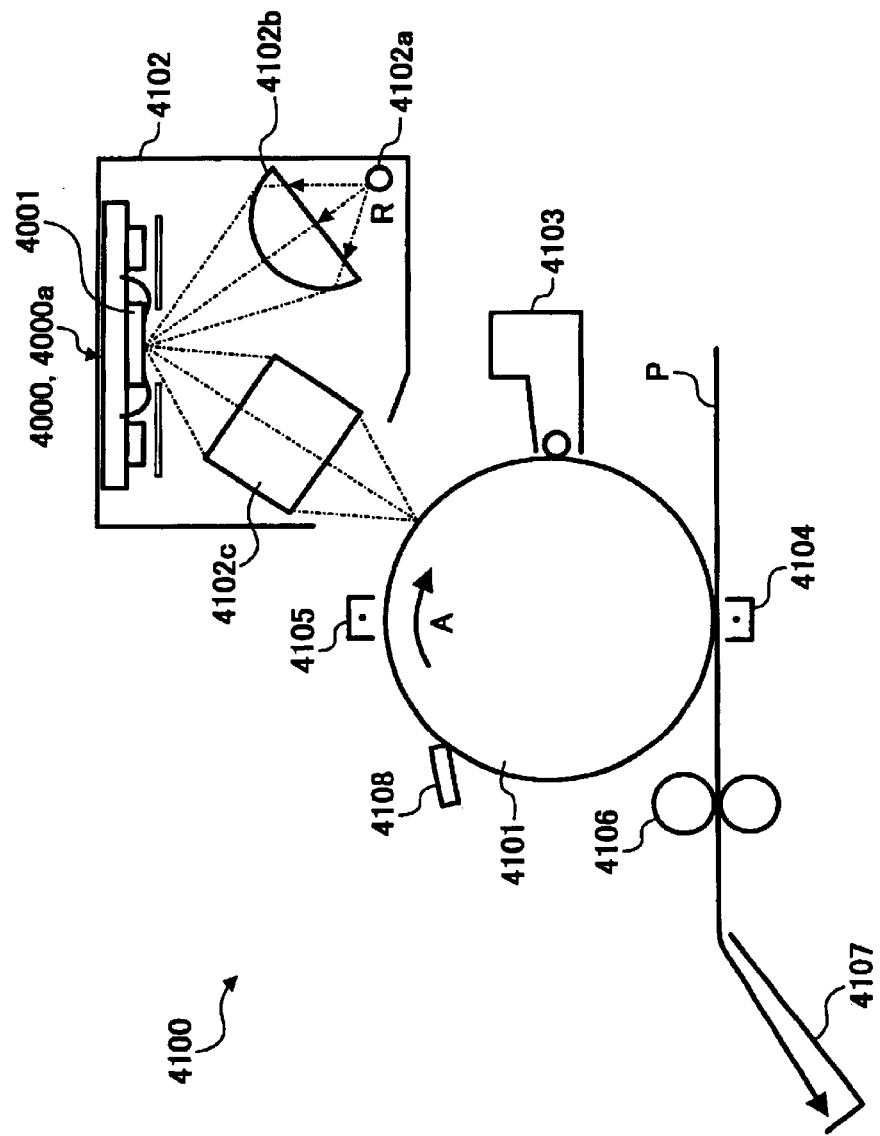
Figure 173:
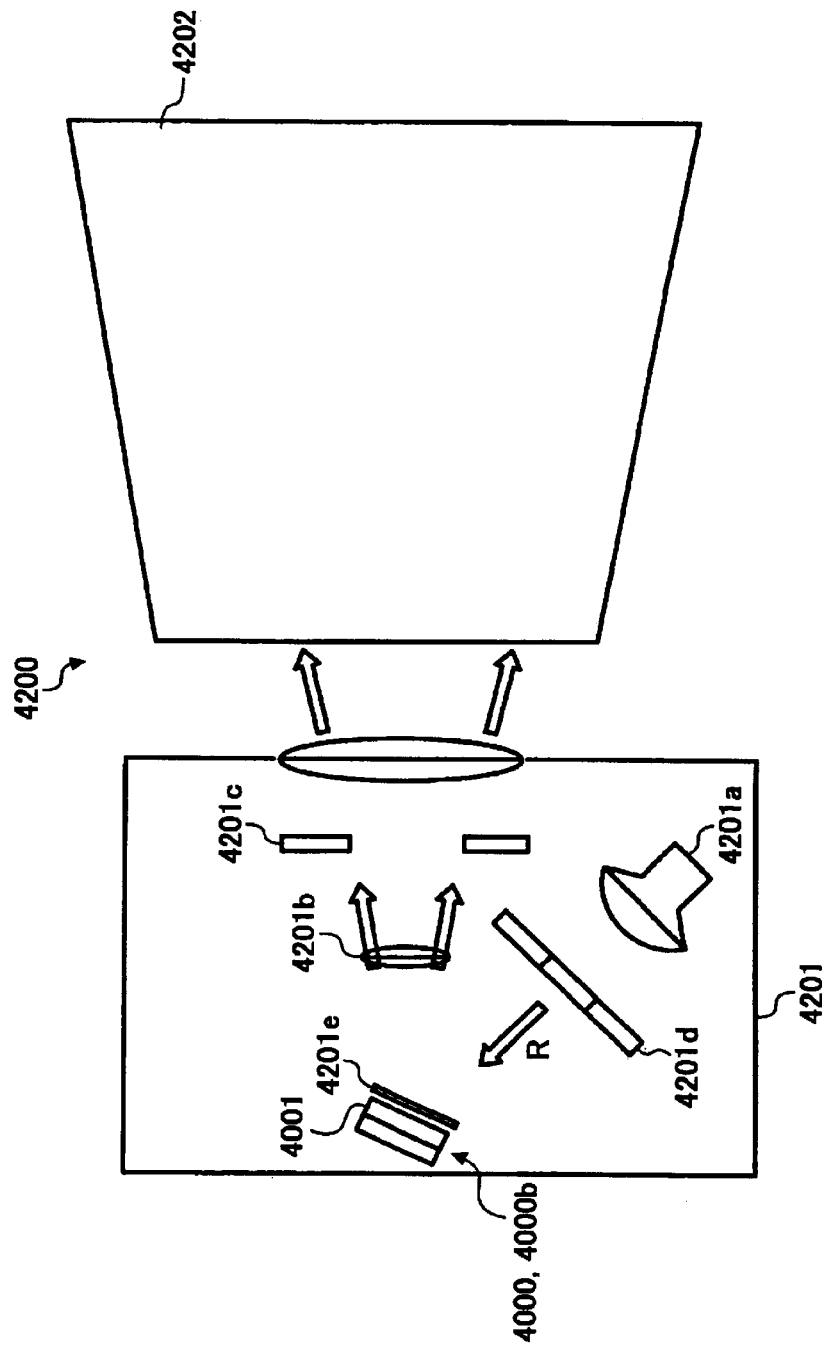

FIGS. 132A, 132B and 132C are schematic cross-sectional views which explain the manufacturing steps of the light modulator in the first example of the fourth embodiment;

FIG. 133A and FIG. 133B are schematic cross-sectional views which show the configuration of an organic EL element;

FIG. 134A and FIG. 134B are schematic cross-sectional views which show a light modulator in a driven state and a non-driven state, respectively, and which explain the second example of the fourth embodiment of the light modulator according to the present invention;

FIG. 135A, FIG. 135B, FIG. 135C and FIG. 135D are schematic cross-sectional views which explain the manufacturing steps of the light modulator in the second example of the fourth embodiment;

FIG. 136A, FIG. 136B, FIG. 136C and FIG. 136D are a schematic cross-sectional view, a schematic plan view, a schematic cross-sectional view and a schematic plan view which explain the manufacturing steps of the light modulator in the second example of the fourth embodiment, respectively;

FIG. 137A, FIG. 137B, FIG. 137C, FIG. 137D, FIG. 137E and FIG. 137F are a schematic cross-sectional view, a schematic plan view, a schematic cross-sectional view, a schematic cross-sectional view, a schematic cross-sectional view and a schematic cross-sectional view which explain the manufacturing steps of the light modulator in the second example of the fourth embodiment, respectively;

FIG. 138A and FIG. 138B are schematic cross-sectional views which show a light modulator in a driven state and a non-driven state, respectively, and which explain a third example of the fourth embodiment of the light modulator according to the present invention;

FIG. 139A, FIG. 139B, FIG. 139C and FIG. 139D are schematic cross-sectional views which explain the manufacturing steps of the light modulator in the third example of the fourth embodiment;

FIG. 140A, FIG. 140B, FIG. 140C and FIG. 140D are a schematic cross-sectional view, a schematic plan view, a schematic cross-sectional view and a schematic plan view which explain the manufacturing steps of the light modulator in the third example of the fourth embodiment, respectively;

FIG. 141A, FIG. 141B, FIG. 141C, FIG. 141D and FIG. 141E are a schematic cross-sectional view, a schematic plan view, a schematic cross-sectional view, a schematic cross-sectional view and a schematic cross-sectional view which explain the manufacturing steps of the light modulator in the third example of the fourth embodiment, respectively;

FIG. 142 is an explanatory view which explains a light modulator which shows a fifth embodiment of the present invention;

FIG. 143 is a plan view of FIG. 142;

FIG. 144 is an explanatory view which shows the states of the important sections of the light modulator which shows one example in the fifth embodiment of the present invention;

FIG. 145 is an explanatory view which shows the other states of the important sections of the light modulator which one example in the fifth embodiment of the present invention;

FIG. 146 is an explanatory view which shows the states of the important sections of the light modulator which shows another example in the fifth embodiment of the present invention;

FIG. 147 is an explanatory view which shows the other states of the important sections of the light modulator which another example in the fifth embodiment of the present invention;

FIG. 148 is an enlarged view which explains the important sections of the light modulator which shows yet another example in the fifth embodiment of the present invention;

FIG. 149 is an enlarged view which explains the important sections of the light modulator which shows yet another example in the fifth embodiment of the present invention;

FIG. 150 is an explanatory view which explains the manufacturing step for an important section of the manufacturing method of the light modulator which shows yet another example in the fifth embodiment of the present invention;

FIG. 151 is a plan view of FIG. 150;

FIG. 152 is an explanatory view which explains the manufacturing step for the other important section of the manufacturing method of the light modulator which shows yet another example in the fifth embodiment of the present invention;

FIG. 153 is a plan view of FIG. 152;

FIG. 154 is an explanatory view which explains the manufacturing step for the other important section of the manufacturing method of the light modulator which shows yet another example in the fifth embodiment of the present invention;

FIG. 155 is a plan view of FIG. 154;

FIG. 156 is an explanatory view which explains the manufacturing step for the other important section of the manufacturing method of the light modulator which shows yet another example in the fifth embodiment of the present invention;

FIG. 157 is a plan view of FIG. 156;

FIG. 158 is an explanatory view which explains the manufacturing step for the other important section of the manufacturing method of the light modulator which shows yet another example in the fifth embodiment of the present invention;

FIG. 159 is a plan view of FIG. 158;

FIG. 160 is an explanatory view which explains the manufacturing step for the other important section of the manufacturing method of the light modulator which shows yet another example in the fifth embodiment of the present invention;

FIG. 161 is a plan view of FIG. 160;

FIG. 162 is an explanatory view which explains the manufacturing step for the other important section of the manufacturing method of the light modulator which shows yet another example in the fifth embodiment of the present invention;

FIG. 163 is a plan view of FIG. 162;

FIG. 164 is an explanatory view which explains the manufacturing step for the other important section of the manufacturing method of the light modulator which shows yet another example in the fifth embodiment of the present invention;

FIG. 165 is a plan view of FIG. 164;

FIG. 166 is an explanatory view which explains the manufacturing step for the other important section of the manufacturing method of the light modulator which shows yet another example in the fifth embodiment of the present invention;

FIG. 167 is a plan view of FIG. 166;

FIG. 168 is an explanatory view which explains the manufacturing step for the other important section of the manufacturing method of the light modulator which shows yet another example in the fifth embodiment of the present invention;

FIG. 169 is a plan view of FIG. 168;

FIG. 170 is an explanatory view which explains manufacturing steps for the other important sections of the manufacturing method of the light modulator which shows yet another example in the fifth embodiment of the present invention;

FIG. 171 is a plan view of FIG. 170;

FIG. 172 is an explanatory view which explains an image formation apparatus which includes the light modulator which shows the fifth embodiment of the present invention; and FIG. 173 is an explanatory view which explains an image projection and display apparatus which includes the light modulator which shows the fifth embodiment of the present invention.

DETAILED DESCRIPTION

The preferred embodiments of a light modulator, a manufacturing method of the light modulator, a light information processing apparatus which includes the light modulator, an image formation apparatus which includes the light modulator and an image projection and display apparatus which includes the light modulator according to the present invention will be explained hereinafter in detail in the order of a first embodiment, a second embodiment, a third embodiment, a fourth embodiment and a fifth embodiment.

(First Embodiment)

A first embodiment will be explained in detail with reference to FIGS. 1 to 80.

Figure 1:
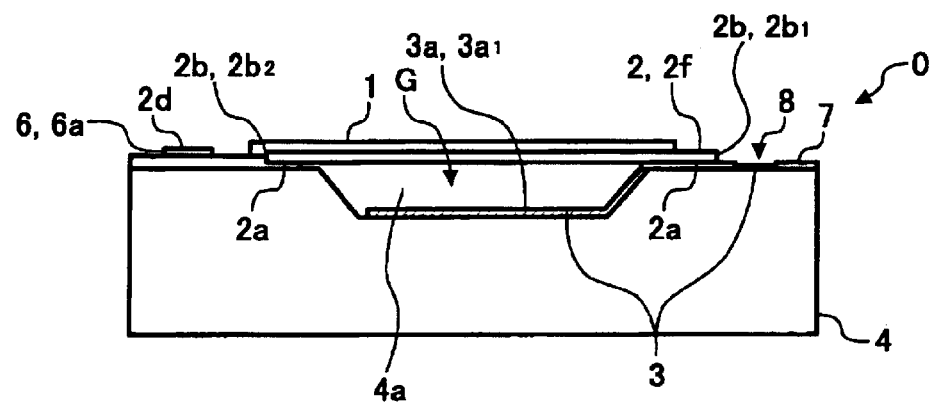
FIG. 1 is an explanatory view which explains a light modulator which shows a first embodiment of the present invention.
Figure 2:
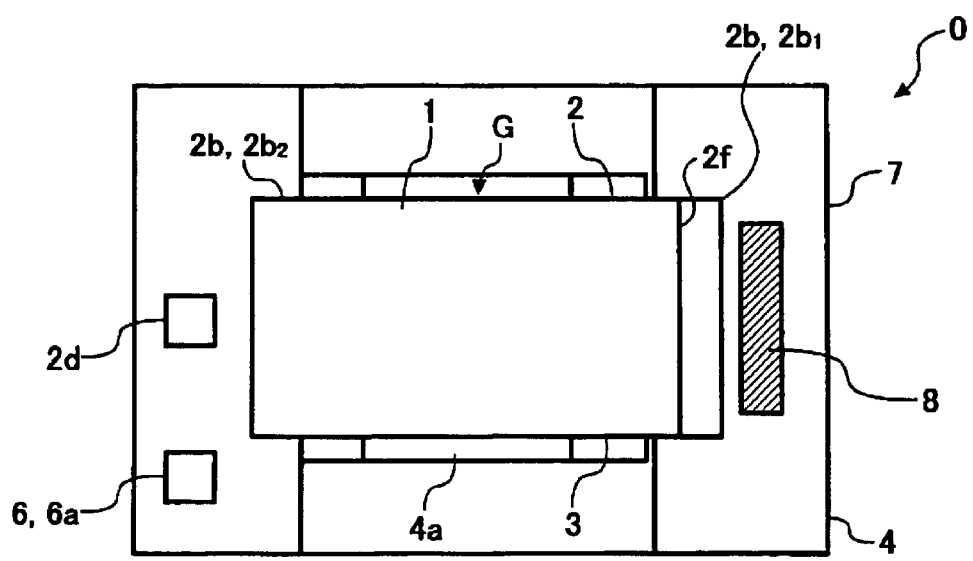
FIG. 2 is a plan view of FIG. 1.

In FIGS. 1 and 2, a light modulator 0 which modulates light by changing the reflection direction of incident light, consists of a light reflection film 1, a center beam 2, a substrate electrode 3 and a substrate 4. The light reflection film 1 regularly reflects the incident light. The center beam 2 is formed out of a thin film constituted to be combined with the light reflection film 1 formed out of a metallic thin film on the front side of one surface of the center beam 2. The both ends of the center beam 2 are fixed and the center beam 2 is deformed by an electrostatic force. The substrate electrode 3 is opposed to the center beam 2 across a gap (G) in a concave section 4a formed on the rear side of the other surface of the center beam 2 constituted to be combined with a beam electrode 2f so that a voltage can be applied to the center beam 2. The substrate electrode 3 applies a driving voltage to the center beam 2. A parallel opposed surface $3a_1$, which is the opposed surface $3a$ of the substrate electrode 2 opposed to the center beam 2 which modulates the incident light on the light reflection film 1, restricts the deformation of the center beam 2 due to the application of the driving voltage thereto from the substrate electrode 3 protected by a protection film 7 by abutting on the center beam 2. The substrate 4 consists of light transmission glass on which the parallel opposed surface $3a_1$ and the substrate electrode 3 consisting of the parallel opposed surface $3a_1$ of the opposed surface $3a$ are formed in the concave section $4a$ to hold the to-be-held sections $2a$ of the center beam 2, monocrystalline silicon on which a driving circuit $2d$ driving the center beam 2 is formed and the other materials. The light modulator 0 is simple in the structure of changing the direction of the incident light and thereby modulating light, fast in response, capable of using the incident light without limiting the wavelength thereof, stable in operation and high in reliability.

The center beam 2 is made of monocrystalline silicon, polycrystalline silicon or a silicon nitride thin film. The center beam 2 made of monocrystalline silicon has fewer defects and sustains longer life. If the center beam 2 made of polycrystalline silicon is used, a CVD method or the like can be used and cost can be, therefore, reduced. If the center beam 2 made of the silicon nitride thin film is used, a switching response speed can be accelerated by the action of the tensile stress of the silicon nitride thin film.

Although a metallic thin film is normally used as the material of the light reflection film 1 constituted to be combined with one surface of the center beam 2, a multilayer film made of a dielectric material may be used.

The center beam 2 is formed to be combined with the beam electrode $2f$ which is formed on the other surface of the center beam 2 and which generates an electrostatic force. The beam electrode $2f$ may be formed independently of the center beam 2. If the light reflection film 1 reflecting the incident light is made of a metallic thin film, the metallic thin film can serve as an electrode and the beam electrode $2f$ can be, therefore, omitted.

If the center beam 2 is made of monocrystalline or polycrystalline silicon, the resistance of the monocrystalline or polycrystalline silicon is decreased by impurities and the monocrystalline or polycrystalline silicon is used as an electrode, then the beam electrode $2f$ can be omitted.

The distance between one edge $2b_1$ and the other edge $2b_2$ of two opposed edges $2b$ on the both ends of the center beam 2 fixed to and held by the substrate 4 is fixed to be equal to or longer than the length of one edge $2b_1$ or the other edge $2b_2$ of the two edges $2b$. This can ensure driving the center beam 2 at a lower driving voltage and accelerate the deformation of the center beam 2.

The substrate electrode 3 which drives the center beam 2 is normally made of metal, such as Al, Cr, Ti or TiN, or a thin film made of a metallic compound. If the substrate 4 is made of light transmission glass and the substrate electrode 3 is made of an ITO of a transparent conductive film, then it is possible to observe the state of the center beam 2 from the rear side of the substrate 4, which is advantageous to inspection. In addition, if the substrate 4 is made of monocrystalline silicon, an electrode can be formed by a method of diffusing impurities into the monocrystalline silicon and a part of or all of the electronic circuits $6a$ of a driving circuit 6 can be formed within the substrate 4 by a diffusion method. Further, a wiring matrix can be formed by using the diffusion method, which is advantageous to the formation of many complex wirings. Moreover, it is possible to form a part of or all of the driving circuit $2d$, which applies a voltage to the center beam 2, within the substrate 4 and to thereby make the light modulator 0 compact.

The protection film 7 is normally made of an oxide film formed by a vacuum film formation method. The protection film 7 acts to prevent the substrate electrode 3 from being contacted with the center beam 2 and short-circuited. A pad opening section 8 which serves to connect the substrate electrode 3 to an external signal is formed in the protection film 7.

Figure 3:
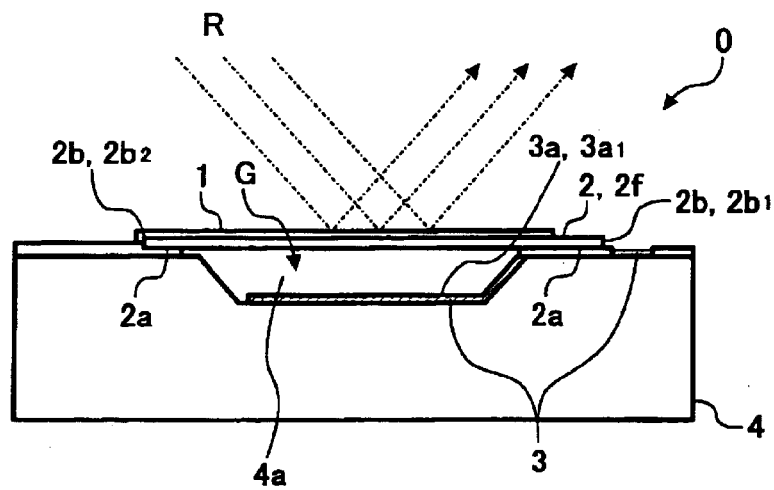
FIG. 3 is an explanatory view which explains the states of the important sections of the light modulator which shows one example in the first embodiment of the present invention.
Figure 4:
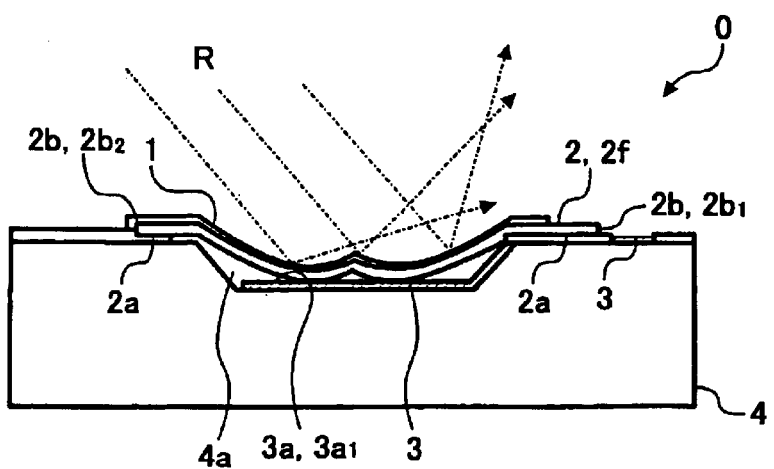
FIG. 4 is an explanatory view which explains the states of the other important sections of the light modulator which shows one example in the first embodiment, of the present invention.

In FIGS. 3 and 4, if no electrostatic force acts on the center beam 2, the to-be-held sections $2a$ of the center beam 2 is held by and fixed to the substrate 4 with one edge $2b_1$ and the other edge $2b_2$ of the two edges $2b$ on the two opposed ends of the center beam 2 held by and fixed to the substrate 4. At this moment, incident light beams (R) are regularly reflected by the surface of the light reflection film 1 constituted to be combined with the front side of one surface of the center beam 2 and moved in directions indicated by arrows (see FIG. 3).

A driving voltage is applied between the beam electrode $2f$, which is constituted to be combined with the center beam 2, and the substrate electrode 3 to thereby act an electrostatic force on the center beam 2. At that moment, the center beam 2 having the the both ends held and fixed to the substrate 4 is bent, abutted on the surface of the substrate 4, deformed along the shape of the gap (G) of the parallel concave section $4a$ formed on the other surface of the center beam 2, attracted to and abutted on the parallel opposed surface $3a_1$ the opposed surface $3a$ of the substrate electrode 3 to restrict the bending of the center beam 2, and driven by a digital signal. The surface of the light reflection film 1 constituted to combined with the center beam 2 is influenced by the bending of the center beam 2 (i.e., the surface of the light reflection film 1 becomes irregular) and the direction of the reflected light of each incident light beam (R) is disturbed (see FIG. 4), such that the reflected light has random directions because of the irregular shape of the light reflection film 1.

If observed from the direction in which the incident light beams (R) are reflected, the state of the light modulator 0 shown in FIG. 3 is a bright ON state since the light reflection film 1 constituted to be combined with the center beam 2 regularly reflects the incident light beams (R) and the state thereof shown in FIG. 4 is a dark OFF state since the direction of the reflected light of each incident light beam (R) is disturbed. As a result, the light modulator 0 modulates light with a simple structure, fast response, incident light being used without limiting the wavelength thereof, stable operation and high reliability.

In the light modulator 0, the center beam 2 which switches light is a fixed beam having the both ends held by and fixed to the substrate. Therefore, compared with a cantilever structure, free oscillation occurs infrequently to the center beam 2, the center beam 2 is not deformed even if a residual stress exists, the center beam 2 is not changed with the passage of time, and response speed is fast because of lack of the problem of free oscillation. The light modulator 0 is, therefore, excellent in the reliability of the center beam 2 and response speed.

After the center beam 2 is deformed by an electrostatic force generated by applying a driving voltage between the center beam 2 and the substrate electrode 3, a voltage opposite in polarity to the driving voltage is applied between the center beam 2 and the substrate electrode 3 to the extent that the center beam 2 is not deformed. As a result, the center beam 2 has higher stability, making it possible to drive the center beam 2 with a high frequency.

A positive voltage and a negative voltage are alternately applied, as the driving voltage, between the center beam 2 and the substrate electrode 3 with reference to the potential of the center beam 2 to deform the center beam 2. As a result, as in the case of the above, the center beam 2 has higher stability, making it possible to drive the center beam 2 with a high frequency.

Figure 5:
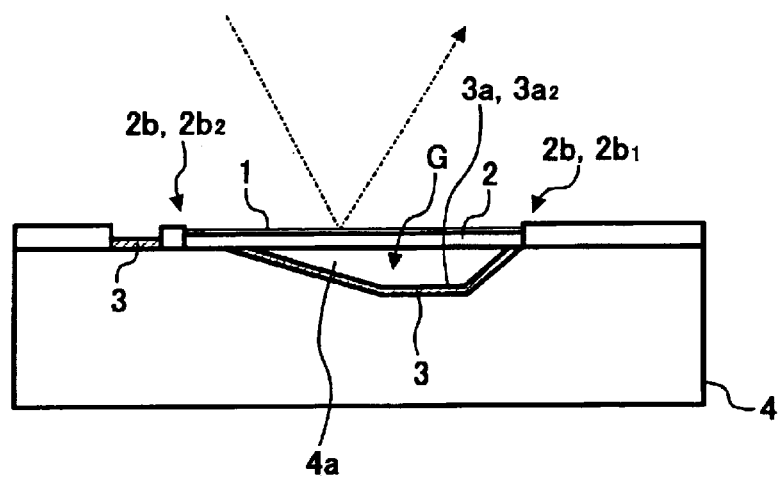
FIG. 5 is an explanatory view which explains the states of the important sections of a light modulator which shows another example in the first embodiment of the present invention.
Figure 6:
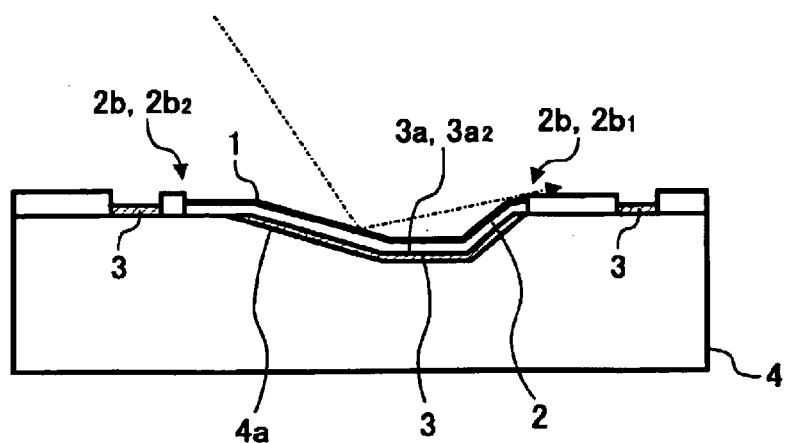
FIG. 6 is an explanatory view which explains the states of the other important sections of the light modulator which shows another example in the first embodiment of the present invention.

In FIGS. 5 and 6, the gap (G) of the concave section 4a formed between the center beam 2 and the partially non-parallel opposed surface $3a_2$ of the opposed surface 3a of the substrate electrode 3 opposed to the center beam 2 is formed on a partially non-parallel, partially inclined surface to the center beam 2 held by the substrate 4 between the two edges 2b on the two opposed ends of the center beam 2. The shape of this partially non-parallel, partially inclined surface is effective to decrease the driving voltage required to deform the center beam 2.

The electrostatic force acting on the center beam 2 is inversely proportional to the square of the distance between the substrate electrode 3 and the center beam 2. Namely, the shorter the distance between the substrate electrode 3 and the center beam 2, the higher the electrostatic force acting on the center beam 2. For that reason, if a driving voltage is applied to the center beam 2, the deformation of the center beam 2 starts in the narrower portion of the gap (G) of the concave section 4a. The center beam 2 is then abutted on the surface of the substrate 4, deformed along the shape of the gap (G) of the concave section 4a which is the partially non-parallel, partially inclined surface formed on the other surface of the center beam 2, attracted to and abutted on the partially non-parallel, opposed surface $3a_2$ of the opposed surface 3a of the substrate electrode 3 to thereby restrict the bending of the center beam 2, and driven by a digital signal.

The gap (G) of the concave section 4a becomes narrower in accordance with the deformation of the center beam 2. As a result, it is possible to drive the center beam 2 at a low driving voltage compared with a case in which the gap (G) is formed in the parallel concave section 4a on the parallel opposed surface $3a_1$, thereby promoting the deformation of the center beam 2.

Figure 7:
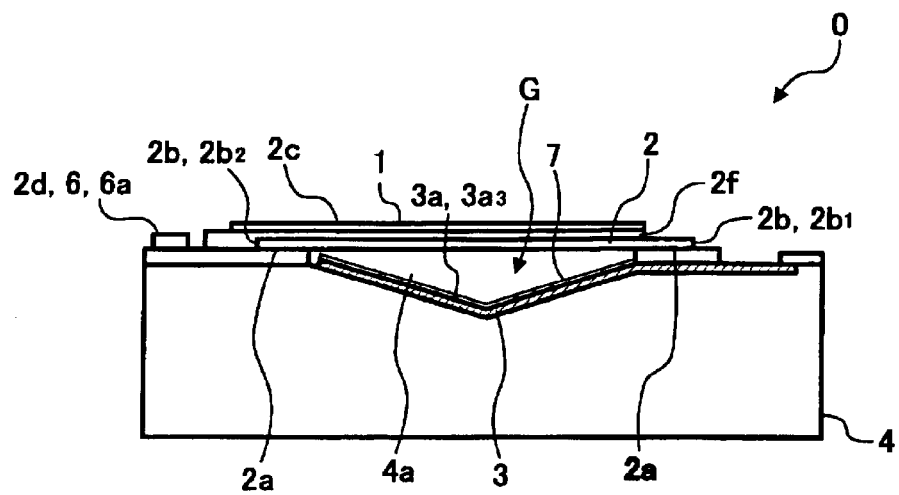
FIG. 7 is an explanatory view which explains a light modulator which shows yet another example in the first embodiment of the present invention.
Figure 8:
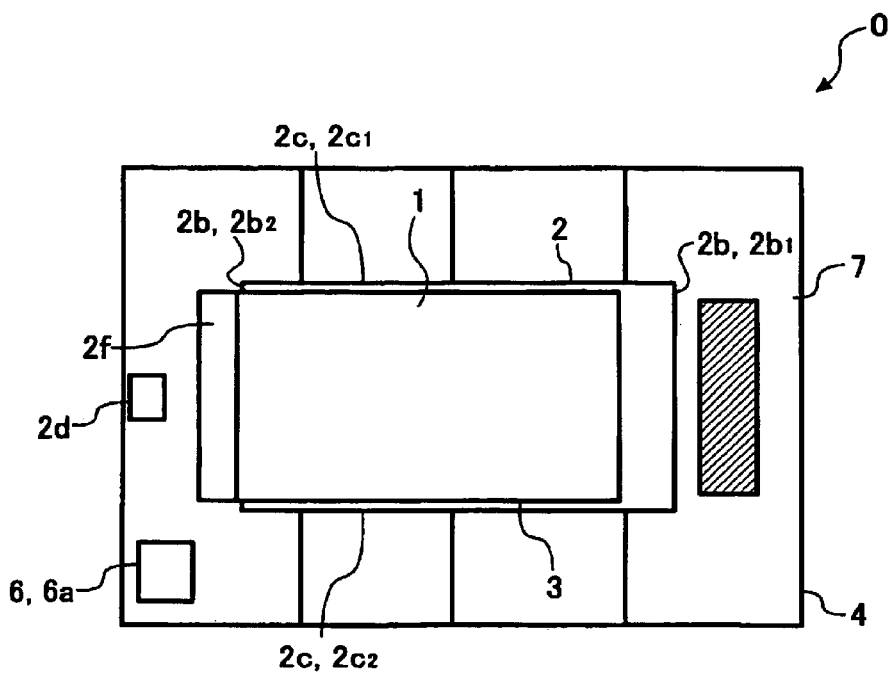
FIG. 8 is a plan view of FIG. 7.

In FIGS. 7 and 8, the center beam 2 is constituted to be combined with the light reflection film 1 which regularly reflects incident light and the beam electrode 2f which applies a voltage to the center beam 2. The light reflection film 1 and the beam electrode 2f are provided on one surface of the center beam 2. One edge $2b_1$ and the other edge $2b_2$ on the two opposed ends of the center beam 2, respectively are held by and fixed to the substrate 4.

The gap (G) is formed in the concave section 4a of the substrate 4 opposed to the center beam 2 and formed between the center beam 2 and a plurality of non-parallel, opposed surfaces $3a_3$ which are two non-parallel opposed surfaces of the opposed surface 3a of the substrate electrode 3 opposed to the center beam 2 and protected by the protection film 7. The gap (G) of the concave section 4a consists of two non-parallel, inclined surfaces between the two edges 2b on the two opposed ends of the center beam 2, respectively, held by and fixed to the substrate 4.

Due to the gap (G) of the concave section 4a which is formed between the center beam 2 and a plurality of non-parallel, opposed surfaces $3a_3$ which are two non-parallel opposed surfaces of the opposed surface 3a of the substrate electrode 3 opposed to the center beam 2 and protected by the protection film 7, the clearance between the beam electrode 2f of the center beam 2 and a plurality of non-parallel, opposed surfaces $3a_3$ which is protected by the protection film 7 opposed to the two non-parallel opposed surfaces of the opposed surface 3a of the substrate electrode 3 opposed to the center beam 2 is formed on the inclined surface of the two non-parallel surfaces.

The electrostatic force acting on the center beam 2 causes a driving voltage to be applied between the beam electrode 2f constituted to be combined with the center beam 2 and a plurality of non-parallel, opposed surfaces $3a_3$ which are two non-parallel opposed surfaces of the opposed surface 3a of the substrate electrode 3 opposed to the center beam 2 and protected by the protection film 7. As a result, an electrostatic force with which the center beam 2 is bent is generated using a plurality of non-parallel, opposed surfaces $3a_3$ which are two non-parallel opposed surfaces of the opposed surface 3a of the substrate electrode 3 formed on the concave section 4a of the substrate 4 opposed to the center beam 2 and protected by the protection film 7 through the gap (G) of the concave section 4a which is formed between a plurality of non-parallel, opposed surfaces $3a_3$ which are two non-parallel opposed surfaces of the opposed surface 3a of the substrate electrode 3 formed on the concave section 4a of the substrate 4 opposed to the center beam 2 and protected by the protection film 7.

The center beam 2 is made of a thin film. As the thin film, various types of materials such as monocrystalline silicon, polycrystalline silicon, an amorphous silicon thin film, nitride silicon, a metallic thin film and an organic thin film are available. The center beam 2 made of a monocrystalline silicon thin film has fewer defects and sustains longer life. If the center beam 2 made of a polycrystalline silicon thin film, an amorphous silicon thin film or a silicon nitride thin film is used, the CVD method or the like can be used as a manufacturing method and cost can be, therefore, reduced. If the center beam 2 made of the metallic thin film is used, the center beam 2, the beam electrode 2f and the light reflection film 1 which regularly reflects incident light can be formed integrally with one another by being constituted to be combined with one another.

Although a metallic thin film is normally used as the material of the light reflection film 1 constituted to be combined with one surface of the center beam 2, a multilayer film made of a dielectric material may be used. In addition, the beam electrode 2f which generates an electrostatic force is formed on the other surface of the center beam 2 to be combined with the center beam 2.

The beam electrode 2f may be formed independently of the center beam 2. If the light reflection film 1 reflecting the incident light is made of a metallic thin film, the metallic thin film can serve as an electrode and the beam electrode 2f can be, therefore, omitted. If the center beam 2 is made of monocrystalline or polycrystalline silicon, the resistance of the monocrystalline or polycrystalline silicon is decreased by impurities and the monocrystalline or polycrystalline silicon is used as an electrode, then the beam electrode 2f can be omitted.

In addition, a transparent protection film which protects the light reflection film 1 and the beam electrode 2f is sometimes formed on the center beam 2.

While the center beam 2 made of the thin film is constituted to be combined with the light reflection film 1 and the beam electrode 2f made of the above-explained thin films, the center beam 2 is formed to have a tensile stress by adjusting formation conditions for the respective thin films.

If the center beam 2, the light reflection film 1, the beam electrode 2f and the like have tensile stresses with plus signs and compressive stresses with minus signs, the center beam 2 is formed by adjusting thicknesses (t) and stresses (s) of the respective thin films so as to satisfy $t_1 \cdot s_1 + t_2 \cdot S_2 + \ldots + t_n \cdot s_n / t_1 + t_2 + \ldots + t_n = 0$ where combinations of thicknesses (t) and stresses (s) are $(t_1, s_1), (t_2, s_2), \ldots (t_n, s_n)$.

If so adjusted, the tensile stress is stored in the center beam 2, making it possible to attain the stable shape of the center beam 2 and higher driving frequency. Furthermore, since the center beam 2 satisfies a relationship of $(t/1)^2 = s/E$ with respect to the tensile stress (s), the thickness (t), the Young's modulus (E) of the thin film material, the distance (1) between one edge $2b_1$ and the other edge $2b_2$ of the two edges 2b on the opposed both ends of the center beam 2, respectively, held by the substrate 4, it is possible to decrease a driving voltage.

All of or a part of the gap (G) of the concave section 4a which generates an electrostatic force is formed in the substrate 4. Various materials such as light transmission glass, ceramic, monocrystalline silicon, metal and an organic material are available as the material of the substrate 4.

If the substrate 4 is made of light transmission glass, the state of the center beam 2 can be observed from the rear side of the substrate 4, which is advantageous to the inspection of products.

If the substrate 4 is made of monocrystalline silicon, an electrode can be formed by a method of diffusing impurities into the monocrystalline silicon and a part of or all of the electronic circuits 6a of a driving circuit 6 can be formed within the substrate 4 by a diffusion method. Further, a wiring matrix can be formed by using the diffusion method, which is advantageous to the formation of many complex wirings. Moreover, it is possible to form a part of or all of the driving circuit 2d, which applies a voltage to the center beam 2, within the substrate 4 and to thereby make the light modulator 0 compact.

The gap (G) of the non-parallel concave section 4a which is formed between the center beam 2 and a plurality of non-parallel, opposed surfaces $3a_3$ which are two non-parallel opposed surfaces of the opposed surface 3a of the substrate electrode 3 opposed to the center beam 2 and protected by the protection film 7, is cone-shaped. Namely, the first non-parallel, inclined surface which changes from the held end of the to-be-held section 2a of one edge $2b_1$ of the two edges 2b on the opposed both ends of the center beam 2 toward the held end of the to-be-held section 2a of the other edge $2b_2$ of the two edges 2b and the second non-parallel, inclined surface which changes from the held end of the to-be-held section 2a on the other edge $2b_2$ of the two edges 2b on the opposed both ends of the center beam 2 toward the held end of the to-be-held section 2a on one edge $2b_1$ of the two edges 2b are formed so that the size of the gap (G) is equal in equidistant portions from the respective to-be-held sections 2a on the center beam 2. The gap (G) has the largest distance in the central portion of the center beam 2 held by the substrate 4. The gap (G) is sequentially increased toward the central portion of the center beam 2 from one edge $2b_1$, of the two edges 2b on the two opposed ends of the center beam 2, the other edge $2b_2$ thereof, one edge $2c_1$ of the other edges 2c and the other edge $2c_2$ thereof.

The shape of the gap (G) of the concave section 4a formed on the other surface of the center beam 2 is not limited to that of the gap (G) of the concave section 4a which is formed in the concave section 4a of the substrate 4 opposed to the center beam 2 and which consists of the two non-parallel, inclined surfaces formed between the center beam 2 and a plurality of non-parallel, opposed surfaces $3a_3$ which are two non-parallel opposed surfaces of the opposed surface 3a of the substrate electrode 3 opposed to the center beam 2. The various other shapes including that in which the largest gap portion is offset to one edge $2b_1$ or the other edge $2b_2$ of the to-be-held section 2a.

The gap (G) of the concave section 4a on the two non-parallel, inclined surfaces which is formed in the concave section 4a of the substrate 4 opposed to the center beam 2 and which is formed between the center beam 2 and a plurality of non-parallel, opposed surfaces $3a_3$ which are two non-parallel opposed surfaces of the opposed surface 3a of the substrate electrode 3 opposed to the center beam 2, can be formed by photolithography and dry etching. A photosensitive resist material which becomes a dry etching mask is formed on the substrate 4. The light transmission quantity of the photosensitive resist material is adjusted to thereby form a photomask. Using the photomask, a photoresist is formed in a desired non-parallel concave section 4a. The shape of the photoresist is then transferred and etched on the substrate 4 by anisotropic dry etching.

The substrate electrode 3 is made of a conductive thin film of metal, such as Al, Cr, Ti or TiN, or a metallic compound. All of or a part of the substrate electrode 3 is formed in the concave section 4a formed on the substrate 4.

If the substrate 4 is made of light transmission glass and the substrate electrode 3 is made of a transparent conductive film of, for example, ITO or ZnO, then the state of the center beam 2 can be observed from the rear side of the substrate 4, which is advantages to inspection.

If the substrate 4 is made of monocrystalline silicon, the substrate electrode 3 can be formed by a method of diffusing impurities of a different conductive type into the monocrystalline silicon of the substrate 4.

If the substrate 4 is made of a conductive material such as metal, the substrate electrode 3 is formed through an insulation material.

The protection film 7 is normally made of an insulation material, particularly an oxide film by a vacuum film formation method. The protection film 7 functions to prevent the substrate electrode 3 from being contact with the beam electrode 2f of the center beam 2 and short-circuited.

A pad opening section 8 is sometimes formed in a part of the protection film 7 to connect the substrate electrode 3 to an external signal.

To form the center beam 2 having one edge $2b_1$ and the other edge $2b_2$ of the two edges 2b on the two opposed ends of the center beam 2 which are held the substrate 4 on the respective to-be-held sections 2a, it is effective to use a sacrificial layer process method.

That is, the gap (G) of the concave section 4a which is formed in the concave section 4a of the substrate 4 opposed to the center beam 2 and which is formed between the center beam 2 and the non-parallel, opposed surfaces $3a_3$ of the opposed surface 3a of the substrate electrode 3 is buried with a sacrificial material layer 5, which can be removed later and which is not shown, and flattened. The center beam 2 is formed on the gap (G) thus flattened and then the sacrificial material layer 5, which is not shown, is etched away.

The material of the sacrificial material layer 5 is appropriately selected in view of the material of the center beam 2 and that of the substrate 4 having the gap (G) formed in the concave section 4a.

That is, when removing the sacrificial material layer 5, which is not shown, it is necessary to prevent the center beam 2 and the substrate 4 from being damaged.

To remove the sacrificial material layer 5, which is not shown, wet etching or dry etching is used. For that reason, the materials of the center beam 2, the substrate 4 and the sacrificial material layer 5 having high etching selectivity and high etching rates are selected.

If the center beam 2 is made of the nitride film or the polycrystalline silicon film, an oxide film formed by the CVD method can be selected as the material of the sacrificial material layer 5, which is not shown.

It is also possible to use the center beam 2 made of the nitride film and the sacrificial material layer 5, which is not shown, made of the polycrystalline silicon film. If dry etching can be used to remove the sacrificial material layer 5 which is not shown, various materials are available as the material of the sacrificial material layer 5, which is not shown and serves as a resist film.

In this case, however, it is requisite to form the center beam 2 and carry out the other processes at a temperature of not more than 300° C.

Figure 9:
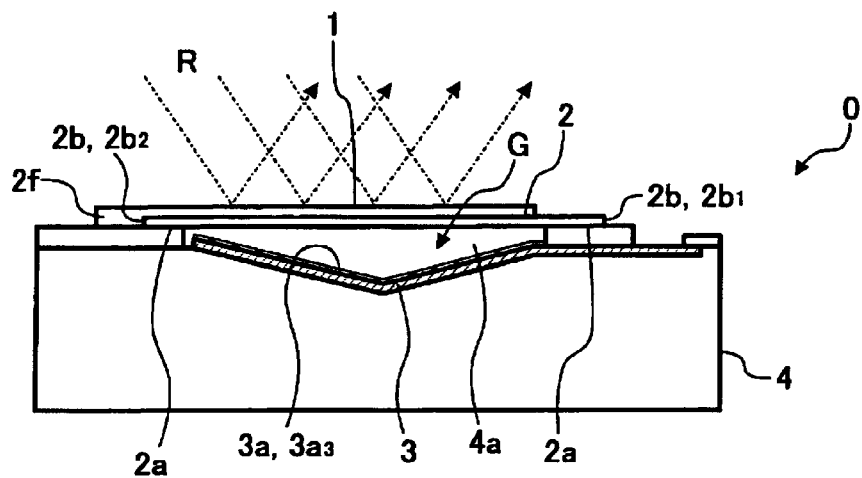
FIG. 9 is an explanatory view which explains the states of the important sections of a light modulator which shows yet another example in the first embodiment of the present invention.
Figure 10:
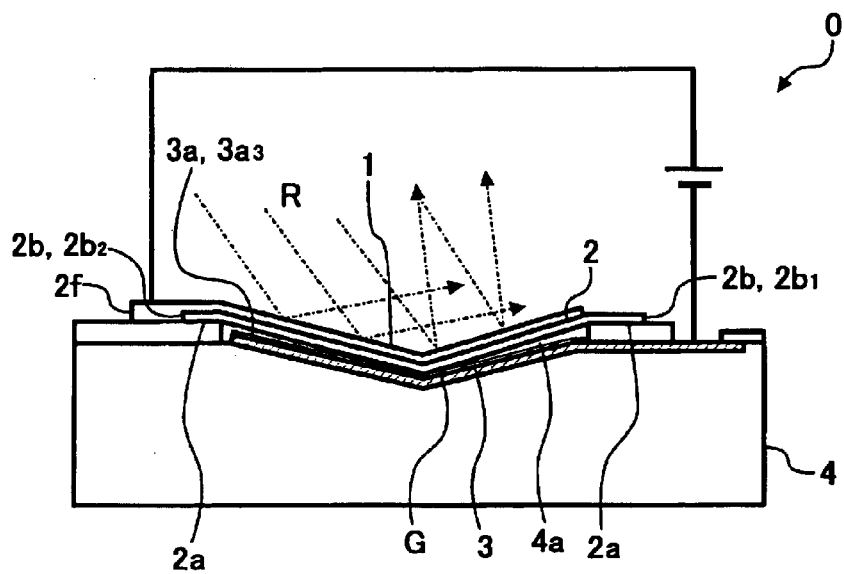
FIG. 10 is an explanatory view which explains the states of the other important sections of the light modulator which shows yet another example in the first embodiment of the present invention.

In FIGS. 9 and 10, if no electrostatic force acts on the center beam 2, the to-be-held sections 2a of the center beam 2 are held by the substrate 4 with one edge $2b_1$ and the other edge $2b_2$ of the two edges 2b on the two opposed ends of the center beam 2 fixed to the substrate 4.

Incident light beams (R) at this moment are regularly reflected by the light reflection film 1 constituted to be combined with one surface of the center beam 2 and moved in directions indicated by arrows (see FIG. 9).

A driving voltage is applied between the beam electrode 2f constituted to be combined with the center beam 2 and a plurality of non-parallel, opposed surfaces $3a_3$ which are two non-parallel surfaces of the opposed surface 3a of the substrate electrode 3 opposed to the center beam 2, thereby acting an electronic force on the center beam 2.

The center beam 2 having the both ends fixed to the substrate 4 is bent, abutted on the surface of the substrate electrode 4, deformed along the shape of the gap (G) of the concave section 4a of the two non-parallel, inclined surfaces formed on the other surface of the center beam 2, attracted to and abutted on a plurality of non-parallel, opposed surfaces 3a of the opposed surface 3a of the substrate electrode 3 to thereby restrict the bending of the center beam 2, and driven by a digital signal.

At this moment, the surface of the light reflection film 1 constituted to be combined with the center beam 2 is influenced by the bending of the center beam 2 and the directions of the reflection light beams of incident light beams (R) are disturbed in two directions (see FIG. 10).

If observed from the direction in which the incident light beams (R) are reflected, the state of the light modulator 0 shown in FIG. 9 is a bright ON state since the light reflection film 1 constituted to be combined with the center beam 2 regularly reflects the incident light beams and the state thereof shown in FIG. 10 is a dark OFF state since the reflection light beams of the incident light beams are disturbed in two directions. As a result, light modulation is carried out.

In the light modulator 0, the center beam 2 which switches light is a fixed beam having the both ends fixed to the substrate 4. Therefore, compared with a cantilever structure, free oscillation occurs infrequently to the center beam 2, the center beam 2 is not deformed even if a residual stress exists, the center beam 2 is not changed with the passage of time, and response speed is fast because of lack of the problem of free oscillation. The light modulator 0 is, therefore, excellent in the reliability of the center beam 2 and response speed.

The gap (G) of the non-parallel concave section 4a formed between the center beam 2 and a plurality of non-parallel, opposed surfaces $3a_3$ which are two non-parallel opposed surfaces of the opposed surface 3a of the substrate electrode 3 opposed to the center beam 2 is formed on the two non-parallel, inclined surface to the center beam 2 between the two edges 2b on the two opposed ends of the center beam 2 held by the substrate 4. The shapes of these two non-parallel, inclined surfaces are effective to further decrease a driving voltage required to deform the center beam 2.

An electrostatic force acting on the center beam 2 is inversely proportional to the square of the distance between the center beam 2 and a plurality of non-parallel, opposed surfaces $3a_3$ which are two non-parallel, inclined surfaces of the opposed surface 3a of the substrate electrode 3 opposed to the center beam 2.

Namely, the smaller the distance between the center beam 2 and a plurality of non-parallel, opposed surfaces $3a_3$ which are two non-parallel, inclined surfaces of the opposed surface 3a of the substrate electrode 3 opposed to the center beam 2, the higher the electronic force acting on the center beam 2. For that reason, if a driving voltage is applied to the center beam 2, the deformation of the center beam 2 starts in the narrower portion of the two inclined surfaces in the gap (G) of the concave section 4a.

In addition, the gap (G) of the concave section 4a is narrower in accordance with the deformation of the center beam 2. Compared with the gap (G) of the parallel, flat concave section 4a of the parallel opposed surface $3a_1$ and the gap (G) of the partially non-parallel, partially inclined surface of the partially non-parallel, opposed surface $3a_2$, the center beam 2 is deformed at a low voltage.

Figure 11:
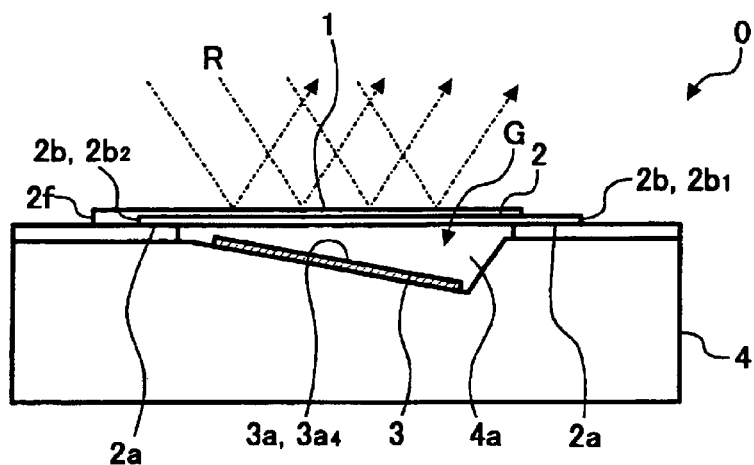
FIG. 11 is an explanatory view which explains the states of the important sections of a light modulator which shows yet another example in the first embodiment of the present invention.
Figure 12:
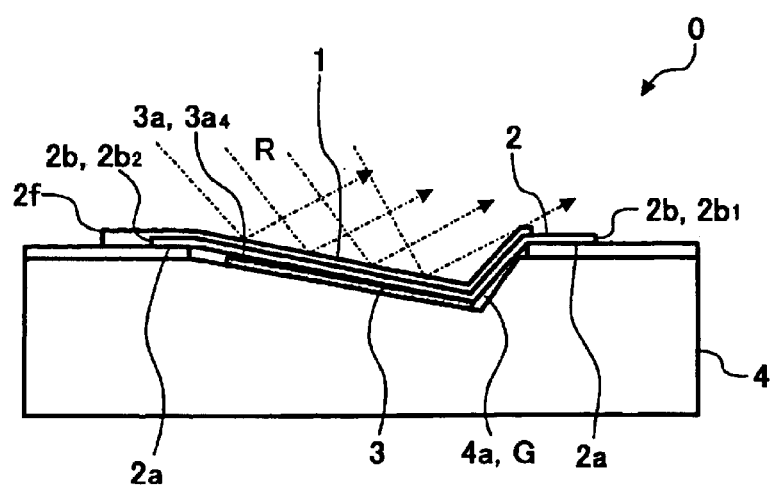
FIG. 12 is an explanatory view which explains the states of the other important sections of the light modulator which shows yet another example in the first embodiment of the present invention.

In FIGS. 11 and 12, the gap (G) of the non-parallel concave section 4a formed in the concave section 4a of the substrate 4 opposed to the center beam 2 and formed between the center beam 2 and an entirely non-parallel opposed surface $3a_4$ which is the entirely non-parallel, inclined surface of the opposed surface 3a of the substrate electrode 3 opposed to the center beam 2, is the largest in size in a portion offset to one edge $2b_1$ of the to-be-held sections 2a. The size of the gap (G) is gradually enlarged from the other edge $2b_2$ toward one edge $2b_1$ of the two edges 2b on the two opposed ends of the center beam 2 held by the substrate 4.

If no electrostatic force acts on the center beam 2, the to-be-held sections 2a of the center beam 2 are fixed to the substrate 4 with one edge $2b_1$ and the other edge $2b_2$ of the two edges 2b on the two opposed ends of the center beam 2 held by the substrate 4.

Incident light beams (R) at this moment are regularly reflected by the surface of the light reflection film 1 constituted to be combined with one surface of the center beam 2 and moved in directions indicated by arrows (see FIG. 11).

A driving voltage is applied between the beam electrode 2f constituted to be combined with the center beam 2 and the entirely non-parallel opposed surface $3a_4$ which is the entirely non-parallel, inclined surface of the opposed surface 3a of the substrate electrode 3 opposed to the center beam 2, thereby acting an electrostatic force on the center beam 2.

The center beam 2 having the both ends fixed to and held by the substrate 4 is bent, abutted on the surface of the substrate 4, deformed along the shape of the gap (G) of the concave section 4a of the entirely non-parallel inclined surface formed on the other surface of the center beam 2, attracted to and abutted on the entirely non-parallel opposed surface $3a_4$ which is the entirely non-parallel, inclined surface of the opposed surface 3a of the substrate electrode 3 opposed to the center beam 2 to thereby restrict the bending of the center beam 2, and driven by a digital signal.

At this moment, the surface of the light reflection film 1 constituted to be combined with the center beam 2 is influenced by the bending of the center beam and the direction of the reflection light of each incident light beams (R) is changed to one direction (see FIG. 12).

If observed from the direction in which the incident light beams (R) are reflected, the state of the light modulator 0 shown in FIG. 11 is a bright ON state since the light reflection film 1 constituted to be combined with the center beam 1 regularly reflects the light beams (R) and the state thereof shown in FIG. 12 is a dark OFF state since the direction of the reflection light of the incident light beam (R) is changed to one direction. It is, therefore, possible to ensure light modulation.

In the light modulator 0, the center beam 2 which switches light is a fixed beam having the both ends held by and fixed to the substrate 4. Therefore, compared with a cantilever structure, free oscillation occurs infrequently to the center beam 2, the center beam 2 is not deformed even if a residual stress exists, the center beam 2 is not changed with the passage of time, and response speed is fast because of lack of the problem of free oscillation. The light modulator 0 is, therefore, excellent in the reliability of the center beam 2 and response speed.

The gap (G) of the non-parallel concave section 4a formed between the center beam 2 and the entirely non-parallel opposed surface $3a_4$ which is the entirely non-parallel, inclined surface of the opposed surface 3a of the substrate electrode 3 opposed to the center beam 2, is formed in the entirely non-parallel, inclined surface to the center beam 2 between the two edges 2b on the two opposed ends of the center beam 2 held by the substrate 4. The shape of this entirely non-parallel, inclined surface is effective to further decrease a driving voltage required to deform the center beam 2.

The electrostatic force acting on the center beam 2 is in inverse proportion to the distance between the center beam 2 and the entirely non-parallel opposed surface $3a_4$ which is the entirely non-parallel, inclined surface of the opposed surface 3a of the substrate electrode 3 opposed to the center beam 2.

Namely, the smaller the distance between the center beam 2 and the entirely non-parallel opposed surface $3a_4$ which is the entirely non-parallel, inclined surface of the opposed surface 3a of the substrate electrode 3 opposed to the center beam 2, the higher the electrostatic force acting on the center beam 2. For that reason, if a driving voltage is applied to the center beam 2, the deformation of the center beam 2 starts in the narrower portion of the gap (G) of the concave section 4a.

In addition, the gap (G) of the concave section 4a is narrower in accordance with the deformation of the center beam 2. Compared with the gap (G) of the parallel, flat concave section 4a on the parallel opposed surface $3a_1$ and the gap (G) on the partially non-parallel, partially inclined surface of the partially non-parallel opposed surface $3a_2$, it is possible to deform the center beam 2 at a low voltage. Besides, since the reflection direction of the incident light beam (R) at the time of the bending of the center beam 2 by the electrostatic force is changed to one direction, the light modulator 0 becomes dark and turns into an OFF state more surely, thereby further ensuring light modulation and facilitating a light information processing.

Figure 13:
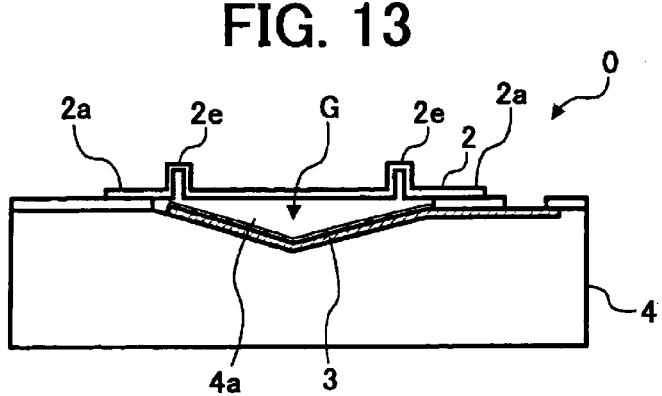
FIG. 13 is an explanatory view which explains the states of the important sections of a light modulator which shows yet another example in the first embodiment of the present invention.
Figure 14:
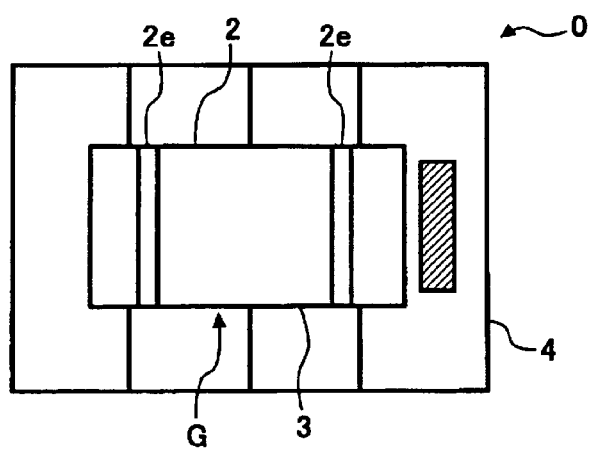
FIG. 14 is a plan view of FIG. 13.

In FIGS. 13 and 14, each of the to-be-held sections 2a of the center beam 2 held by and fixed to the substrate 4 consists of a folded structure section 2e folded near the held and fixed portion.

Since the folded structure sections 2e can substantially increase the distance between the two to-be-held sections 2a, a large bending quantity can be obtained at the same driving voltage.

The to-be-held sections 2a of the center beam 2 held by and fixed to the substrate 4 near the portions in which the gap (G) of the non-parallel concave section 4a formed between at least the center beam 2 and the substrate electrode 3 opposed to the center beam 2 has the largest distance, consist of the folded structure sections 2e, respectively. It is, therefore, possible to further decrease a driving voltage.

Figure 15:
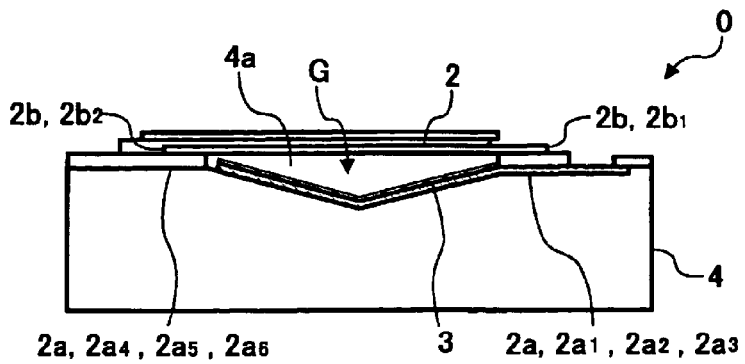
FIG. 15 is an explanatory view which explains the states of the important sections of a light modulator which shows yet another example in the first embodiment of the present invention.
Figure 16:
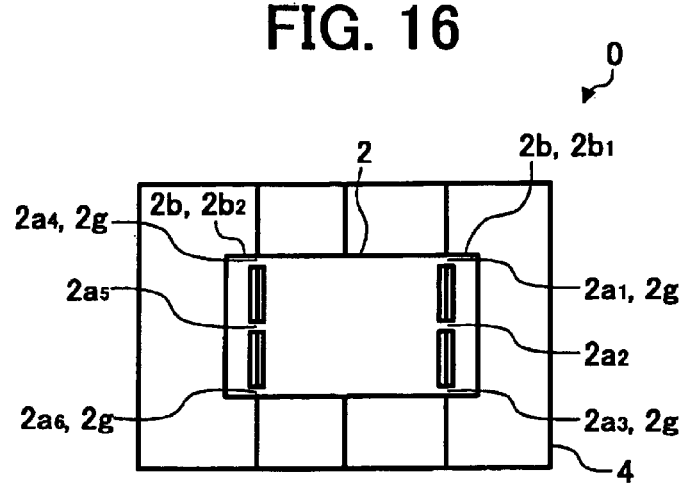
FIG. 16 is a plan view of FIG. 15.

In FIGS. 15 and 16, the to-be-held sections 2a of the center beam 2 held by and fixed to the substrate 4 consist of, for example, six divided to-be-held sections $2a_1$, $2a_2$, $2a_3$, $2a_4$, $2a_5$ and $2a_6$ to make it possible to further decrease a voltage required to deform the center beam 2. While various division methods are available, one edge $2b_1$ and the other edge $2b_2$ of the two edges 2b on the two opposed ends of the center beam 2 or one edge $2c_1$ and the other edge $2c_2$ of the other two edges 2c which are not shown, are divided into a plurality of divided to-be-held sections $2a_1$ to $2a_n$.

The largest bending quantity ($\omega_1$) of the center beam 2 the both ends of which are each a square of one edge having a length (a), a thickness (h), applied with uniformly distributed load (P) and held, receives the uniform load (P), is expressed by $\omega_1 = 0.025 * Pa^4/Eh^3$ where E is the Young modulus of the center beam 2.

On the other hand, the largest bending quantity ($\omega_2$) of the similar center beam 2 except that the both ends are not held by and fixed to the substrate 4 is $0.045 * Pa^4/Eh^3$ which is about twice as large as the bending quantity ($\omega_1$).

If the to-be-held sections 2a of the center beam 2 held by the substrate 4 consist of a plurality of divided to-be-held sections $2a_1$ to $2a_n$ obtained by dividing one edge $2b_1$ and the other edge $2b_2$ of the two edges 2b on the two opposed ends of the center beam 2 or one edge $2c_1$ and the other edge $2c_2$ of the two edges 2c, which are not shown, into a plurality of segments, then the bending quantity of the center beam 2 is the composite quantity of ($\omega_1$) and ($\omega_2$) and increases, making it possible to decrease an electrostatic force. As a result, a driving voltage required to deform the center beam 2 lowers.

If the to-be-held sections 2a of the center beam 2 held by the substrate 4 are divided and the divided to-be-held sections $2a_1$, $2a_3$, $2a_4$ and $2a_6$ are held by the substrate 4 in the corner sections 2g of the both to-be-held sections 2, then stable operation can be ensured and the reflection direction of the incident light is stabilized.

If the divided to-be-held sections $2a_1$ to $2a_n$ of the to-be-held sections $2a$ are not provided in the corner sections $2g$ of the center beam 2, the corner sections $2g$ are largely deformed when the center beam 2 is deformed by an electronic force and the center beam 2 is deformed slant. This makes the reflection direction of the incident light beams unstable.

The divided to-be-held sections $2a_1$ to $2a_n$ are connected to the connection sections between the to-be-divided sections $2a_1$ to $2a_n$ and the center beam 2 by smooth outline sections $2h$ so as to prevent the concentration of a bending stress on the connection sections between the to-be-divided sections $2a_1$ to $2a_n$ and the center beam 2 due to the electrostatic force.

If the outline of the center beam 2 which is applied with a stress is suddenly changed, the stress is concentrated on the largest change portions thereof. This concentrated stress breaks down the center beam 2 even if a stress acting on the center beam 2 is lower than a breaking stress.

The divided to-be-held sections $2a_1$ to $2a_n$ divided from the to-be-held sections $2a$ have the smooth outline sections $2h$ connected to the center beam 2, thereby preventing the concentration of the stress and improving the reliability of light modulation.

The smooth outline sections $2h$ connected to the center beam 2 are preferably partially circular arc shaped or partially elliptic arc shaped.

The to-be-held sections $2a$ of the center beam 2 held by the substrate 4 near portions in which the gap (G) of the non-parallel concave section $4a$ formed between the center beam 2 and the substrate electrode 3 opposed to the center beam 2 has the largest distance, consist of a plurality of divided to-be-held sections $2a_2$ and $2a_5$. It is, therefore, possible to further decrease a driving voltage.

Figure 17:
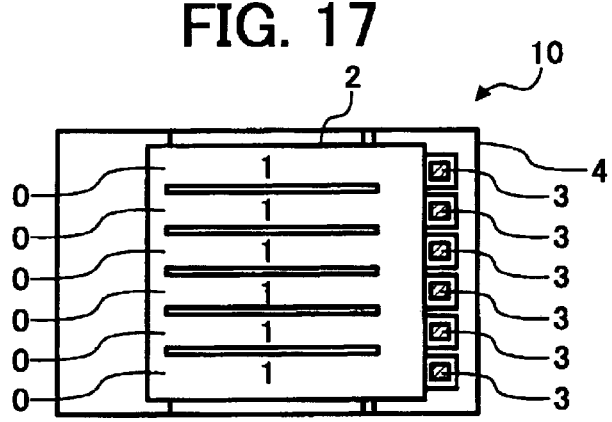
FIG. 17 is an explanatory view which explains a light modulator which shows yet another example in the first embodiment of the present invention.

In FIG. 17, a plurality of light reflection films 1, the center beam 2, the substrate electrodes 3 and the like are arranged on the substrate 4 in the form of a one-dimensional array. It is, therefore, possible to provide a light modulator 10 capable of performing linear light modulation.

Figure 18:
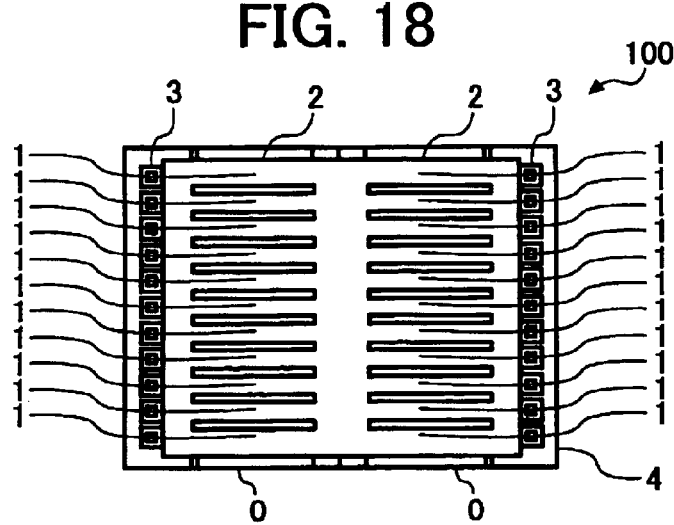
FIG. 18 is an explanatory view which explains a light modulator which shows yet another example in the first embodiment of the present invention.
Figure 19:
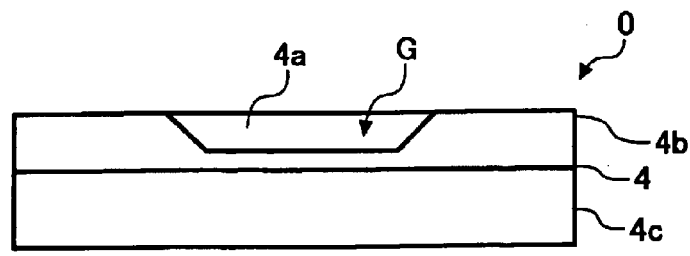
FIG. 19 is an explanatory view which explains the steps for the important sections of the manufacturing method of the light modulator which shows the example in the first embodiment of the present invention.
Figure 20:
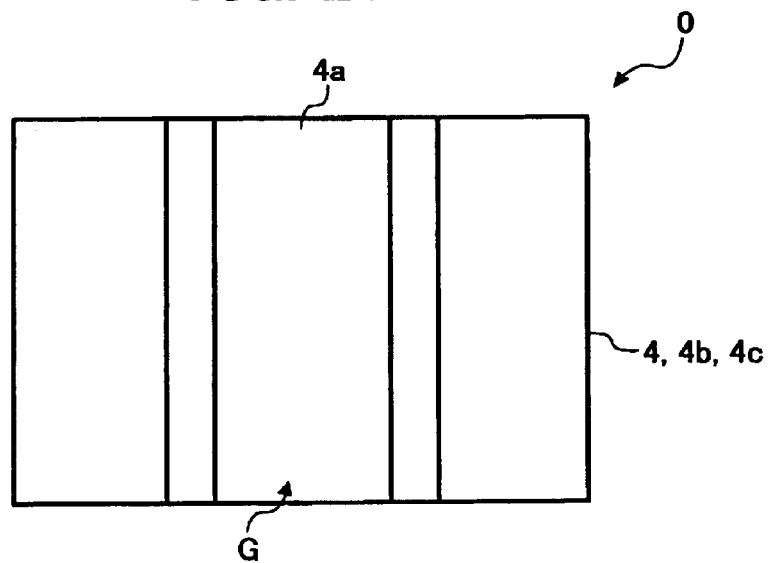
FIG. 20 is a plan view of FIG. 19.

In FIG. 18, a plurality of light reflection films 1, center beams 2, substrate electrodes 3 and the like are arranged on the substrate in the form of a two-dimensional array. It is, therefore, possible to provide a light modulator 100 capable of performing plane light modulation.

In FIGS. 19 to 30, the light modulator 0 is manufactured by forming the gap (G) of the concave section $4a$ on the substrate 4, forming a sacrificial material layer 5 made of a sacrificial material, flattening the substrate 4, forming the center beam 2 and removing the sacrificial material layer 5 as explained later in detail. It is, therefore, possible to provide a manufacturing method for the light modulator 0 having fewer manufacturing steps and high yield.

At a concave section formation step (a), the substrate 4 consists of a silicon substrate $4c$ on which an oxide film $4b$ is formed. A gap (G) is formed in the concave section $4a$ on the substrate 4 by photolithography and dry etching.

If a photomask on which an area gradation pattern is formed or a resist material thermal deformation method or the like is used, it is possible to form a non-parallel gap (G) in the concave section $4a$. The gap (G) of the concave section $4a$ is formed to have a width of 20 µm and a depth of 2.4 µm (see FIGS. 19 and 20).

At a substrate electrode formation step (b), the substrate electrode 3 is formed out of a TiN thin film in the gap (G) of the concave section $4a$. The TiN thin film is formed to have a thickness of 0.1 µm by sputtering with Ti as a target. The TiN thin film is formed into the substrate electrode 3 having a width of 20 µm by photolithography and dry etching.

Figure 21:
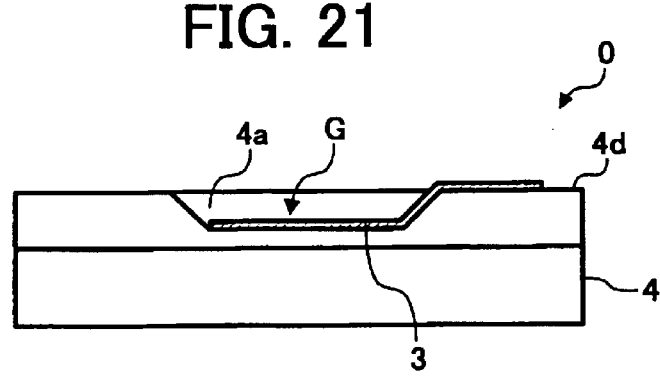
FIG. 21 is an explanatory view which explains the steps for the other important sections of the manufacturing method of the light modulator which shows the one example in the first embodiment of the present invention.
Figure 22:
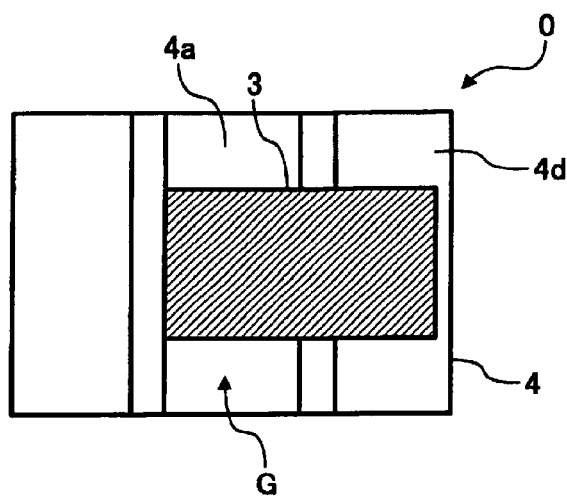
FIG. 22 is a plan view of FIG. 21.
Figure 23:
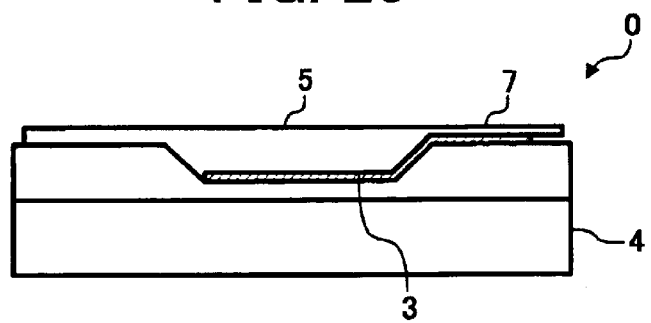
FIG. 23 is an explanatory view which explains the steps for the other important sections of the manufacturing method of the light modulator which shows the one example in the first embodiment of the present invention.
Figure 24:
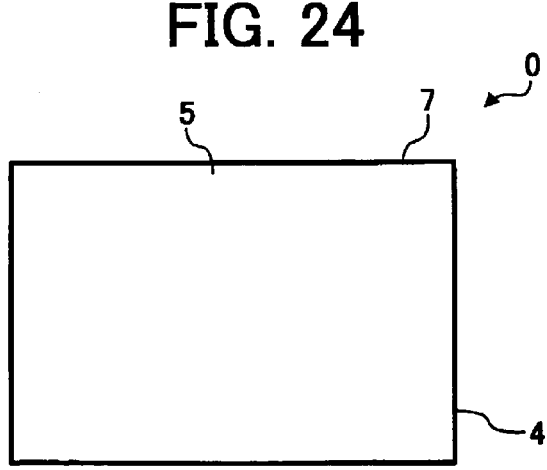
FIG. 24 is a plan view of FIG. 23.
Figure 25:
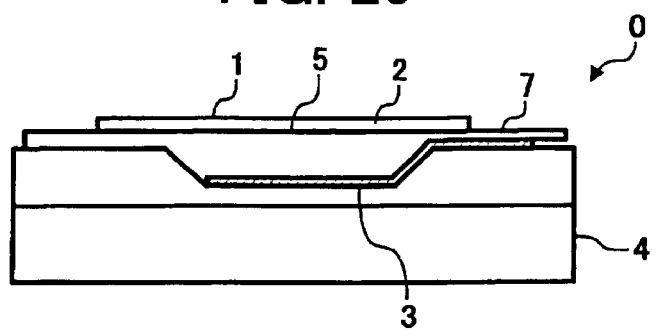
FIG. 25 is an explanatory view which explains the steps for the other important sections of the manufacturing method of the light modulator which shows the one example in the first embodiment of the present invention.
Figure 26:
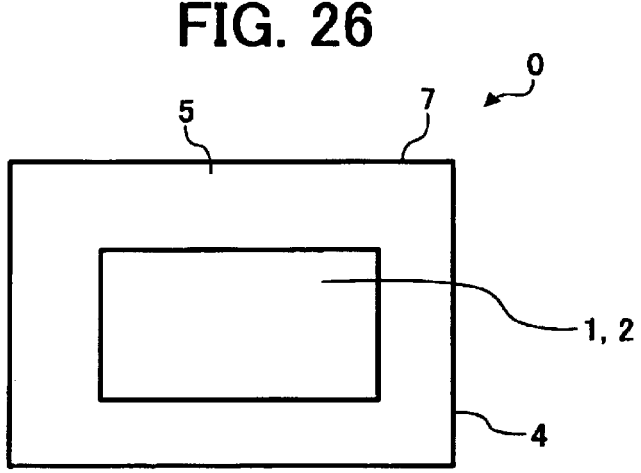
FIG. 26 is a plan view of FIG. 25.
Figure 27:
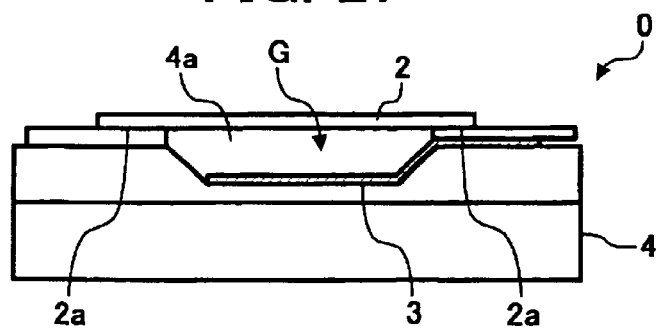
FIG. 27 is an explanatory view which explains the steps for the other important sections of the manufacturing method of the light modulator which shows the one example in the first embodiment of the present invention.
Figure 28:
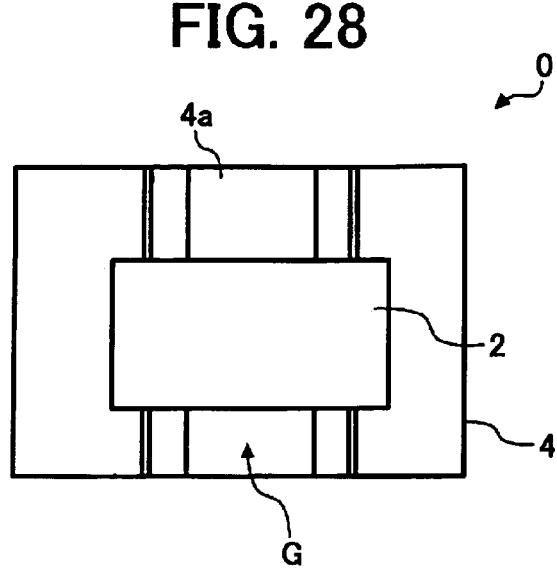
FIG. 28 is a plan view of FIG. 27.
Figure 29:
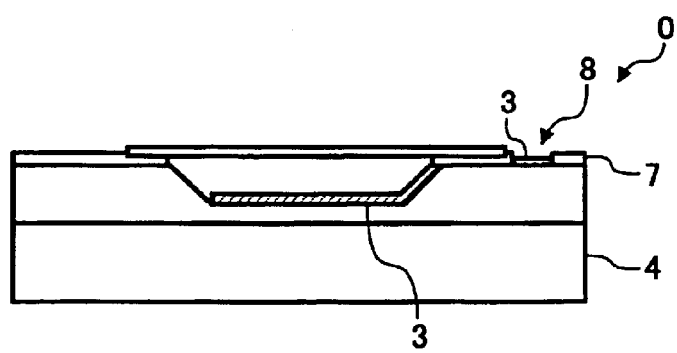
FIG. 29 is an explanatory view which explains the steps for the other important sections of the manufacturing method of the light modulator which shows the one example in the first embodiment of the present invention.
Figure 30:
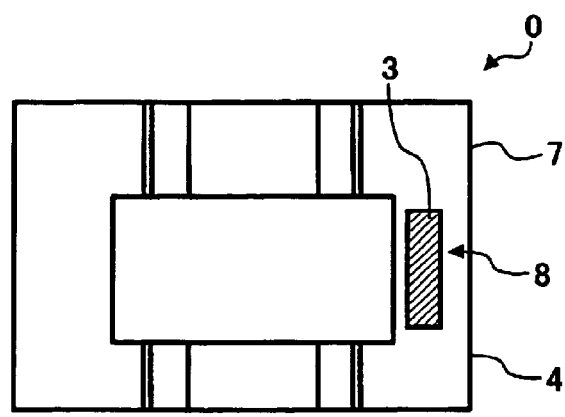
FIG. 30 is a plan view of FIG. 29.

A part of the substrate electrode 3 is projected from the gap (G) of the concave section $4a$ to the surface $4d$ of the substrate 4 so as to be connected to an external signal (see FIGS. 21 and 22).

At a sacrificial material layer formation step (c), a silicon oxide film as the sacrificial material layer 5 and a protection film 7 formed by a plasma CVD method is formed on the substrate 4 until the gap (G) of the concave section $4a$ is buried to cover the substrate electrode 3. The oxide films as the sacrificial material layer 5 and the protection film 7 are flattened by polishing or dry etch-back. As the sacrificial material layer 5, a silicon oxide film, a polycrystalline silicon film, an amorphous silicon film or an organic material film is used. If the silicon oxide film is used, the sacrificial material layer 5 becomes stable to ensure a highly accurate manufacturing method. Since the polycrystalline silicon film or the amorphous silicon film can be formed by the CVD method, it is possible to provide a low-cost manufacturing method. If the organic material film is used, the sacrificial material layer 5 can be formed easily and a low-cost manufacturing method can be provided (see FIGS. 23 and 24).

At a center beam formation step (d), a silicon nitride film which is the material of the center beam 2 is formed to have a thickness of 0.04 µm on the entire surface of the silicon oxide film as the flattened sacrificial material layer 5 and the protection film 7 by a thermal CVD method.

The Al thin film of a light reflection film 1 which serves as an incident light reflection surface is formed to have a thickness of 0.05 µm on the silicon nitride film by dry etching. The silicon nitride film including the reflection film layer of the reflection film 1 is formed into the center beam 2 by dry etching. The center beam 2 has a width of 20 µm and a length of 27 µm (see FIGS. 25 and 26).

At a sacrificial material layer removal step (E), after the formation of the center beam 2, the oxide film of the sacrificial material layer 5 which flattens the gap (G) of the concave section $4a$ is etched away. If so, the to-be-held sections $2a$ on the both ends of the center beam 2 are held by and fixed to the substrate 4 through the gap (G) of the concave section $4a$ (see FIGS. 27 and 28).

Finally, a pad opening 8 is formed in the protection film 7 to connect the substrate electrode 3 to an external signal. The light modulator 0 is thus completed (see FIGS. 29 and 30).

In FIGS. 31 to 42, the light modulator 0 is manufactured by forming the gap (G) of the concave section $4a$ between the center beam 2 and a plurality of non-parallel, opposed surfaces $3a_3$ which are two non-parallel, inclined surfaces opposed to the center beam 2, on the substrate 4, forming the sacrificial material layer 5 made of a sacrificial material to flatten the substrate 4, forming the center beam 2 and removing the sacrificial material layer 5 as explained later in detail. It is, therefore, possible to provide a manufacturing method for the light modulator 0 having fewer manufacturing steps and high yield.

At a concave section formation step (a), the substrate 4 consists of a silicon substrate $4c$. A gap (G) in a concave section $4a$ is formed between a center beam 2 and a plurality of non-parallel, opposed surfaces $3a_3$ which are two non-parallel, inclined surfaces opposed to the center beam 2 by photolithography and dry etching.

The gap (G) of the concave section $4a$ formed between the center beam 2 and a plurality of non-parallel, opposed surfaces $3a_3$ which are two non-parallel, inclined surfaces opposed to the center beam 2 can be shaped by using a photomask on which an area gradation pattern is formed or by a resist material thermal deformation method or the like.

The gap (G) of the concave section 4a formed between the center beam 2 and a plurality of non-parallel, opposed surfaces $3a_3$ which are two non-parallel, inclined surfaces opposed to the center beam 2 has a width of 20 μm. The central portion of the gap (G) of the concave section 4a formed between the center beam 2 and a plurality of non-parallel, opposed surfaces $3a_3$ which are two non-parallel, inclined surfaces opposed to the center beam 2 has the largest depth of 1.0 μm.

Figure 31:
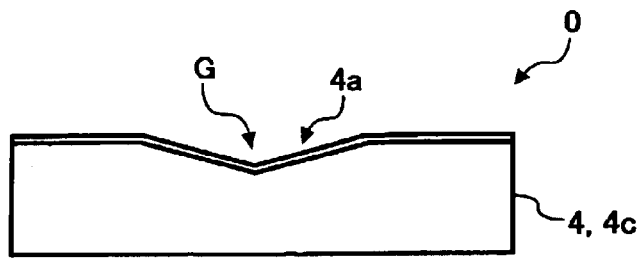
FIG. 31 is an explanatory view which explains the steps for the important sections of the manufacturing method of the light modulator which shows another example in the first embodiment of the present invention.
Figure 32:
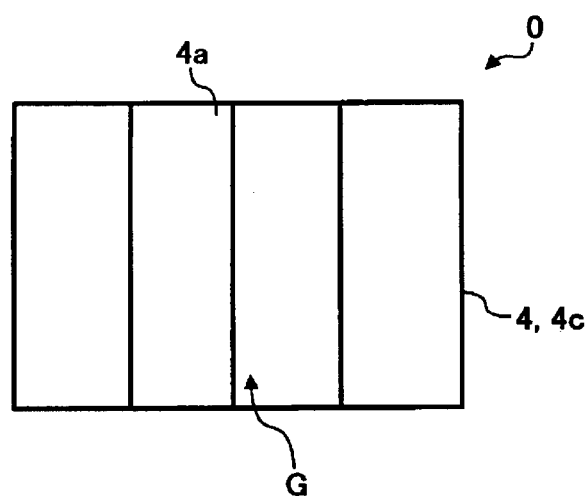
FIG. 32 is a plan view of FIG. 31.
Figure 33:
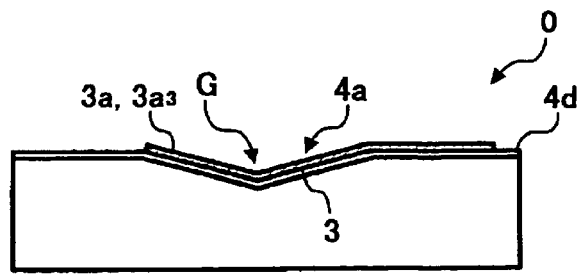
FIG. 33 is an explanatory view which explains the steps for the other important sections of the manufacturing method of the light modulator which shows another example in the first embodiment of the present invention.
Figure 34:
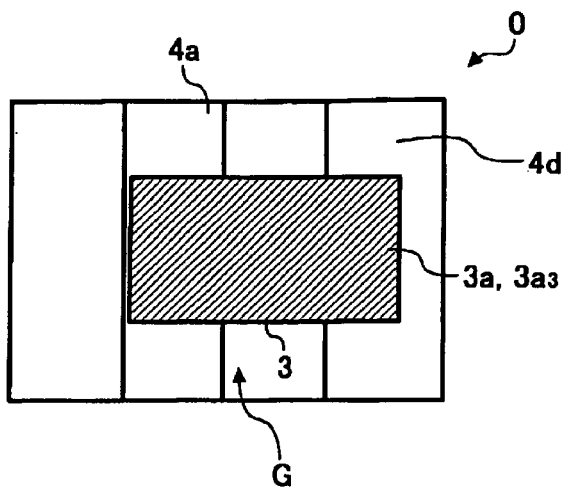
FIG. 34 is a plan view of FIG. 33.

After shaping the gap (G) of the concave section 4a formed between the center beam 2 and a plurality of non-parallel, opposed surfaces $3a_3$ which are two non-parallel, inclined surfaces opposed to the center beam 2, the silicon substrate 4c is subjected to thermal oxidation to thereby form an oxide film 4b having a thickness of 0.2 μm on the surface of the silicon substrate 4c (see FIGS. 31 and 32).

At a substrate electrode formation step (b), a plurality of non-parallel, opposed surfaces $3a_3$ which are two non-parallel, inclined surfaces of the opposed surface 3a of the substrate electrode 3 opposed to the center beam 2, are formed out of a TiN thin film in the gap (G) of the concave section 4a. The TiN thin film is formed to have a thickness of 0.1 μm by reactive sputtering with Ti as a target.

The TiN thin film is formed into a plurality of non-parallel, opposed surfaces $3a_3$ which are two non-parallel, inclined surfaces of the opposed surface 3a of the substrate electrode 3 opposed to the center beam 2 by photolithography and dry etching, to have a length of 20 μm orthogonal to the width of the gap (G) of the concave section 4a.

A part of a plurality of non-parallel, opposed surfaces $3a_3$ which are two non-parallel, inclined surfaces of the opposed surface 3a of the substrate electrode 3 opposed to the center beam 2 are projected from the gap (G) of the concave section 4a to the surface 4d of the substrate 4 so as to be connected to an external signal. Further, a plasma nitride film serving as an electrode protection film is formed on the opposed surfaces $3a_3$ to have a thickness of 0.05 μm (see FIGS. 33 and 34).

At a sacrificial material layer formation step (c), the polycrystalline silicon film of a sacrificial material layer 5 is formed on the substrate 4 by the plasma CVD method until the polycrystalline silicon film buries the gap (G) so as to cover a plurality of non-parallel, opposed surfaces $3a_3$ which are two non-parallel, inclined surfaces of the opposed surface 3a of the substrate electrode 3 opposed to the center beam 2.

Figure 35:
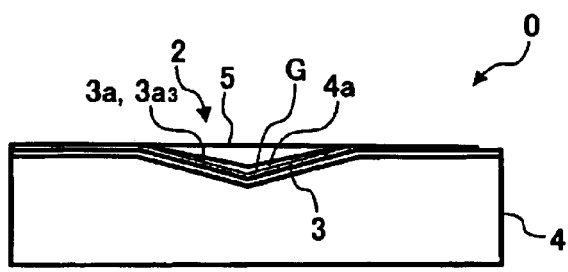
FIG. 35 is an explanatory view which explains the steps for the other important sections of the manufacturing method of the light modulator which shows another example in the first embodiment of the present invention.
Figure 36:
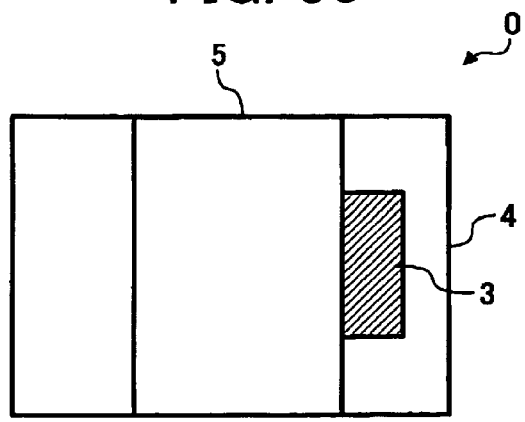
FIG. 36 is a plan view of FIG. 35.
Figure 37:
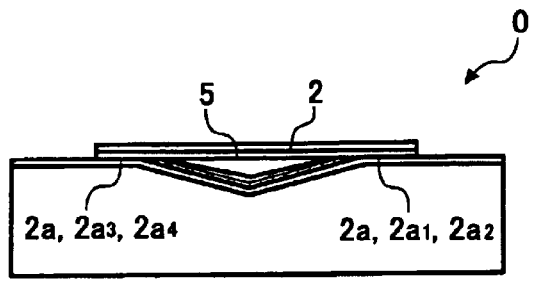
FIG. 37 is an explanatory view which explains the steps for the other important sections of the manufacturing method of the light modulator which shows another example in the first embodiment of the present invention.
Figure 38:
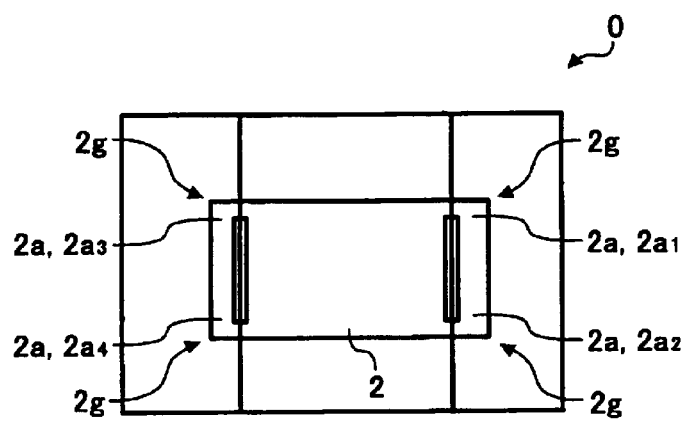
FIG. 38 is a plan view of FIG. 37.
Figure 39:
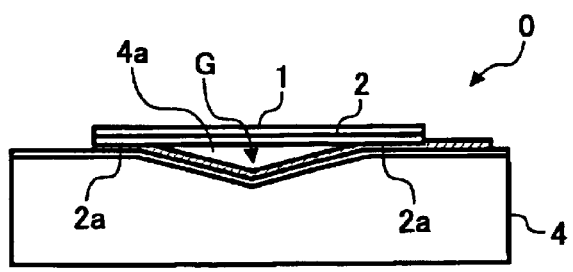
FIG. 39 is an explanatory view which explains the steps for the other important sections of the manufacturing method of the light modulator which shows another example in the first embodiment of the present invention.
Figure 40:
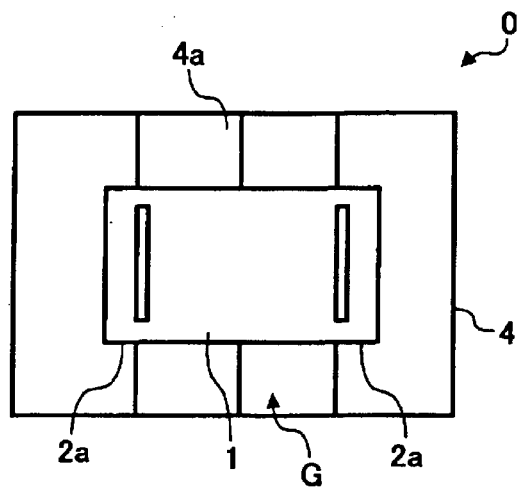
FIG. 40 is a plan view of FIG. 39.
Figure 41:
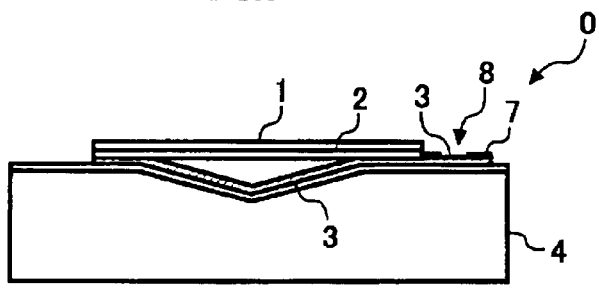
FIG. 41 is an explanatory view which explains the steps for the other important sections of the manufacturing method of the light modulator which shows another example in the first embodiment of the present invention.
Figure 42:
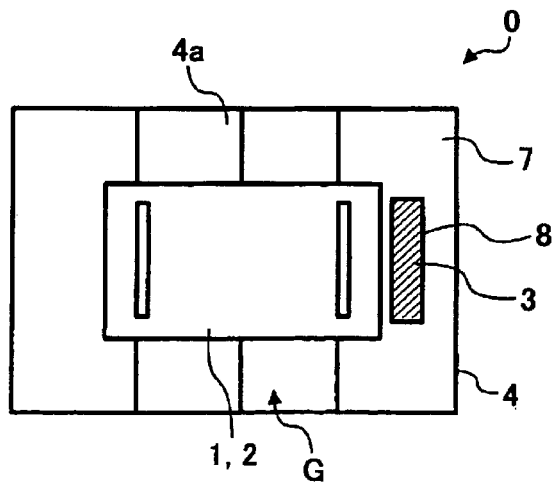
FIG. 42 is a plan view of FIG. 41.

The oxide film of the sacrificial material layer 5 is flattened by CMP (Chemical Mechanical Polishing) to thereby form the sacrificial layer film to form the center beam 2 (see FIGS. 35 and 36).

At a center beam formation step (d), a silicon nitride film which is the material of the center beam 2 is formed to have a thickness of 0.04 μm the entire surface of the flattened sacrificial material layer 5 by the thermal CVD method.

The Cr thin film of a light reflection film 1 which becomes an incident light reflection surface is formed to have a thickness of 0.05 μm on the silicon nitride film by sputtering. The silicon nitride film including the reflection film layer is formed into the center beam 2 having divided to-be-held sections $2a_1$, $2a_2$, $2a_3$ and $2a_4$ divided from to-be-held sections 2a and held by connection sections by photolithography and dry etching.

The center beam 2 has a width of 20 μm and a length of 20 μm. The connection sections of the four divided to-be-held sections $2a_1$, $2a_2$, $2a_3$ and $2a_4$ are located in respective corner sections 2g and the width of each connection section is 5 μm (see FIGS. 37 and 38).

At a sacrificial material layer removal step (E), after the formation of the center beam 2, the sacrificial material layer 5 which flattens the gap (G) is removed by wet etching with tetramethyl ammonium hydroxide (TMAH). The to-be-held sections 2a on the both ends of the center beam 2 are thereby held by and fixed to the substrate 4 through the gap (G) (see FIGS. 39 and 40).

Finally, a pad opening 8 is formed in the protection film 7 to connect the substrate electrode 3 to an external signal. The light modulator 0 is thus completed (see FIGS. 41 and 42).

In FIGS. 43 to 54, the light modulator 0 is manufactured by forming a gap (G) in the concave section 4a between the center beam 2 and the entirely non-parallel opposed surface $3a_4$ which is an entirely non-parallel, inclined surface opposed to the center beam 2, forming the sacrificial material layer 5 made of a sacrificial material, flattening the substrate 4, forming the center beam 2 and then removing the sacrificial material layer 5 as explained later in detail. It is, therefore, possible to provide a manufacturing method for the light modulator 0 having fewer manufacturing steps and high yield.

At a concave section formation step (a), the substrate 4 consists of a silicon substrate 4c on which a plasma CVD oxide film 4b having a thickness of 7 μm is formed on the surface 4d. A gap (G) in a concave section 4a is formed between a center beam 2 and an entirely non-parallel, opposed surface $3a_4$ which is an entirely non-parallel, inclined surface opposed to the center beam 2.

The gap (G) of the concave section 4a formed between the center beam 2 and the entirely non-parallel, opposed surface $3a_4$ which is an entirely non-parallel, inclined surface opposed to the center beam 2 is shaped so that the deepest portion thereof is located on one end of the gap (G) of the concave section 4a and that the depth of the gap (G) of the concave section 4a gradually changes from the other end toward the deepest portion.

The gap (G) of the concave section 4a formed between the center beam 2 and the entirely non-parallel, opposed surface $3a_4$ which is an entirely non-parallel, inclined surface opposed to the center beam 2 can be shaped by a photomask on which an area gradation pattern is formed or by a resist material thermal deformation method or the like.

Figure 43:
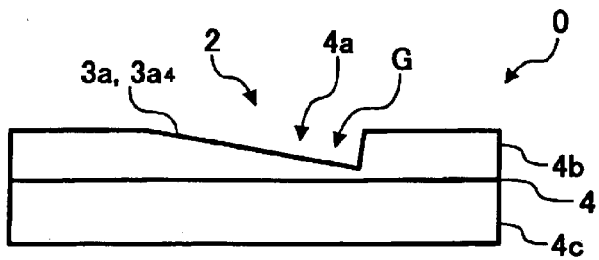
FIG. 43 is an explanatory view which explains the steps for the important sections of the manufacturing method of the light modulator which shows yet another example in the first embodiment of the present invention.
Figure 44:
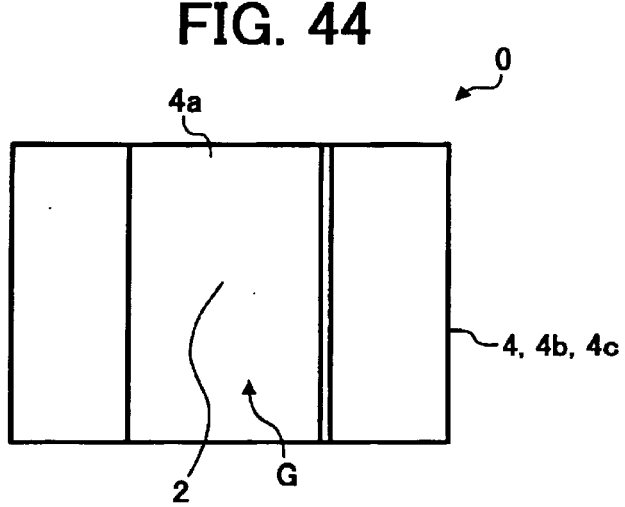
FIG. 44 is a plan view of FIG. 43.
Figure 45:
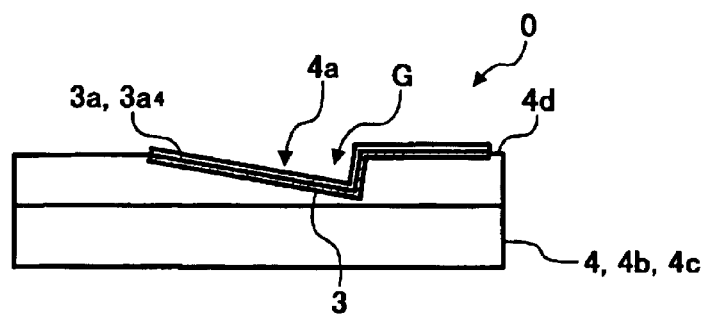
FIG. 45 is an explanatory view which explains the steps for the other important sections of the manufacturing method of the light modulator which shows yet another example in the first embodiment of the present invention.
Figure 46:
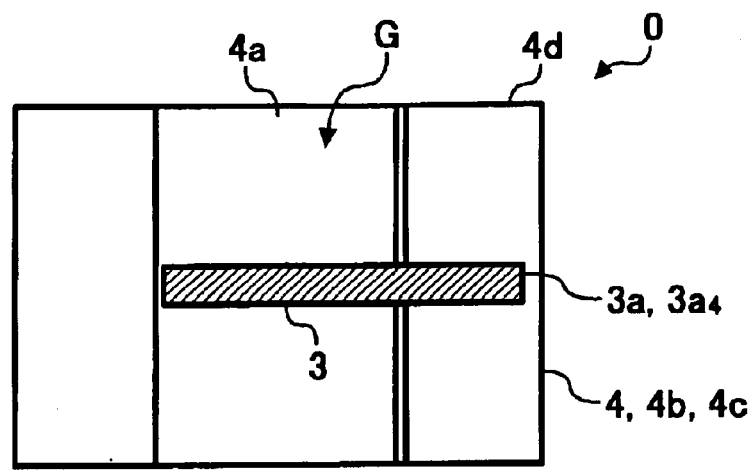
FIG. 46 is a plan view of FIG. 45.
Figure 47:
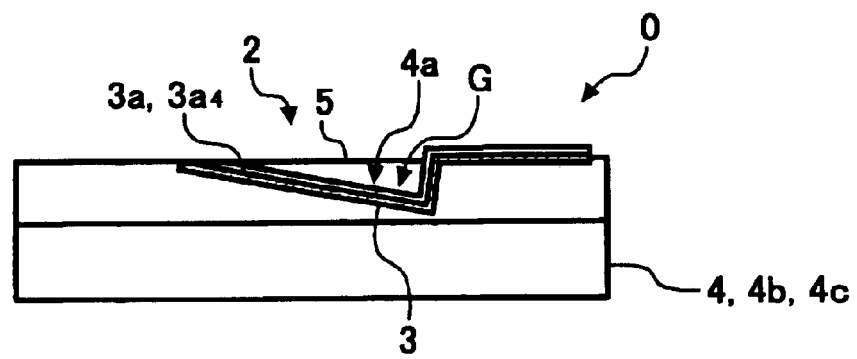
FIG. 47 is an explanatory view which explains the steps for the other important sections of the manufacturing method of the light modulator which shows yet another example in the first embodiment of the present invention.
Figure 48:
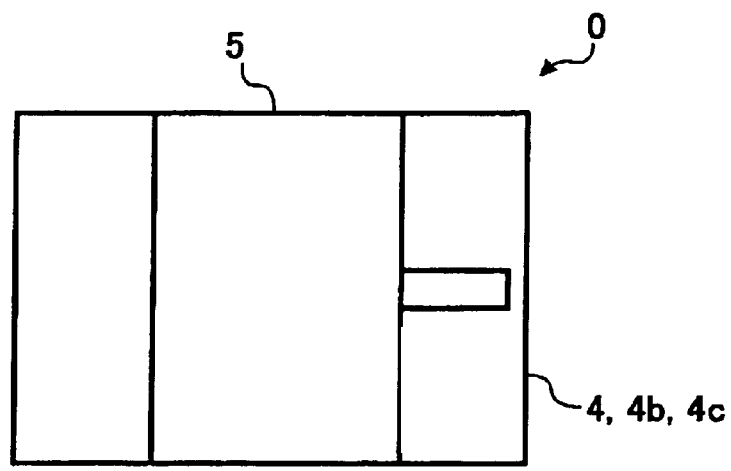
FIG. 48 is a plan view of FIG. 47.
Figure 49:
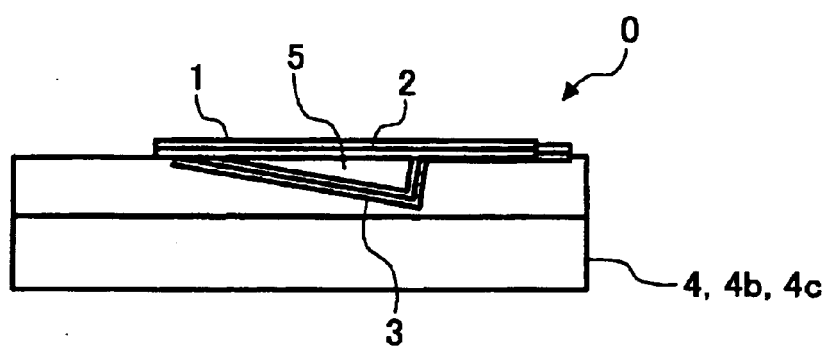
FIG. 49 is an explanatory view which explains the steps for the other important sections of the manufacturing method of the light modulator which shows yet another example in the first embodiment of the present invention.
Figure 50:
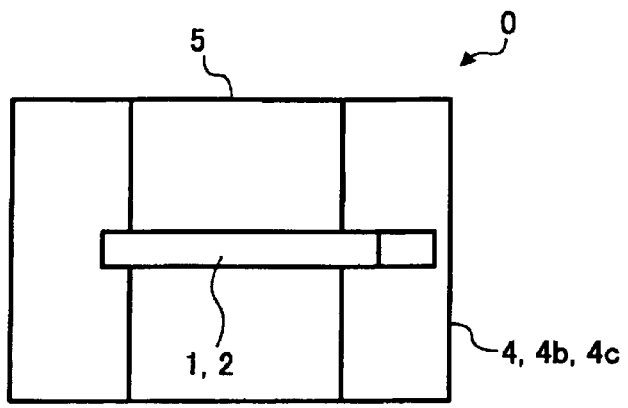
FIG. 50 is a plan view of FIG. 49.
Figure 51:
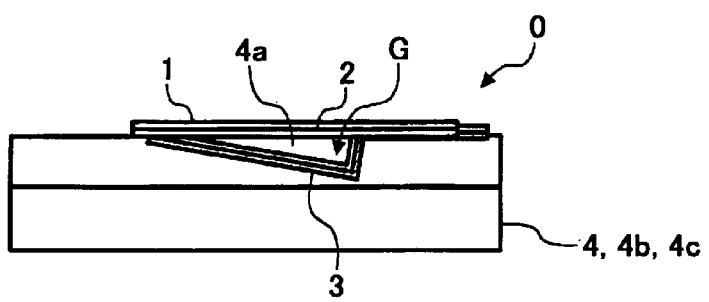
FIG. 51 is an explanatory view which explains the steps for the other important sections of the manufacturing method of the light modulator which shows yet another example in the first embodiment of the present invention.
Figure 52:
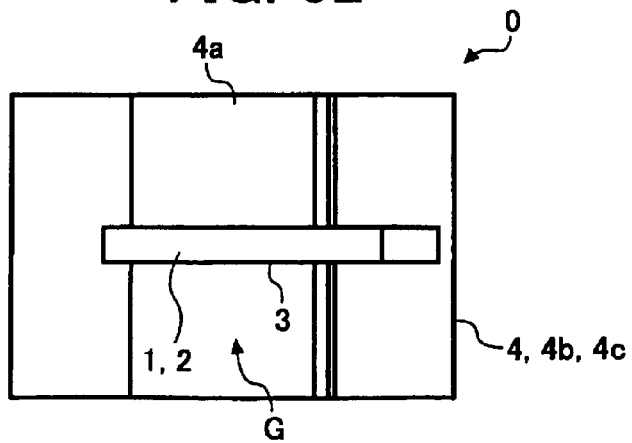
FIG. 52 is a plan view of FIG. 51.
Figure 53:
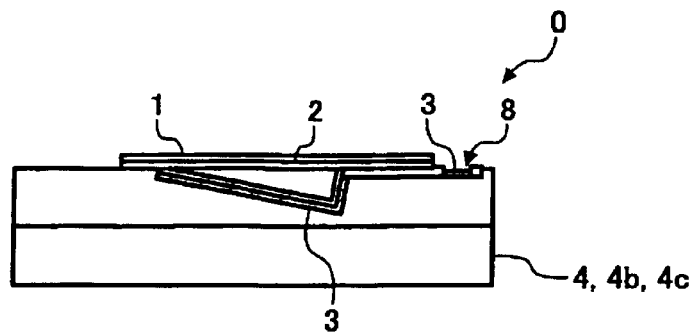
FIG. 53 is an explanatory view which explains the steps for the other important sections of the manufacturing method of the light modulator which shows yet another example in the first embodiment of the present invention.
Figure 54:
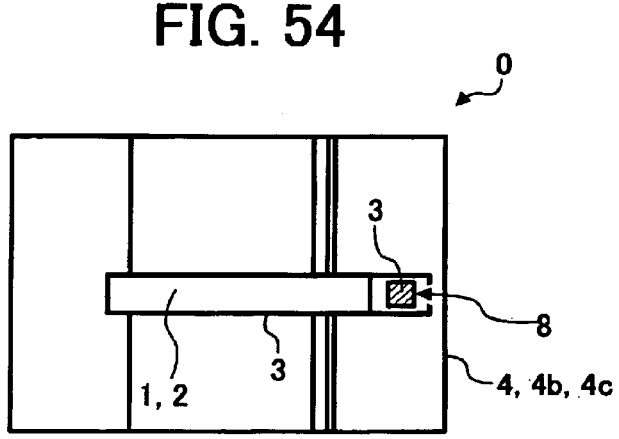
FIG. 54 is a plan view of FIG. 53.
Figure 55:
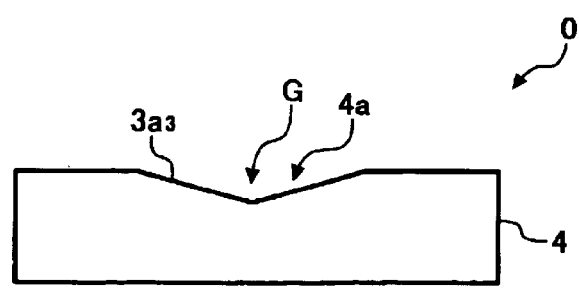
FIG. 55 is an explanatory view which explains the steps for the important sections of the manufacturing method of the light modulator which shows yet another example in the first embodiment of the present invention.
Figure 56:
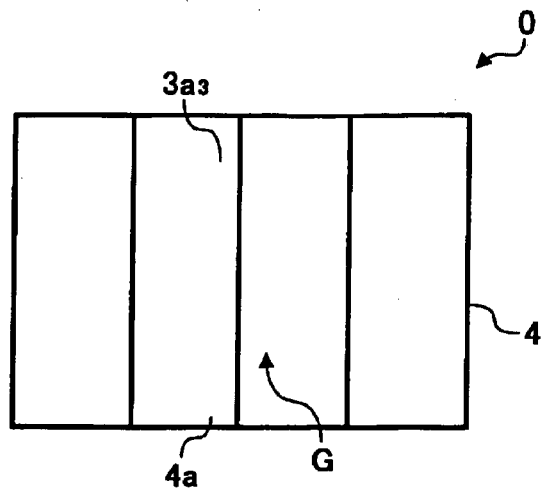
FIG. 56 is a plan view of FIG. 55.
Figure 57:
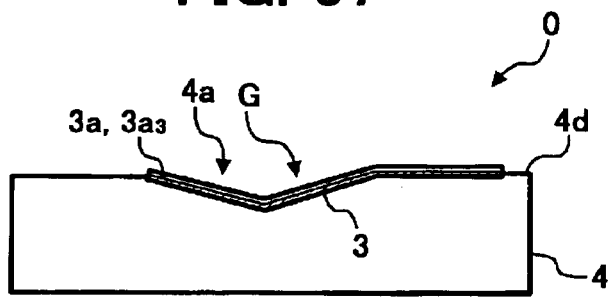
FIG. 57 is an explanatory view which explains the steps for the other important sections of the manufacturing method of the light modulator which shows yet another example in the first embodiment of the present invention.
Figure 58:
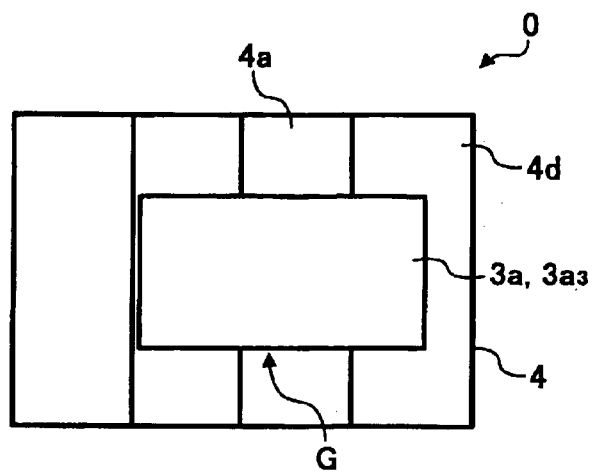
FIG. 58 is a plan view of FIG. 57.
Figure 59:
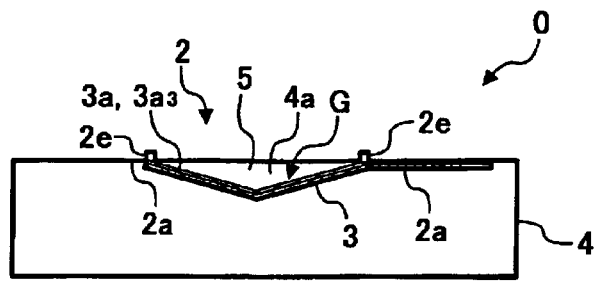
FIG. 59 is an explanatory view which explains the steps for the other important sections of the manufacturing method of the light modulator which shows yet another example in the first embodiment of the present invention.
Figure 60:
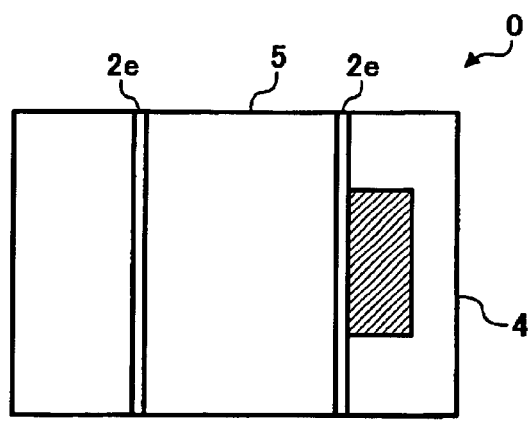
FIG. 60 is a plan view of FIG. 59.
Figure 61:
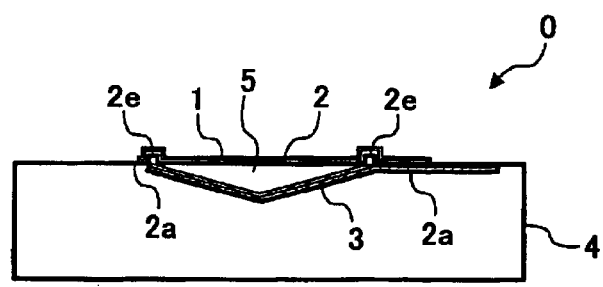
FIG. 61 is an explanatory view which explains the steps for the other important sections of the manufacturing method of the light modulator which shows yet another example in the first embodiment of the present invention.
Figure 62:
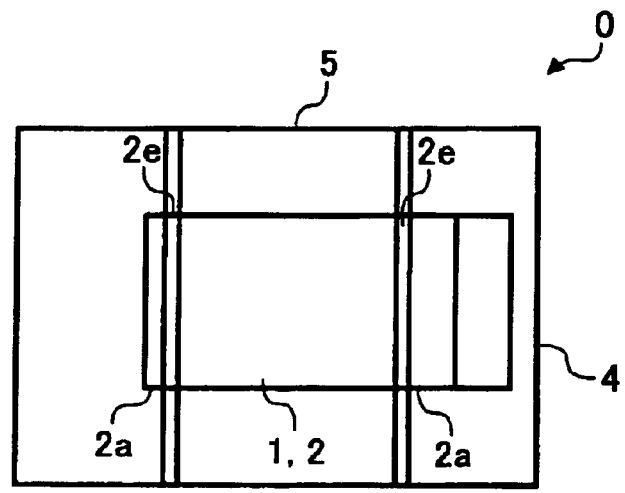
FIG. 62 is a plan view of FIG. 61.
Figure 63:
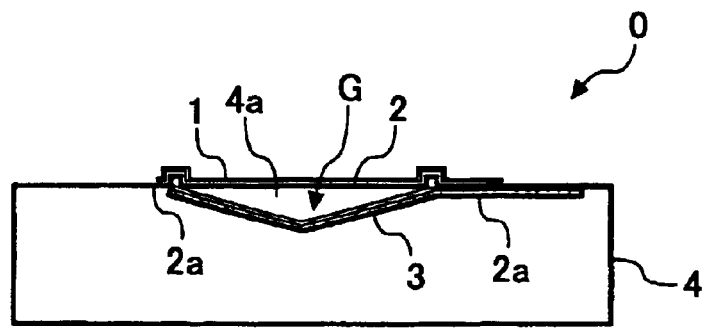
FIG. 63 is an explanatory view which explains the steps for the other important sections of the manufacturing method of the light modulator which shows yet another example in the first embodiment of the present invention.
Figure 64:
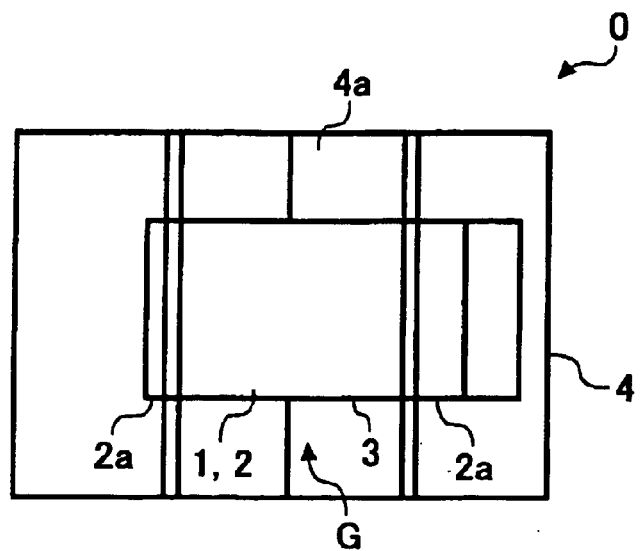
FIG. 64 is a plan view of FIG. 63.
Figure 65:
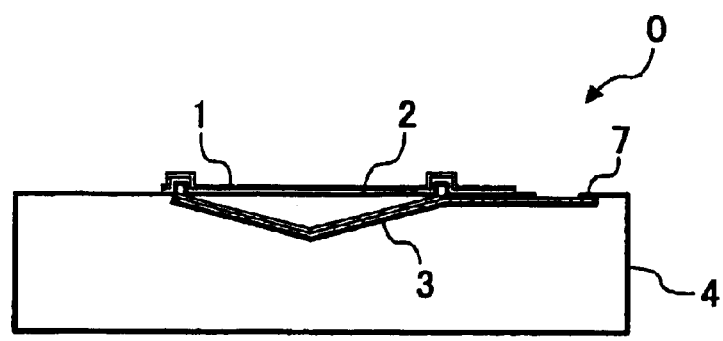
FIG. 65 is an explanatory view which explains the steps for the other important sections of the manufacturing method of the light modulator which shows yet another example in the first embodiment of the present invention.
Figure 66:
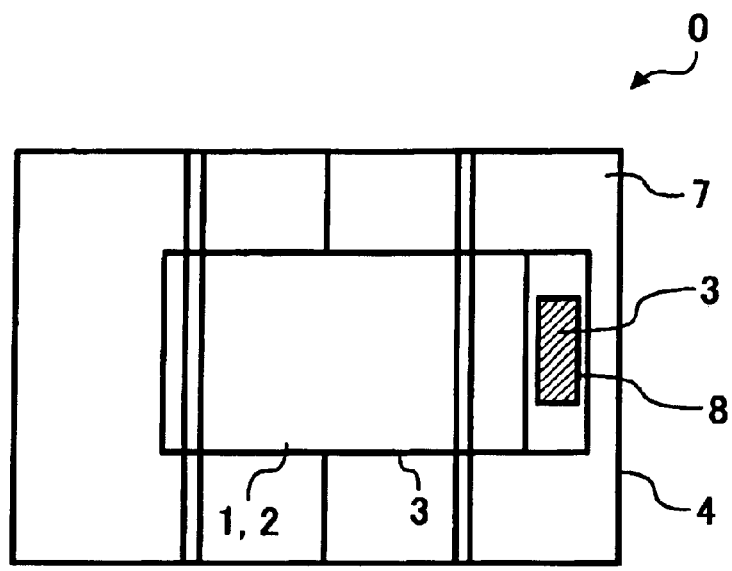
FIG. 66 is a plan view of FIG. 65.

The gap (G) of the concave section 4a formed between the center beam 2 and the entirely non-parallel, opposed surface $3a_4$ which is an entirely non-parallel, inclined surface opposed to the center beam 2 is formed to have a width of 100 μm and a depth of 5.0 μm (see FIGS. 43 and 44).

At a substrate electrode formation step (b), the entirely non-parallel opposed surface $3a_4$ which is the entire surface of the opposed surface 3a of the substrate electrode 3 and which is an entirely non-parallel, inclined surface opposed to the center beam 2, is formed out of a TiN thin film in the gap (G) of the concave section 4a. The TiN thin film is formed to have a thickness of 0.1 μm by reactive sputtering with Ti as a target. The TiN thin film is formed into the entirely non-parallel opposed surface $3a_4$ which is the entire surface of the opposed surface 3a of the substrate electrode 3 and which is an entirely non-parallel, inclined surface opposed to the center beam 2 by photolithography and dry etching, to have a length of 20 μm which is orthogonal to the width of the gap (G) of the concave section 4a. Apart of the entirely non-parallel opposed surface $3a_4$ which is the entire surface of the opposed surface 3a of the substrate electrode 3 and which is an entirely non-parallel, inclined surface opposed to the center beam 2, is projected from the gap (G) of the concave section 4a to the surface 4d of the substrate 4 so as to be connected to an external signal. Further, a plasma nitride film serving as an electrode protection film is formed to have a thickness of 0.05 μm (see FIGS. 45 and 46).

At a sacrificial material layer formation step (c), an oxide film for the sacrificial material layer 5 is formed on the substrate 4 until the oxide film buries the gap (G) of the concave section 4a so as to cover the entirely non-parallel opposed surface $3a_4$ which is the entire surface of the opposed surface 3a of the substrate electrode 3 and which is an entirely non-parallel, inclined surface opposed to the center beam 2, by the plasma CVD method. The oxide film for the sacrificial material layer 5 is flattened by CMP (Chemical Mechanical Polishing) to serve as a sacrificial layer film to form the center beam 2 (see FIGS. 47 and 48).

At a center beam formation step (d), a plasma nitride film which is the material of the center beam 2 is formed to have a thickness of 0.08 μ on the entire surface of the flattened sacrificial material layer 5.

The Cr thin film of a light transmission film 1 serving as an incident light transmission surface is formed to have a thickness of 0.05 μm by sputtering. The silicon nitride film including the reflection film layer is formed into the center beam 2 by photolithography and dry etching. The center beam 2 has a width of 100 μm and a length of 20 μm (see FIGS. 49 and 50).

At a sacrificial material layer removable step (E), after the formation of the center beam 2, the flattened sacrificial material layer 5 which buries the gap (G) of the concave section 4a is removed by wet etching with a hydrofluoric acid (HF). The to-be-held sections 2a on the both ends of the center beam 2 are thereby held by and fixed to the substrate 4 through the gap (G) of the concave section 4a (see FIGS. 51 and 52).

Finally, a pad opening 8 is formed in a protection film 7 to connect the substrate electrode 3 to an external signal. The light modulator 0 is thus completed (see FIGS. 53 and 54).

In FIGS. 55 to 66, the light modulator 0 is manufactured by forming folded structure sections 2e folded near to-be-held sections 2a of the center beam 2 held by the substrate 4, forming a sacrificial material layer 5 made of a sacrificial material layer, flattening the substrate 4, forming the center beam 2 and then removing the sacrificial material layer 5 as explained later in detail. It is, therefore, possible to provide a manufacturing method for the light modulator 0 having fewer manufacturing steps and high yield.

At a concave section formation step (a), the substrate 4 consists of a transparent quartz glass substrate made of a light transmissible glass material. A gap (G) in a concave section 4a is formed on the substrate 4 between a center beam 2 and a plurality of non-parallel opposed surfaces $3a_3$ which are two non-parallel, inclined surfaces opposed to the center beam 2, by photolithography and dry etching.

The gap (G) of the concave section 4a formed between the center beam 2 and a plurality of non-parallel opposed surfaces $3a_3$ which are two non-parallel, inclined surfaces opposed to the center beam 2, has a width of 20 μm. The central portion of the gap (G) of the concave section 4a formed between the center beam 2 and a plurality of non-parallel opposed surfaces $3a_3$ which are two non-parallel, inclined surfaces opposed to the center beam 2 has the largest depth of 1.0 μm. The gap (G) can be shaped by using a photomask on which an area gradation pattern is formed or by a resist material thermal deformation method or the like (see FIGS. 55 and 56).

At a substrate electrode formation step (b), a plurality of non-parallel opposed surfaces $3a_3$ which are two non-parallel, inclined surfaces of the opposed surface 3a of the substrate electrode 3 opposed to the center beam 2 are formed out of a Pt thin film in the gap (G) of the concave section. The Pt thin film is formed to have a thickness of 0.1 μm by sputtering with Pt as a target.

The Pt thin film is formed into a plurality of non-parallel opposed surfaces $3a_3$ which are two non-parallel, inclined surfaces of the opposed surface 3a of the substrate electrode 3 opposed to the center beam 2 by photolithography and dry etching, to have a length of 20 μm which is orthogonal to the width of the gap (G) of the concave section 4a.

A part of a plurality of non-parallel opposed surfaces $3a_3$ which are two non-parallel, inclined surfaces of the opposed surface 3a of the substrate electrode 3 opposed to the center beam 2, are projected from the gap (G) of the concave section 4a to the surface 4d of the substrate 4 so as to be connected to an external signal. Further, a plasma nitride film serving as an electrode protection film is formed to have a thickness of 0.05 μm (see FIGS. 56 and 57).

At a sacrificial material layer formation step (c), an amorphous silicon film or a polycrystalline silicon film for a sacrificial material layer 5 is formed to have a thickness of 2.0 μm on the substrate 4 so as to cover a plurality of non-parallel opposed surfaces $3a_3$ which are two non-parallel, inclined surfaces of the opposed surface 3a of the substrate electrode 3 opposed to the center beam 2. Similarly to a case in which the gap (G) of the concave section 4a is formed between the center beam 2 and the two non-parallel, inclined surfaces, the sacrificial material layer 5 having folded structure sections 2e folded near the to-be-held sections 2a of the center beam 2 to be held by the substrate 4, respectively, is formed by photolithography and dry etching (see FIGS. 59 and 60).

At a center beam formation step (d), a polycrystalline silicon film which is the material of the center beam 2 is formed to have a thickness of 0.2 μm on the entire surface of the flattened sacrificial material layer 5 by a thermal CVD method.

The Al thin film of a light reflection film 1 serving as an incident light reflection surface is formed to have a thickness of 0.05 μm on the polycrystalline silicon film by sputtering. The silicon nitride film including the reflection film layer is formed into the center beam having folded structure sections 2e folded near the to-be-held sections 2a of the center beam 2 to be held by the substrate 4, respectively, by photolithography and dry etching. The center beam 2 has a width of 100 μm and a length of 20 μm (see FIGS. 61 and 62).

At a sacrificial material layer removal step (E), after the formation of the center beam 2, the sacrificial material layer 5 which flattens the gap (G) of the concave section 4a is etched away. The to-be-held sections 2a on the both ends of the center beam 2 are thereby held by and fixed to the substrate 4 through the gap (G) (see FIGS. 63 and 64).

Finally, a pad opening 8 is formed in a protection film 7 to connect the substrate electrode 3 to an external signal. The light modulator 0 is thus completed (see FIGS. 65 and 66).

In FIGS. 67 to 78, the light modulator 0 is manufactured by forming the gap (G) of the concave section 4a in the form of an array between the center beam 2 and the entirely non-parallel opposed surface $3a_4$ which is an entirely non-parallel, inclined surface opposed to the center beam 2, forming the sacrificial material layer 5 made of a sacrificial material, flattening the substrate 4, forming the center beam 2 and then removing the sacrificial material layer 5 as explained later in detail. It is, therefore, possible to a manufacturing method for the light modulator 0 in the form of an array having fewer manufacturing steps.

At a concave section formation step (a), the substrate 4 consists of a transparent optical glass substrate made of a light transmission glass material. A gap (G) in a concave section 4a is formed on the substrate 4 between a center beam 2 and an entirely non-parallel opposed surface $3a_4$ which is an entirely non-parallel, inclined surface opposed to the center beam 2 by photolithography and dry etching.

The gap (G) of the concave section 4a formed between the center beam 2 and the entirely non-parallel opposed surface $3a_4$ which is an entirely non-parallel, inclined surface opposed to the center beam 2, is shaped so that the deepest portion thereof is located on one end of the gap (G) of the concave section 4a and that the depth of the gap (G) of the concave section 4a gradually changes from the other end of the gap (G) toward the deepest portion.

The gap (G) of the concave section 4a formed between the center beam 2 and the entirely non-parallel opposed surface $3a_4$ which is an entirely non-parallel, inclined surface opposed to the center beam 2, can be shaped by using a photomask on which an area gradation patter is formed or by a resist material thermal deformation method or the like.

Figure 67:
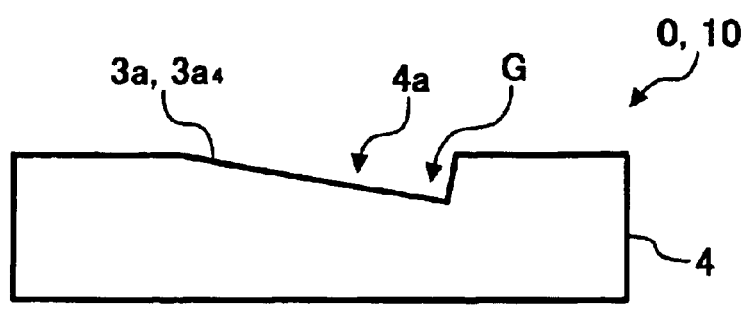
FIG. 67 is an explanatory view which explains the steps for the important sections of the manufacturing method of the light modulator which shows yet another example in the first embodiment of the present invention.
Figure 68:
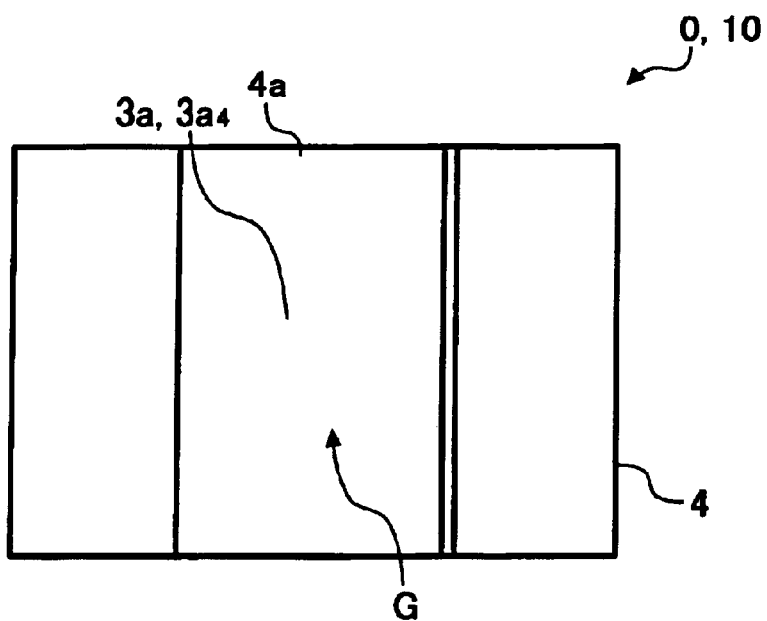
FIG. 68 is a plan view of FIG. 67.
Figure 69:
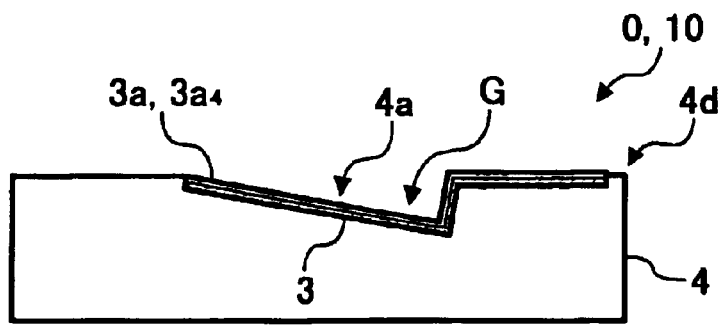
FIG. 69 is an explanatory view which explains the steps for the other important sections of the manufacturing method of the light modulator which shows yet another example in the first embodiment of the present invention.
Figure 70:
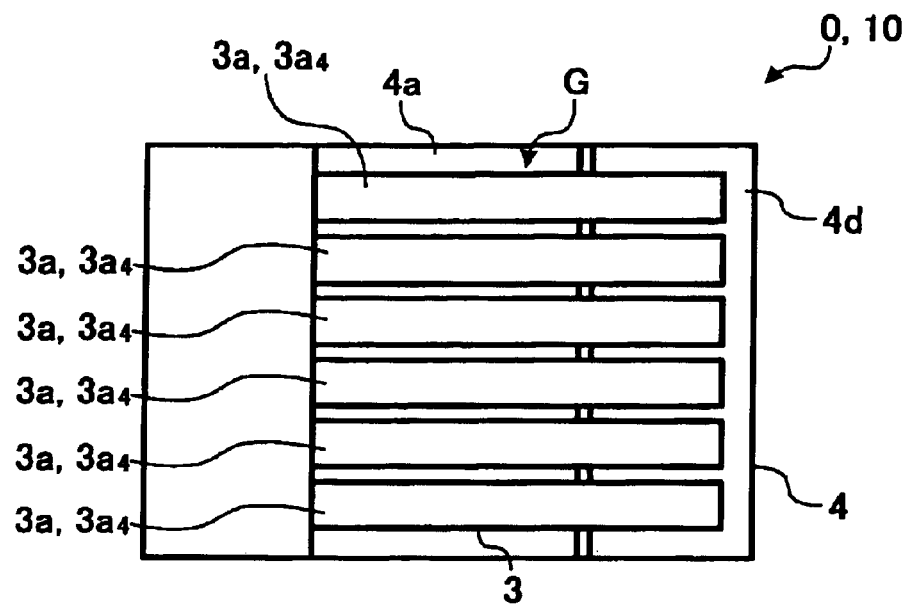
FIG. 70 is a plan view of FIG. 69.
Figure 71:
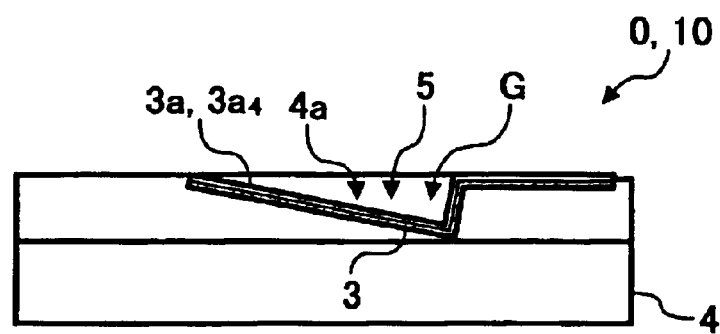
FIG. 71 is an explanatory view which explains the steps for the other important sections of the manufacturing method of the light modulator which shows yet another example in the first embodiment of the present invention.
Figure 72:
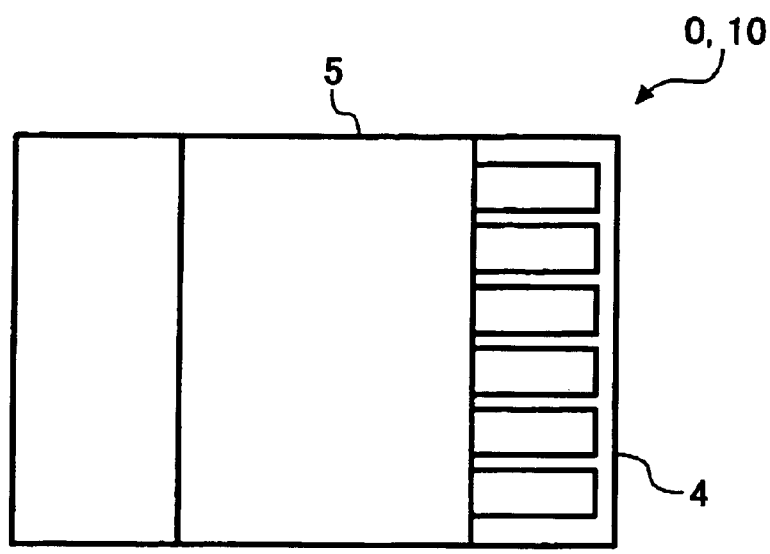
FIG. 72 is a plan view of FIG. 71.
Figure 73:
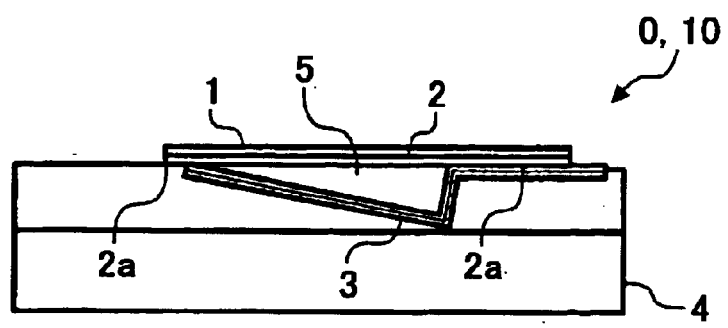
FIG. 73 is an explanatory view which explains the steps for the other important sections of the manufacturing method of the light modulator which shows yet another example in the first embodiment of the present invention.
Figure 74:
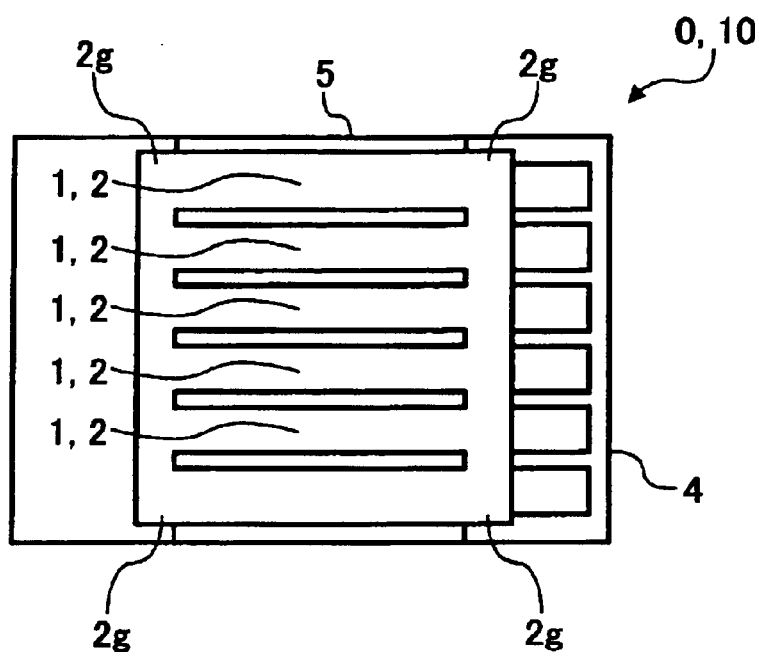
FIG. 74 is a plan view of FIG. 73.
Figure 75:
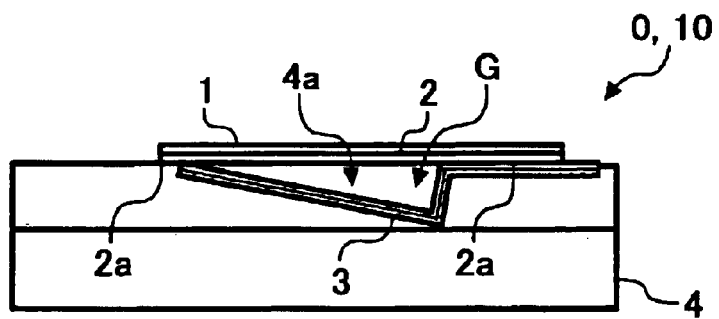
FIG. 75 is an explanatory view which explains the steps for the other important sections of the manufacturing method of the light modulator which shows yet another example in the first embodiment of the present invention.
Figure 76:
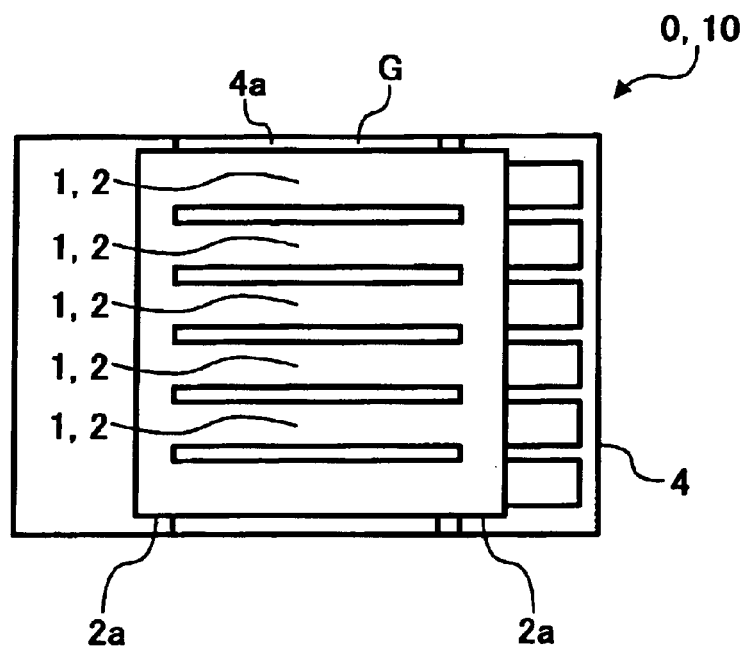
FIG. 76 is a plan view of FIG. 75.
Figure 77:
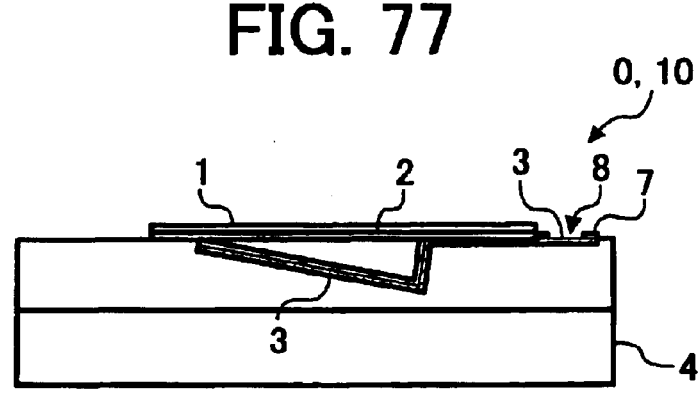
FIG. 77 is an explanatory view which explains the steps for the other important sections of the manufacturing method of the light modulator which shows yet another example in the first embodiment of the present invention.
Figure 78:
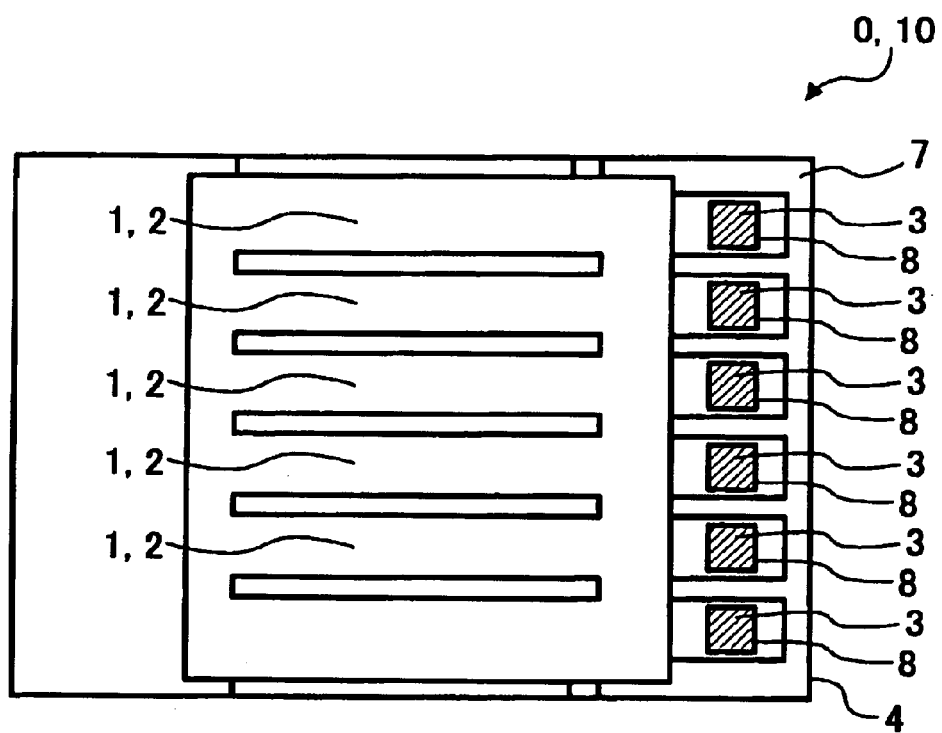
FIG. 78 is a plan view of FIG. 77.

The gap (G) of the concave section 4a formed between the center beam 2 and the entirely non-parallel opposed surface $3a_4$ which is an entirely non-parallel, inclined surface opposed to the center beam 2 is formed to have a width of 100 μm and a depth of 5.0 μm (see FIGS. 67 and 68).

At a substrate electrode formation step (b), the entirely non-parallel opposed surface $3a_4$ which is an entirely non-parallel, inclined surface of the opposed surface 3a of the substrate electrode 3 opposed to the center beam 2, is formed out of an Al thin film in the gap (G) of the concave section 4a. The Al thin film is formed to have a thickness of 0.1 μm by sputtering with Al as a target. The Al thin film is formed into the entirely non-parallel opposed surface $3a_4$ which is an entirely non-parallel, inclined surface of the opposed surface 3a of the substrate electrode 3 opposed to the center beam 2, in the form of an array to have a length of 20 μm which is orthogonal to the width of the gap (G) of the concave section 4a by photolithography and dry etching. A part of the entirely non-parallel opposed surface $3a_4$ which is an entirely non-parallel, inclined surface of the opposed surface 3a of the substrate electrode 3 opposed to the center beam 2 is projected from the gap (G) of the concave section 4a to the surface 4d of the substrate 4 so as to be connected to an external signal. Further, a plasma nitride film serving as an electrode protection film is formed on the surface $3a_4$ to have a thickness of 0.05 μm (see FIGS. 69 and 70).

At a sacrificial material layer formation step (c), the resist layer as a sacrificial material layer 5 is formed on the substrate 4 until the gap (G) of the concave section 4a is buried so as to cover the entirely non-parallel opposed surface $3a_4$ which is an entirely non-parallel, inclined surface of the opposed surface 3a of the substrate electrode 3 opposed to the center beam 2, and flattened by thermal annealing. After flattening, the resist layer as the sacrificial material layer 5 is removed by dry etching except for the portion which buries the gap (G) of the concave section 4a (see FIGS. 71 and 72).

At a center beam formation step (d), a silicon nitride film which is the material of the center beam 2 is formed to have a thickness of 0.1 μm on the entire surface of the flattened sacrificial material layer 5 by the plasma CVD method.

The Cr thin film of a light reflection film 1 which serves as a reflection surface reflecting incident light beams (R) is formed to have a thickness of 0.05 μm on the silicon nitride film by sputtering. The silicon nitride film including the reflection film layer is formed into the center beam 2 in the form of an array having to-be-held sections 2a each divided into two segments and each held by a connection section, by dry etching. The center beam 2 has a width of 100 μm and a length of 20 μm. The connection sections to which the divided to-be-held sections 2a are connected are located in the corner sections 2g of the respective to-be-held sections 2a and the width of each connection section is 5 μm (see FIGS. 73 and 74).

At a sacrificial material layer removal step (E), after the formation of the center beam 2, the sacrificial material layer 5 which flattens the gap (G) of the concave section 4a is etched away. The to-be-held sections 2a on the both ends of the center beam 2 are thereby held by and fixed to the substrate 4 through the gap (G) of the concave section 4a (see FIGS. 75 and 76).

Finally, opening pads 8 are formed in the protection film 7 to connect the substrate electrode 3 to an external signal. The light modulator 0 is thus completed.

Figure 79:
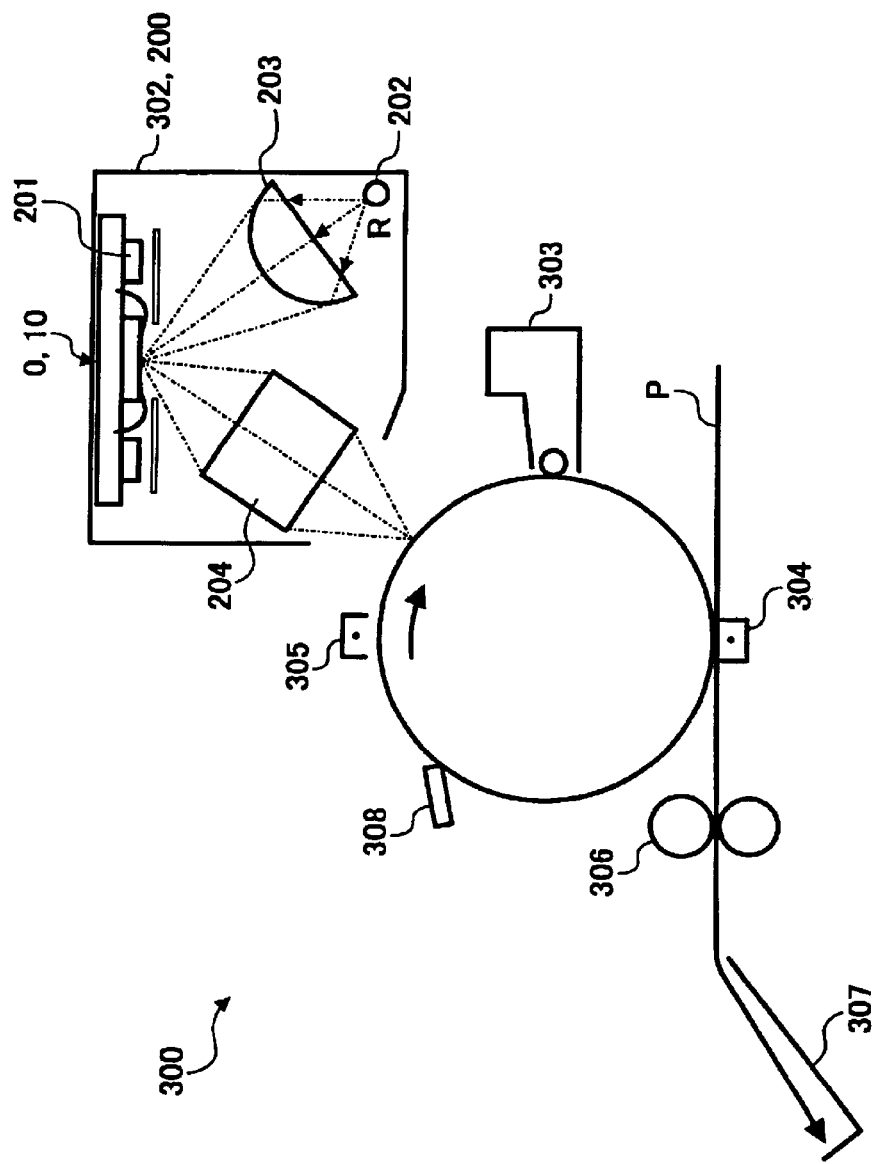
FIG. 79 is an explanatory view which explains a light information processing apparatus which includes the light modulator which shows the first embodiment of the present invention and an image formation apparatus which includes the light modulator.

In FIG. 79, an image formation apparatus 300 which forms an image by writing optical data by an electrophotographic process, forms a latent image by writing optical data by a latent image formation unit 302 which consists of a light information processing apparatus 200. The light information processing apparatus 200 consists of a drum-shaped photosensitive body of an image carrier 301 which is rotatably held and which carries a to-be-formed image, a plurality of light modulators 0 and an independent driving unit 201 which independently drives a plurality of light modulators 0 on the drum-shaped photosensitive body of the image carrier 301 uniformly charged by a charge unit 305. The image formation apparatus 300 develops the latent image formed by the light modulators 0 of the latent image formation unit 302 by a development unit 303 to form a toner image, transfers the toner image formed by the development unit 303 to a to-be transferred body (P) by a transfer unit 304, and fixes the toner image transferred to to-be-transferred body (P) by a fixing unit 306. Thereafter, the image formation apparatus 300 discharges the to-be-transferred body (P) to a paper discharge tray 307 and then stores the to-be-transferred body (P) in the discharge tray 307.

The drum-shaped photosensitive body of the image carrier 301 after the toner image is transferred to the to-be-transferred body (P) by the transfer unit 304 is cleaned by a cleaning unit 308 to be prepared for image formation at the next step.

In the light information processing apparatus 200, incident light beams (R) from a light source 202 are applied to a light modulator assembly 10, which has a plurality of light modulators 0 arranged in the form of a one-dimensional array, through the first lens system 203. Each of the plural light modulators 0 arranged in the form of a one-dimensional array in the light modulator assembly 10, independently applies a driving voltage between the beam electrode 2f of the center beam 2 and the substrate electrode 3 thereof by the independent driving unit 201 in accordance with image information, controls the center beam 2, and introduces the incident light beams (R) to the surface of the drum-shaped photosensitive body of the image carrier 301 through the light reflection film 1 to thereby form an image on the drum-shaped photosensitive body of the image carrier 301 through the second lens system 204.

In the light modulator assembly 10 having a plurality of light modulators 10 arranged in the form of a one-dimensional array, a substrate 4 is formed out of silicon wafer by the same method as that explained in FIGS. 67 to 78. The center beam 2 is formed out of a nitride film and arranged so that the distance between to-be-held sections 2a on the both ends of the center beam 2 is 100 µm, the length of the center beam 2 is 15 µm, the pitch thereof is 20 µm and the thickness thereof is 0.08 µm. An Al thin film serving as the light reflection layer of the light reflection film 1 and having a thickness of 0.01 µm is formed on the surface of the center beam 2. The gap (G) of a concave section 4a is formed in the substrate 4 so that the deepest portion on the entirely non-parallel, inclined surface is located on one end of the gap (G) and that the depth of the gap (G) gradually changes from the other end thereof in the direction of the deepest portion. The gap (G) is formed to have the largest depth of 5.00 µm.

A driving voltage at this moment is 37V. The IC's of the driving circuit 2d and the electronic circuit 6a of the driving circuit 6 of the center beam 2 are mounted on the substrate 4.

Therefore, it is possible to provide the light information processing apparatus 200 and the image formation apparatus 300 each including the light modulator assembly 10 on which a plurality of small-sized light modulators 0, which has a simple structure of modulating light by changing the reflection direction of the incident light beams (R), which has fast response, does not limit the wavelength of incident light beams (R) to be used, performs a stable operation, ensures high reliability, requires low voltage to therefore reduce consumption power, are arranged in the form of a one-dimensional array.

Figure 80:
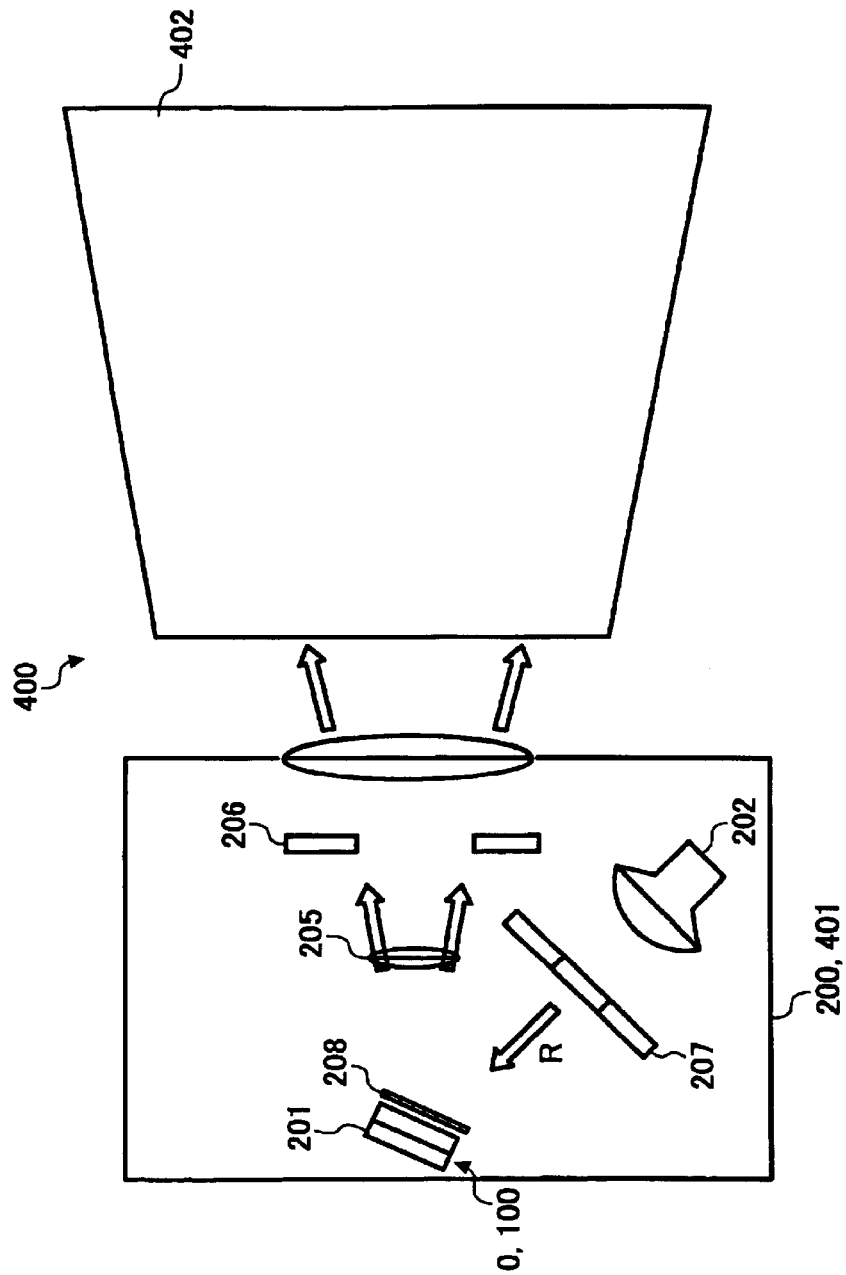
FIG. 80 is an explanatory view which explains a light information processing apparatus which includes the light modulator which shows the first embodiment of the present invention and an image formation apparatus which includes the light modulator.

In FIG. 80, in an image projection and display apparatus 400 which projects and displays an image, a plurality of light modulators 0 in a light switching unit 401 projects and displays an image on a projection screen 402. The light switching unit 400 consists of a light information processing apparatus 200. The light information processing apparatus 200 consists of a plurality of light modulators 0 each of which modulates light by changing the reflection direction of the incident light beams (R) of projected image data and thereby projects the image, and an independent driving unit 201 which independently drives the respective light modulators 0.

Each of the center beams 2 of the respective light modulators 0 arranged in the form of a two-dimensional array in a light modulator assembly 100 of the light information processing apparatus 200 has a width of 20 µm and a length of 20 µm. The distance between the adjacent center beams 2 is 1.0 µm.

A substrate 4 is formed out of monocrystalline silicon wafer. A wiring for a substrate electrode 3 corresponding to each center beam 2, is penetrated through an oxide film in which the gap (G) of a concave section 4a is formed, and connected to transistors on a driving circuit 2d which drives the center beam 2 and which is formed in the silicon wafer.

The gap (G) of the non-parallel concave section 4a formed in the concave section 4a of the substrate 4 opposed to the center beam 2 and formed between the center beam 2 and a plurality of non-parallel opposed surfaces $3a_3$ which are two non-parallel, inclined surfaces of the opposed surface 3a of the substrate electrode 3, is constituted so that the depth of the gap (G) is 1 µm and the central portion of the center beam 2 becomes has the largest depth.

In the light information processing apparatus 200 as the light switching unit 401, incident light beams (R) are applied from a light source 202 to the light modulator assembly 100 on which a plurality of light modulators 0 are arranged in the form of a two-dimensional array, and desired image data is reflected by the mirror of the light reflection film 1 of each center beam 2 by the independent driving unit 201 and projected to a projection screen 402 through a projection lens 205 and a diaphragm 206.

For color display, a rotary color hole 207 may be provided in front of the light source 202 or a micro-lens array 208 may be used to improve performance.

Therefore, it is possible to provide the light information processing apparatus 200 and the image projection and display apparatus 400 each including a small-sized light modulator 0 which has a simple structure of modulating light by changing the reflection direction of the incident light beams (R), has fast response, does not limit the wavelength of incident light beams (R) to be used, performs a stable operation, ensures high reliability, and requires low voltage to therefore reduce consumption power.

(Second Embodiment)

A second embodiment will be explained hereinafter with reference to FIGS. 81 to 105.

Figure 81A:
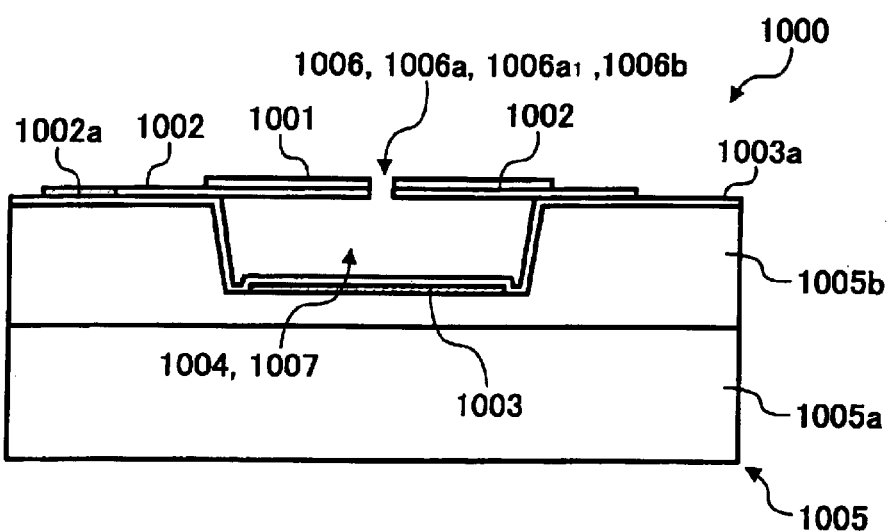
FIG. 81A is an explanatory view which explains a light modulator which shows one example in a second embodiment of the present invention.
Figure 81B:
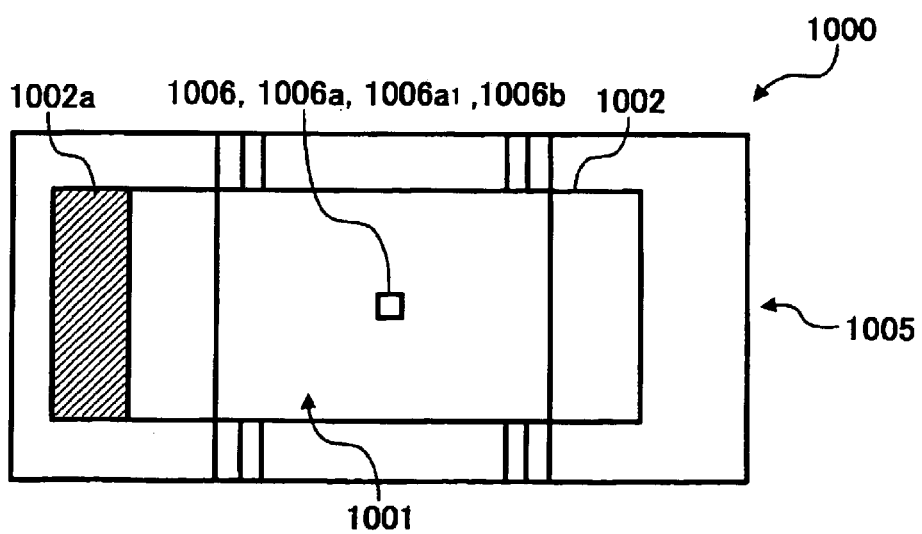
FIG. 81B is a plan view of FIG. 81A.

FIGS. 81A and 81B are a longitudinal sectional view and a plan view which shows the configuration of a light modulator according to the second embodiment, respectively. In FIGS. 81A and 81B, a light modulator 1000 which modulates light by changing the reflection direction of incident light consists of a reflection unit 1001, a thin film, both-end-fixed beam (center beam) 1002, a substrate electrode 1003, a gap 1004, a substrate 1005 and a hole section 1006. The reflection unit 1001 regularly reflects the incident light. The thin film, both-end-fixed beam (center beam) 1002 is constituted to be combined with the reflection unit 1001 provided on a side surface thereof (an upper surface in FIGS. 81A and 81B) and formed out of a thin film. The both ends of the thin film, both-end-fixed beam (center beam) 1002 are fixed and the thin film, both-end-fixed beam (center beam) 1002 is deformed by an electrostatic force. The substrate electrode 1003 is opposed to the thin film, both-end-fixed beam (center beam) 1002 and applies a driving voltage to the beam 1002. The gap 1004, which is formed by opposing the substrate electrode 1003 to the thin film, both-end-fixed beam (center beam) 1002, is formed on the other side surface of the thin film, both-end-fixed beam (center beam) 1002. The substrate 1005 has the substrate electrode 1003 which is formed on the bottom of the gap 1004 and formed in a concave section, holds and fixes the both ends of the thin film, both-end-fixed beam (center beam) 1002. The hole section 1006 is formed in the thin film, both-end-fixed beam (center beam) 1002 above the gap 1004 to be deformed more easily than the other sections. The light modulator 1000 is simple in the structure of changing the direction of the incident light and thereby modulating light, and fast in response. The light modulator 1000 can use the incident light without limiting the wavelength thereof. In addition, the light modulator 100 performs a stable operation, has high reliability, has fewer manufacturing steps to thereby reduce cost.

Further, it is possible to increase the number of paths from which an etchant is introduced and shorten time required to etch away the sacrificial material layer 1007 in the removal of a sacrificial material layer 1007 to be explained later, to decrease the film thickness of the thin film, both-end-fixed beam (center beam) 1002 and to decrease the distribution of the remaining thickness thereof.

As the substrate 1005, a silicon substrate 1005a which has (1100) plane on the surface there of is employed. A silicon substrate, an optical glass substrate or the like is normally used as the substrate 1005. An insulation film 1005b, such as a silicon oxide film, is formed on the silicon substrate 1005a.

As the substrate electrode 1003, a conductive thin film made of metal, such as Al, An, Au, Ti, TiN or Cr, or ITO or a substrate silicon into which impurities are diffused to decrease resistance is employed. The substrate electrode 1003 serves as one of the electrodes which drive the thin film, both-end-fixed beam (center beam) 1002.

The insulation film 1003a is a protection film which protects the substrate electrode 1003. The insulation film 1003a, such as a silicon nitride film, functions to prevent the substrate electrode 1003 from being contacted with the thin film, both-end-fixed beam (center beam) 1002 and short-circuited.

In addition, a pad opening, which is not shown, is sometimes formed in the insulation film 1003a to serve as a section which connects the substrate electrode 1003 to an external signal.

The thin film, both-end-fixed beam (center beam) 1002 is formed out of a thin film constituted to be combined with the reflection unit 1001, which is provided on the side surface thereof. The thin film, both-end-fixed beam (center beam) 1002 has both ends fixed, and is deformed by an electrostatic force.

The reflection unit 1001 formed on the thin film, both-end-fixed beam (center beam) 1002 is not limited to a film which is independently deposited but may include a case in which a light reflection region contributing to device performance is formed on the thin film, both-end-fixed beam (center beam) 1002.

A pad 1002a is provided to apply a driving voltage to the thin film, both-end-fixed beam (center beam) 1002 and functions to take out the other electrode which drives the thin film, both-end-fixed beam (center beam) 1002 if the conductive thin film is used as the thin film, both-end-fixed beam (center beam) 1002.

If the thin film, both-end-fixed beam (center beam) 1002 is made of a nonconductive material, it is possible to provide a pad in a region from which the potential of the metallic thin film made of Al, Au, Ti or Cr and used as the light reflection layer of the reflection unit 1001 is taken out and to use the pad as the other electrode so as to reduce cost.

An electrostatic force with which the thin film, both-end-fixed beam (center beam) 1002 is bent is generated by applying a driving voltage between the substrate electrode 1003 formed to be opposed to the thin film, both-end-fixed beam (center beam) 1002 and the thin film, both-end-fixed beam (center beam) 1002 or the reflection layer of the reflection unit 1001 through the gap 1004. The thin film, both-end-fixed beam (center beam) 1002 is formed out of a metallic film or a thin film made of monocrystalline silicon, polycrystalline silicon or silicon nitride. The thin film, both-end-fixed beam (center beam) 1002 made of the monocrystalline silicon thin film, in particular, has fewer defects and sustains longer life. The thin film, both-end-fixed beam (center beam) 1002 made of the polycrystalline silicon thin film can be formed by a CVD method or the like, contributing to cost reduction. The thin film, both-end-fixed beam (center beam) 1002 made of the silicon nitride thin film can accelerate switching response speed by the action of the tensile stress of the silicon nitride film. Further, if the thin film, both-end-fixed beam (center beam) 1002 is made of monocrystalline or polycrystalline silicon, the resistance of the monocrystalline or polycrystalline silicon is decreased by diffusing impurities and the both-end-fixed beam 1002 can be made conductive.

After forming the insulation film 1005b on the silicon substrate 1005a, the insulation film 1005b is patterned by photo-engraving and dry etching to thereby form the gap 1004. Alternatively, the silicon substrate 1005a may be similarly patterned and then the insulation film 1005b may be deposited on the silicon substrate 1005a.

One rectangle 1006a of a square shape is formed as the hole section 1006 at the center of the light reflection layer of the reflection unit 1001 and that of the thin film, both-end-fixed beam (center beam) 1002 as shown in FIG. 81A and FIG. 81B.

The hole section 1006 is formed in the thin film, both-end-fixed beam (center beam) 1002 above the gap 1004 simultaneously with the patterning of the insulation film 1005b by photo-engraving and dry etching so that corresponding section of the beam 1002 can be deformed more easily than the other sections thereof.

The hole section 1006 is not limited to the square 1006a as the square 1006a but may be a rectangle 1006a₁, which is not shown, or a circular section 1006b of a complete round shape or an elliptical shape which can prevent stress concentration, and is easy to work and low in cost.

Figure 82A:
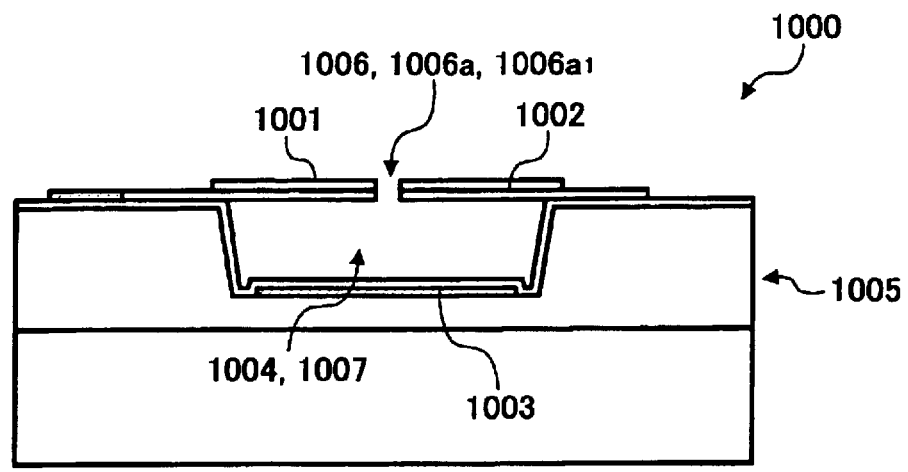
FIG. 82A is an explanatory view which explains a light modulator which shows another example in the second embodiment of the present invention.
Figure 82B:
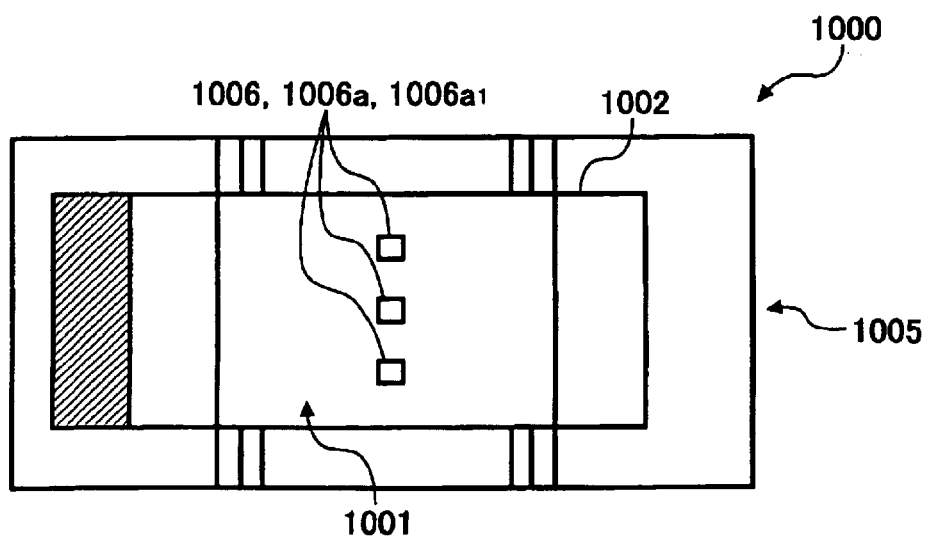
FIG. 82B is a plan view of FIG. 81A.

FIGS. 82A and 82B are a longitudinal sectional view and a plan view of the light modulator according to another example in the second embodiment of the present invention, respectively. In FIGS. 82A and 82B, three squares 1006a₁ as the rectangles 1006a or as the hole sections 1006 formed in the thin film, both-end-fixed beam (center beam) 1002 above the gap 1004 so that the corresponding sections of the thin film, both-end-fixed beam (center beam) 1002 can be deformed more easily than the other sections thereof, are arranged at the center of the thin film, both-end-fixed beam (center beam) 1002 in the same direction as the tangential direction of the fixed both ends of the thin film, both-end-fixed beam (center beam) 1002.

Alternatively, the squares 1006a₁ may be provided at arbitrary positions in view of the strength and light modulation property of the thin film, both-end-fixed beam (center beam) 1002.

If the thin film, both-end-fixed beam (center beam) 1002 is bent in the direction of the gap 1004 pivotally about the fixed both ends thereof by an electrostatic force generated between the thin film, both-end-fixed beam (center beam) 1002 and the substrate electrode 1003, the sections of the thin film, both-end-fixed beam (center beam) 1002 in the vicinity of the squares 1006a₁ arranged in a row can be more bent than the other sections. This is because the squares 1006a₁ are arranged at arbitrary intervals in the same direction as the tangential direction of the fixed both ends of the thin film, both-end-fixed beam (center beam) 1002. It is, therefore, possible to provide the light modulator 1000 which can lower a driving voltage required for light modulation.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof, and improve reliability.

Figure 83A:
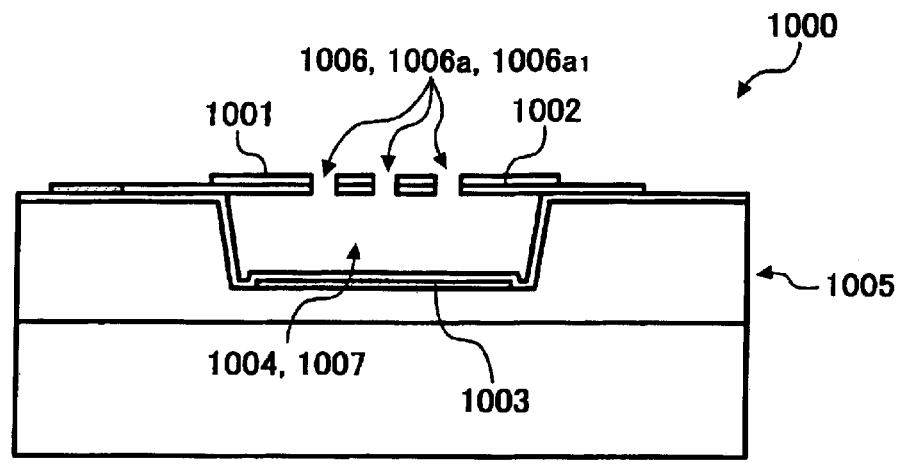
FIG. 83A is an explanatory view which explains a light modulator which shows yet another example in the second embodiment of the present invention.
Figure 83B:
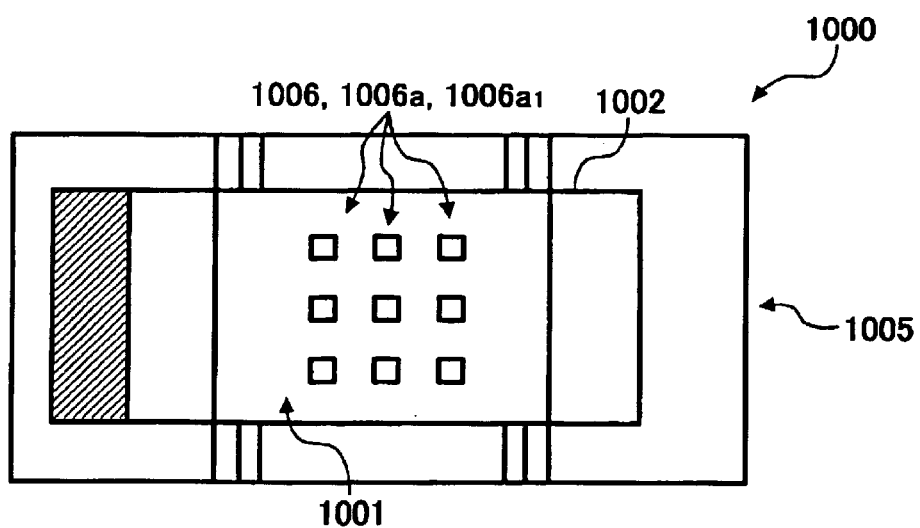
FIG. 83B is a plan view of FIG. 81A.

FIGS. 83A and 83B are a longitudinal sectional view and a plan view of the light modulator according to yet another example of the second embodiment of the present invention, respectively. In FIGS. 83A and 83B, a plurality of squares 1006a₁ as the rectangles 1006a or as the hole sections 1006 are arranged in a perpendicular direction to the tangential direction of the fixed ends of the thin film, both-end-fixed beam (center beam) 1002.

That is, the squares 1006a₁ are arranged in three rows and three columns equidistantly in the thin film, both-end-fixed beam (center beam) 1002 on the gap 1004. This can further facilitate bending the thin film, both-end-fixed beam (center beam) 1002 and provide the light modulator 1000 which can lower a driving voltage required for light modulation.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

FIGS. 84 to 86 are explanatory views which explain the configuration and operation of the light modulator according to yet another example of the second embodiment of the present invention. In FIGS. 84 to 86, the rectangle 1006$a_2$ as the rectangle 1006$a$ or as the hole section 1006$a$ is arranged in the same direction as the tangential direction of the fixed ends of the thin film, both-end-fixed beam (center beam) 1002.

Namely, the rectangle 1006$a_2$ formed in the thin film, both-end-fixed beam (center beam) 1002 has a rectangular shape viewed from upward in the plane direction of the thin film, both-end-fixed beam (center beam) 1002. The long edge direction of the rectangle 1006$a_2$ or the long diameter direction of the circle 1006$b$ such as an ellipse, which is not shown, is set to be the same as the tangential direction of the fixed ends of the thin film, both-end-fixed beam (center beam) 1002.

Figure 84A:
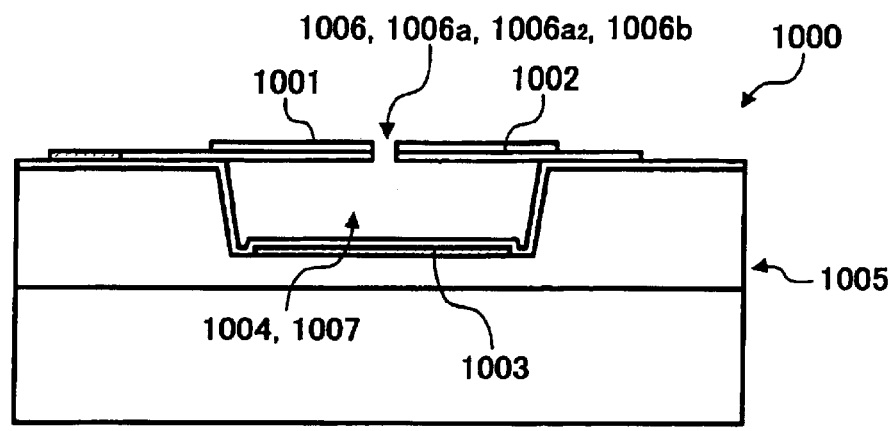
FIG. 84A is an explanatory view which explains a light modulator which shows yet another example in the second embodiment of the present invention.
Figure 84B:
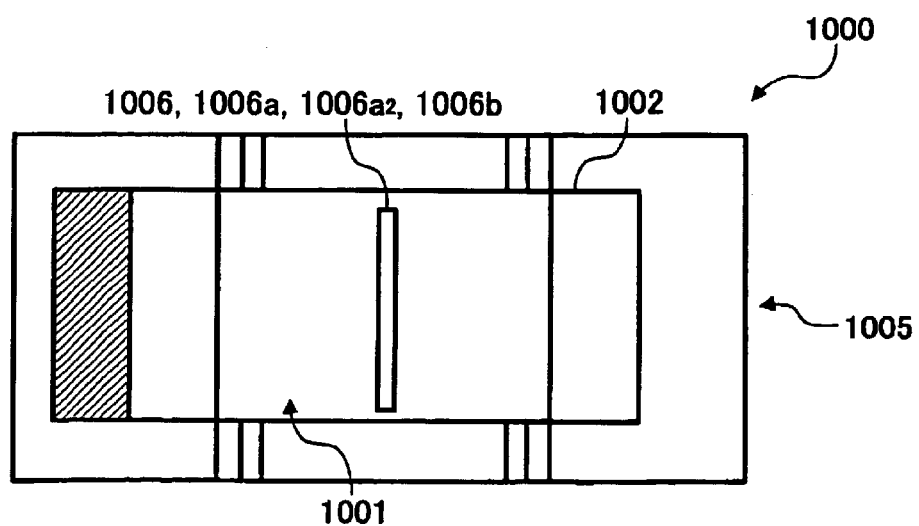
FIG. 84B is a plan view of FIG. 81A.

While the rectangle 1006$a_2$ as the rectangle 1006$a$ or as the hole section 1006 is arranged at the center of the thin film, both-end-fixed beam (center beam) 1002, it may be arranged at an arbitrary position in view of the strength and light modulation property of the thin film, both-end-fixed beam (center beam) 1002 (see FIGS. 84A and 84B).

Figure 85C:
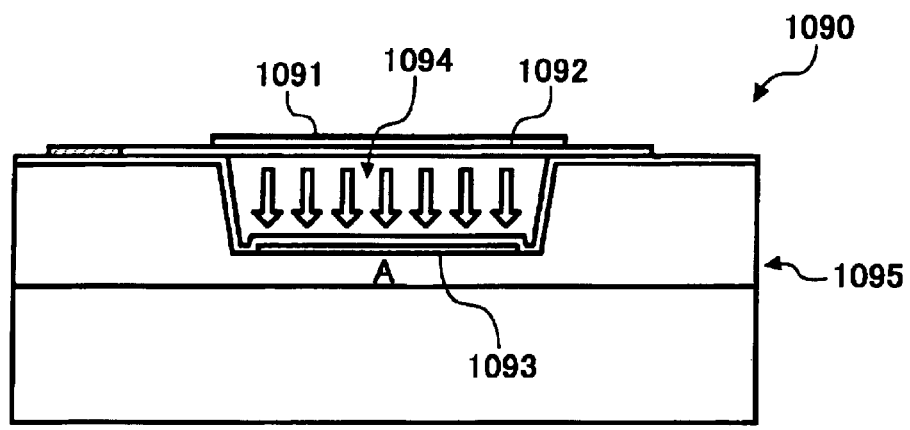
FIG. 85C and FIG. 85D are explanatory views which explain the important sections of a conventional light modulator.
Figure 85D:
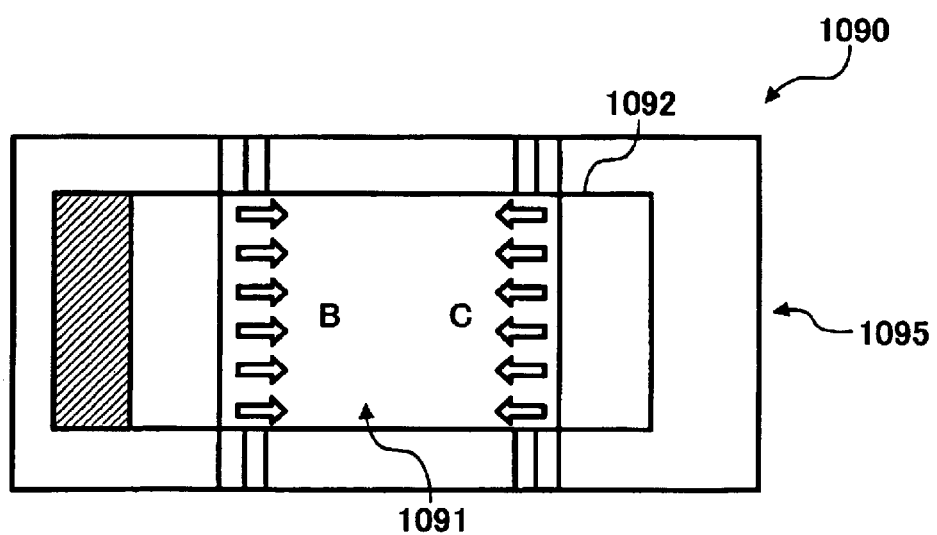

An electrostatic force applied to a thin film, both-end-fixed beam (center beam) 1092 which does not include the hole section 1006 is typically shown in FIG. 85C in an arrow A direction. A force which is applied to the thin film, both-end-fixed beam (center beam) 1092 when the electrostatic force is applied thereto and which acts on the plane direction of the thin film, both-end-fixed beam (center beam) 1092 is shown in FIG. 85D in arrow B and C directions.

The thin film, both-end-fixed beam (center beam) 1092 is forced to be attracted and bent by the action of the electrostatic force applied to the thin film, both-end-fixed beam (center beam) 1092 through a gap 1094. As a result, a force is applied to the plane direction of the thin film, both-end-fixed beam (center beam) 1092.

At this moment, the force acting on the plane direction of the thin film, both-end-fixed beam (center beam) 1092 is uniform since the hole section 1006 is not formed in the thin film, both-end-fixed beam (center beam) 1092.

Figure 86E:
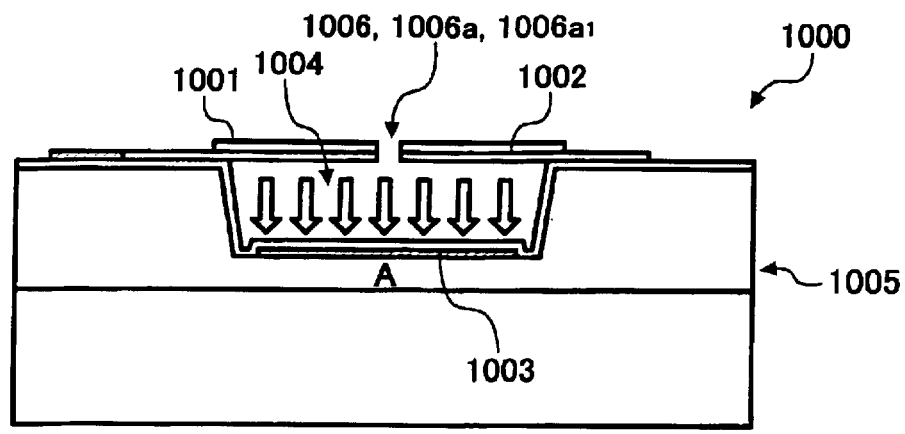
FIG. 86E and FIG. 86F are explanatory views which explain a light modulator which shows yet another example in the second embodiment of the present invention.
Figure 86F:
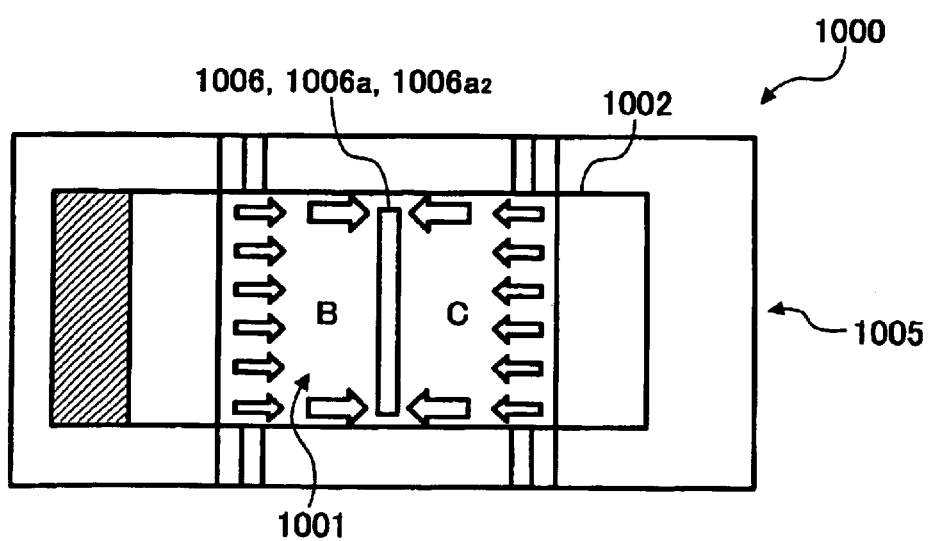

An electrostatic force applied to the thin film, both-end-fixed beam (center beam) 1002 which includes the square 1006$a_2$ as the square 1006$a$ or as the hole section 1006 is typically shown in FIG. 86E in an arrow A direction. A force which is applied to the thin film, both-end-fixed beam (center beam) 1002 when the electrostatic force is applied thereto and which acts on the plane direction of the thin film, both-end-fixed beam (center beam) 1002 is shown in FIG. 86F in arrow B and C directions.

As shown, there is not so large difference between the electrostatic force applied to the thin film, both-end-fixed beam (center beam) 1002 and that applied to the thin film, both-end-fixed beam (center beam) 1092. Although no electrostatic force actually occurs to the rectangle 1006$a_2$ as the hole section 1006, the influence of the electrostatic force is decreased by microscopically designing the rectangle 1006$a$. As a result, the force acting on the plane of the thin film, both-end-fixed beam (center beam) 1002 concentrates on the surrounding of the rectangle 1006$a$. Therefore, the thin film, both-end-fixed beam (center beam) 1002 can be bent more easily, whereby it is possible to provide the light modulator 1000 which can lower a driving voltage required for light modulation.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 87A:
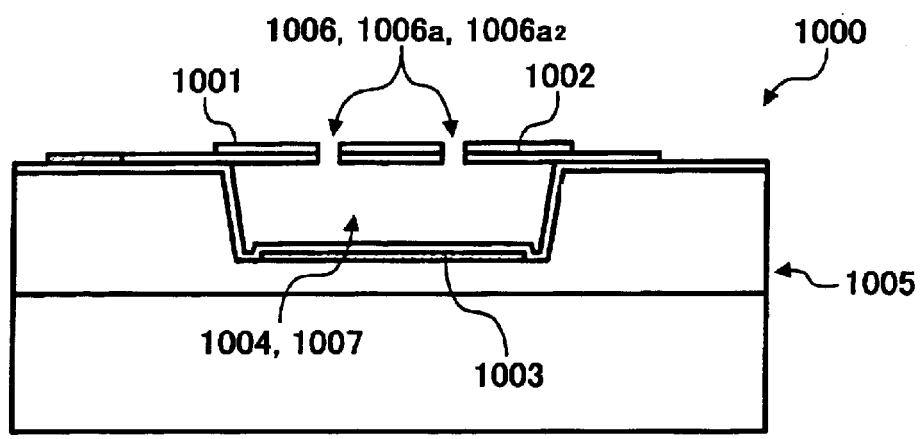
FIG. 87A and FIG. 87B are explanatory views which explain a light modulator which shows yet another example in the second embodiment of the present invention.
Figure 87B:
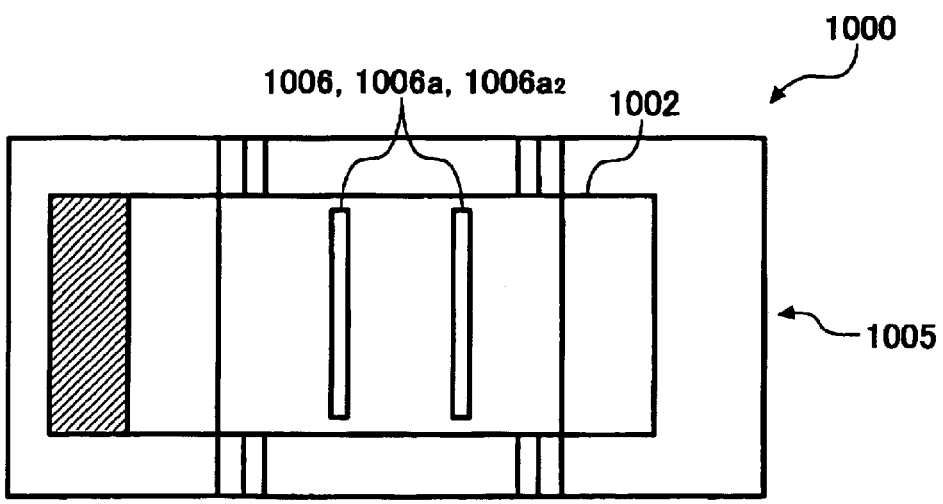

FIGS. 87A and 87B are a longitudinal sectional view and a plan view of the light modulator according to yet another example in the second embodiment of the present invention, respectively. In FIGS. 87A and 87B, a plurality of rectangles 1006$a_2$ as the rectangles 1006$a$ or as the hole sections 1006 are arranged in a perpendicular direction to the tangential direction of the fixed ends of the thin film, both-end-fixed beam (center beam) 1002.

Namely, the rectangles 1006$a_2$ are arranged in two columns in the thin film, both-end-fixed beam (center beam) 1002 above the gap 1004. This can further facilitate bending the thin film, both-end-fixed beam (center beam) 1002, whereby it is possible to provide the light modulator 1000 which can lower a driving voltage required for light modulation.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 88A:
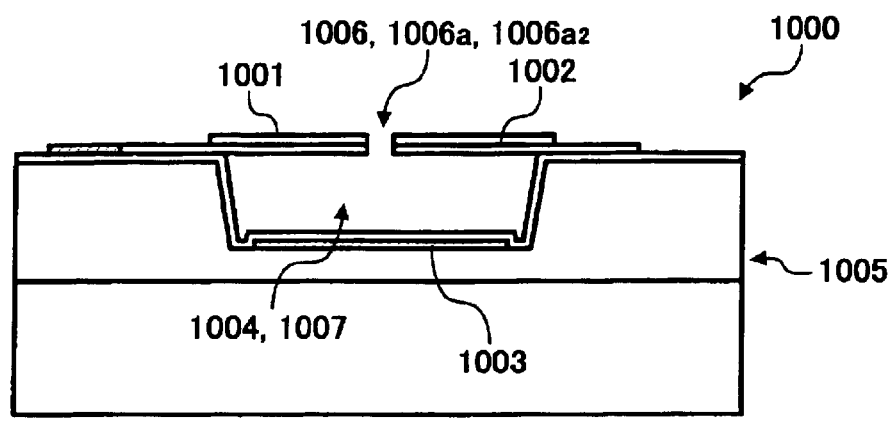
FIG. 88A and FIG. 88B are explanatory views which explain a light modulator which shows yet another example in the second embodiment of the present invention.
Figure 88B:
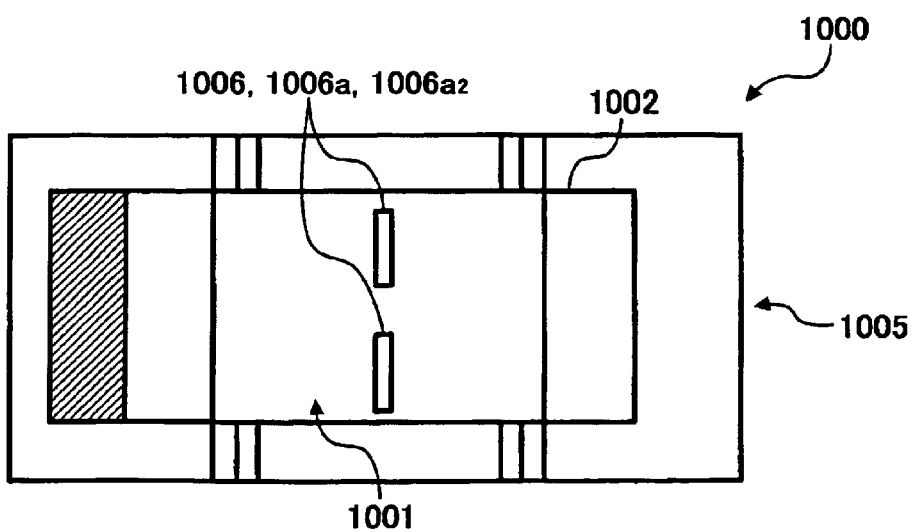

FIGS. 88A and 88B are a longitudinal sectional view and a plan view of the light modulator according to yet another example of the second embodiment of the present invention, respectively. In FIGS. 88A and 88B, two rectangles 1006$a_2$ as the rectangles 1006$a$ or as the hole section 1006 are arranged at the center of the thin film, both-end-fixed beam (center beam) 1002 in the same direction as the tangential direction of the both fixed ends of the thin film, both-end-fixed beam (center beam) 1002.

Alternatively, the rectangles 1006$a_2$ may be provided at arbitrary positions in view of the strength and light modulation property of the thin film, both-end-fixed beam (center beam) 1002.

If the thin film, both-end-fixed beam (center beam) 1002 is bent in the direction of the gap 1004 pivotally about the fixed both ends thereof by an electrostatic force generated between the thin film, both-end-fixed beam (center beam) 1002 and the substrate electrode 1003, the sections of the thin film, both-end-fixed beam (center beam) 1002 in the vicinity of the squares 1006$a_2$ as the squares 1006$a_1$ or as the hole sections 1006$a$ arranged in two columns which beam has many stress release regions, can be more bent than the other sections. This is because the squares 1006$a_2$ are arranged at arbitrary intervals in the same direction as the tangential direction of the fixed both ends of the thin film, both-end-fixed beam (center beam) 1002. It is, therefore, possible to provide the light modulator 1000 which can not only further lower a driving voltage required for light modulation but also can increase the connection regions of the thin film, both-end-fixed beam (center beam) 1002 to decrease the concentration of a stress on the connection regions during bending and which can ensure long-lasting reliability.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 89A:
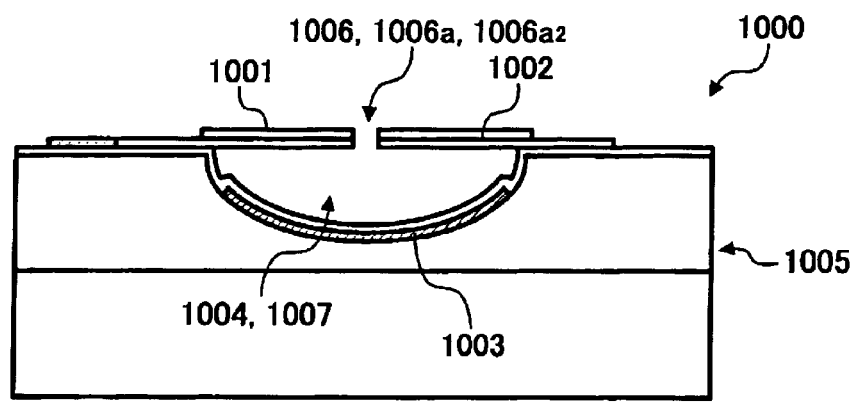
FIG. 89A and FIG. 89B are explanatory views which explain a light modulator which shows yet another example in the second embodiment of the present invention.
Figure 89B:
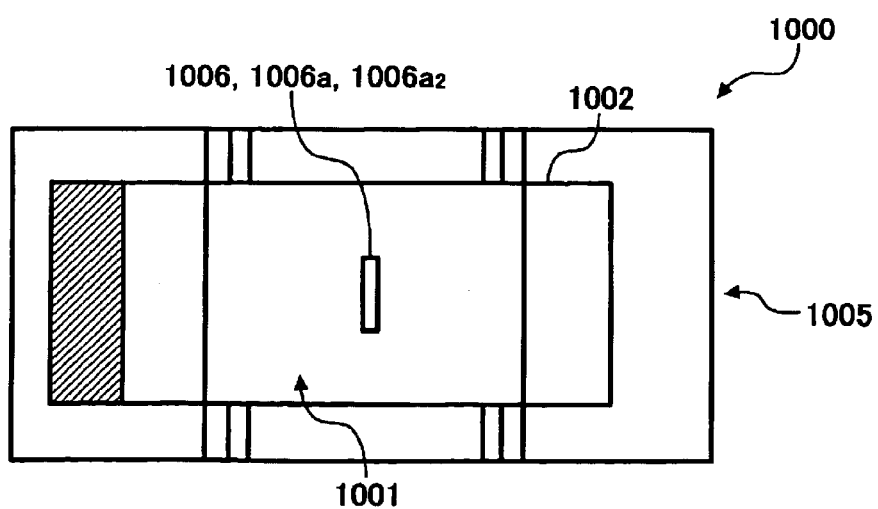

FIGS. 89A and 89B are a longitudinal sectional view and a plan view of the light modulator according to yet another example of the second embodiment of the present invention, respectively. In FIGS. 89A and 89B, the gap 1004 is formed to be round on the substrate electrode 1003 side. Therefore, the thin film, both-end-fixed beam (center beam) 1002 is non-parallel to the substrate electrode 1003. The rectangle 1006$a_2$ as the rectangle 1006$a$ or as the hole section 1006 may be formed near the center of the thin film, both-end-fixed beam (center beam) 1002.

As a result, it is possible to provide the light modulator 1000 which can facilitate bending the thin film, both-end-fixed beam (center beam) 1002 and lower a driving voltage required for light modulation.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 90A:
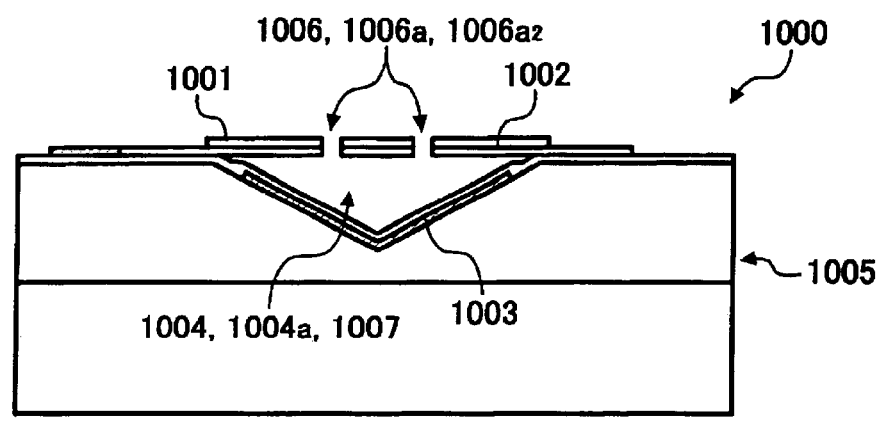
FIG. 90A and FIG. 90B are explanatory views which explain a light modulator which shows yet another example in the second embodiment of the present invention.
Figure 90B:
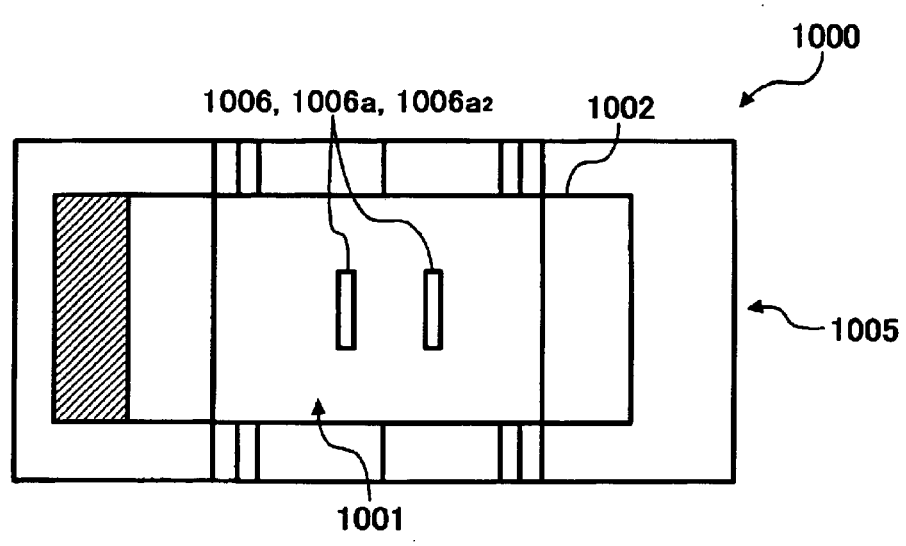

FIGS. 90A and 90B are a longitudinal sectional view and a plan view which shows the configuration of the light modulator according to yet another example of the second embodiment of the present invention, respectively. The gap 1004 is formed to have an apex angle section 1004$a$ on the substrate electrode 1003 side. Therefore, the thin film, both-end-fixed beam (center beam) 1002 is non-parallel to the substrate electrode 1003. Two rectangles 1006$a_2$ as the rectangles 1006$a$ or as the hole sections 1006 may be formed in the thin film, both-end-fixed beam (center beam) 1002 in a perpendicular direction to the tangential direction of the fixed ends of the thin film, both-end-fixed beam (center beam) 1002. Namely, the rectangles 1006$a_2$ as the rectangles 1006$a$ or as the hole section 1006 are arranged in two columns in the thin film, both-end-fixed beam (center beam) 1002 above the gap 1004.

As a result, it is possible to provide the light modulator 1000 which can further facilitate bending the thin film, both-end-fixed beam (center beam) 1002 and lower a driving voltage required for light modulation.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 91A:
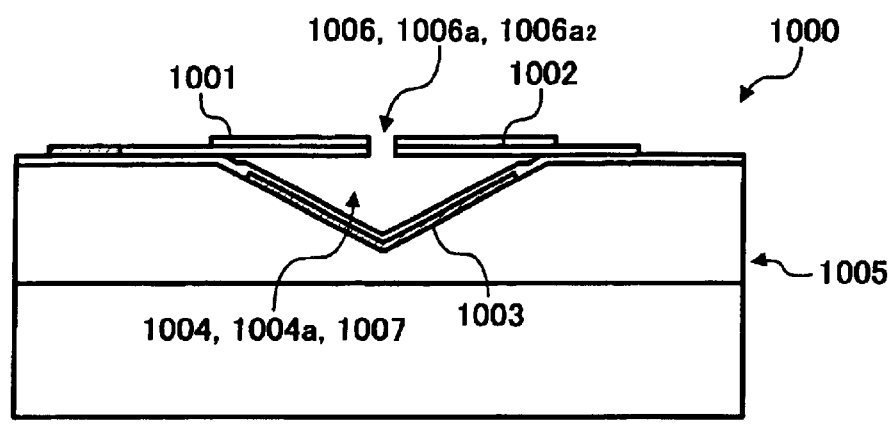
FIG. 91A and FIG. 91B are explanatory views which explain a light modulator which shows yet another example in the second embodiment of the present invention.
Figure 91B:
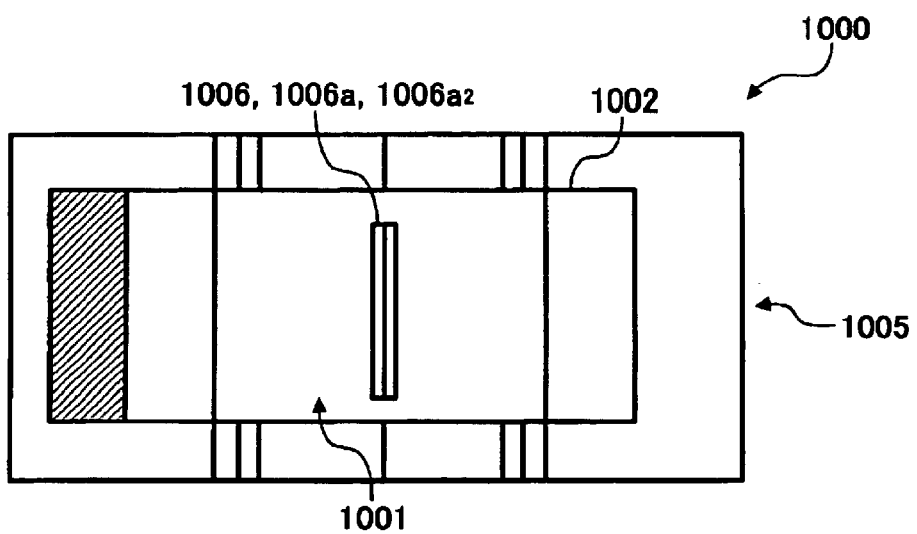

FIGS. 91A and 91B are explanatory views which show the configuration and operation of the light modulator in yet another example of the second embodiment of the present invention. In FIGS. 91A and 91B, the rectangle 1006$a_2$ as the rectangle 1006$a$ or as the hole section 1006 is arranged at a position opposed to and in the vicinity of the apex angle section 1004$a$ of the gap 1004.

Namely, the rectangle 1006$a_2$ as the rectangle 1006$a$ or as the hole section 1006 formed in the thin film, both-end-fixed beam (center beam) 1002 is located at a position opposed to and in the vicinity of the apex angle section 1004$a$ of the non-parallel gap 1004 having the apex angle section 1004$a$ (see FIGS. 91A and 91B).

Figure 92A:
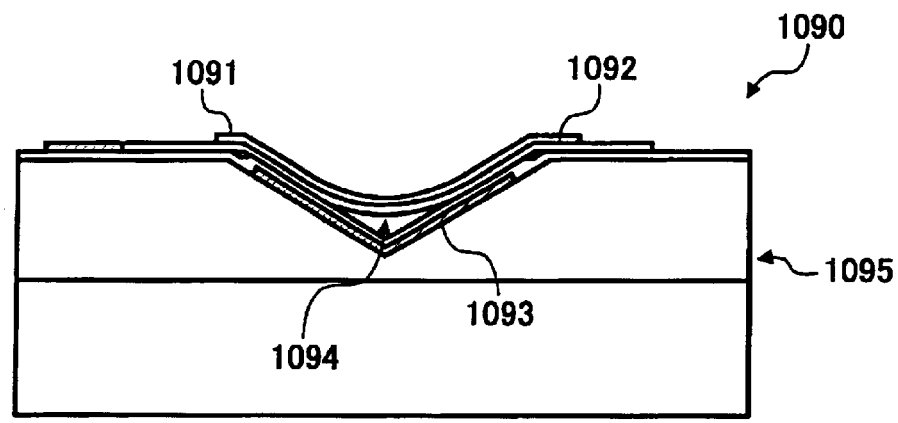
FIG. 92A and FIG. 92B are explanatory views which explain a conventional light modulator and a light modulator which shows yet another example in the second embodiment of the present invention.

The irregularity of the deformation of the thin film, both-end-fixed beam (center beam) 92 which does not include the hole section 1006 is typically shown in FIG. 92A. The irregularity of the deformation of the thin film, both-end-fixed beam (center beam) 1002 which has the rectangle 1006$a_2$ as the rectangle 1006$a$ or as the hole section 1006 is typically shown in FIG. 92B.

In case of the thin film, both-end-fixed beam (center beam) 1092 which does not include the hole section 1006, the deformation of the thin film, both-end-fixed beam (center beam) 1092 caused by an arbitrary driving voltage tends to be irregular as shown in FIG. 92A.

Figure 92B:
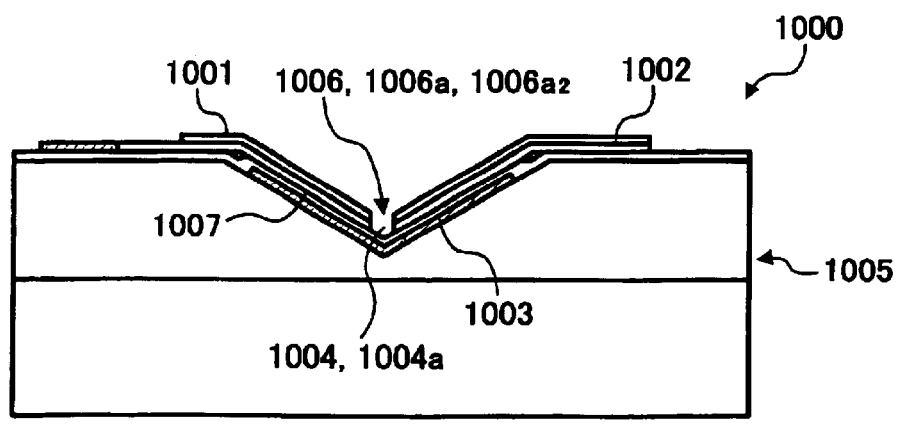

In case of the thin film, both-end-fixed beam (center beam) 1002 which includes the rectangle 1006$a_2$ as the rectangle 1006$a$ or as the hole section 1006$a$, by contrast, the thin film, both-end-fixed beam (center beam) 1002 tends to be deformed in the vicinity of the rectangle 1006$a_2$ as shown in FIG. 92B. It is, therefore, possible to easily attain the deformation of the thin film, both-end-fixed beam (center beam) having less irregularity. This can be attained particularly if the rectangle 1006$a_2$ is arranged at a position opposed to-and in the vicinity of the apex angle section 1004$a$ of the gap 1004.

Namely, if the thin film, both-end-fixed beam (center beam) 1002 is bent by an electrostatic force, the deformation of the thin film, both-end-fixed beam (center beam) 1002 tends to occur about the center line of the rectangle 1006$a_2$ as the rectangle 1006$a$ or as the hole section 1006. Compared with the structure which does not include the hole section 1006, the position at which the thin film, both-end-fixed beam (center beam) 1002 is bent can be easily controlled, the reproducibility of the thin film, both-end-fixed beam (center beam) 1002 during bending is improved, an S/N ratio in light modulation is improved, a driving voltage is low, an operation is stable and reliability is improved.

As a result, it is possible to provide the light modulator 1000 which can further facilitate bending the thin film, both-end-fixed beam (center beam) 1002, further lower a driving voltage required for light modulation, ensure stable operation and ensure high reliability.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 93A:
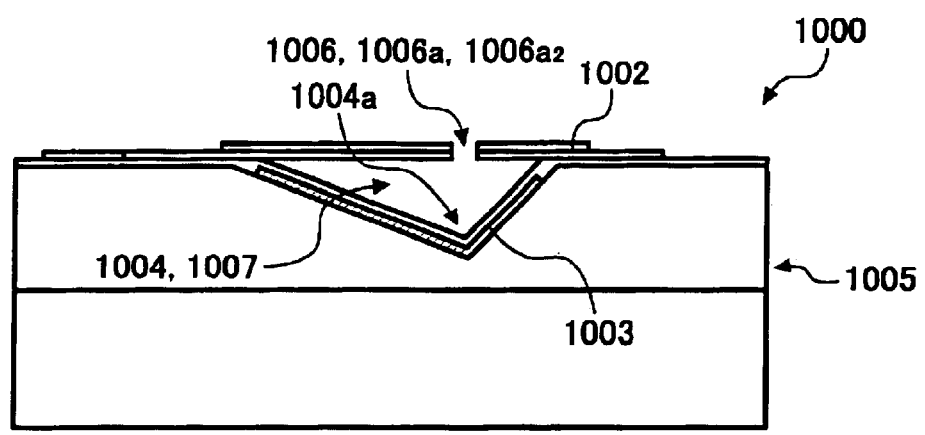
FIG. 93A and FIG. 93B are explanatory views which explain a light modulator which shows yet another example in the second embodiment of the present invention.
Figure 93B:
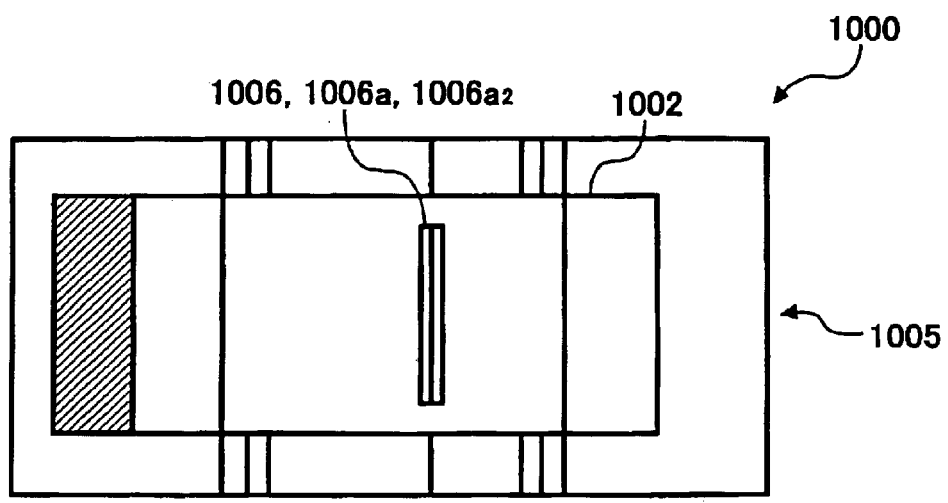

FIGS. 93A and 93B are a longitudinal sectional view and a plan view which shows the configuration of the light modulator according to yet another example of the second embodiment of the present invention, respectively. In FIGS. 93A and 93B, the rectangle 1006$a_2$ as the rectangle 1006$a$ or as the hole section 1006 is arranged in the thin film, both-end-fixed beam (center beam) 1002 at a position opposed to the apex angle section 1004$a$ which is located at a relatively close position to one of the fixed ends of the thin film, both-end-fixed beam (center beam) 1002.

Therefore, it is possible to provide the light modulator 1000 which can further facilitate bending the thin film, both-end-fixed beam (center beam) 1002, further lower a driving voltage required for light modulation, ensure stable operation and ensure high reliability.

Furthermore, it is possible to provide the light modulator 1000 which can increase the number of paths from which an etchant is introduced and shorten time required to etch away the sacrificial material layer 1007 in the removal of the sacrificial material layer 1007 to be explained later, decrease the film thickness of the thin film, both-end-fixed beam (center beam) 1002 and decrease the distribution of the remaining thickness thereof.

Figure 94A:
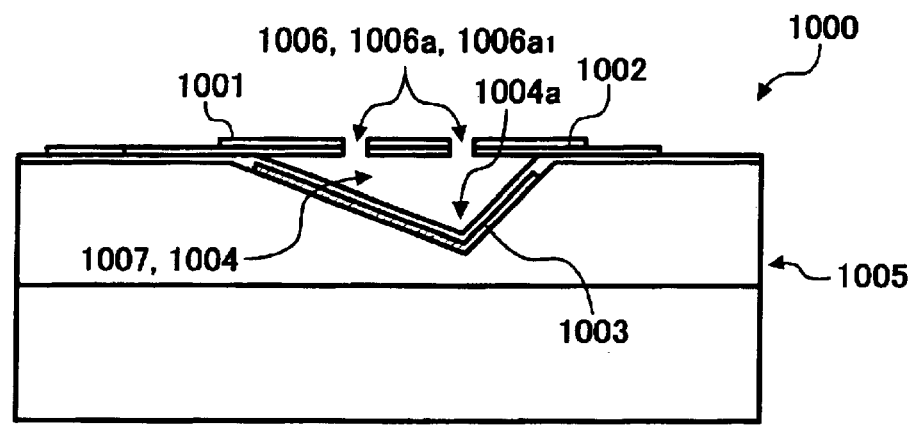
FIG. 94A and FIG. 94B are explanatory views which explain the states of the important sections of a light modulator which shows yet another example in the second embodiment of the present invention.
Figure 94B:
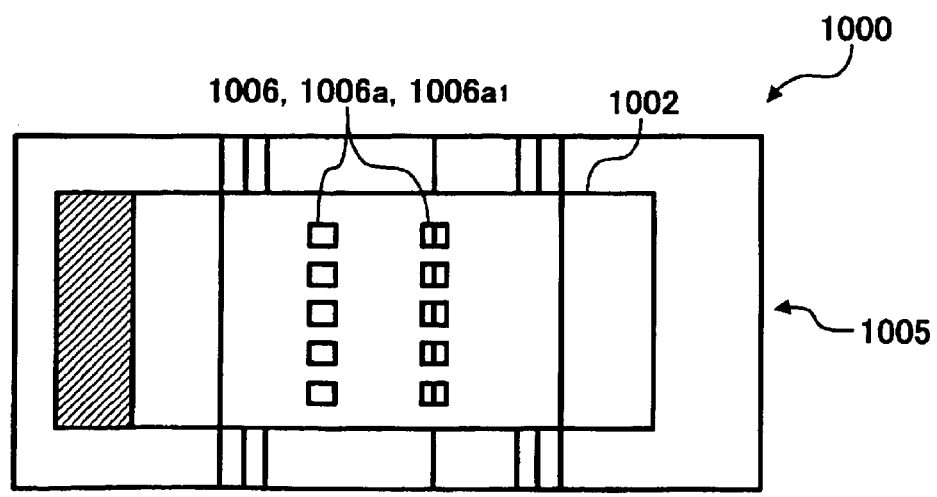

FIGS. 94 and 95 are explanatory views for the configuration and the operation of the light modulator according to yet another example of the second embodiment of the present invention. In FIGS. 94 and 95, a plurality of squares 1006$a_1$ as the rectangles 1006$a$ or as the hole sections 1006 are arranged in a column to be opposed to the apex angle section 1004$a$ of the gap 1004 located at a relatively close position to one of the fixed ends of the thin film, both-end-fixed beam (center beam) 1002 and a plurality of squares 1006$a_1$ as the rectangles 1006$a$ or as the hole sections 1006 are also arranged in a column at arbitrary positions on the other fixed end side of the thin film, both-end-fixed beam (center beam) 1002 (see FIGS. 94A and 94B).

The squares 1006$a_1$ as the rectangles 1006$a$ or as the hole sections 1006 provided to correspond to the apex angle section 1004$a$ are formed at positions opposed to the apex angle section 1004$a$ of the gap 1004. Therefore, if the thin film, both-end-fixed beam (center beam) 1002 is bent by an electrostatic force, the deformation of the thin film, both-end-fixed beam (center beam) 1002 tends to occur about the center line of the squares 1006$a_1$ provided to correspond to the apex angle section 1004$a$. Compared with the structure which does not include the hole section 1006, the reproducibility of the thin film, both-end-fixed beam (center beam) 1002 is improved during bending, an S/N ratio in light modulation is improved, a driving voltage is lowered, operation is stable and reliability is improved.

A plurality of squares 1006$a_1$ arranged in a column at arbitrary positions on the other fixed end side of the thin film, both-end-fixed beam (center beam) 1002 can further facilitate bending the thin film, both-end-fixed beam (center beam) 1002 and lower a driving voltage required for light modulation.

Figure 95C:
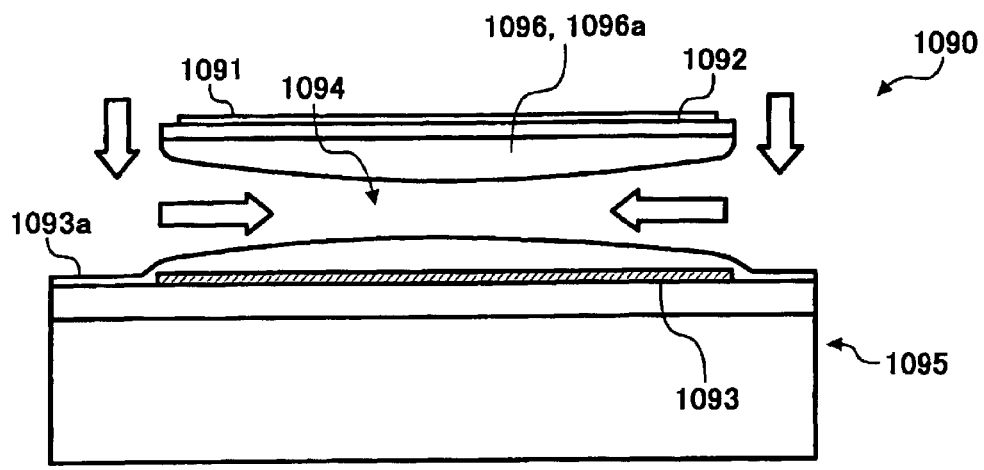
FIG. 95C is an explanatory view which explains the states of the other important sections of the conventional light modulator.

An etchant introduction process indicated by arrows, the thin film, both-end-fixed beam (center beam) 1092 and the residual film 1096$a$ of the sacrificial material layer 1096 if the light modulator 1090 does not include the hole section 1006, are typically shown in FIG. 95C. An etchant introduction process indicated by arrows and the residual film 1007$a$ of the sacrificial material layer 1007 if the light modulator 1000 includes the hole sections 1006, are typically shown in FIG. 95D.

In case of the light modulator 1090 does not include hole sections 1006 to there by decrease the number of etchant introduction paths as shown in FIG. 95C, it takes a long time to promote etching to the sacrificial material layer 1096. It is, therefore, necessary to set the thin film, both-end-fixed beam (center beam) 1092 and the insulation film 1093$a$ which are etched during the etchant introduction process to be thick at the time of initially forming them. As a result, when the etching is finished, the difference in thickness among the regions of the thin film, both-end-fixed beam (center beam) 1092 and the insulation film 1093$a$ grows, thereby increasing a driving voltage.

Figure 95D:
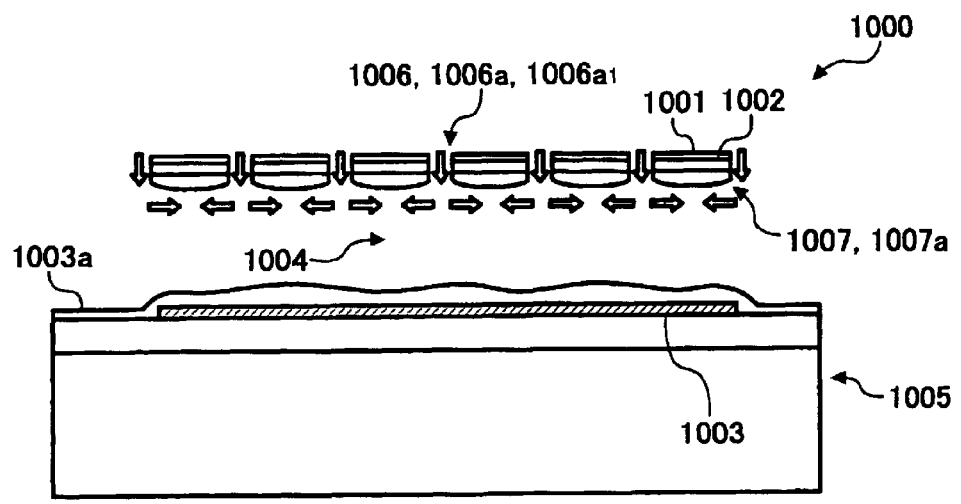
FIG. 95D is an explanatory view which explains the states of the other important sections of the light modulator which shows yet another example in the second embodiment of the present invention.

If the light modulator 1000 includes the squares 1006$a_1$ as the rectangles 1006$a$ or as the hole sections 1006 to thereby increase the number of etchant introduction paths as shown in FIG. 95D, by contrast, it takes only a short time to promote etching to the sacrificial material layer 1007. The increase of the thickness of the thin film, both-end-fixed beam (center beam) 1002 and that of the insulation film 1003$a$ which are etched during the etching of the sacrificial material layer 1007 can be, therefore, set small at the time of the initial formation thereof. In addition, when the etching is finished, the difference in film thickness among the regions of the thin film, both-end-fixed beam (center beam) 1002 and the insulation film 1003$a$ is small. It is, therefore, possible to suppress a driving voltage from increasing.

Therefore, it is possible to provide the light modulator 1000 which can further facilitate bending the thin film, both-end-fixed beam (center beam) 1002, further lower a driving voltage required for light modulation, ensure stable operation and ensure high reliability.

Furthermore, it is possible to provide the light modulator 1000 which can increase the number of paths from which an etchant is introduced and shorten time required to etch away the sacrificial material layer 1007 in the removal of the sacrificial material layer 1007, decrease the film thickness of the thin film, both-end-fixed beam (center beam) 1002 and decrease the distribution of the remaining thickness thereof.

Figure 96A:
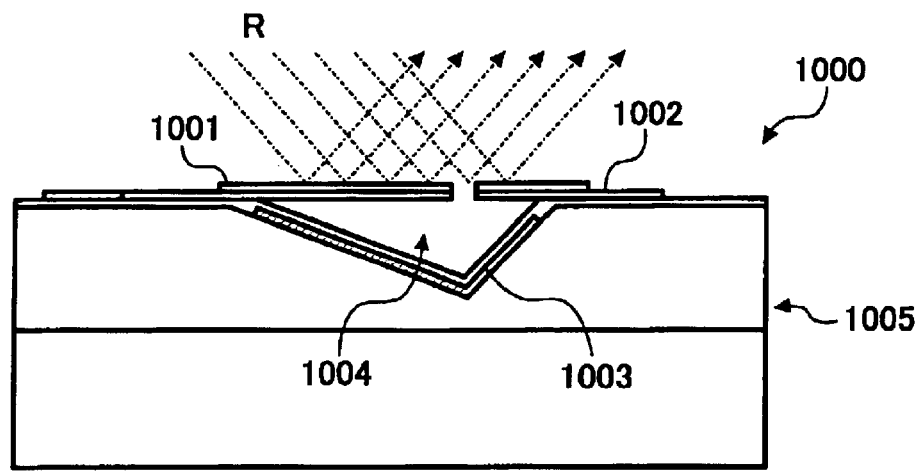
FIG. 96A and FIG. 96B are explanatory views which explain the states of the other important sections of the light modulator which shows yet another example in the second embodiment of the present invention.
Figure 96B:
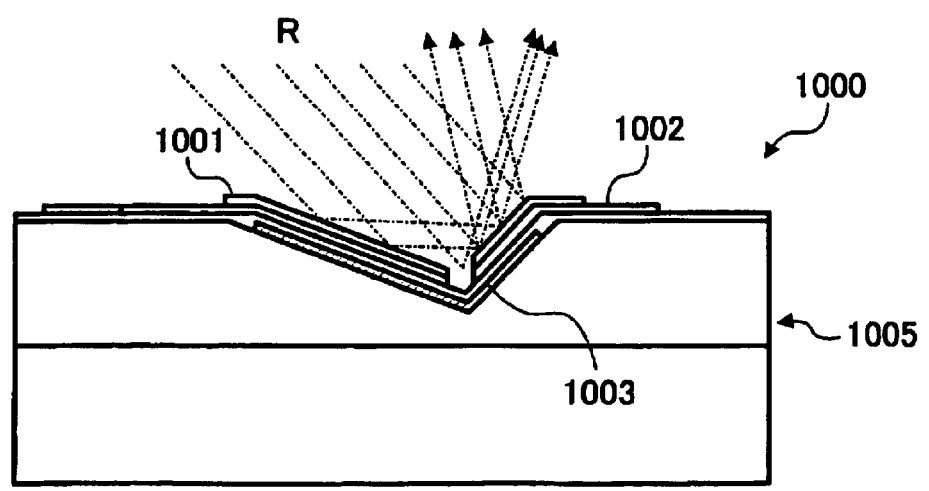

In FIGS. 96A and 96B, if no electrostatic force acts on the thin film, both-end-fixed beam (center beam) 1002, the both ends of the thin film, both-end-fixed beam (center beam) 1002 are supported by and fixed to the substrate 1005. Incident light beams (R) at that time are regularly reflected by the mirror of the reflection unit 1001 constituted to be combined with the thin film, both-end-fixed beam (center beam) 1002 and provided on the side surface thereof, and are moved in arrow directions. If viewed from the direction in which the incident light beams are reflected, the light modulator 1000 becomes bright by the regular reflection of light by the mirror of the reflection unit 1001 constituted to be combined with the thin film, both-end-fixed beam (center beam) 1002 and provided on the side surface thereof and turns into an ON state (see FIG. 96A).

If a driving voltage is applied between the thin film, both-end-fixed beam (center beam) 1002 and the substrate electrode 1003 to act an electronic force on the thin film, both-end-fixed beam (center beam) 1002, then the thin film, both-end-fixed beam (center beam) 1002 is bent as if it is attracted toward the substrate electrode 1003.

As the thin film, both-end-fixed beam (center beam) 1002 is bent, the incident light beams (R) are influenced by the bending of the thin film, both-end-fixed beam (center beam) 1002 and the reflection directions of the incident light beams reflected by the mirror of the reflection unit 1001 constituted to be combined with the thin film, both-end-fixed beam (center beam) 1002 and provided on the side surface thereof are disturbed. Because of the disturbed reflection directions of the incident light beams (R), the light modulator 1000 turns into an OFF state (see FIG. 96B), whereby light modulation is carried out.

The gap 1004 formed below the thin film, both-end-fixed beam (center beam) 1002 is formed non-parallel to the thin film, both-end-fixed beam (center beam) 1002 and the substrate electrode 1003 (see FIG. 96A). The non-parallel shape of the gap 1004 is effective to decrease a driving voltage required to deform the thin film, both-end-fixed beam (center beam) 1002. An electrostatic force acting on the thin film, both-end-fixed beam (center beam) 1002 is inversely proportional to the distance between the thin film, both-end-fixed beam (center beam) 1002 and the substrate electrode 1003. Namely, the shorter the distance between the thin film, both-end-fixed beam (center beam) 1002 and the substrate electrode 1003, the higher the electrostatic force acting on the thin film, both-end-fixed beam (center beam) 1002. For that reason, if a driving voltage is applied, the deformation of the thin film, both-end-fixed beam (center beam) 1002 starts in a narrower portion of the gap 1004 and the gap 1004 is narrower in accordance with the deformation of the thin film, both-end-fixed beam (center beam) 1002. As a result, compared with the parallel-shaped gap 1004, it is possible to promote the deformation of the thin film, both-end-fixed beam (center beam) 1002 at a low voltage (see FIG. 96B).

Therefore, it is possible to provide the light modulator 1000 which can further facilitate bending the thin film, both-end-fixed beam (center beam) 1002, further lower a driving voltage required for light modulation, ensure stable operation and ensure high reliability.

Figure 97A:
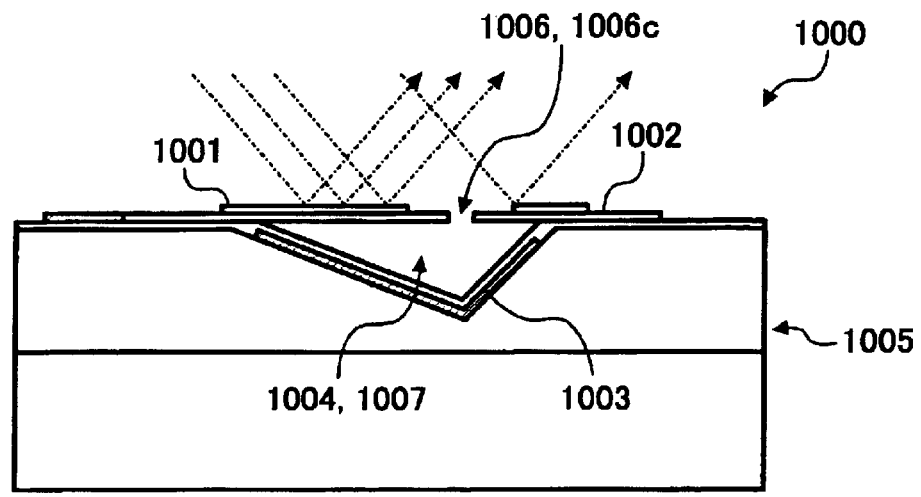
FIG. 97A and FIG. 97B are explanatory views which explain the states of the other important sections of the light modulator which shows yet another example in the second embodiment of the present invention.
Figure 97B:
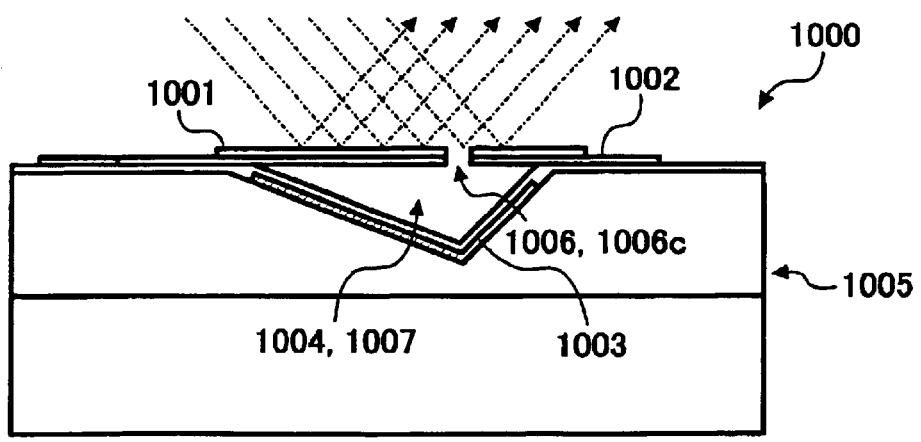

In FIGS. 97A and 97B, the light reflection region or the light reflection layer of the mirror of the reflection unit 1001 is provided at a position in contact with the edge 1006c of the hole section 1006.

Light reflection during ON operation in a case in which the light reflection region or the light reflection layer of the mirror of the reflection unit 1001 is formed at a position distant from the position in contact with the edge 1006c of the hole section 1006, is typically shown in FIG. 97A.

Light reflection during ON operation in a case in which the light reflection region or the light reflection layer of the mirror of the reflection unit 1001 is formed at a position in contact with the edge 1006c of the hole section 1006, is typically shown in FIG. 97B.

As typically shown in FIG. 97A, if the light reflection region or the light reflection layer of the mirror of the reflection unit 1001 is formed at a position distant from the position in contact with the edge 1006c of the hole section 1006, the intensity of reflection light decreases.

As typically shown in FIG. 97B, by contrast, if the light reflection region or the light reflection layer of the mirror of the reflection unit 1001 is formed at a position in contact with the edge 1006c of the hole section 1006, it is possible to suppress the decrease of the intensity of reflection light as much as possible.

Therefore, the light reflection region or the mirror region of the reflection unit 1001 in one element can be enlarged as much as possible. As a result, it is possible to increase the intensity of an optical signal and improve an S/N ratio when an image formation apparatus 1100, which is not shown, such as an optical writing device in a photo-engraving process or an image projection and display apparatus 1200, which is not shown, such as a projector. In addition, it is possible to provide the light modulator 1000 which can further lower a driving voltage required for light modulation, ensure stable operation and ensure high reliability.

Furthermore, it is possible to provide the light modulator 1000 which can increase the number of paths from which an etchant is introduced and shorten time required to etch away the sacrificial material layer 1007 in the removal of the sacrificial material layer 1007, decrease the film thickness of the thin film, both-end-fixed beam (center beam) 1002 and decrease the distribution of the remaining thickness thereof.

FIGS. 98 to 103 show manufacturing procedures for the light modulator according to the present invention. In FIGS. 98 to 103, the light modulator 1000 which includes the hole section 1006 which is formed in the thin film, both-end-fixed beam (center beam) 1002 having both ends held by and fixed to the substrate 1005 above the gap 1004 so that the corresponding section of the thin film, both-end-fixed beam (center beam) 1002 can be deformed more easily than the other sections thereof, is manufactured as follows. After a concave section which serves as the gap 1004 in the substrate 1005 is formed, the sacrificial material layer 1007 made of a sacrificial material is formed, the substrate 1005 is flattened, the thin film, both-end-fixed beam (center beam) 1002 and the hole section 1006 are formed and then the sacrificial material layer 1007 is removed. It is, therefore, possible to provide a manufacturing method for the light modulator 1000 which is simple in the structure of modulating light by changing the reflection direction of incident light, fast in response, which can use the incident light without limiting the wavelength thereof, which is low in driving voltage, stable in operation, high in reliability, small in the number of manufacturing steps and low in cost.

Figure 98:
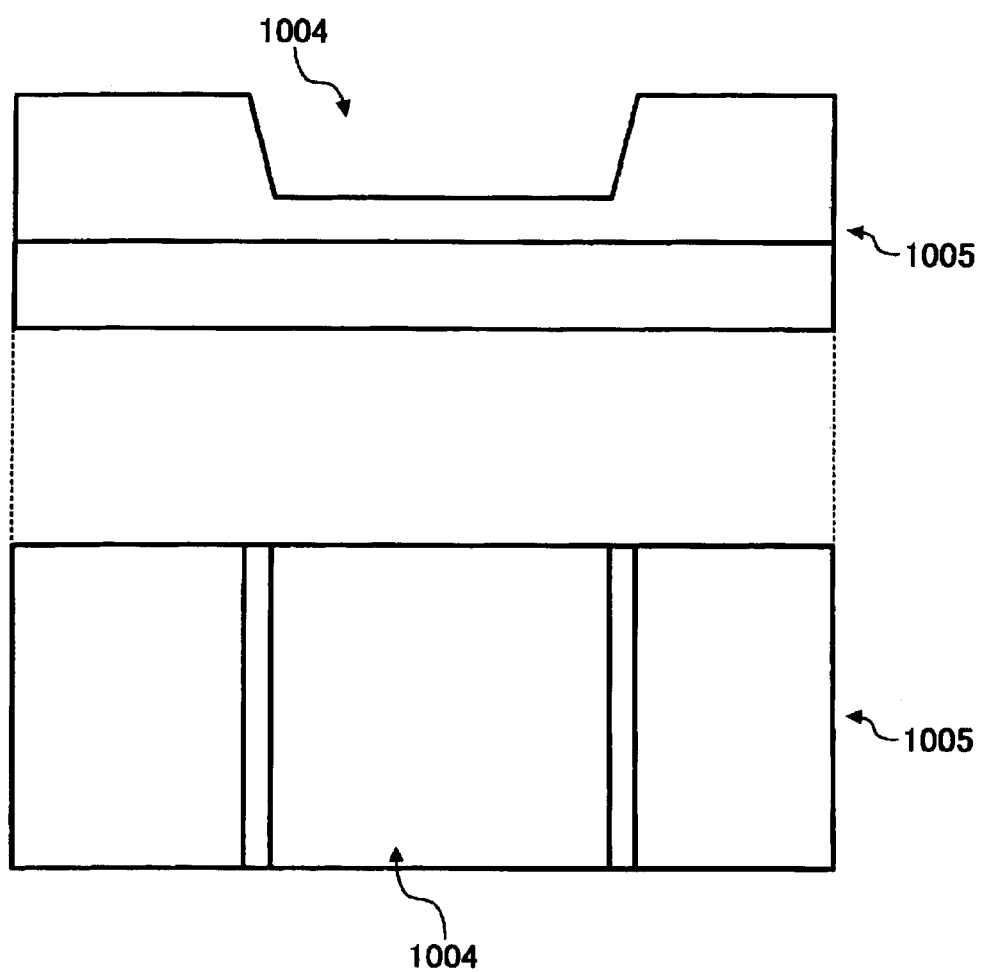
FIG. 98 is an explanatory view which explains the states of the other important sections of the light modulator which shows yet another example in the second embodiment of the present invention.

At a concave section formation step (a), the concave section which becomes the gap 1004 is formed in the substrate 1005 by a thin film formation method or a micro-machining method (see FIG. 98). The substrate 1005 is a silicon substrate on which a silicon oxide film is formed. If the concave section which becomes the gap 1004 is formed in the substrate 1005 by photo-engraving and dry etching while, in the gap 4, using a photomask on which an area gradation pattern is formed or a resist material thermal deformation method or the like, then it is possible to form a non-parallel gap.

Figure 99:
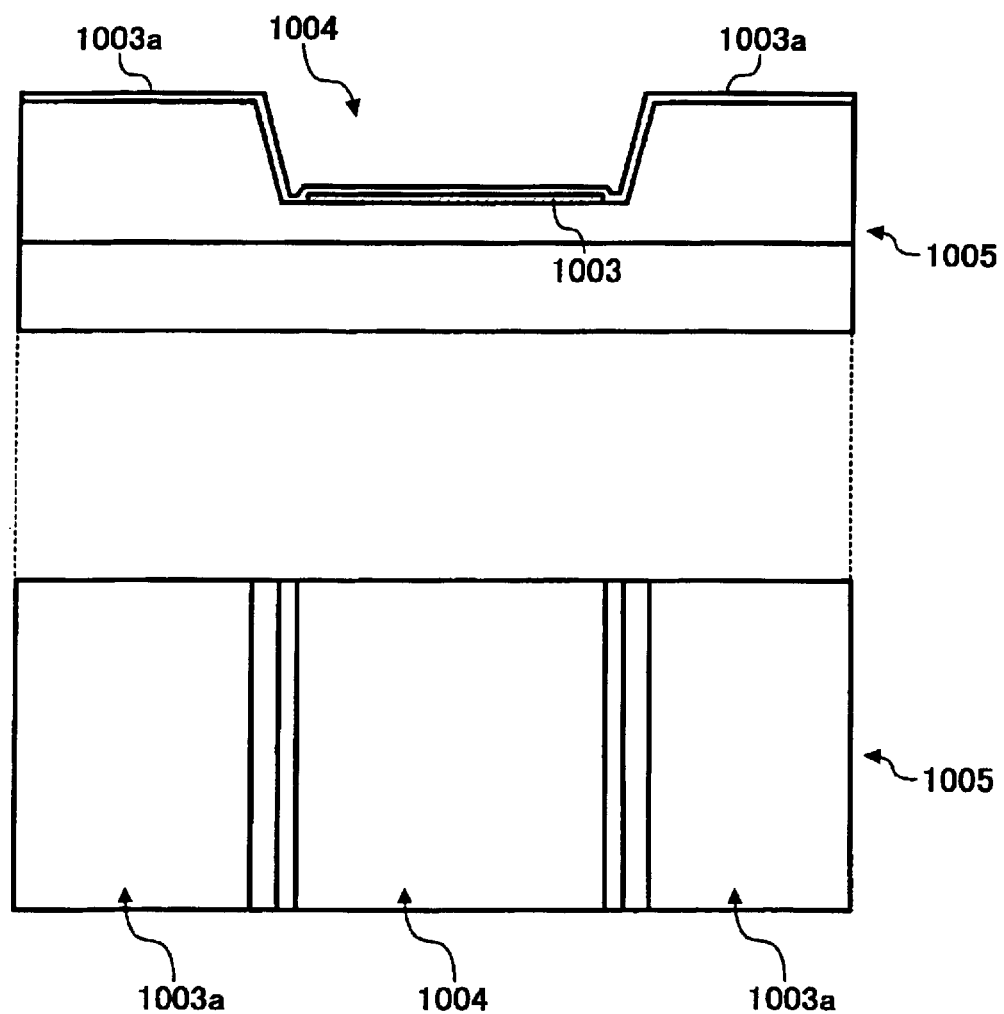
FIG. 99 is an explanatory view which explains the step for the important section of the manufacturing method of the light modulator which shows the second embodiment of the present invention.

At a substrate electrode formation step (b), all of or a part of the substrate electrode 1003 is formed in the concave section on the substrate 1005 (see FIG. 99).

The substrate electrode 1003 is formed, out of a titanium nitride (TiN) thin film, in the gap 1004. The titanium nitride (TiN) thin film as the substrate electrode 1003 is formed to have a thickness of 0.01 $\mu$m by sputtering with Ti as a target.

The titanium nitride (TiN) thin film is formed into the substrate electrode 1003 by photo-engraving and dry etching.

Thereafter, a silicon nitride film which becomes the insulation film 1003a to serve as the protection film of the substrate electrode 1003 is formed to have a thickness of 0.1 $\mu$m by an atmospheric pressure CVD method.

Figure 100:
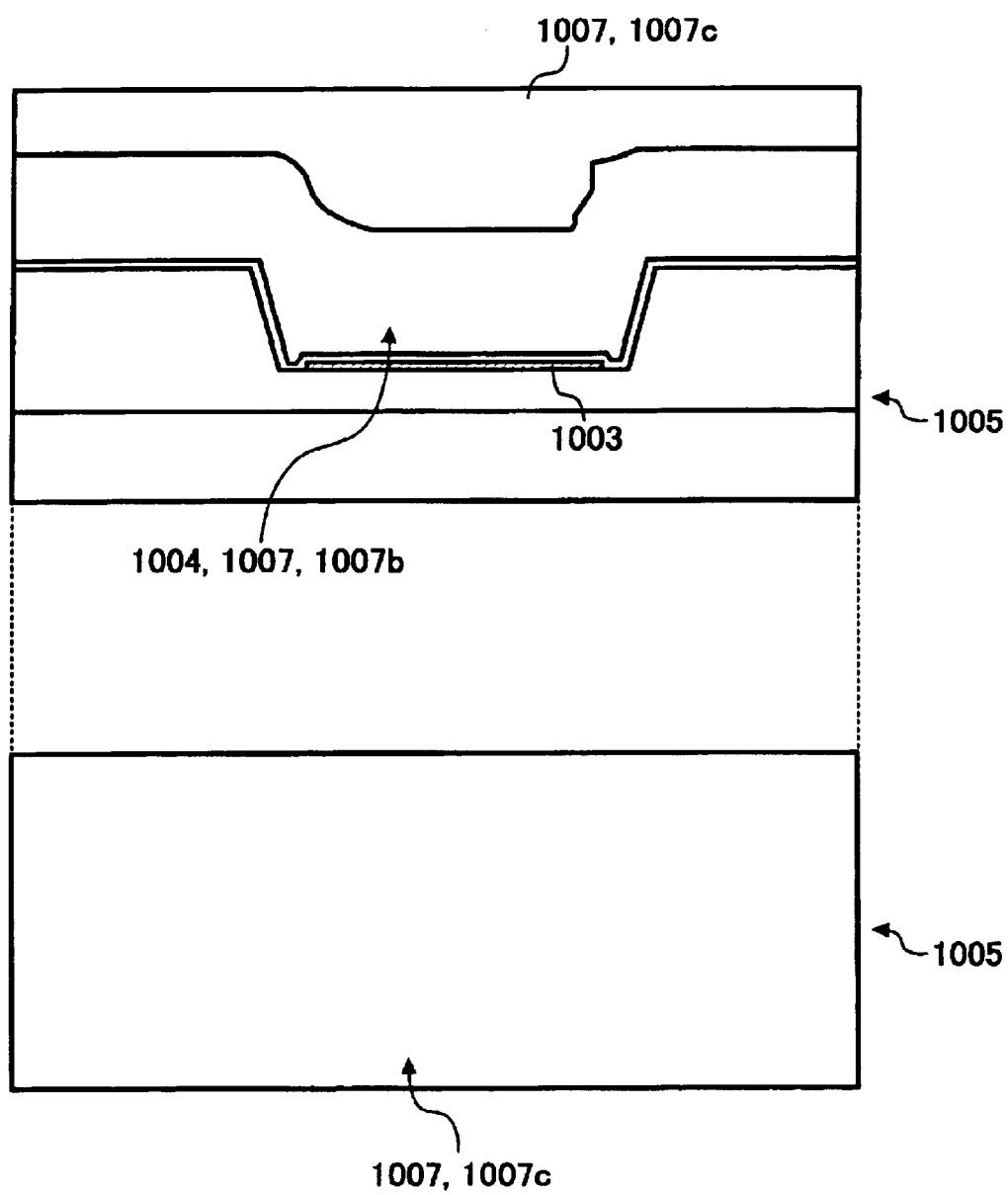
FIG. 100 is an explanatory view which explains the step for the important section of the manufacturing method of the light modulator which shows the second embodiment of the present invention.

At a sacrificial material layer formation step (c), the sacrificial material layer 1007 made of a sacrificial material is formed in the concave section as the gap 1004 on the substrate 1005 (see FIG. 100).

After a silicon oxide film 1007b as the sacrificial material of the sacrificial material layer 1007 is formed until the concave section of the gap 1004 is completely buried by a plasma CVD method, a photosensitive organic coating 1007c is applied to thereby flatten the sacrificial material layer 1007.

Figure 101:
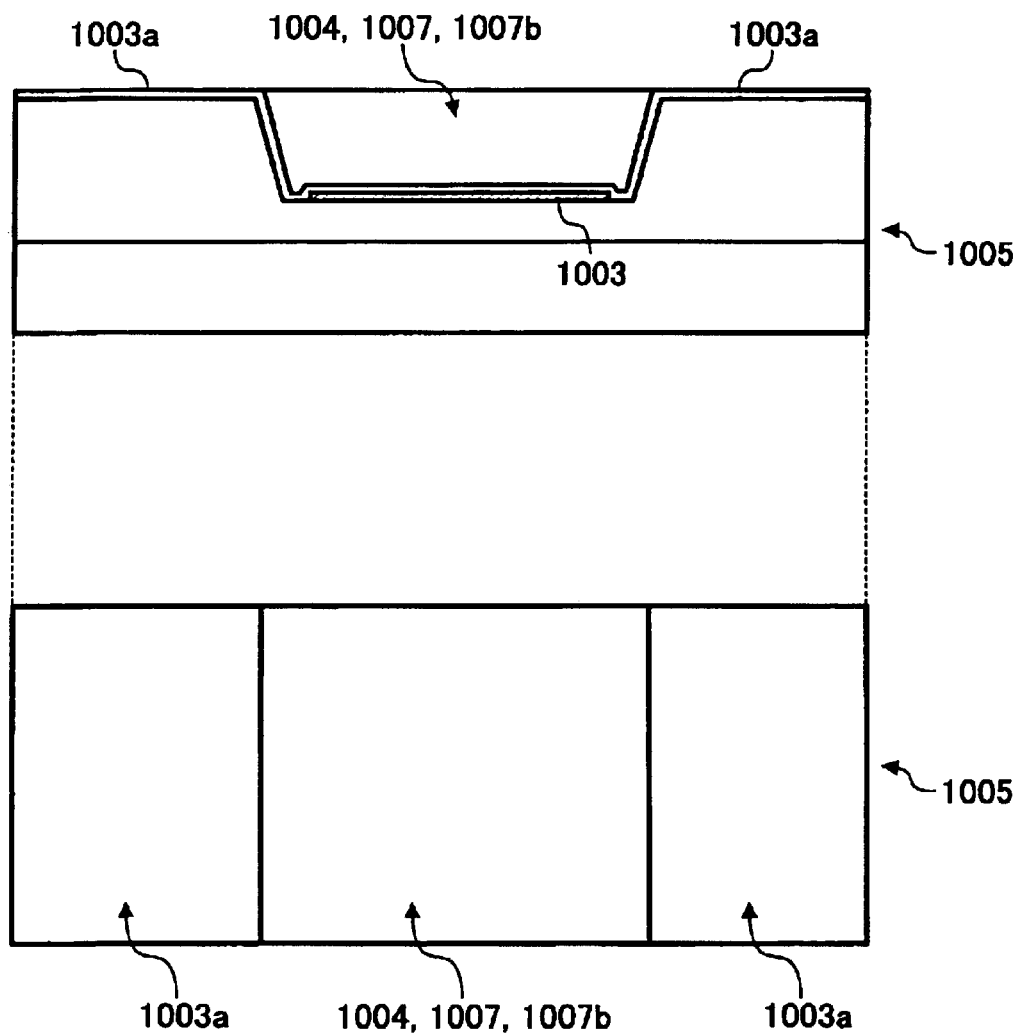
FIG. 101 is an explanatory view which explains the step for the important section of the manufacturing method of the light modulator which shows the second embodiment of the present invention.

At a flattening step (d), using an etch-back method of dry-etching the photosensitive organic coating 1007c and the silicon oxide film 1007b at the same etch rate, the photosensitive organic coating 1007c and the silicon oxide film 1007b are etched until the insulation film 1003a as the protection film on the surface of the substrate 1005 is exposed (see FIG. 101).

At this moment, the silicon oxide film 1007b on the gap 1004 remains to be as high as the surface of the substrate 1005. This silicon oxide film 1007b is the sacrificial material layer 1007. While the sacrificial material layer is formed by the etch-back method at the sacrificial material layer formation step (c) and the flattening step (d), the sacrificial material layer 1007 may be flattened by using a CMP (Chemical Mechanical Polishing) method as an alternative method.

Figure 102:
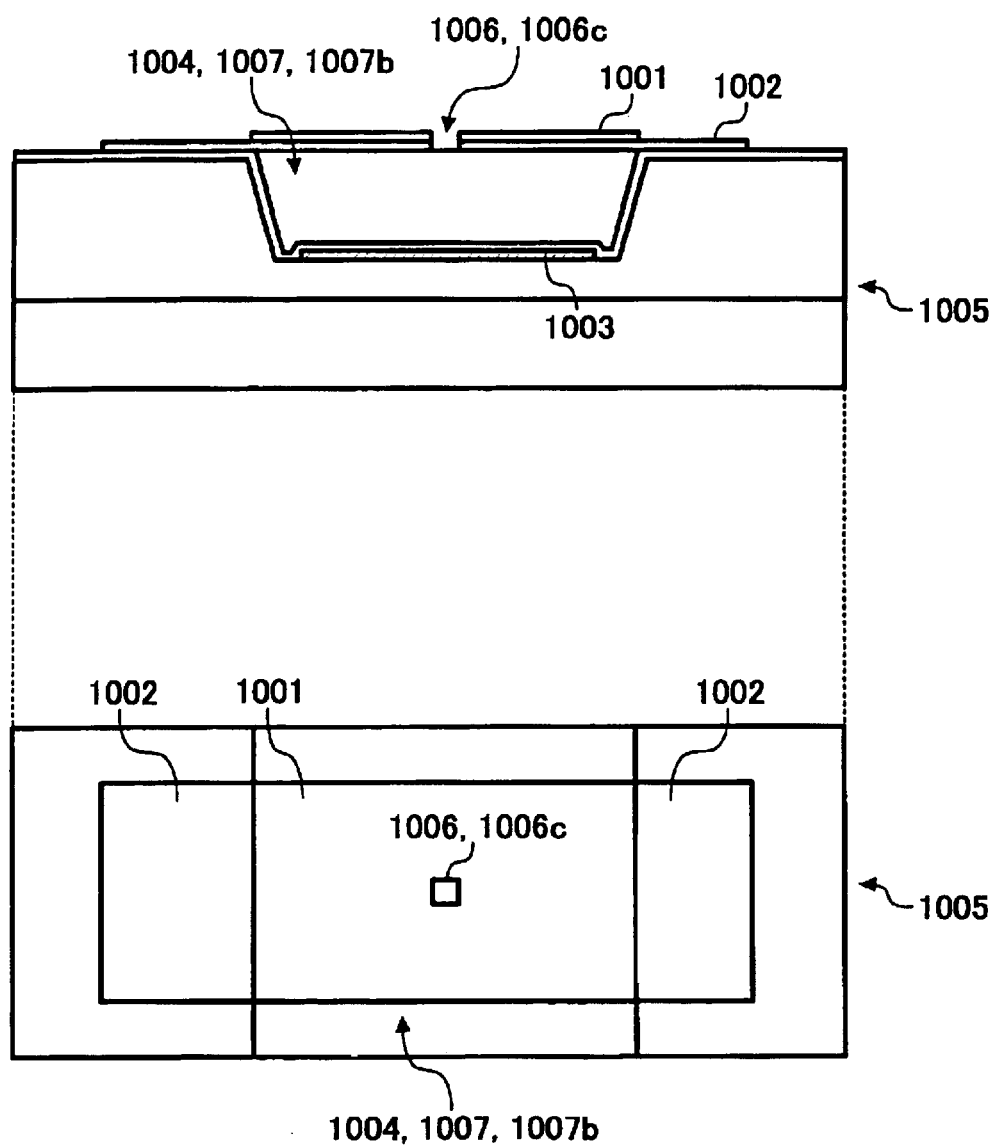
FIG. 102 is an explanatory view explains the step for the important section of the manufacturing method of the light modulator which shows the second embodiment of the present invention.

At a thin film, both-end-fixed beam (center beam) formation step (E), the thin film, both-end-fixed beam (center beam) 1002 and the hole section 1006 are formed on the sacrificial material layer 1007 (see FIG. 102).

A silicon nitride film which is the material of the thin film, both-end-fixed beam (center beam) 1002 is formed to have a thickness of 0.1 µm on the entire surface of the substrate 1005 by a thermal CVD method.

A Cr thin film as the mirror of the reflection unit 1001 which serves as an incident light beam reflection surface, is formed to have a thickness of 0.1 µm by dry etching.

The Cr thin film and the silicon nitride film are patterned by photo-graving and dry etching, thereby forming the thin film, both-end-fixed beam (center beam) 1002 and the mirror of the reflection unit 1001.

The hole section 1006 is simultaneously formed with the patterning of the Cr thin film and the silicon nitride film. As shown, the mirror of the reflection unit 1001 is formed at a position in contact with the edge 1006c of the hole section 1006.

The mirror of the reflection unit 1001 can be formed at a position in contact with the edge 1006c of the hole section 1006 as follows. After the Cr film as the the mirror of the reflection unit 1001 is patterned, the silicon nitride film as the thin film, both-end-fixed beam (center beam) 1002 is pierced under the conditions under which the silicon nitride film has selectivity to the Cr film, e.g., by dry etching using mixed gas of $CF_4$ and $H_2$.

Figure 103:
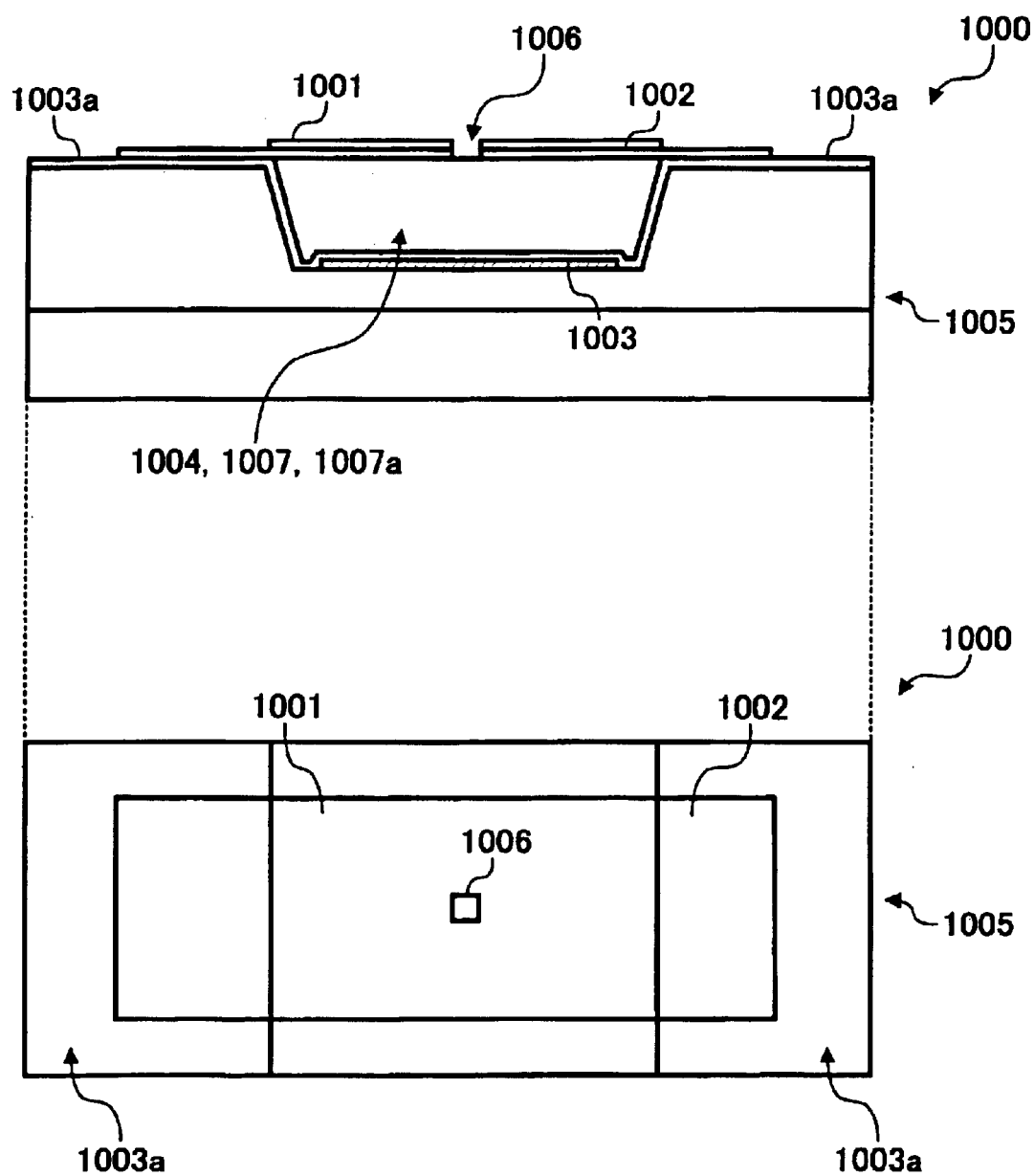
FIG. 103 is an explanatory view which explains the step for the important section of the manufacturing method of the light modulator which shows the second embodiment of the present invention.

At a sacrificial material layer removal step (f), the sacrificial material layer 1007 which flattens the gap 1004 of the concave section on the substrate 1005 is removed (see FIG. 103).

Specifically, the sacrificial material layer 1007 which flattens the gap 1004 is removed by wet etching with a diluted hydrofluoric acid solution.

During the removal, the initial thickness of the thin film, both-end-fixed beam (center beam) 1002 and that of the insulation film 1003a as the protection film are determined based on the etching selectivity of the sacrificial material layer 1007, the insulation film 1003a which serves as the protection film of the substrate electrode 1003 and the thin film, both-end-fixed beam (center beam) 1002, so that the thin film, both-end-fixed beam (center beam) 1002 and the insulation film 1003a which serves as the protection film are kept to have desired thicknesses even after the sacrificial material layer 1007 is etched.

Through these steps, the light modulator 1000 is completed.

In the removal of the sacrificial material layer 1007 at the sacrificial material layer removal step (f), an etchant is introduced from the free end of the thin film, both-end-fixed beam (center beam) 1002 and the hole section 1006 to etch away the sacrificial material layer 1007. As a result, the difference in thickness between the residual thin film, both-end-fixed beam (center beam) 1002 and the residual film 1007a of the insulation film 1003a which serves as the protection film is generated along the etchant introduction paths.

If the hole section 1006 is provided, the number of etchant introduction paths increases compared with a case in which the etchant is introduced only from the free end of the thin film, both-end-fixed beam (center beam) 1002. It is, therefore, possible to shorten etching time and thereby thin the initial thin film, both-end-fixed beam (center beam) 1002 and the insulation film 1003a which serves as the protection film.

Furthermore, it is possible to decrease the difference in thickness between the residual thin film, both-end-fixed beam (center beam) 1002 and the residual film 1007a of the insulation film 1003a which serves as the protection film along the etchant introduction paths.

A step at which the insulation film 1003a which serves as the protection film, is etched to form a hole on a pad section, which is not shown, on the substrate electrode 1003 is not explained herein. However, the step can be executed between the thin film, both-end-fixed beam (center beam) formation step (E) and the sacrificial material layer removal step (f) by extending the substrate electrode 1003 from the gap 1004 to the surface of the substrate 1005.

Figure 104:
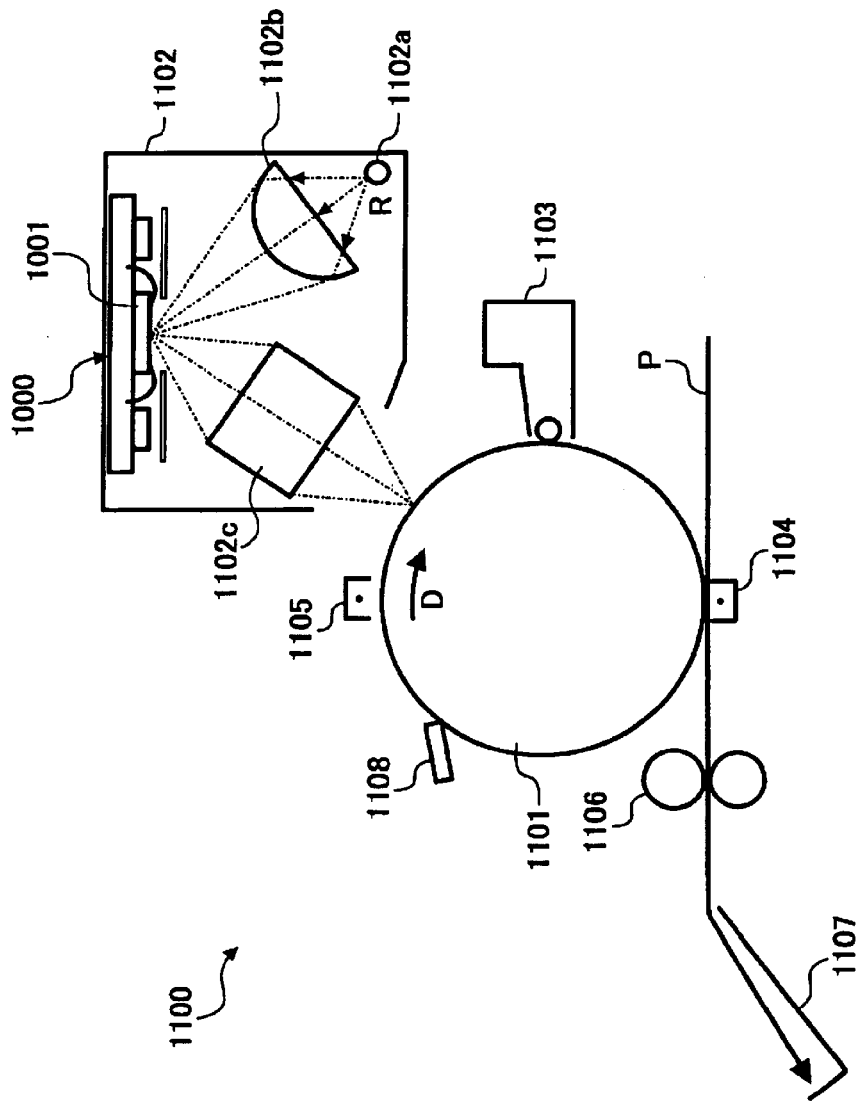
FIG. 104 is an explanatory view which explains an image formation apparatus which includes the light modulator which shows the second embodiment of the present invention.

In FIG. 104, an image formation apparatus 1100 which forms an image by writing optical data by an electrophotographic process, consists of a drum-shaped photosensitive body of an image carrier 1101 which is held rotatably in an arrow D direction and carries an image to be formed and a latent image formation unit 1102 which consists of the light modulators 1000. The image formation apparatus 1100 forms a latent image by writing optical data on the drum-shaped photosensitive body of the image carrier 1101 uniformly charged by a charge unit 1105, by the latent image formation unit 1102. The image formation apparatus 1100 develops the latent image formed by the light modulators 1000 of the latent image formation unit 1102 by a development unit 1103 to thereby form a toner image. The toner image formed by the development unit 1103 is transferred to a to-be-transferred body (P) by a transfer unit 1103. After the toner image transferred to the to-be-transferred body (P) is fixed by a fixing unit 1106, the to-be-transferred body (P) is discharged to a paper discharge tray 1107 and stored.

The drum-shaped photosensitive body of the image carrier 1101 after the toner image is transferred to the to-be-transferred body (P) by the transfer unit 1104, is cleaned by a cleaning unit 1108 to be prepared for image formation at the next step.

The latent image formation unit 1102 applies incident light beams (R) from a light source 1102a to a plurality of light modulators 1000 arranged in an array, through the first lens system 1102b. Each of the light modulators 1000 directs the light beams (R) to the surface of the drum-shaped photosensitive body of the image carrier 1101 through the light reflection unit 1001 to thereby form an image on the surface of the drum-shaped photosensitive body of the image carrier 1101 through the second lens system 1102c.

Therefore, it is possible to provide the image formation apparatus 1100 including the light modulators 1000 each of which has a simple structure of modulating light by changing the reflection direction of the incident light beams (R), which has fast response, does not limit the wavelength of incident light beams (R) to be used, performs a stable operation, ensures high reliability, has fewer manufacturing steps and can reduce cost.

Figure 105:
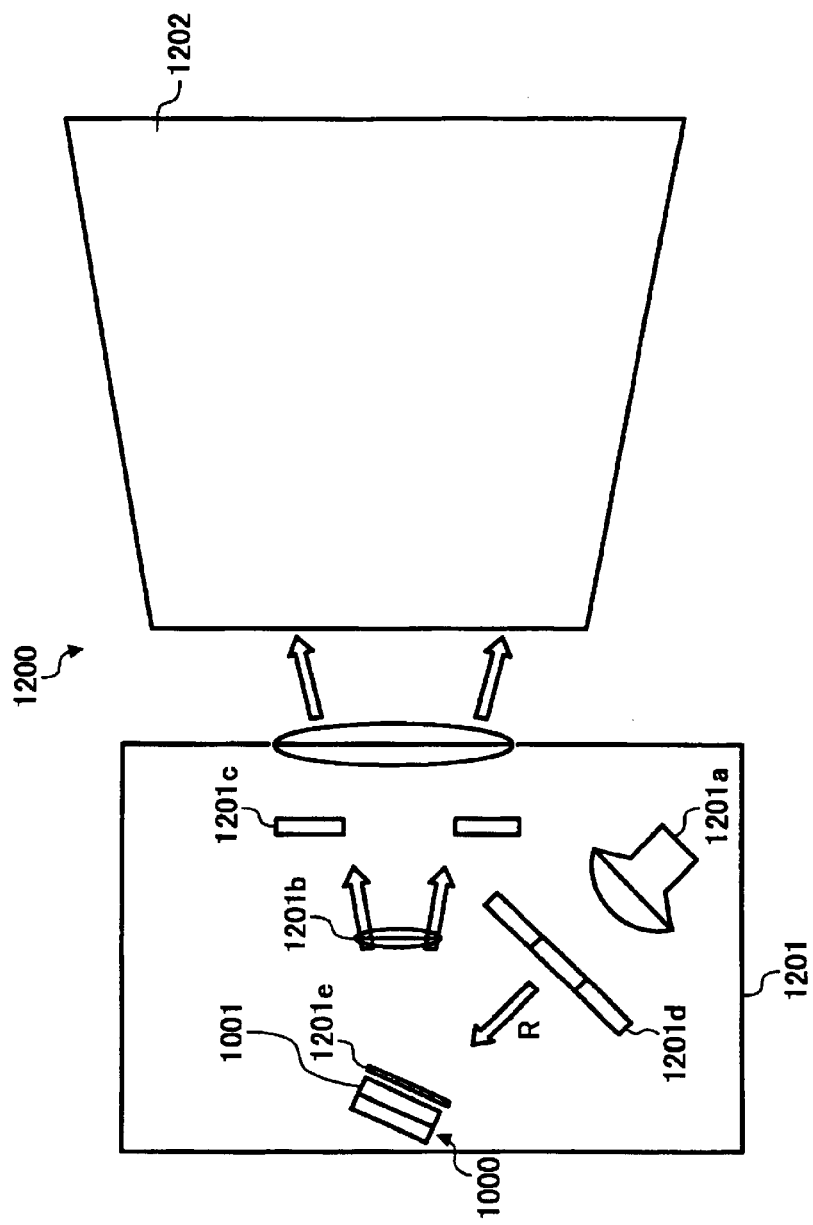
FIG. 105 is an explanatory view which explains an image projection and display apparatus which includes the light modulator which shows the second embodiment of the present invention.

In FIG. 105, an image projection and display apparatus 1200 which displays and projects an image includes a light switching unit 1201. The light switching unit 1201 consists of the light modulator 1000 which modulates light by changing the reflection direction of incident light beams (R) of projected image data. The light modulator 1000 projects an image to a projection screen 1202 and displays the image on the projection screen 1202.

In the light switching unit 1201, the incident light beams (R) from a light source 1201a are applied to the light modulator 1000, reflected by the mirror of the reflection unit 1001 of the light modulator 1000 and projected to the projection screen 1202 through a projection lens 1201b and a diaphragm 1201c.

For color display, a rotary color hole 1201d may be provided in front of the light source 1201a or a micro-lens array 1201e may be used to improve performance.

Therefore, it is possible to provide the image projection and display apparatus 1200 which includes the light modulator which has a simple structure of modulating light by changing the reflection direction of the incident light beams (R), has fast response, does not limit the wavelength of incident light beams (R) to be used, performs a stable operation, ensures high reliability, has fewer manufacturing steps and can reduce cost.

(Third Embodiment)

A third embodiment will be explained hereinafter in the order of [First example of Third embodiment] and [Second example of Third embodiment] with reference to FIGS. 106 to 126.

[First Example of Third Embodiment]

Figure 106A:
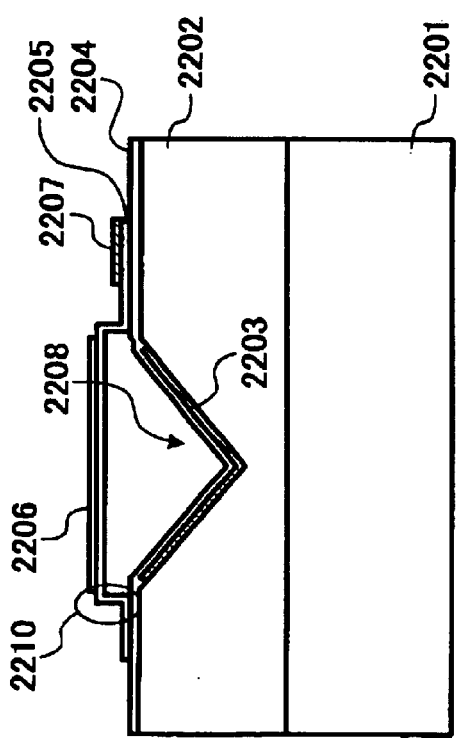
FIG. 106A and FIG. 106B are a schematic cross-sectional view and a schematic plan view which explain a first example of a third embodiment of a light modulator according to the present invention, respectively.
Figure 106B:
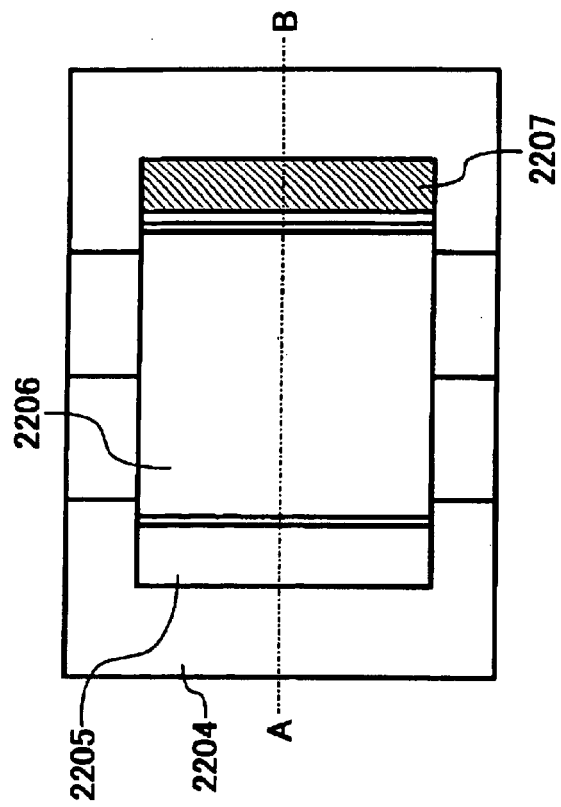

A first example will be explained with reference to FIGS. 106 to 113. FIG. 106A and FIG. 106B are explanatory views which explain the configuration of a light modulator in the first example. FIG. 106A is a schematic cross-sectional view and FIG. 106B is a schematic plan view. It is noted that FIG. 106B is a cross-sectional view taken along line A–B of FIG. 106A.

In FIG. 106A and FIG. 106B, reference symbol 2201 denotes a substrate made of silicon, optical glass or the like. Although a silicon substrate having (100) plane on a surface thereof is employed as the substrate 2201, the substrate 2201 is not limited to the silicon substrate. An insulation film 2202 such as a silicon oxide film is formed on the substrate 2201. An electrode 2203 is formed in the concave section of the insulation film 2202. This electrode 2203 serves as one of the electrodes which drives a beam 2205 by an electrostatic force. The electrode 2203 is made of metal such as Al, Au, Ti, TiN or Cr, a conductive thin film such as ITO or a substrate silicon into which impurities are diffused to thereby decrease resistance. Reference symbol 2204 denotes a protection film formed out of an insulating film such as a silicon nitride film. The protection film 2204 functions to prevent the electrode 2203 from being contacted with the beam 2205 and short-circuited. Although not shown in FIG. 106A and 106B, a pad opening is sometimes formed in the protection film 2204 to serve as a section which connects the electrode 2203 to an external signal.

The beam 2205 is a both-end-fixed beam having a light reflection layer 2206 on a surface thereof. The beam 2205 is formed to be projected from the upper surface of the substrate by L-shaped fixed ends 2210 thereof. In this embodiment as wells as the following embodiments, the light reflection layer 2206 is not limited to a film which is independently deposited but may be such a layer that a light reflection region contributing to device performance is formed on the beam 2205. Reference symbol 2207 denotes a pad provided to apply a voltage to the beam 2205. This pad 2207 functions to take out the other electrode which drives the beam 2205. If a conductive film is used as the beam 2205, the pad 2207 is formed on the beam 2205. If a conductive film is used as the light reflection layer 2206, the pad 2207 is formed on the light reflection film 2206. An electrostatic force with which the beam 2205 is bent is generated by applying a voltage between the electrode 2203 which is opposed to the beam 2205 through a gap 2208 and the beam 2205 or the light reflection layer 2206.

The beam 2205 is formed out of a thin film such as a metallic film, a monocrystalline silicon film, a polycrystalline silicon film or a silicon nitride film. The beam made of monocrystalline silicon film has fewer defects and sustains longer life. The beam made of polycrystalline silicon film can be formed by a CVD method or the like. It is, therefore, possible to reduce cost and it is easy to control the residual stress of the film from a compressive stress to a tensile stress. In addition, the beam made of a silicon nitride thin film is used, it is possible to accelerate switching response speed by the action of the strong tensile stress of the film. If the beam is made of monocrystalline or polycrystalline silicon and impurities are diffused to this monocrystalline or polycrystalline silicon to decrease resistance, then the beam can be made conductive.

In the first embodiment, after the insulation film 2202 is formed on the substrate 2201, the insulation film 2202 is patterned by photo-engraving and dry etching to thereby form the gap 2208. Alternatively, the substrate 2201 may be patterned similarly and the insulation film 2202 may be deposited thereon.

Figure 107:
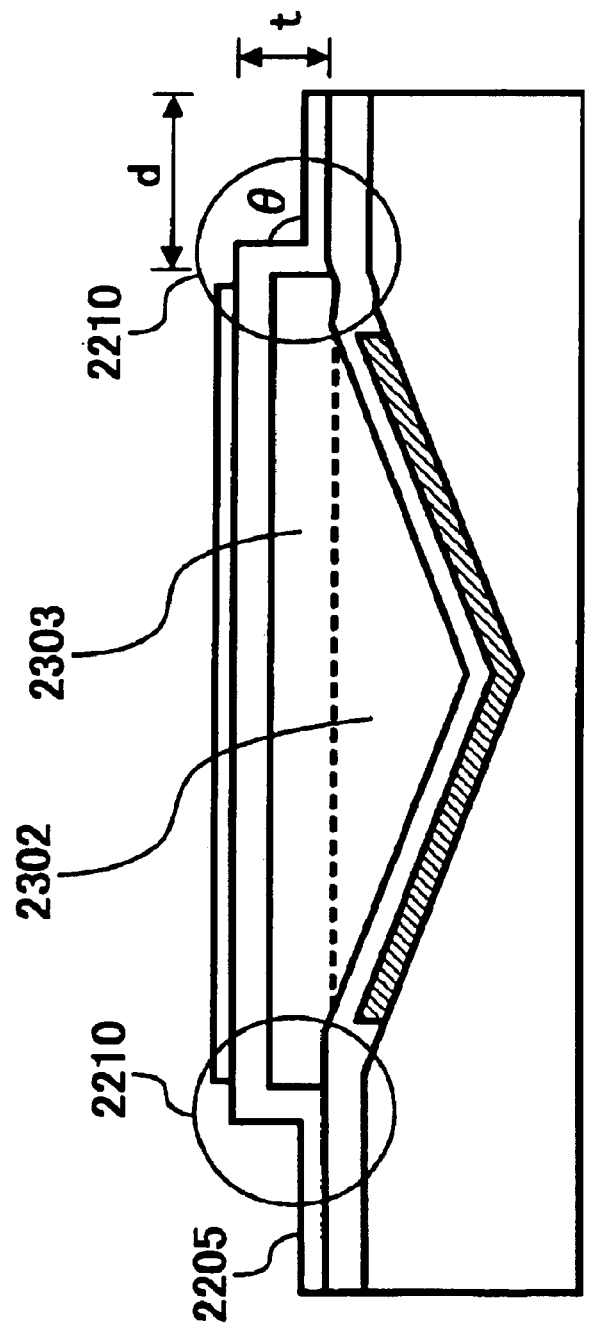
FIG. 107 is an enlarged, schematic cross-sectional view which explains the characteristic sections of the light modulator in the first example of the third embodiment.
Figure 109B:
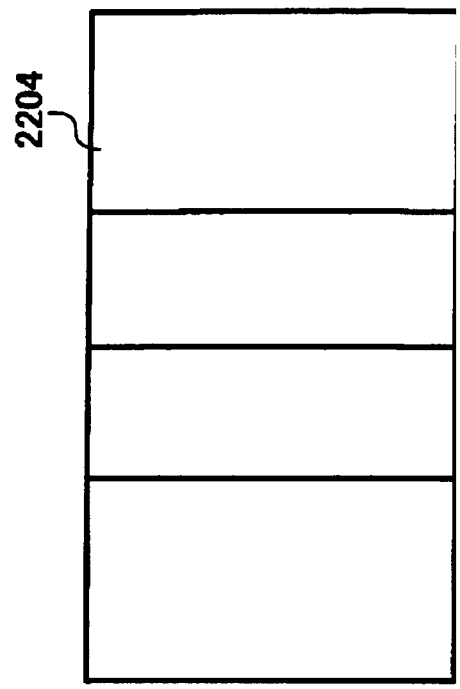
FIG. 109A and FIG. 109B are a schematic cross-sectional view and a schematic plan view which explain the manufacturing step of the light modulator in the first example of the third embodiment, respectively.
Figure 109A:
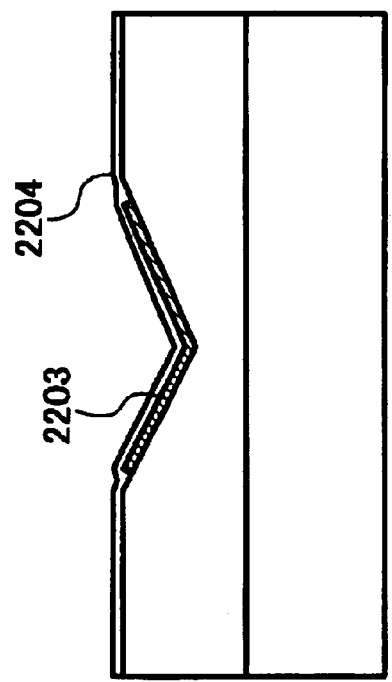

FIG. 107 shows an enlarged sectional view of the characteristic sections of the light modulator of the first example. In FIG. 107, the beam 2205 includes the fixed ends 2210 and the section between the fixed ends 2210 substantially functions as a beam. The height t and angle θ of each L-shaped fixed end 2210 can be arbitrarily set according to the patterning of a sacrificial layer. The length d of each L-shaped fixed end 2210 can be arbitrarily set according to the patterning of the beam 2205, as well. Reference symbol 2302 denotes a non-parallel gap formed in the lower section of the substrate. The non-parallel gap 2208 shown in FIG. 109A and FIG. 109B is the combination of the non-parallel gap 2302 and a generally rectangular gap 2303.

The beam 2205 (beam member) is formed out of a film having a tensile residual stress. Actually, a polycrystalline silicon film formed by subjecting a silicon nitride film formed by the CVD method or the like at a temperature of about 800° C. or an amorphous silicon film formed by the CVD method or the like at a temperature of 500 to 600° C. to a heat treatment in a nitrogen atmosphere at a temperature of about 900° C., is used as the beam 2205. The film can be applied with a tensile residual stress as high as about 0.5 GPa to about 2.0 GPa depending on the formation conditions.

A manufacturing method for the light modulator in the first example explained above will be explained with reference to FIGS. 108 to 113. FIGS. 108 to 113 show typical steps in order. In each figures, FIG. A is a schematic cross-sectional view (taken along line A–B) and FIG. B is a schematic plan view.

Figure 108B:
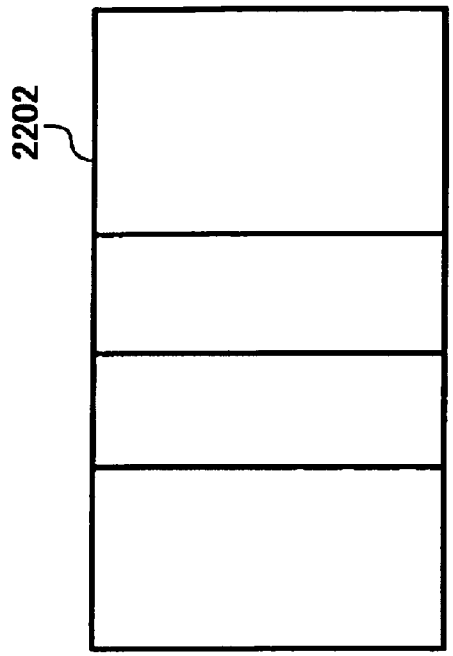
FIG. 108A and FIG. 108B are a schematic cross-sectional view and a schematic plan view which explain the manufacturing step of the light modulator in the first example of the third embodiment, respectively.
Figure 108A:
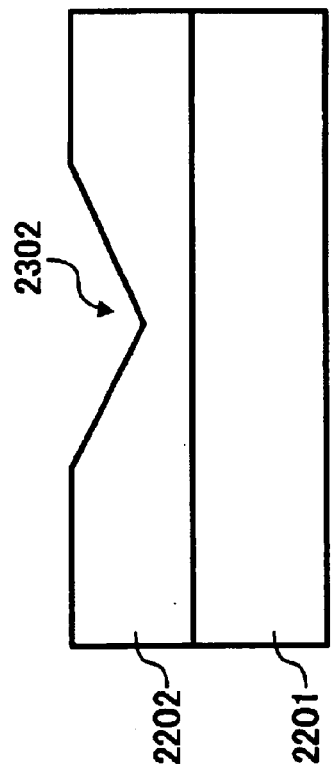

In FIG. 108A and FIG. 108B, the substrate 2201 is a silicon substrate on which the silicon oxide film 2202 is formed. A resist pattern having an arbitrary thickness is formed in a portion corresponding to a concave section on the substrate 2201 by photo-engraving using a photomask on which a gradation pattern is formed or photo-engraving which forms and thermally deforms a resist pattern. The concave section is then formed by dry etching. The non-parallel gap 2302 is formed out of this concave section.

In FIG. 109, the electrode 203 is formed in the concave section corresponding to the gap 2302 and the protection film 2204 is formed on the electrode 2203. For example, a titanium nitride (TiN) thin film having a thickness of 0.01 μm is formed by sputtering with Ti as a target, the electrode 2203 is formed by photo-engraving and dry etching, a silicon nitride film is formed to have a thickness of 0.2 μm by an atmospheric pressure CVD method and the protection film 2204 is formed.

Figure 110B:
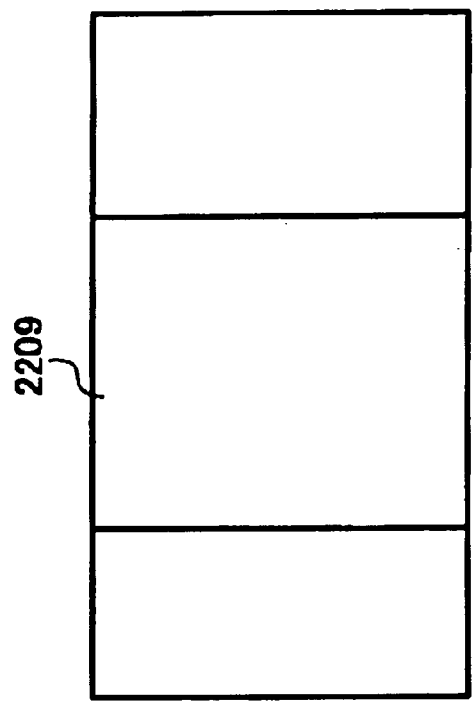
FIG. 110A and FIG. 110B are a schematic cross-sectional view and a schematic plan view which explain the manufacturing step of the light modulator in the first example of the third embodiment, respectively.
Figure 110A:
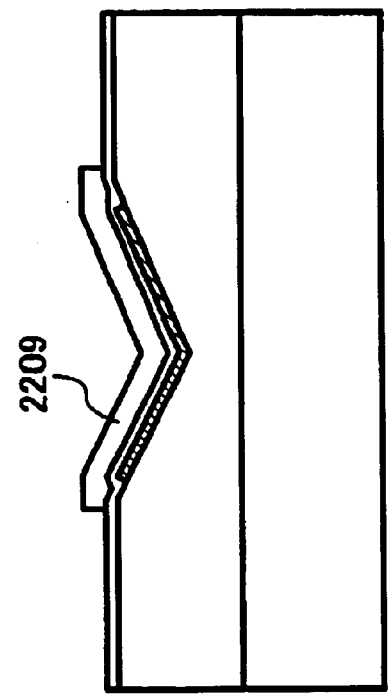
Figure 113B:
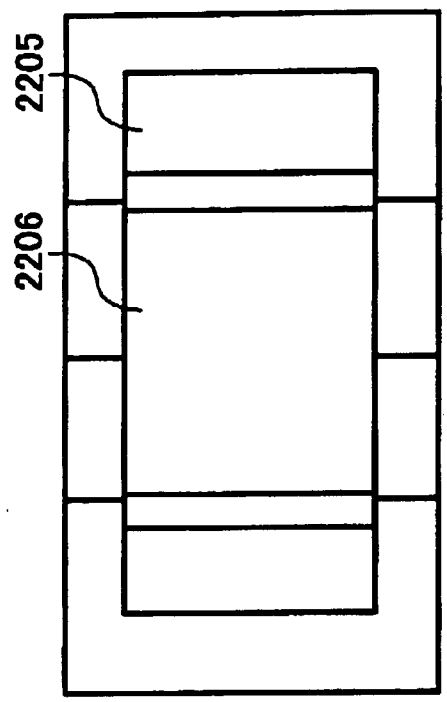
FIG. 113A and FIG. 113B are a schematic cross-sectional view and a schematic plan view which explain the manufacturing step of the light modulator in the first example of the third embodiment, respectively.
Figure 113A:
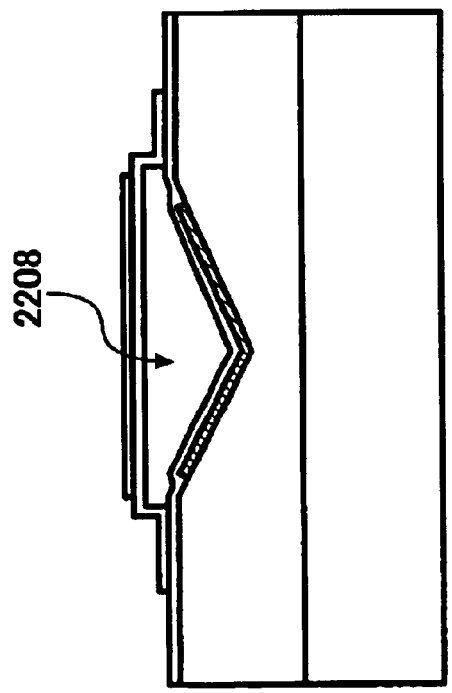

In FIG. 110A and FIG. 110B, a silicon oxide film having an arbitrary thickness is formed by a plasma CVD method, and patterned by photo-engraving using a resist to thereby the sacrificial layer 2209. The thickness of the silicon oxide film as the sacrificial layer 2209 is determined so that the beam is contracted by its own tensile residual stress and formed into a plane shape in parallel to the substrate plane when this sacrificial layer 2209 is removed as shown in FIG. 113A and FIG. 113B. Further, the sacrificial layer 2209 is preferably patterned to completely cover the concave section in the sectional direction of FIG. 113A and FIG. 113B. By doing so, even if misalignment slightly occurs during the photo-engraving to pattern the sacrificial layer 2209, the beam above the gap 2208 is always plane and the irregularity of light modulation characteristic and that of a driving voltage can be thereby suppressed.

Figure 111B:
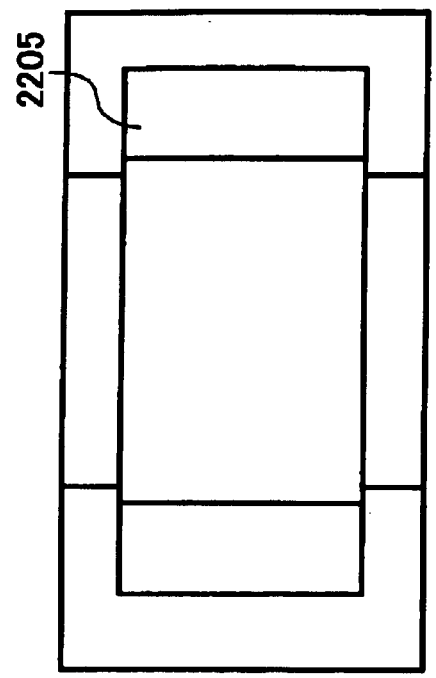
FIG. 111A and FIG. 111B are a schematic cross-sectional view and a schematic plan view which explain the manufacturing step of the light modulator in the first example of the third embodiment, respectively.
Figure 111A:
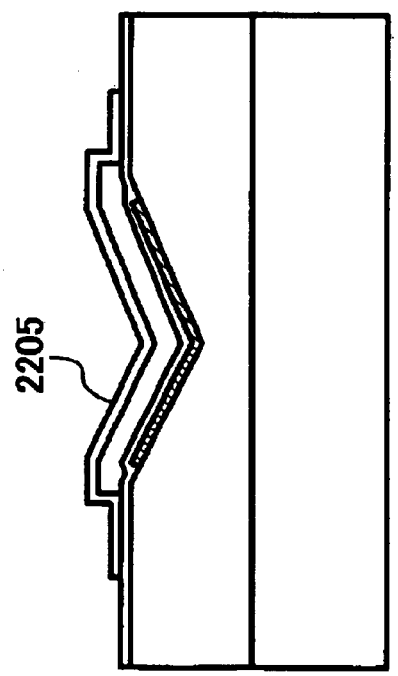

In FIGS. 111A and 111B, a silicon nitride film is formed to have a thickness of, for example, 0.1 μm on the entire surface of the substrate by the thermal CVD method, the silicon nitride film thus formed is patterned by photo-engraving and dry etching and the beam 2205 is thereby formed.

Figure 112B:
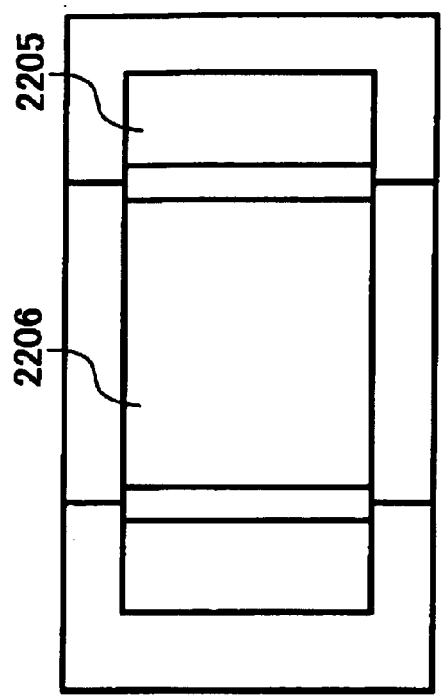
FIG. 112A and FIG. 112B are a schematic cross-sectional view and a schematic plan view which explain the manufacturing step of the light modulator in the first example of the third embodiment, respectively.
Figure 112A:
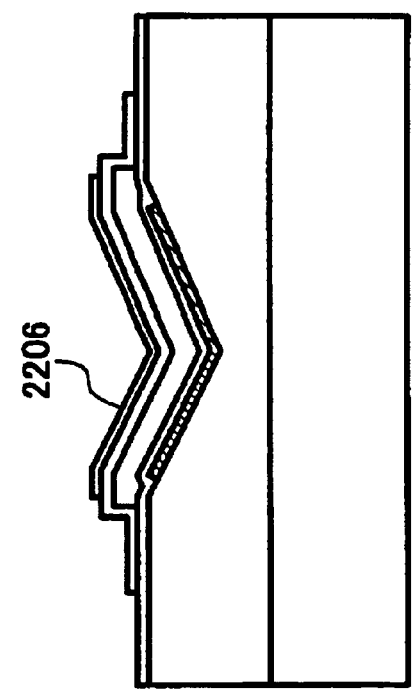

In FIGS. 112A and 112B, a Cr thin film which becomes an incident light beam reflection layer is formed to have a thickness of, for example, 0.05 μm by sputtering and patterned by photo-engraving and dry etching, thereby forming the surface reflection layer 2206. At this moment, the residual internal stress of the surface reflection layer 2206 also influences the flattening of the beam when removing the sacrificial layer 2209 as shown in FIG. 113A and FIG. 113B. A process for the surface reflection layer 2206 is, therefore, designed so that the surface reflection layer 2206 has an appropriate residual stress. The Cr film formed by DC sputtering has a residual internal stress of about 1.0 GPa, which contributes to the formation of the plane beam at the time of removing the sacrificial layer. In FIG. 112A and FIG. 112B, the surface reflection layer 2206 is shown not to overlap the L-shaped fixed ends of the beam. However, to increase the intensity of the beam on the fixed ends, the fixed ends may be covered with the surface reflection layer 2206.

In FIGS. 113A and 113B, the sacrificial layer 2209 formed to cover the concave section is removed by wet etching with a diluted hydrofluoric acid solution. The initial thickness of the beam 2205 and that of the protection film 2204 are determined based on the etching selectivity of the sacrificial layer 2209, the electrode protection film 2204 and the beam 2205 so that the beam 2205 and the protection film 2204 can be kept to have desired thicknesses even after the etching of the sacrificial layer is finished. As a result of removing the sacrificial layer, the beam 2205 is contracted to lessen the tensile residual stress thereof and formed into a plane form parallel to the substrate plane. Consequently, the non-parallel gap 2208 consisting of the non-parallel gap 2302 below the substrate plane and the generally rectangular gap 2303 above the substrate plane is formed.

While a step of forming an opening in the protection film 2204 by etching on the pad section on the electrode 2203 is not shown in the drawings and not explained, the step can be executed between the steps shown in FIG. 111A, FIG. 111B and FIG. 112A, FIG. 112B by extending the electrode 2203 from the concave section to the surface of the substrate.

[Second Example of Third Embodiment]

A second example will be explained with reference to FIGS. 114 to 122.

Figure 114B:
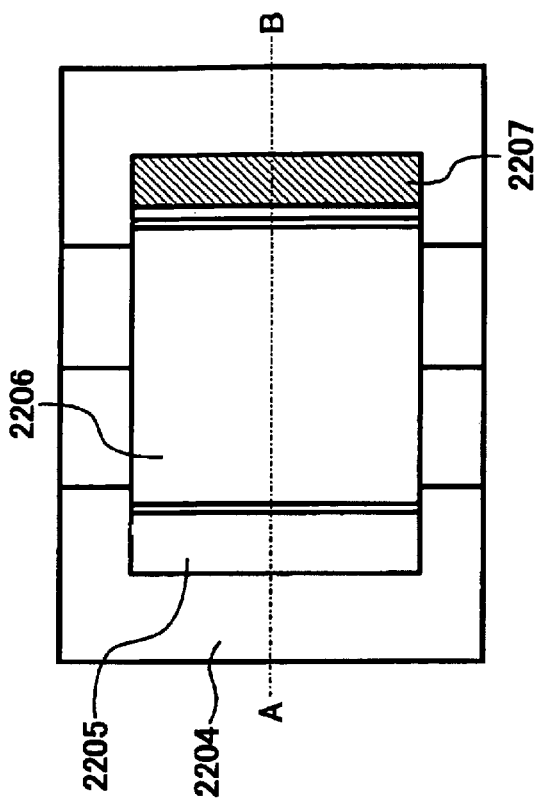
FIG. 114A and FIG. 114B are a schematic cross-sectional view and a schematic plan view which explain a second example of the third embodiment of a light modulator according to the present invention, respectively.
Figure 114A:
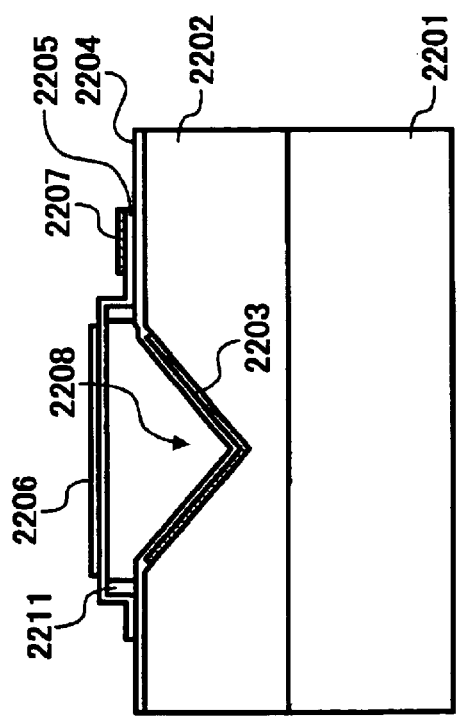

FIG. 114A and FIG. 114B are explanatory views which explain the configuration of a light modulator in this embodiment. FIG. 114A is a schematic cross-sectional view and FIG. 114B is a schematic plan view. FIG. 114A is a cross-sectional view taken along line A–B of FIG. 114B.

The light modulator in the second example is the same in constituent elements as the light modulator in the first example. However, the notable difference of the light modulator in the second example from the light modulator in the first example is that supports 2211 are provided in proximity to the respective fixed ends of the beam 2205 and the supports 2221 and the beam 2205 are formed out of the same material. The material of the supports 2211 is required to have good etching selectivity at least to the sacrificial layer 2209. In this embodiment, a silicon nitride film or a poly-crystalline silicon film is used as the material of the supports 2211. The supports 2211 are particularly formed out of the same silicon nitride film as that for the beam 2205.

Figure 122:
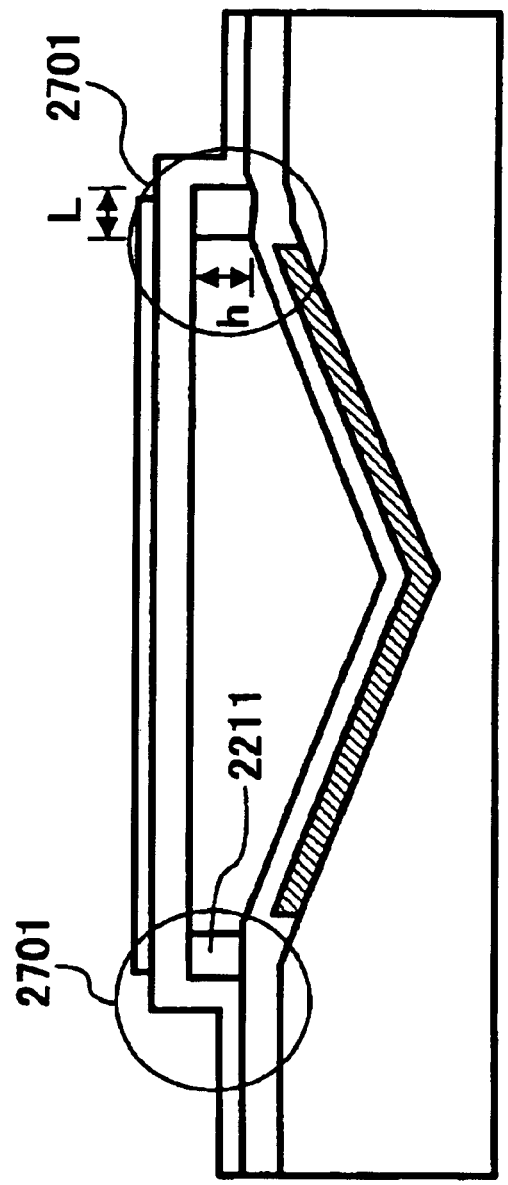

FIG. 122 is an enlarged cross-sectional view of the characteristic elements of the light modulator in the second example. In FIG. 122, reference symbol 2701 denotes the fixed end of the beam 2205 and the support 2211 proximate to the fixed end. The length L of each support 2211 formed by a manufacturing method to be explained later can be arbitrarily set according to the thickness of a support formation layer 2601 and the height h thereof can be arbitrarily set according to an over-etching quantity during the etch-back of the support formation layer and the thickness of the sacrificial layer.

A concrete manufacturing method for the light modulator in the second example will be explained with reference to FIGS. 115 to 121. FIGS. 115 to 121 show typical steps in order. In the respective figures, FIG. A is a schematic cross-sectional view taken along line A–B and FIG. B is a schematic plan view.

Figure 115B:
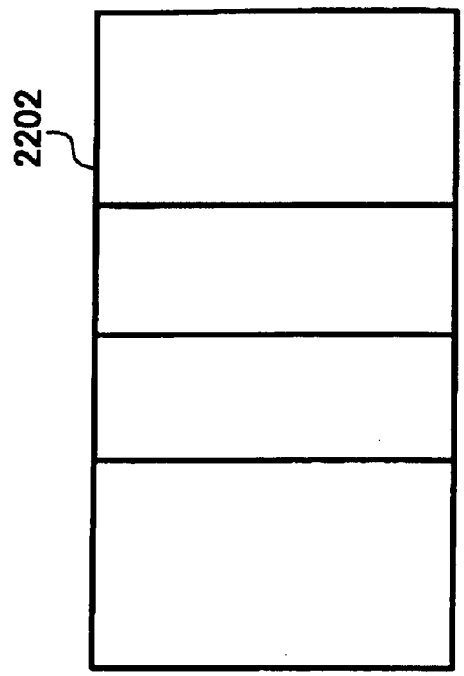
FIG. 115A and FIG. 115B are a schematic cross-sectional view and a schematic plan view which explain the manufacturing step of the light modulator in the second example of the third embodiment, respectively.
Figure 115A:
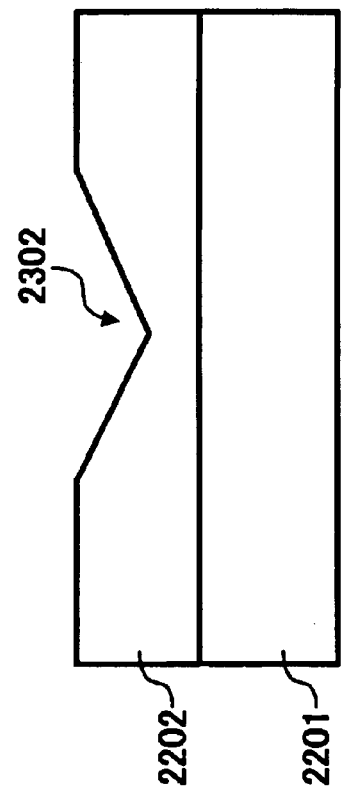

In FIG. 115A and FIG. 115B, the substrate 2201 is a silicon substrate on which the silicon oxide film 2202 is formed. On the substrate 2201, a resist pattern having an arbitrary thickness is formed in a portion corresponding to a concave section by photo-engraving using a photomask on which an area gradation pattern is formed or photo-engraving which forms and then thermally deforms a resist pattern and the concave section is then formed by dry etching. The non-parallel gap 2302 is formed out of this concave section.

Figure 116B:
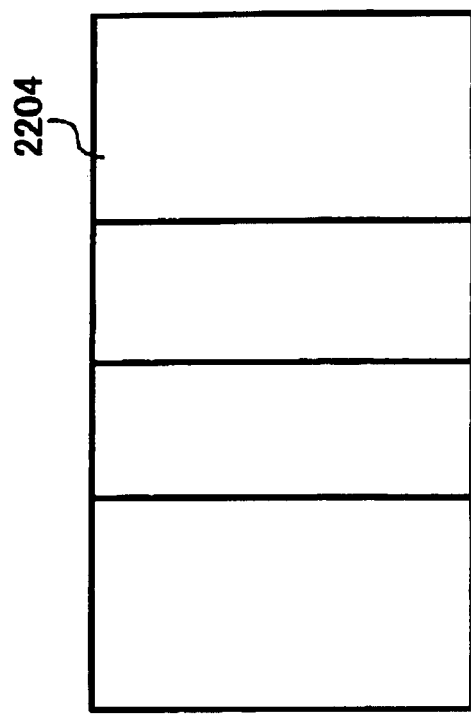
FIG. 116A and FIG. 116B are a schematic cross-sectional view and a schematic plan view which explain the manufacturing step of the light modulator in the second example of the third embodiment, respectively.
Figure 116A:
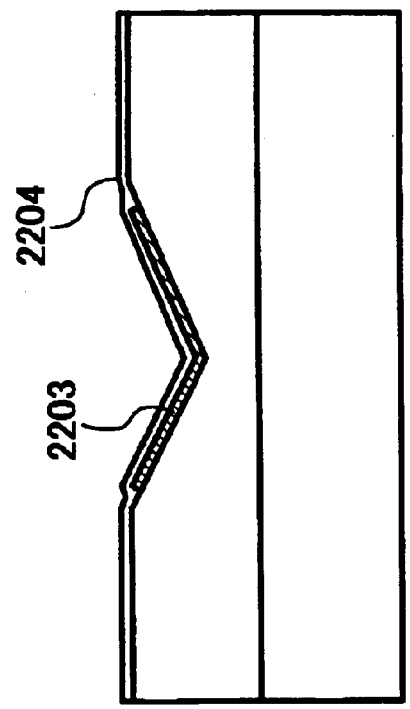

In FIGS. 116A and 116B, the electrode 2203 is formed out of a TiN thin film in the concave section corresponding to the gap 2302. For example, the TiN thin film having a thickness of 0.01 μm is formed by sputtering with Ti as a target and the electrode 2203 is formed by photo-engraving and dry etching. Thereafter, a silicon nitride film having a thickness of 0.2 μm is formed as the protection film 2204 of the electrode 2203 by the atmospheric pressure CVD method.

Figure 117B:
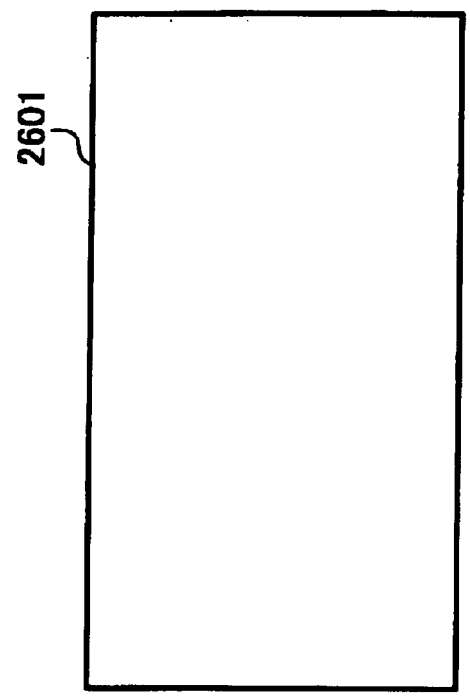
FIG. 117A and FIG. 117B are a schematic cross-sectional view and a schematic plan view which explain the manufacturing step of the light modulator in the second example of the third embodiment, respectively.
Figure 117A:
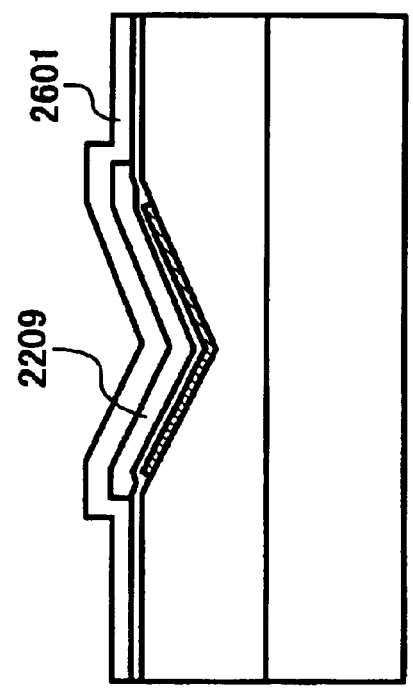

In FIGS. 117A and 117B, a silicon oxide film is formed to have an ar bitrary thickness by the plasma CVD method, patterned by photo-engraving using a resist and the sacrificial layer 2209 is thereby formed. A silicon nitride film having an arbitrary thickness is deposited, as the support formation film 2601, on the entire surface of the substrate. At this moment, the length L of each support 2211 can be arbitrarily set to be large by making the support formation film 2601 thick.

Figure 118A:
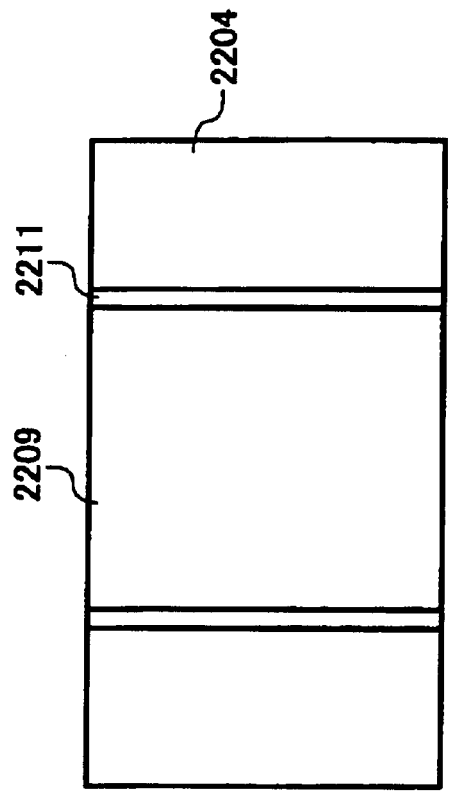
FIG. 118A and FIG. 118B are a schematic cross-sectional view and a schematic plan view which explain the manufacturing step of the light modulator in the second example of the third embodiment, respectively.
Figure 118B:
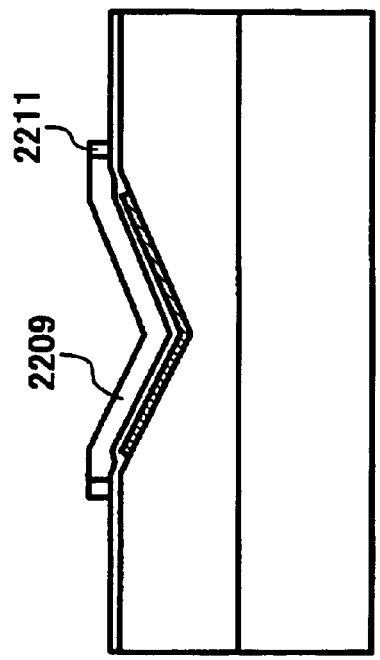

In FIGS. 118A and 118B, the support formation film 2601 is etched back by the etch-back method which is an ordinary semiconductor manufacturing technique and film sections which become the supports 2211 are left on the end face of the sacrificial layer 2209. If an over-etching quantity during the etch-back is set large, it is possible to arbitrarily set the height h of each support 2211 to be low.

Figure 119B:
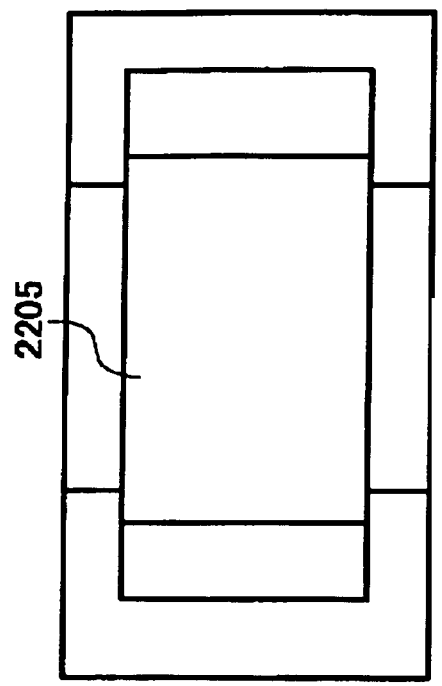
FIG. 119A and FIG. 119B are a schematic cross-sectional view and a schematic plan view which explain the manufacturing step of the light modulator in the second example of the third embodiment, respectively.
Figure 119A:
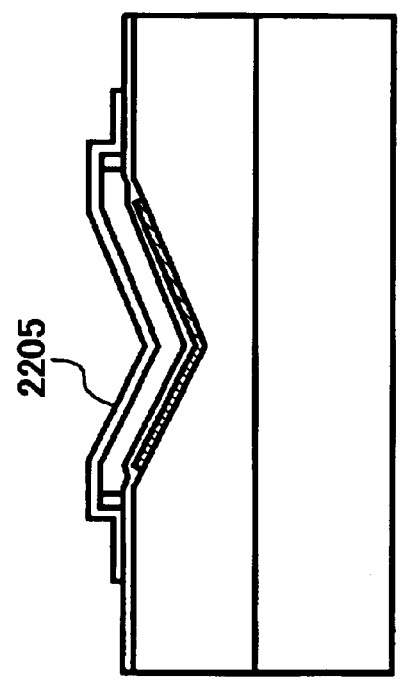

In FIGS. 119A and 119B, a silicon nitride film is formed to have a thickness of, for example, 0.1 μm on the entire surface of the substrate by the thermal CVD method, and patterned by photo-engraving and dry etching to thereby form the beam 2205. The unnecessary portions of the supports 2211 are etched away simultaneously with this patterning.

Figure 120B:
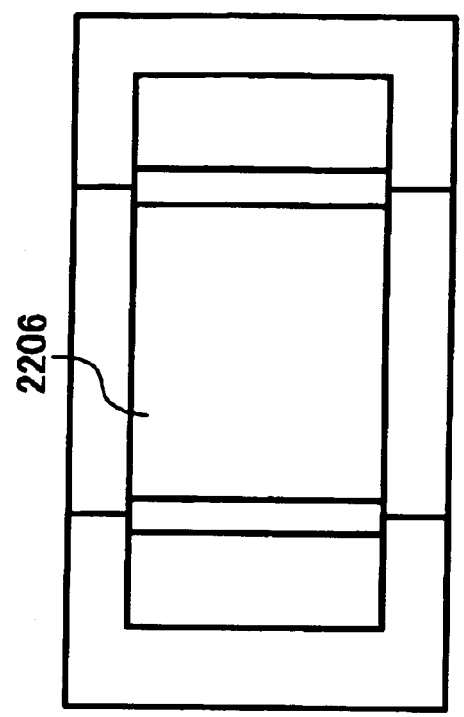
Figure 120A:
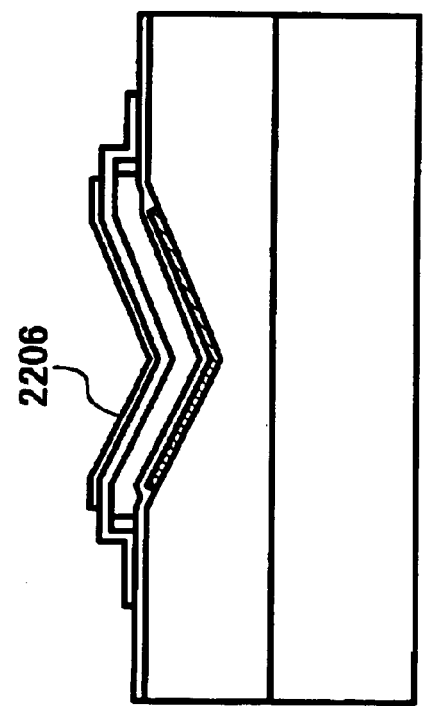

In FIGS. 120A and 120B, a Cr thin film which becomes an incident light beam reflection layer is formed to have a thickness of, for example, 0.05 µm by sputtering. The Cr film is patterned by photo-engraving and dry etching to form the surface reflection layer 2205. Since the residual internal stress of the surface reflection layer 2206 also influences the formation of the beam 2206 into a plane shape at the time of removing the sacrificial layer 2209, a process for the surface reflection layer 2206 is designed so that the surface reflection layer 2206 has an appropriate residual stress. The Cr film formed by DC sputtering has a residual stress of about 1.0 GPa, which contributes to the plane formation of the beam 2205 at the time of removing the sacrificial layer 2209. While FIGS. 119A and 119B show that the surface reflection layer 2206 does not overlap the L-shaped fixed ends of the beam 2205, the surface reflection layer 2206 may be formed to cover the fixed ends so as to increase the intensity of the beam 2206 on the fixed ends.

Figure 121B:
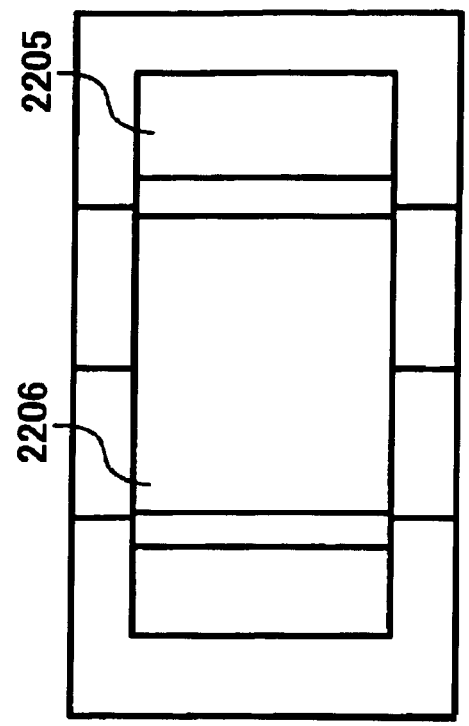
Figure 121A:
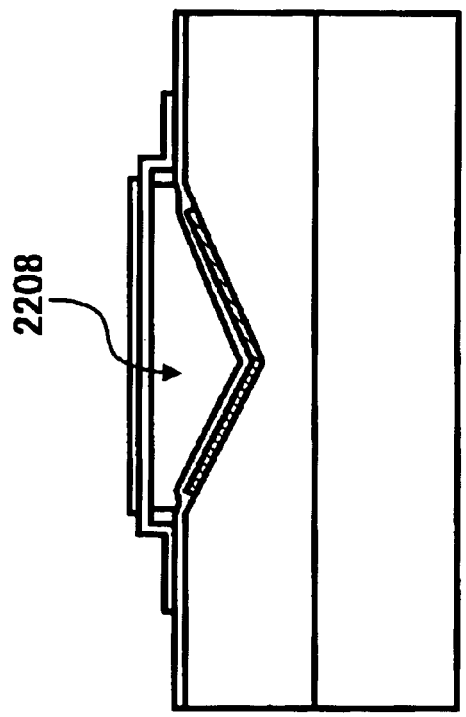

In FIGS. 121A and 121B, the sacrificial layer 2209 formed to cover the concave section is removed by wet etching with a diluted hydrofluoric acid solution. The initial thickness of the beam 2205 and that of the protection film 2204 are determined based on the etching selectivity of the sacrificial layer 2209, the electrode protection film 2204 and the beam 2205 so that the beam 2205 and the protection film 2204 can be kept to have desired thicknesses even after the etching of the sacrificial layer 2209 is finished. It is also necessary to consider the etching selectivity in relation to the supports 2211. In this embodiment, however, the same silicon nitride film is used for the beam 2205 and the supports 2211 and it is not necessary to consider the etching selectivity in relation to the supports 2211. By removing the sacrificial layer 2209, the beam 2205 is contracted to lessen the internal tensile residual stress of the beam 2205 and formed into a plane shape in parallel to the substrate plane. As a result, the non-parallel gap 2208 consisting of the non-parallel gap 2302 below the substrate plane and the generally rectangular gap 2303 above the substrate plane is formed. Since the supports 2211 are provided, resistance against the breaking of the fixed ends of the beam when this residual stress is lessened is improved (mechanical strength is increased).

While a step of forming an opening in the protection film 2204 on the pad section on the electrode 2203 by etching is not shown in the drawings and is not explained, the step may be executed between the steps shown in FIGS. 120 and 121 by extending the electrode 2203 from the concave section to the surface of the substrate.

The effect of decreasing a driving voltage obtained by the light modulator manufacturing method explained with reference to FIGS. 108 to 113 will be explained with reference to FIGS. 123 and 124. FIG. 124A and FIG. 124B are cross-sectional views of the light modulator before and after the removal of the sacrificial layer according to the manufacturing method of the present invention. FIGS. 123A and 123B are cross-sectional views of the light modulator before and after the removal of the sacrificial layer according to the conventional manufacturing method.

Figure 123A:
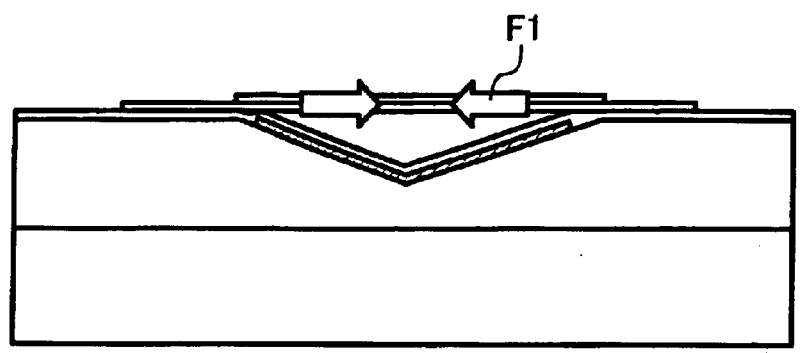

According to the conventional method, before the sacrificial layer is removed, the beam formed on the substrate plane and flattened by CMP is pulled from the both ends by a force F1 derived from the tensile residual stress remaining in the beam as shown in FIG. 123A. Even after the sacrificial layer is removed, the force F1 remains as it is as shown in FIG. 123B. To bend the beam by an electrostatic attracting force, therefore, it is necessary to increase a driving voltage to compensate for the remaining force F1.

Figure 124A:
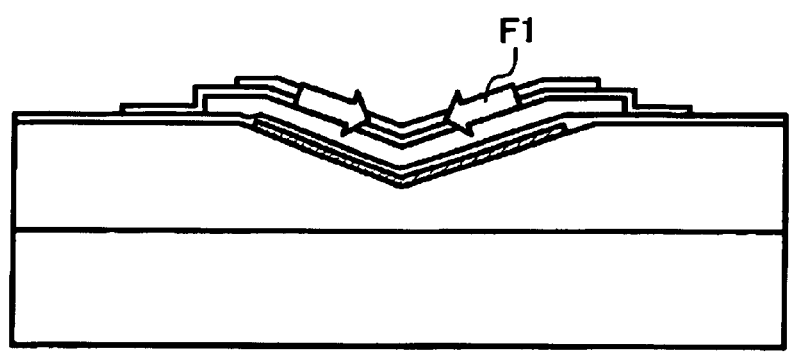

According to the method of the present invention, by contrast, before the sacrificial layer is removed, the beam is non-parallel to the substrate plane as shown in FIG. 124A. A force derived from a tensile residual stress in this state is denoted by F1. After the sacrificial layer is removed, the beam is pulled from the both ends because of the tensile residual stress and contracted as shown in FIG. 124B. As a result, the beam is flattened, the tensile residual stress is lessened and the force F2 remaining in the beam becomes thereby lower than the force F1. Therefore, it is possible to decrease a driving voltage by as much as the less increase of the driving voltage to compensate for the remaining force F2.

Figure 123B:
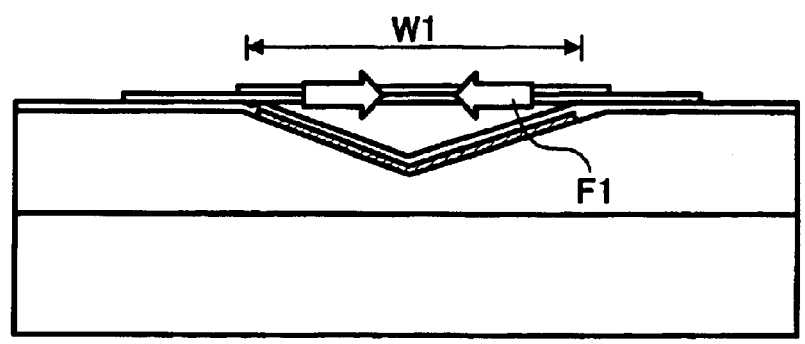
Figure 124B:
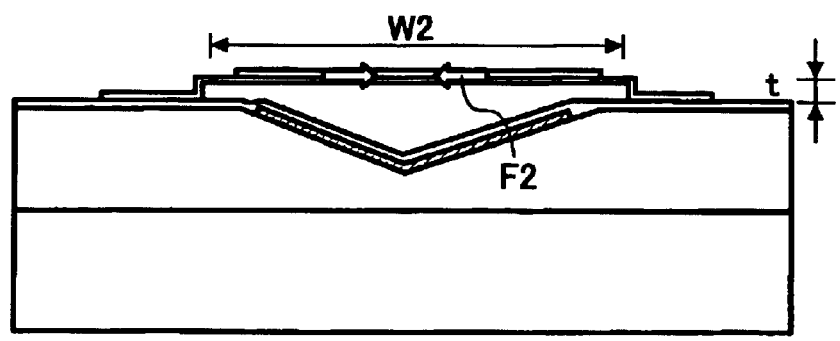

Furthermore, according to the conventional method, the length W1 of the beam is restricted by the length of the concave section in the substrate as is obvious from FIG. 123B. According to the method of the present invention, by contrast, the length W2 of the beam is restricted by the length of the sacrificial layer as is obvious from FIG. 123B. Therefore, if the length of the concave section in the substrate is the same, the length W2 can be set longer than the length W1. Further, the substantial length of the beam which is the sum of the length W2 and the height t of the beam (the projection quantity of the beam from the substrate plane) specified to the height of the sacrificial layer is far longer than the length of the beam according to the conventional method. A driving voltage required to deform the beam can be further decreased by as much as the increase of the length of the beam to (W2+t) since the driving voltage is approximately inversely proportional to the square of the length of the beam.

Figure 125A:
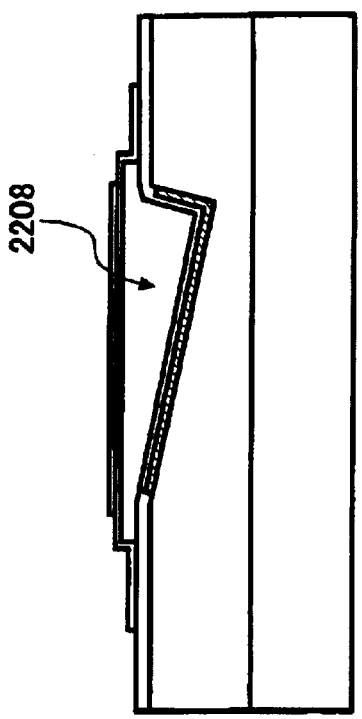
Figure 125B:
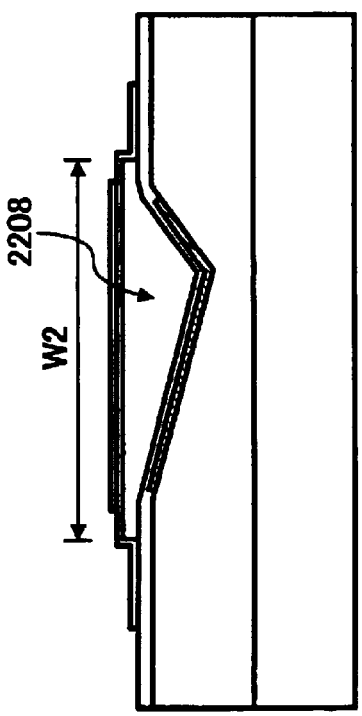

The modifications of the light modulator in the first example will be explained with reference to FIGS. 125A and 125B. FIG. 125A shows a modification in which the apex of the non-parallel gap is moved to a position of about W2/4 from one fixed end of the beam. FIG. 125B shows a modification in which the apex of the non-parallel gap is moved to the neighborhood of one fixed end of the beam. By thus moving the position of the apex of the non-parallel gap, it is possible to change the shape of the beam which is deformed by an electrostatic force to such shape as to attain desired light modulation property.

Finally, the light modulation operation of the light modulator according to the present invention will be explained while taking the configuration of the light modulator in the first example as an example. FIG. 126A, FIG. 126B, FIG. 126C and FIG. 126D are explanatory views which explain the operation of the light modulator in the first example.

Figure 126A:
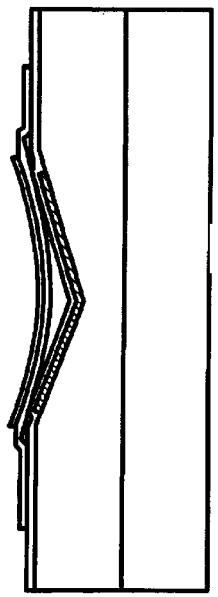
Figure 126C:
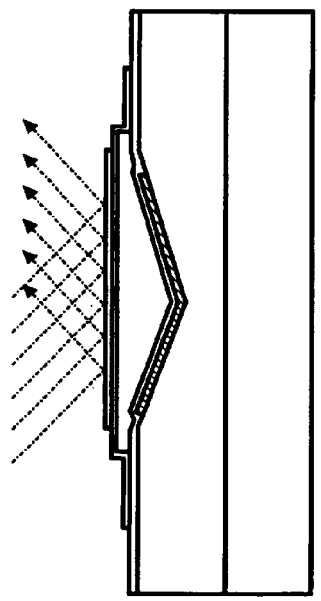
Figure 126B:
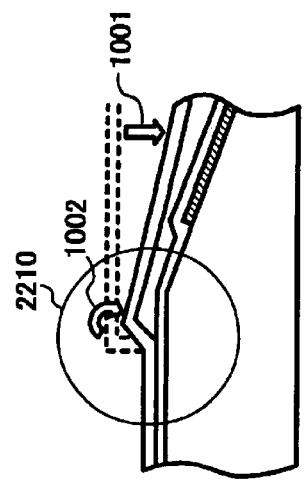

FIG. 126A shows a state in which no driving force is applied to the beam. Namely, since no electrostatic force acts on the beam (2205), the L-shaped fixed ends of the beam (2205) are raised vertically to the plane of the substrate (2201). Incident light beams are regularly reflected by the surface of the beam and moved in target direction as indicated by arrows. FIG. 126B shows a state in which a low driving voltage is applied to the beam. The beam is bent to be attracted toward the electrode (2203) side from the narrow portion of the gap (2208) by the action of the electrostatic force. Since the surface of the beam is bent, the direction of reflection light is changed. FIG. 126C shows a state in which a higher driving voltage is applied to the beam. If a high electrostatic force acts on the beam, the beam is completely attracted to the electrode (2203) and largely bent. As a result, reflection light is moved in the different direction from the target direction. If viewed from the reflection direction shown in FIG. 126A, the light modulator looks bright by the regular reflection of light on the beam in the state of FIG. 126A (ON operation state) and the light modulator looks dark since the reflection direction is completely changed in the state of FIG. 126C (OFF operation state). Light modulation is thus carried out.

Figure 126D:
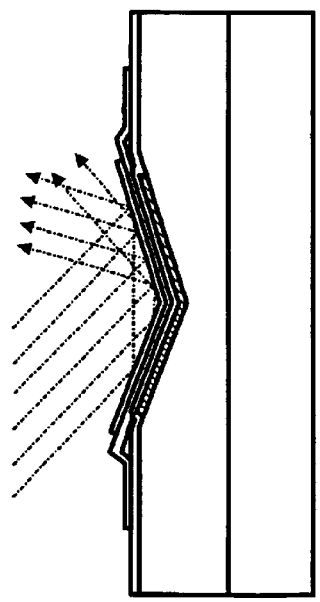

With the configuration of the light modulator in the first example, the gap (2208) below the beam (2205) is formed non-parallel to the beam. This shape of the gap is effective to decrease a voltage required to deform the beam. An electrostatic force acting on the beam is inversely proportional to the square of the distance between the electrode (2203) and the beam. That is, the shorter the distance, the higher the electrostatic force acting on the beam. For that reason, if a driving voltage is applied, the deformation of the beam starts in the narrower section of the gap. In addition, the gap is narrower in accordance with the deformation of the beam and the beam is deformed at a lower voltage than the voltage applied in a case in which the parallel gap is provided. FIG. 124D shows the behavior of the L-shaped fixed end 2210 of the beam in a transient state shown in FIG. 123B. In FIG. 126D, if the certain section of the light reflection layer of the beam starts to be bent by an electrostatic force 1001 acting between the ends of the electrode, rotational operation 1002 about the L-shaped fixed end 2210 occurs. Such a rotational operation of the fixed end 2210 makes it possible to deform the certain section of the light reflection layer of the beam at a lower voltage.

(Fourth Embodiment)

A fourth embodiment of the present invention will be explained hereinafter in the order of [First example of Fourth embodiment], [Second example of Fourth embodiment] and [Third example of Fourth embodiment] with reference of FIGS. 127 to 141.

[First Example of Fourth Embodiment]

Figure 127A:
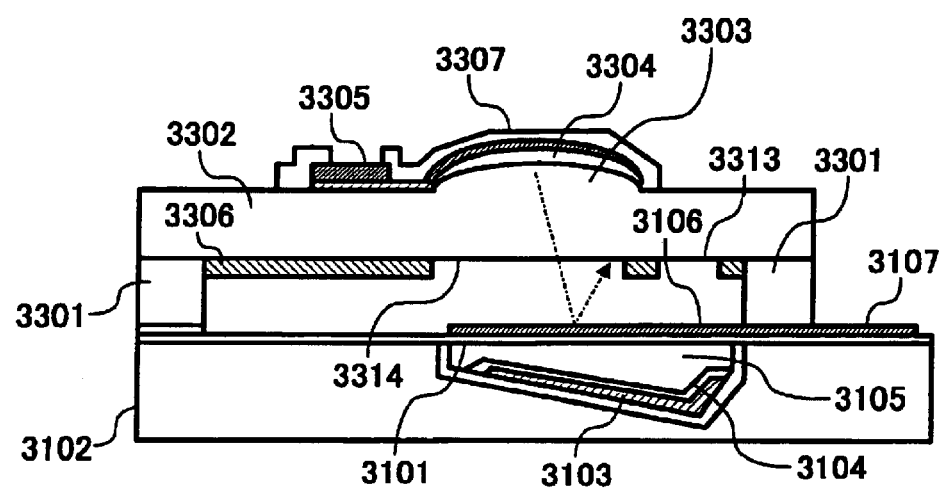
Figure 127B:
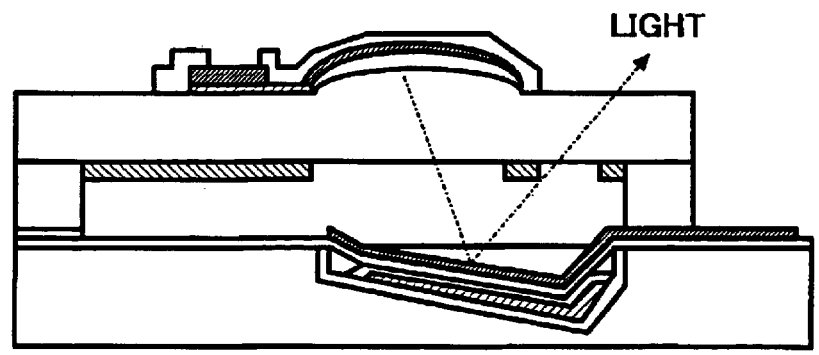

A first example will be explained with reference to FIGS. 127 to 133. FIG. 127A and FIG. 127B are schematic cross sectional views which explain the configuration of a light modulator in the first example. FIG. 127A shows the non-driven state of the light modulator and FIG. 127B shows the driven state of the light modulator. In FIG. 127A and 127B, reference symbol 3102 denotes a substrate which has a shape elongated in a perpendicular direction to a sheet. A long groove is formed in the longitudinal direction of the substrate 3102 and a fixed electrode 3103 is formed in the groove. Although the electrode pad of the fixed electrode 3103 is provided, it is not shown in FIG. 127A and FIG. 127B. A beam 3101 which is opposed to the fixed electrode 3103 through a gap 3105 is formed on the upper surface of the substrate 3102. While the beam 3101 is a both-end-fixed beam in this embodiment, the beam may be a one-end-fixed beam. A plurality of beams 3101 are aligned in the longitudinal direction of the substrate 3102. A metallic film 3106 is formed on each beam 3101. The metallic film 3106 functions as both a light reflection surface and an electrode. The metallic film 3106 is pulled out toward an electrode pad 3107 on the end section of the substrate 3102.

Long spacers 3301 are connected onto the substrate 3102 in the longitudinal direction of the substrate 3102. A package upper cover 3302 made of a long transparent material is connected onto the spacers 3301 in the longitudinal direction of the substrate 3102. A light emission element 3304 having a long light emission surface is formed in the longitudinal direction of the substrate 3102. In this embodiment, the light emission element 3304 is an organic or inorganic electroluminescence (EL) element. A convex section 3303 is formed on the package upper cover 3302 to converge light emitted from the light emission element 3304 on the metallic film 3106 on the beam 3101 and a light emission element 3304 is formed on the section. In this embodiment, the convex section 3303 is barrel-shaped elongated in the longitudinal direction of the substrate 3102. However, the shape of the convex section 3303 is not limited thereto but may be, for example, a spherical shape corresponding to each beam 3101. Reference symbol 3305 denotes an electrode pad which feeds a current to the light emission element 3304. Reference symbol 3307 denotes a protection film which protects the light emission element 3304. As a shielding film 3306, a Cr thin film, for example, is formed on the lower surface of the package upper cover 3302. A window 3314 which allows light from the light emission element 3304 to be incident on the beam 3101 and a window 3313 which allows reflection light from the beam 3101 to pass are formed in the shielding film 3306 to correspond to each beam 3101.

Figure 128A:
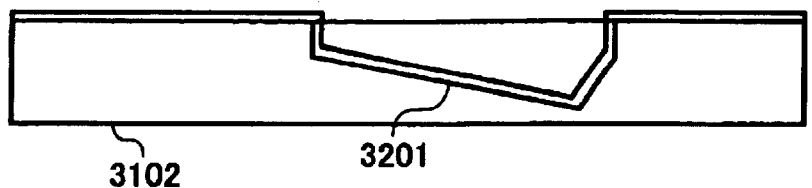

The operation of the light modulator in this embodiment will be explained. If no driving voltage is applied between the electrode pad 3107 corresponding to one of the beams 3101 and the electrode pad (not shown) of the fixed electrode 3103 which is a common electrode, all the beams 3101 are flat as shown in FIG. 127A. Therefore, light L emitted from the light emission element 3304 is reflected by the metallic film 3106 (light reflection surface) on each beam 3101 in a direction offset from the window 3313 as shown in FIG. 128A, the reflection light of the light L is shielded by the shielding film 3306 and outputted to the outside of the package.

If the driving voltage is applied to the electrode pad 3107 corresponding to the selected beam 3101, the selected beam 3101 is pulled in the fixed electrode 3103 and deformed as shown in FIG. 127B. As a result, the light emitted is reflected by the metallic film 3106 on the selected beam 3106 on the selected beam 3101 in a direction of the window 3313 and outputted to the outside of the package.

If the application of the driving voltage to the electrode pad 3107 of the selected beam 3101 is stopped, the beam 3101 returns to the flat state as shown in FIG. 127A again by its spring action and the reflection light is not outputted to the outside of the package.

Since each beam 3101 is a both-end-fixed beam, excess oscillation is generated less frequently when the beam 3101 returns to the flat state than a one-end-fixed beam, thereby making it possible to drive the beam 3101 at higher speed.

If the light emission of the light emission element 3304 is stopped while the beam 3101 is deformed, it is possible to prevent excessive light from being outputted while the beam 3101 is deformed. The same thing is true for the following embodiments. In addition, it is possible to output reflection light to the outside of the package while the beam 3101 is not driven and not to output the reflection light to the outside while the beam 3101 is driven, by changing the positional relationship between the beam 3101 and the light emission element 3304. The same thing is true for the following embodiments.

As explained above, this light modulator (as well as light modulators in embodiments to be explained later) is constituted so that a plurality of light switches each consisting of the beam 3101 and the light emission element 3304 which is a common light source to the light switches are provided in the same package and can be used as, for example, an optically writing device in an electrophotographic process. Differently from a case in which the light source and the light switches are separated, it is not necessary to position the light source and the light switches relative to one another. In addition, it is not necessary to interpose a special optical system between the light source and the light switches. It is, therefore, possible to save space which may be occupied by the optical system.

As digital copiers and printers improve in image quality recently, the number of pixels of each of their optical writing devices increases to make it difficult to correct the light quantity of each pixel. Since the light modulator of the present invention employs a light source common to a plurality of light switches, light quantities for the respective light switches (respective pixels) have a smooth spatial distribution and the light quantity of each pixel can be easily corrected.

One example of a manufacturing method for this light modulator will next be explained with reference to FIGS. 128 to 132. FIGS. 128 to 132 are explanatory views which explain the steps of the manufacturing method and FIG. 133 is a detailed view of the light emission element 3304.

The manufacturing steps of manufacturing the substrate side will first be explained.

In FIG. 128A, the pattern of a groove which becomes the gap is formed on the Si substrate 3102 by patterning an organic photoresist. For example, the groove is formed by dry etching by means of RIE (reactive ion etching) with $SF_6$ gas. If the groove is inclined, a gradation is provided in the photomask and an inclination is formed in the thickness direction of the resist pattern. If RIE is performed, a structure according to the gradation of the photomask is transferred to the groove of the Si substrate. If the groove is deep, the temperature of the substrate is set to be as low as $-40°$ C. or lower so that the groove can be suppressed from spreading toward the side surfaces of the substrate. To insulate the Si substrate 3102 and the fixed electrode 3103 to be formed later, a thermal oxide film 3201 is formed to have a thickness of about 1 $\mu$m on the inner surface of the groove.

Figure 128B:
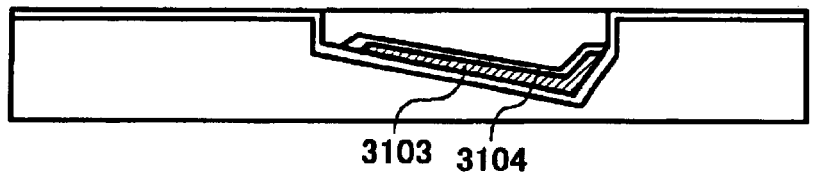

In FIG. 128B, a conductive thin film such as TiN is formed by sputtering. The pattern of the fixed electrode 3103 is formed by patterning an organic resist by photolithography and the conductive thin film is etched by RIE with $Cl_2$ gas to thereby form the fixed electrode 3103. A SiN film which becomes a passivation film 3104 is formed by the thermal CVD method with mixed gas of $SiH_4$ and $NH_3$.

Figure 128C:
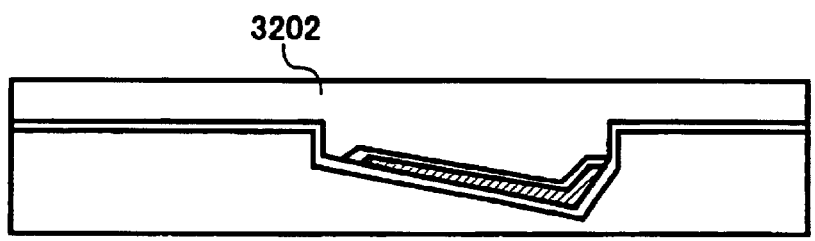

In FIG. 128C, an oxide film 3202 which becomes the sacrificial layer is formed by the thermal CVD method with mixed gas of $PH_3$, $B_2H_2$, $SiH_4$ and $N_2O$. Reflow is performed at a temperature of $1000°$ C. to flatten the oxide film 3202. The oxide film 3202 is polished by CMP (Chemical Mechanical Polishing) to further flatten the oxide film 3202.

Figure 128D:
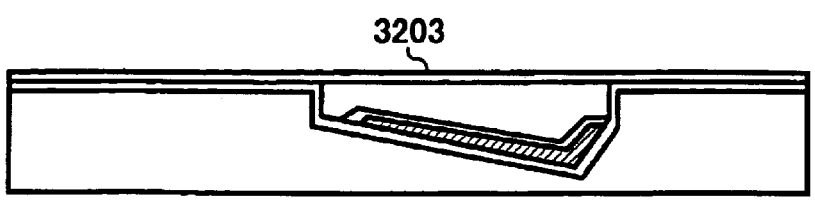

In FIG. 128D, a SiN film 3203 which becomes the beam 3101 is formed by the thermal CVD method with mixed gas of $SiH_4$ and $NH_3$.

Figure 129A:
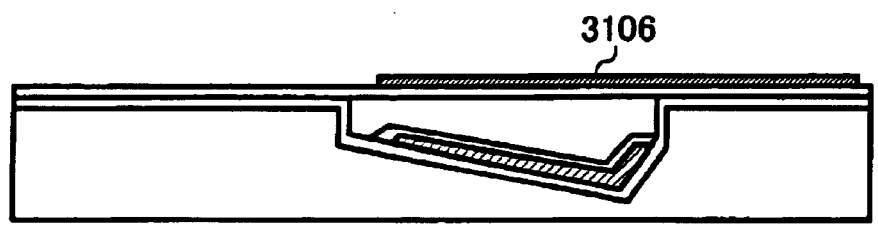
Figure 129B:
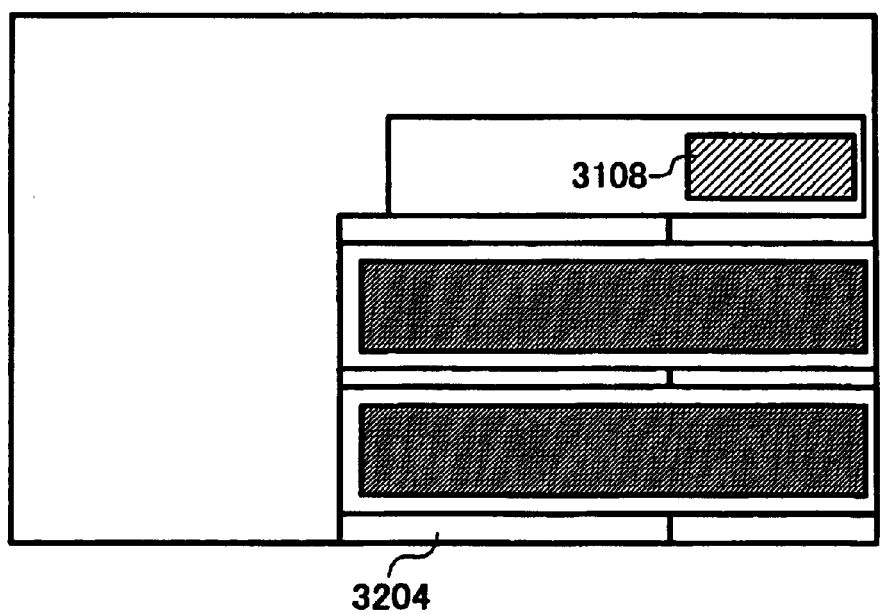

In FIG. 129A and FIG. 129B, the plane shape of the beam 2101 is formed by patterning an organic resist by photolithography and the SiN film 3203 is etched to thereby provide the shape of the beam 3101. The sacrificial layer embedded in the groove is exposed by etchings lits 3204. The electrode pad 3108 of the fixed electrode 3103 is opened simultaneously with the exposure of the sacrificial layer. A metallic thin film, e.g., a Cr film, which becomes a mirror is formed by sputtering, an organic resist is patterned by photolithography and subjected to RIE with mixed gas of $Cl_2$ and $O_2$, thereby forming the metallic film 3106 which serves as the light reflection surface.

Figure 130A:
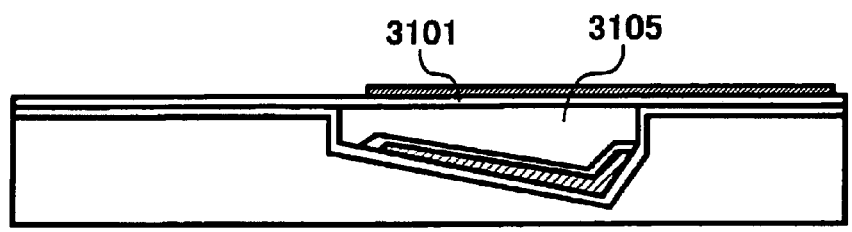
Figure 130B:
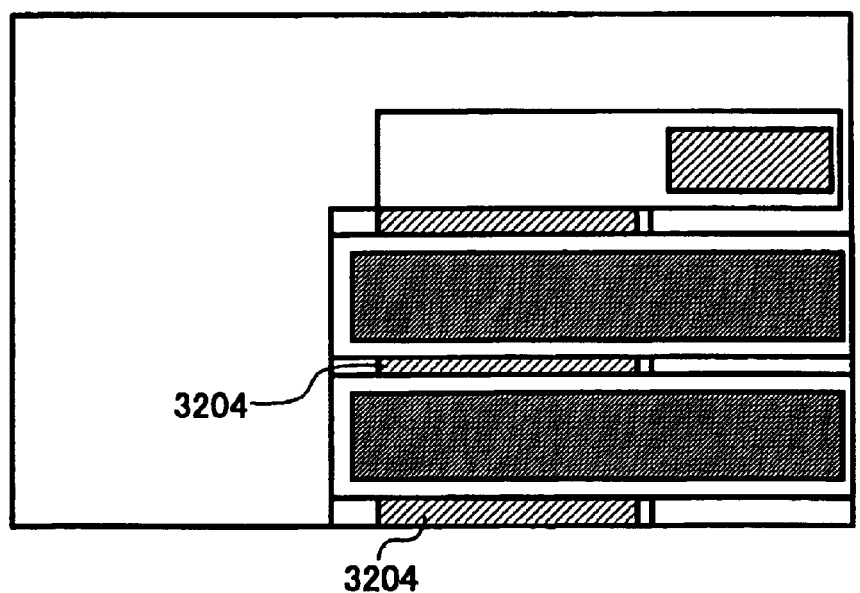

In FIGS. 130A and 130B, the oxide film 3202 which becomes the sacrificial layer is etched away through the slits 3204 with a hydrofluoric acid. By removing the sacrificial layer, the groove 3105 is completed.

The manufacturing steps of manufacturing the package upper cover side will be explained. It is assumed herein that an organic EL element is used as the light emission element 3304.

Figure 131A:
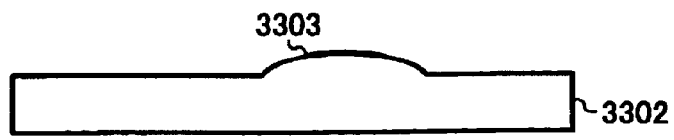

In FIG. 131A, the convex section 3303 is formed on a transparent glass substrate which serves as the package upper cover 3302. As already explained above, the convex section 3303 is formed into a barrel shape elongated in the long edge direction of the light emission element 3304. Alternatively, the convex section 3304 may be spherical. Specifically, a glass substrate having a square hole corresponding to the leading electrode pad (3107, 3108) is formed by beads blasting, a photoresist is coated onto the glass substrate and a photoresist pattern is formed using a photomask having a gradation corresponding to the convex section 3303. Using mixed gas of $CH_4$, $CHF_3$, and $H_2$, the glass substrate is etched by inductive coupling RIE, thereby forming the convex section 3303.

Figure 131B:
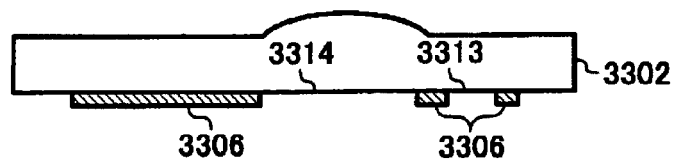

In FIG. 131B, the shielding film 3306 is formed. For example, a Cr film having a thickness of 100 nm is formed on the rear surface of the glass substrate by vacuum evaporation, an organic resist is patterned by photolithography and the Cr film is etched with a mixed aqueous solution of cerium acetate and perchloric acid. The resist is removed with a release solution.

Figure 131C:
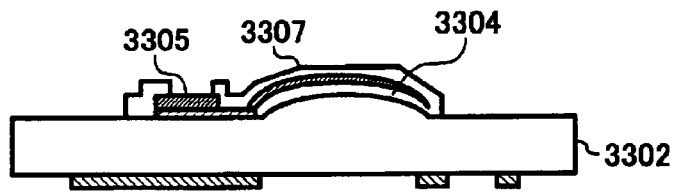

In FIG. 131C, the organic EL element serving as the light emission element 3304 is formed. The film configuration of the organic EL element is shown in FIG. 133A and 133B. FIG. 133A shows the cross-sectional configuration of the organic EL element viewed from the left side in FIG. 131 and FIG. 133B shows the cross-sectional configuration thereof viewed from the front side in FIG. 131.

Using an ITO as a target, a transparent electrode (ITO) is formed to have a thickness of 100 nm by sputtering. An organic resist is patterned on the transparent electrode (ITO) by photolithography, the transparent electrode is etched with a ferric chloride aqueous solution, the organic resist is removed with a resist release solution and the transparent electrode (ITO) 3304a is thereby formed. A metal mask is attached and a hole transport layer 3304b, an electron transport layer 3304c and a metallic electrode 3304d are sequentially formed on the transparent electrode 3403a in this order. As the hole transport layer 3304b, TPD; N,N'-diphenyl-,N'-bis-(3-methylphenyl)-[1,1'-biphenyl]-4,4'-diamine is formed to have a thickness of 55 nm by resistance heating vacuum evaporation. As the electron transport layer 3304c, Alq; Tris (8-quinolinol) aluminum is formed to have a thickness of 55 nm by resistance heating vacuum evaporation. As the metallic electrode 403d, an alloy of Mg and In is formed to have a thickness of 150 nm by vacuum evaporation. Using a metal mask, an Al thin film is formed to have a thickness of 500 nm by evaporation to form the pad electrode 3305. As the protection film 3307, a SiN or SiON film is formed by the plasma CVD method. An organic resist is formed by photolithography. A pad opening is formed in the protection film 3307 by RIE.

As the material of the hole transport layer 3304b, a hydrazone, triphenylmethane, polyvinyl carbazole, pyrazoline-group material or the like may be used. As the material of the electron transport layer 3304c, a cyclopentadiene derivative, a perylene derivative, a beryllium benzoquinolinol complex, a quinolinol complex, a porphyrin-group complex or the like may be used.

Figure 131D:
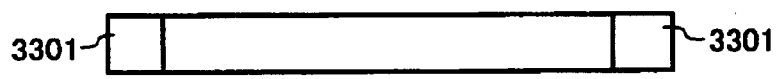
Figure 131E:
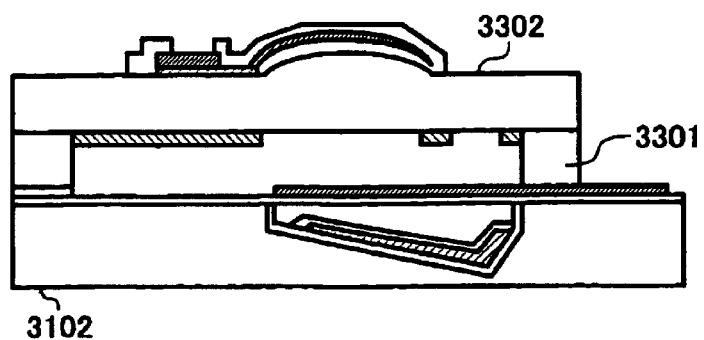

In FIGS. 131D and 131E, the spacers 3301 are separately manufactured. Through the spacers 3301, the package upper cover 3304 and the substrate 3102 are bonded to each other with, for example, an epoxy-group adhesive. The light modulator is thus completed.

So far, the steps of manufacturing one package of the light modulator have been explained. Actually, a method of assembling a plurality of packages on a wafer and separating the wafer into the packages is employed. This method will be explained with reference to FIG. 132A, FIG. 132B and FIG. 132C.

A square hole corresponding to the leading electrode pad (3107, 3108) is formed in the glass substrate by beads blasting, the light emission element and the like are formed by the steps explained above and package upper covers 3302 corresponding to a plurality of packages are prepared. In addition, holes are formed in the glass substrate by discharge machining or beads blasting, thereby preparing the spacers 3301 corresponding to a plurality of packages. Alternatively, stainless or Koval plates in each of which a square hole corresponding to chip size is formed by punching or etching may be used as the spacers 3301. A monocrystalline silicon substrate may be anisotropically etched with a KOH aqueous solution to form the spacers 3301. Likewise, the substrates 3102 corresponding to a plurality of packages and each having the electrode and the like formed thereon are formed on the Si wafer. These members are coupled to one another as shown in FIG. 132A and the resultant substrate is diced as shown in FIG. 132B into a plurality of packages as shown in FIG. 132C.

[Second Example of Fourth Embodiment]

A second example will be explained with reference to FIGS. 134 to 137. FIG. 134A and FIG. 134B are schematic cross-sectional views which explain the configuration of a light modulator in the second example. FIG. 134A shows the non-driven state of the light modulator and FIG. 134B shows the driven state of the light modulator. In FIG. 134A and FIG. 134B, the same reference symbols, as those shown in FIG. 127A and FIG. 127B denote the same or corresponding constituent elements.

The difference in configuration of the second example of the from the first example is that the light emission element 3304 is formed on the substrate 3102, a downward mirror 3311 is formed on each package upper cover 3302 and incident light from the light emission element 3304 is reflected by the mirror 3311 and converged on the beam 3101. In the second example; the mirror 3311 is a concave mirror to efficiently converge light on the beam 3101. While the beam 3101 is a both-end-fixed beam, a one-end-fixed beam may be used.

Each beam 3101 is flat when no driving voltage is applied to the electrode pad 3107 of the beam 3101. As shown in FIG. 134A, therefore, light incident on the beam 3101 by the mirror 3311 is reflected by the light reflection surface on the beam 3191 in the direction of the window 3313 of a shielding film 3306 and outputted to the outside of the package. If a driving voltage is applied to the electrode pad 3107 of a certain beam 3101, the beam 3101 is attracted to the fixed electrode 3101. Therefore, as shown in FIG. 134B, the light reflected by the light reflection surface on the beam 3101 is shielded by the shielding film 3306 and is not outputted outside.

It is possible to output the light to the outside of the package in the, non-driven state and not to output the light in the driven state according to the selection of the positional relationship among the beam 3101, the light emission element 3304 and the mirror 3311.

Manufacturing steps in the second example will be explained with reference to FIGS. 135 to 137.

Figure 135A:
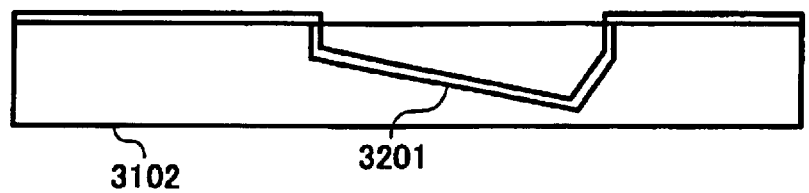

In FIG. 135A, a groove which becomes the gap is formed on an Si substrate 3102 by patterning an organic photoresist. The groove is formed by, for example, dry etching by means of RIE with $SF_6$ gas. If the groove is inclined, a gradation is provided on the photomask and an inclination is formed in the thickness direction of the resist pattern. If RIE is performed, a structure according to the gradation of the photomask is transferred to the groove of the Si substrate. If the groove is deep, the temperature of the substrate is set to be as low as −40° C. or lower so that the groove can be suppressed from spreading toward the side surfaces of the substrate. To insulate the Si substrate 3102 and the fixed electrode 3103 to be formed later, a thermal oxide film 3201 is formed to have a thickness of about 1 $\mu$m on the inner surface of the groove.

Figure 135B:
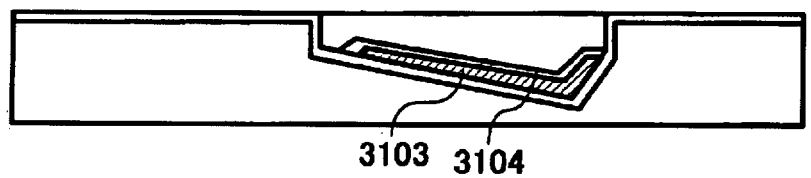

In FIG. 135B, a conductive thin film such as TiN is formed by sputtering. The pattern of the fixed electrode 3103 is formed by patterning an organic resist by photolithography and the conductive thin film is etched by RIE with $Cl_2$ gas to thereby form the fixed electrode 3103. A SiN film which becomes a passivation film 3104 is formed by the thermal CVD method with mixed gas of $SiH_4$ and $NH_3$.

Figure 135C:
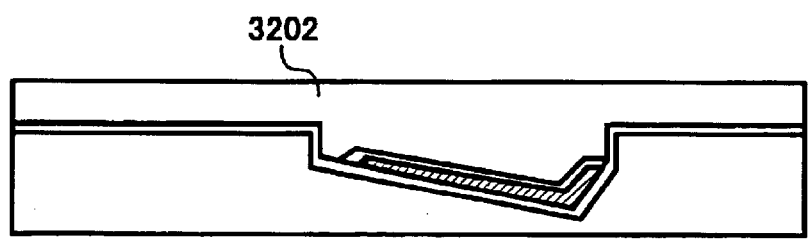

In FIG. 135C, an oxide film 3202 which becomes the sacrificial layer is formed by the thermal CVD method with mixed gas of $PH_3$, $B_2H_2$, $SiH_4$ and $N_2O$. Reflow is performed at a temperature of 1000° C. to flatten the oxide film 3202. The oxide film 3202 is polished by CMP (Chemical Mechanical Polishing) to further flatten the oxide film 3202.

Figure 135D:
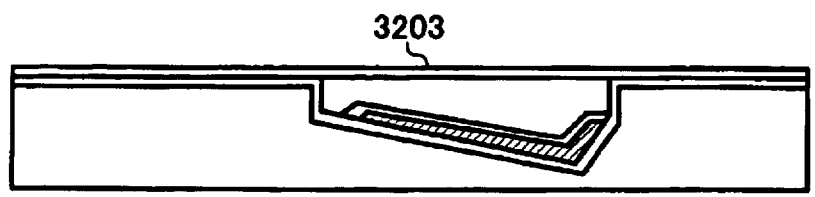

In FIG. 135D, a SiN film 3203 which becomes the beam 3101 is formed by the thermal CVD method with mixed gas of $SiH_4$ and $NH_3$.

Figure 136A:
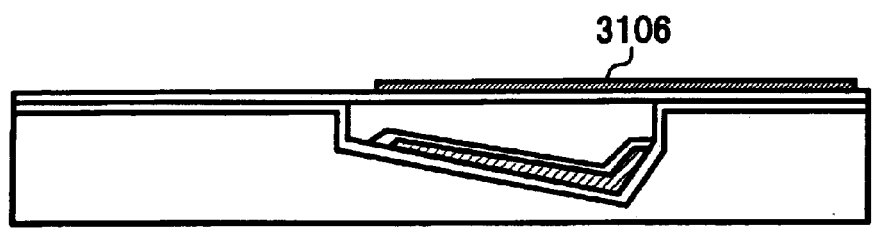
Figure 136B:
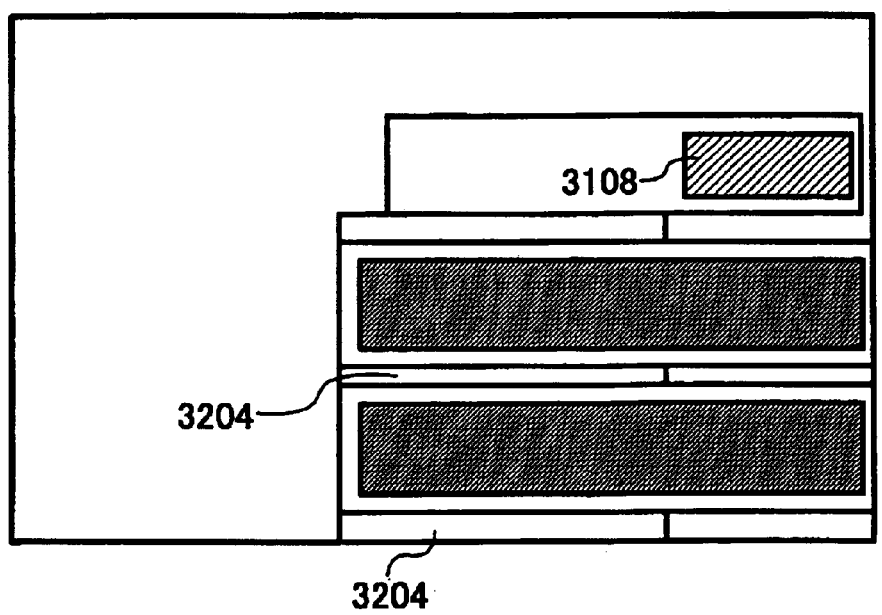

In FIG. 136A and FIG. 136B, the plane shape of the beam 3101 is formed by patterning an organic resist by photolithography and the SiN film 3203 is etched by means of RIE with $CHF_4$ to thereby provide the shape of the beam 3101. The sacrificial layer embedded in the groove is exposed by etching slits 3204. The electrode pad 3108 of the fixed electrode 3103 is opened simultaneously with the exposure of the sacrificial layer. A metallic thin film, e.g. a Cr film, which becomes the mirror is formed by sputtering, an organic resist is patterned by photolithography and subjected to RIE with mixed gas of $Cl_2$ and $O_2$, thereby forming the metallic film 3106 which serves as the light reflection surface.

Figure 136C:
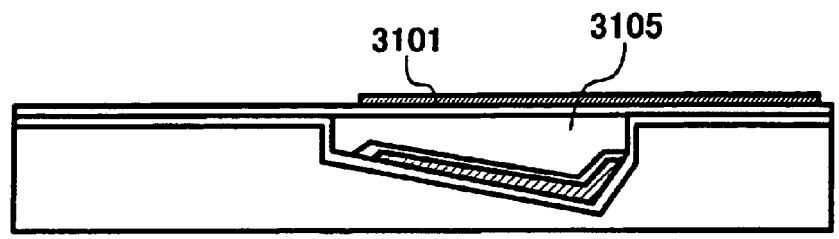
Figure 136D:
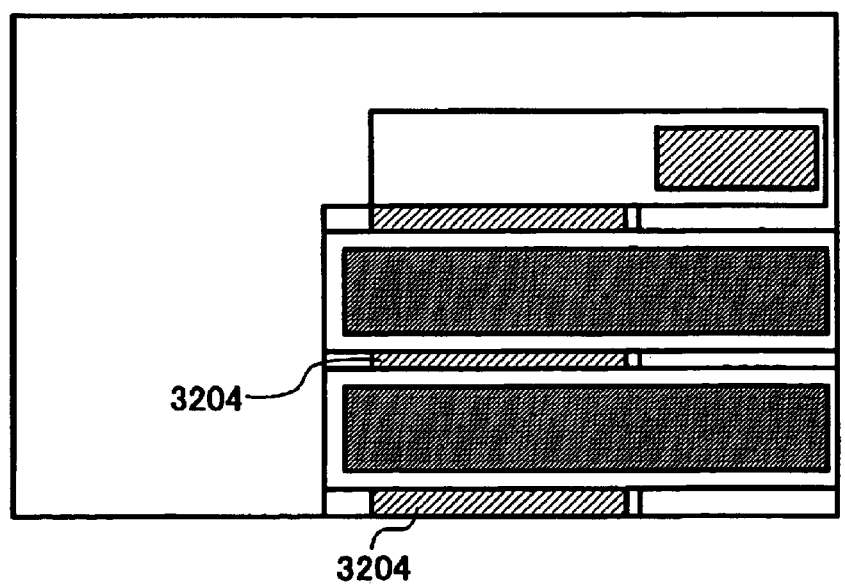

In FIGS. 136C and 136D, the oxide film 3202 which becomes the sacrificial layer is etched away through the slits 3204 with a hydrofluoric acid. By removing the sacrificial layer, the groove 3105 is completed.

Figure 137A:
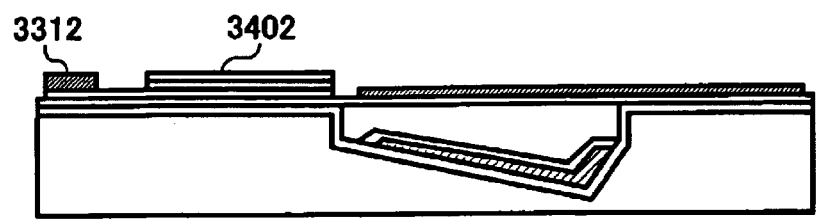
Figure 137B:
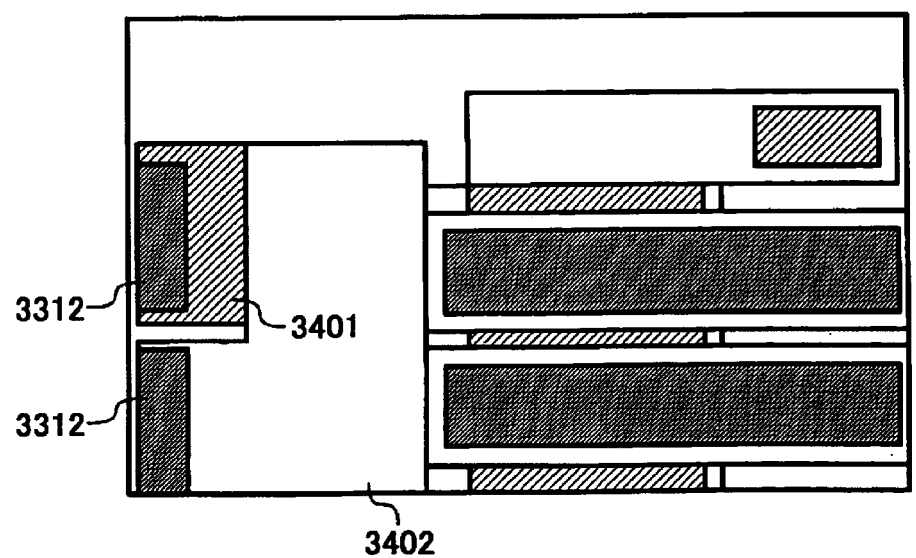

In FIGS. 137A and 137B, the organic EL element which serves as the light emission element 3304 is formed. A metal mask is attached first and an alloy film 3401 of Mg and In is formed to have a thickness of 150 nm by vacuum evaporation. A metal mask is attached and Alq which serves as a hole transport layer is formed to have a thickness of 55 nm by resistance heating vacuum evaporation. As an electron transport layer, TPD is continuously formed to have a thickness of 55 nm by resistance heating vacuum evaporation. As a transparent conductive film 3402, an ITO is formed by ion assist evaporation at room temperature. Using a metal mask, Al is vacuum-evaporated to have a thickness of 500 nm. The electrode pads 3312 are thus formed.

The manufacturing steps of manufacturing the package upper cover side will be explained.

Figure 137C:

In FIG. 137C, as already explained with reference to FIG. 132A, FIGS. 132B and 132C, a glass substrate in which a square hole corresponding to a leading electrode pad is formed by beads blasting as the package upper cover 3302. A photoresist is coated onto the glass substrate and a photoresist pattern is formed using a photomask having a gradation corresponding to a concave shape 3311a. Using mixed gas of $CF_4$, $CHF_3$, and $H_2$, the glass substrate is etched by means of inductive coupling RIE, thereby forming the concave shape 3311a.

Figure 137D:
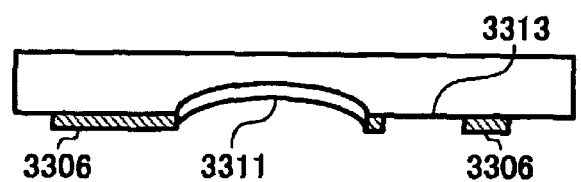

In FIG. 137D, the reflection film of the concave mirror 3311 and the shielding film 3306 are formed. For example, a Cr film is formed to have a thickness of 100 nm by sputtering. An organic resist is patterned by photolithography into the shapes of the concave mirror 3311 and the shielding film 3306. The Cr film is etched with a mixed aqueous solution of cerium acetate and perchloric acid. The resist is removed with a release solution.

Figure 137E:
Figure 137F:
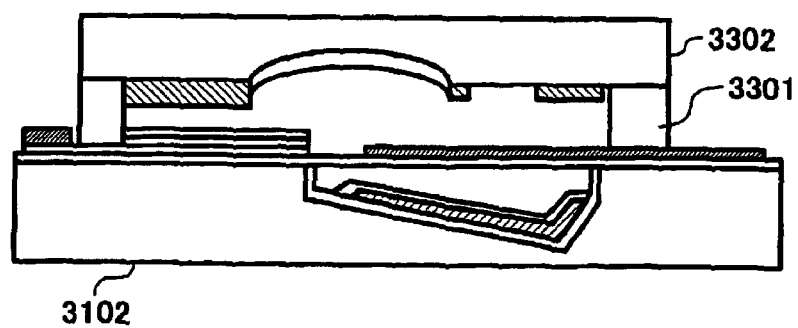

In FIGS. 137E and 137F, spacers 3301 are separately prepared. The spacers 3301 can be manufactured by forming holes in the glass substrate by discharge machining or beads blasting. Alternatively, stainless or Koval plates in each of which a square hole corresponding to chip size is formed by punching or etching may be used as the spacers 3301. A monocrystalline silicon substrate may be anisotropically etched with a KOH aqueous solution to form the spacers 3301. The spacers 3301 are bonded to the substrate 3102 and the package upper cover 3302 with, for example, an epoxy-group adhesive with the spacers 3301 put between the substrate 3102 and the package upper cover 3302. Actually, as explained in the first example, substrates 3102 corresponding to a plurality of packages are formed on a wafer and diced into the respective packages.

[Third Example of Fourth Embodiment]

A third example will be explained with reference to FIGS. 138 to 141. FIG. 138A and FIG. 138B are schematic cross-sectional views which explain a light modulator in the third example. FIG. 138A shows the non-driven state of the modulator and FIG. 138B shows the driven state of the modulator. In FIG. 138A and FIG. 138B, the same reference symbols as those shown in FIG. 127A and FIG. 127B denote the same or corresponding constituent elements.

The difference in configuration of the third example from the first example is that the light emission element 3304 is formed on the substrate 3102, a waveguide path 3201b which guides light emitted from the light emission element 3304 to the groove 3105, is formed on the substrate 3102 and a hole 3101b which causes the light guided by the waveguide path 3210b to pass is formed in the beam 3101. While the beam 3101 is a both-end-fixed beam, a one-end-fixed beam may be used.

Each beam 3101 is flat when no driving voltage is applied to the electrode pad 3107 of the beam 3101. As shown in FIG. 138A, therefore, light guided by the waveguide path 3201b is reflected by a fixed electrode 3103 in the direction of a shielding film 3306 and shielded by a metallic film 3106 on the beam 3101. Therefore, the light is not outputted from the window 3313 of the shielding film 3306 to the outside of the package. If a driving voltage is applied to the electrode pad 3107 of a certain beam 3101, the beam 3101 is attracted to the fixed electrode 3103. Therefore, as shown in FIG. 138B, the light guided by the waveguide path 3201b into the groove 3105 passes through the hole 3101b of the beam 3101, reflected by the metallic film 3106 on the beam 3101 and outputted to the outside in the direction of the window 3313.

Manufacturing steps in the third example of will be explained with reference to FIGS. 139 to 141.

Figure 139A:
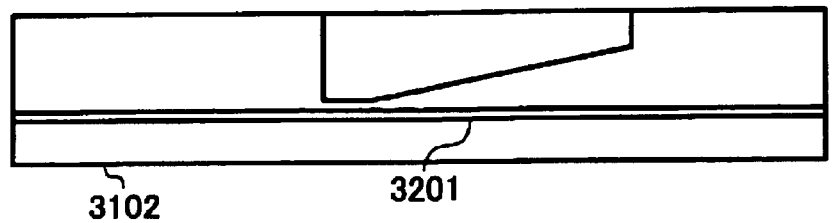

In FIG. 139A, an Si substrate 3102 is thermally oxidized to form a thermal oxide film having a thickness of 1 μm. As the core layer of the waveguide path 3201b, a SiN film is formed to have a thickness of 5.2 μm at a substrate temperature of 300° C. with mixed gas of $SiH_4$ and $NH_3$ by the plasma CVD method. A groove which becomes the gap is formed by patterning an organic photoresist. The groove is formed by, for example, dry etching by means of RIE with mixed gas of $CF_4$ and $H_2$. If the groove is inclined, a gradation is provided on the photomask and an inclination is formed in the thickness direction of the resist pattern. If RIE is performed, a structure according to the gradation of the photomask is transferred to the groove of the SiN layer.

Figure 139B:
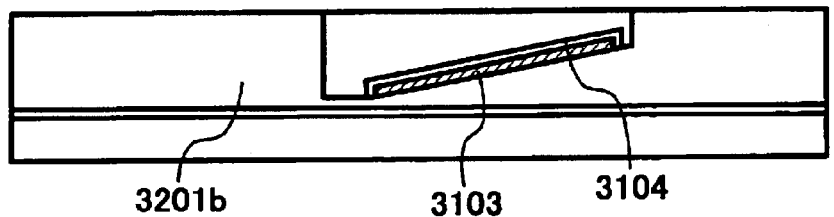

In FIG. 139B, a conductive thin film such as TiN is formed by sputtering. The pattern of the fixed electrode 3103 is formed by patterning an organic resist by photolithography and the conductive thin film is etched by RIE with $Cl_2$ gas to thereby form the fixed electrode 3103. A SiN film which becomes a passivation film 3104 is formed by the thermal CVD method with mixed gas of $SiH_4$ and $NH_3$.

Figure 139C:
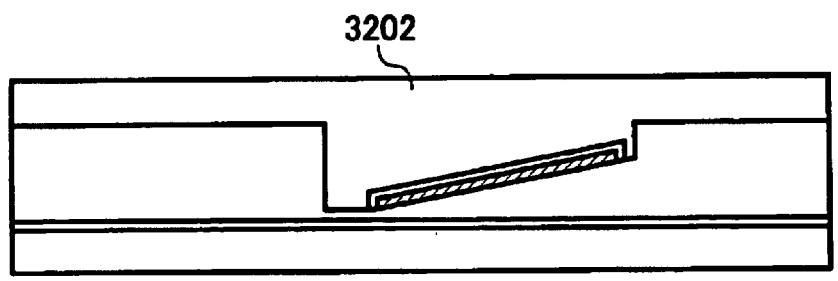

In FIG. 139C, an oxide film 3202 which becomes the sacrificial layer is formed by the thermal CVD method with mixed gas of $PH_3$, $B_2H_2$, $SiH_4$ and $N_2O$. Reflow is performed at a temperature of 1000° C. to flatten the oxide film 3202. The oxide film 3202 is polished by CMP (Chemical Mechanical Polishing) to further flatten the oxide film 3202.

Figure 139D:
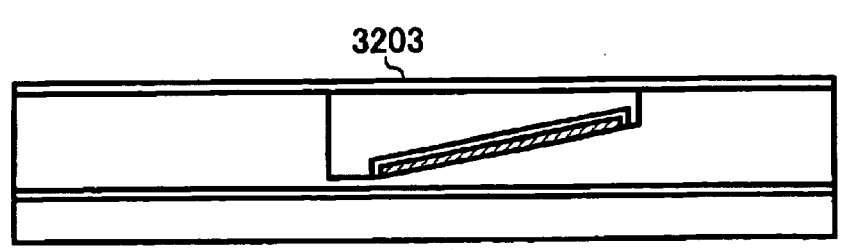

In FIG. 139D, a SiN film 3203 which becomes the beam 3101 is formed by the thermal CVD method with mixed gas of $SiH_4$ and $NH_3$.

Figure 140A:
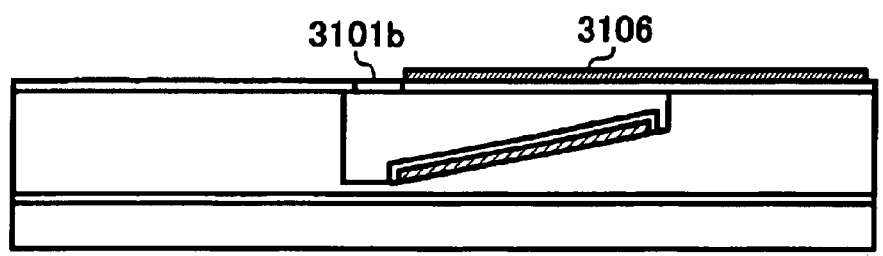
Figure 140B:
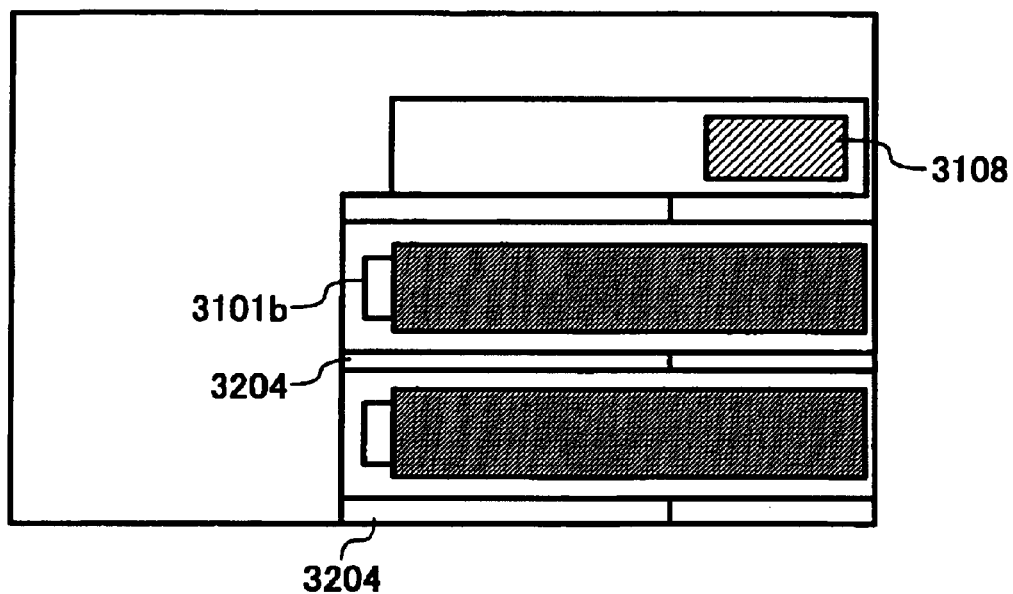

In FIG. 140A and FIG. 140B, the plane shape of the beam 3101 is formed by patterning an organic resist by photolithography and the SiN film 3203 is etched by means of RIE with $CHF_3$ to thereby provide the shape of the beam 3101. The hole 3101b of the beam 3101 is also formed. The sacrificial layer embedded in the groove is exposed by etching slits 3204. The electrode pad 3108 of the fixed electrode 3103 is opened simultaneously with the exposure of the sacrificial layer. A metallic thin film 106, e.g., a Cr film, which becomes a mirror is formed by sputtering, an organic resist is patterned by photolithography and subjected to RIE with mixed gas of $Cl_2$ and $O_2$, thereby forming the metallic film 3106 which serves as the mirror on the beam.

Figure 140C:
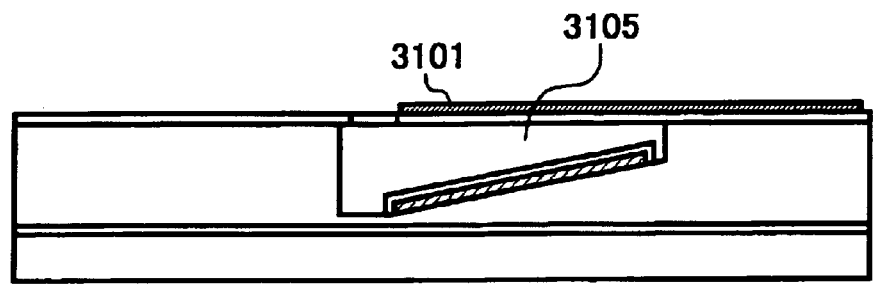
Figure 140D:
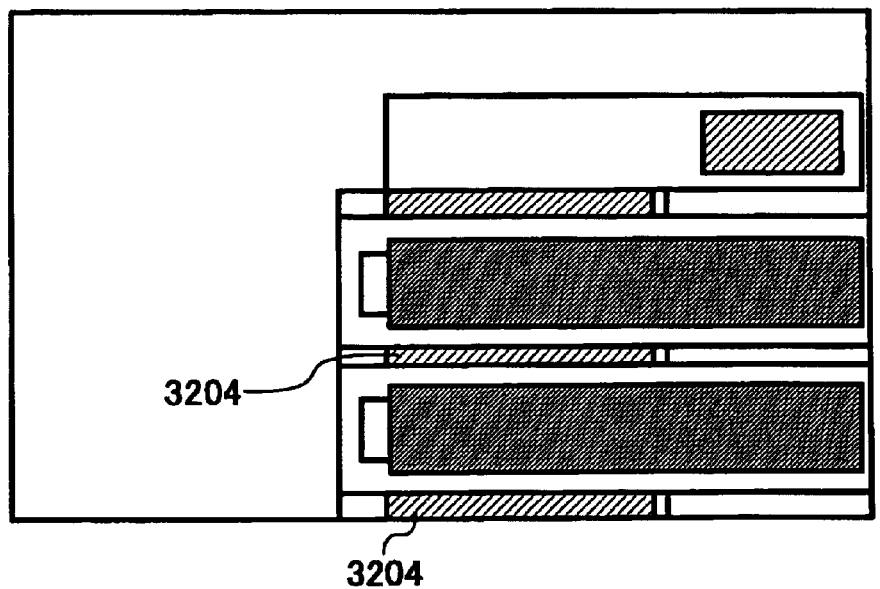

In FIGS. 140C and 140D, the oxide film 3202 which becomes the sacrificial layer is etched away through the slits 3204 with a hydrofluoric acid. By removing the sacrificial layer, the groove 3105 below the beam is completed.

Figure 141A:
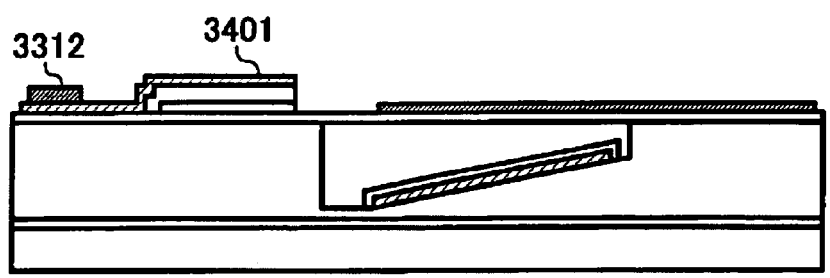
Figure 141B:
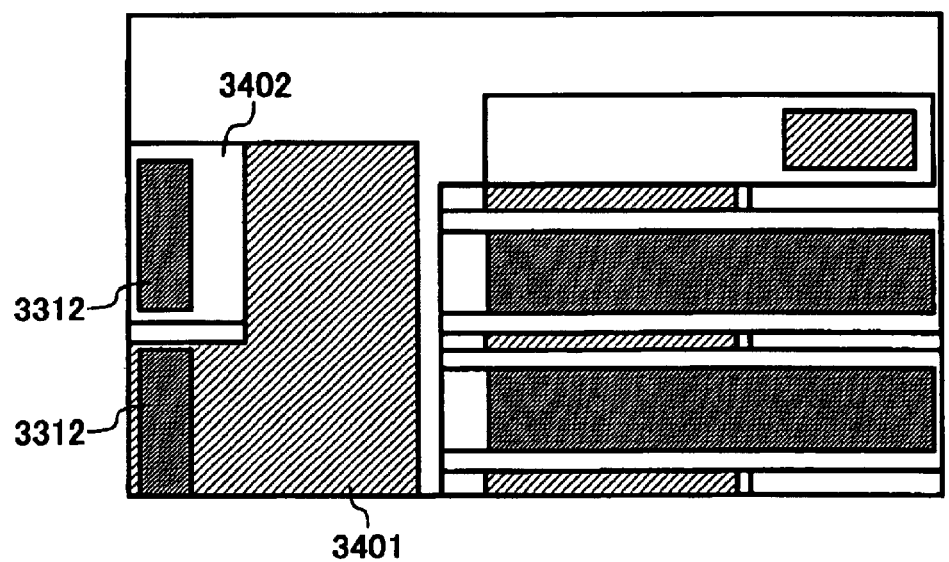

In FIG. 141A and FIG. 141B, to form the light emission element 3304, a metal mask is attached and a transparent conductive film 3402 (ITO) is formed to have a thickness of 100 nm by sputtering. As a hole transport layer, TPD is formed to have a thickness of 55 nm by resistance heating vacuum evaporation. As an electron transport layer, Alq is continuously formed to have a thickness of 55 nm by resistance heating vacuum evaporation. As a metal electrode 3401, an alloy of Mg and In is continuously formed to have a thickness of 150 nm by vacuum evaporation. Using a metal mask, Al is formed by vacuum-evaporation to have a thickness of 500 nm. The electrode pads 3312 are thus formed.

Figure 141C:
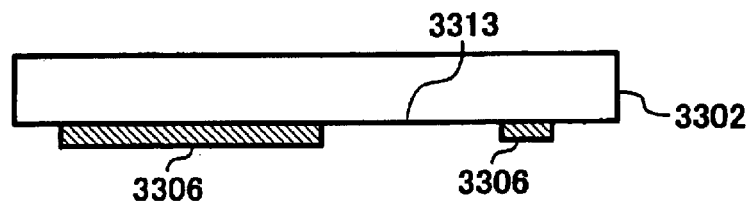
Figure 141D:
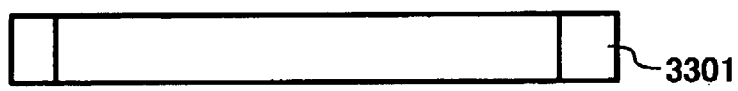
Figure 141E:
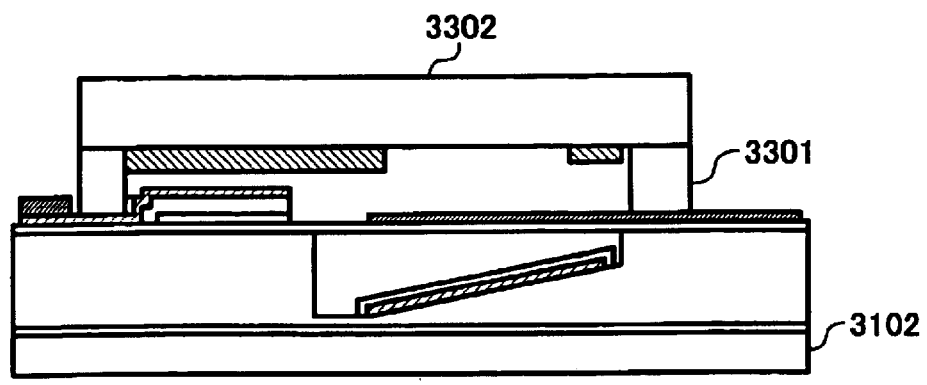

In FIG. 141C, FIG. 141D and FIG. 141E, a Cr film, for example, is formed to have a thickness of 100 nm on the rear surface of the glass substrate which serves as the package upper cover 3302 by sputtering. An organic resist is patterned by photolithography, etched with a mixed aqueous solution of cerium acetate and perchloric acid and the resist is removed with a release solution, thereby forming the shielding film 3306. The window 3313 is formed simultaneously with the shielding film 3306. This package upper cover 3302 is bonded to the substrate 3102 through the spacers 3301 formed in the same manner as that in the preceding examples with, for example, an epoxy-group adhesive. As explained in the preceding examples, since a plurality of packages are actually formed on a wafer, the substrate is diced into a plurality of packages.

(Fifth Embodiment)

A fifth embodiment will be explained with reference to FIGS. 142 to 173.

In FIGS. 142 and 143, a light modulator 4000 which modulates light by changing the reflection direction of incident light consists of a reflection unit 4001 which regularly reflects the incident light, a thin film, both-end-fixed beam (center beam) 4002 which is formed out of a thin film constituted to be combined with the reflection unit 4001 provided on one side surface of the beam 4002, which has both ends fixed and which is deformed by an electrostatic force; a substrate electrode 4003 which is opposed to the other side surface of the thin film, both-end-fixed beam (center beam) 4002 and which applies a driving voltage to the thin film, both-end-fixed beam (center beam) 4002, a gap 4004 formed by opposing the substrate electrode 4003 to the thin film, both-end-fixed beam (center beam) 4002, a substrate 4005 which has the substrate electrode 4003 formed on the bottom of the gap 4004 and which holds and fixes the both ends of the thin film, both-end-fixed beam (center beam) 4002, and a cover member 4006 which is formed to be attached onto the substrate 4005, which includes the thin film, both-end-fixed beam (center beam) 4002 and the gap 4004 in a vacuum space (C) and which is made of a transparent material. According to the light modulator 4000, the structure of modulating light by changing the reflection direction of the incident light is simple, response is fast, the wavelength of the incident light to be used is not limited, the driving voltage is stably low, operation is stable, reliability is high, the number of manufacturing steps is small and cost is low.

An electrostatic force acting on the thin film, both-end-fixed beam (center beam) 4002 is generated by applying a driving voltage between the thin film, both-end-fixed beam (center beam) 4002 and the reflection unit 4001 which also functions as an electrode formed on the thin film, both-end-fixed beam (center beam) 4002 and which is made of a metallic thin film through the gap 4004, from the substrate electrode 4003 formed to be opposed to the thin film, both-end-fixed beam (center beam) 4002 through the gap 4004 and thereby bending the thin film, both-end-fixed beam (center beam) 4002.

Although not shown in FIG. 142, an electrode section which can apply a driving voltage is formed on the thin film, both-end-fixed beam (center beam) 4002.

The thin film, both-end-fixed beam (center beam) 4002 is formed out of a monocrystalline silicon thin film, a polycrystalline silicon thin film, an amorphous silicon thin film, a silicon nitride thin film, a metallic thin film or the like. The thin film, both-end-fixed beam (center beam) 4002 formed out of the monocrystalline silicon thin film has fewer defects and sustains longer life.

If the thin film, both-end-fixed beam (center beam) 4002 is formed out of the polycrystalline silicon thin film or the amorphous silicon thin film, the CVD method or the like can be used for a manufacturing method for the light modulator, making it possible to reduce cost.

If the thin film, both-end-fixed beam (center beam) 4002 is formed out of the silicon nitride thin film, switching response speed can be accelerated by the action of the tensile stress of the silicon nitride thin film. If the thin film, both-end-fixed beam (center beam) 4002 is formed out of the metallic thin film, the thin film, both-end-fixed beam (center beam) 4002 can function as the electrode section, which is not shown, of the thin film, both-end-fixed beam (center beam) 4002 and as the reflection unit 4001, making it possible to provide the light modulator 4000 at low cost.

The reflection unit 4001 which is formed on the surface of the thin film, both-end-fixed beam (center beam) 4002 and which reflects incident light beams is normally formed out of a metallic thin film. It is also possible to form the reflection unit 4001 out of a multilayer film of a dielectric material.

The other electrode which generates an electrostatic force may be formed on the thin film, both-end-fixed beam (center beam) 4002 independently. However, if the reflection unit 4001 which reflects incident light beams is formed out of the metallic thin film, the metallic thin film of the reflection unit 4001 can function as the other electrode.

If the thin film, both-end-fixed beam (center beam) 4002 is formed out of the monocrystalline silicon or polycrystalline silicon thin film and impurities are diffused into the monocrystalline or polycrystalline silicon to decrease resistance, then the beam 4002 can function as an electrode.

The electrode 4003 which drives the thin film, both-end-fixed beam (center beam) 4002 is formed out of metal, such as Al, Cr, Ti or TiN, or a metallic compound thin film. All of or a part of the electrode 4003 is formed in the gap 4004 formed on the substrate 4005.

All of or a part of the gap 4004 which generates an electrostatic force is formed on the substrate 4005. As the material of the substrate 4005, various materials are available including optical glass, ceramics, monocrystalline silicon or metal.

If the substrate 4005 is made of optical glass, it is possible to observe the state of the thin film, both-end-fixed beam (center beam) 4002 from the rear side of the substrate 4005, which is advantageous to the inspection of the light modulator 4000.

If the substrate 4005 is made of monocrystalline silicon, it is possible to form a driving electrode within the substrate 4005 by the diffusion method.

Further, using the diffusion method, a wiring matrix can be formed, which is advantageous to the formation of many complex wirings.

It is also possible to form a part of or all of a driving circuit which applies a voltage to the thin film, both-end-fixed beam (center beam) 4002, within the silicon substrate 4005.

If the substrate 4005 is made of optical glass and the substrate electrode 4003 is formed out of a transparent conductive film (ITO), then it is possible to observe the state of the thin film, both-end-fixed beam (center beam) 4002 from the rear side of the substrate 4005, which is advantageous to the inspection of the light modulator 4000.

In addition, if the substrate 4005 is made of monocrystalline silicon, the substrate electrode 4003 can be formed within the silicon of the substrate 4005 by diffusing impurities different in conductive type from that of the silicon into the silicon.

If the substrate 4005 is made of a conductive material such as metal, the substrate electrode 4003 is formed through an insulation material.

A protection film 4003a functions to prevents the contact between the thin film, both-end-fixed beam (center beam) 4002 and the substrate electrode 4003 and the occurrence of short-circuit.

As the material of the protection film 4003a, an insulation material, particularly an oxide film formed by the vacuum film formation method is normally used.

An opening section 4008 serving as a section which connects the substrate electrode 4003 to an external signal is sometimes formed in the protection film 4003a.

The cover member 4006 can be formed out of a light transmission material such as glass or plastic.

However, it is preferable to form the cover member 4006 out of a glass material so as to improve the reliability of the light modulator 4000. As the glass material, quartz glass, Pyrex glass or the like can be used.

The cover member 4006 is connected or bonded to the substrate 4005 on attachment sections 4006*a* so as to include the thin film, both-end-fixed beam (center beam) 4002 and the gap 4004 on the substrate 4005. The interior of the cover member 4006 is kept to be the vacuum space (C) in a vacuum atmosphere.

In addition, since an engraved section 4006*f* is formed inside of the attachment sections 4006 attached to the substrate 4005, it is possible to facilitate and ensure the attachment of the cover member 4006 to the substrate 4005.

The cover member 4006 can be bonded to the substrate 4005 by an adhesive made of an organic material or an inorganic material.

Alternatively, the cover member 4006 can be bonded to the aged substrate 4005 by a metallic seal layer using a seal member made of a low melting point metallic material such as indium or antimony instead of the adhesive. In this case, since the seal section is fixedly bonded, it is possible to ensure preventing vacuum leakage.

In addition, if the cover member 4006 is made of a material containing movable ions, the cover member 4006 can be connected to the substrate 4005 by anodic junction.

By bonding or connecting the cover member 4006 to the substrate 4005, the portion surrounded by the cover member 4006 and the substrate 4005 is kept to be the vacuum space (C). The vacuum space (C) surrounded by the cover member 4006 and the substrate 4005 includes at least the gap 4004 and the thin film, both-end-fixed beam (center beam) 4002.

By forming the deformed space of the thin film, both-end-fixed beam (center beam) 4002 into the vacuum space (C) in a vacuum atmosphere by the substrate 4005 and the cover member 4006, the driving frequency characteristic of the thin film, both-end-fixed beam (center beam) 4002 is improved to thereby reduce the driving voltage.

If the thin film, both-end-fixed beam (center beam) 4002 is attracted toward the substrate electrode 4003, no air exists between the thin film, both-end-fixed beam (center beam) 4002 and the substrate electrode 4003. Therefore, no resistance which may prevent the deformation of the thin film, both-end-fixed beam (center beam) 4002 or which may make it difficult to deform the thin film, both-end-fixed beam (center beam) 4002, is generated in the thin film, both-end-fixed beam (center beam) 4002 due to lack of the compression of air which may occur by the deformation of the thin film, both-end-fixed beam (center beam) 4002. It is, therefore, possible to provide the light modulator 4000 capable of preventing the occurrence of adverse influences such as the deterioration of the frequency characteristic of the thin film, both-end-fixed beam (center beam) 4002 when being deformed or the increase of the driving voltage driving the thin film, both-end-fixed beam (center beam) 4002.

The cover member 4006 of the light modulator 4000 can keep the deformed space of the thin film, both-end-fixed beam (center beam) 4002 to be the vacuum space (C) in a vacuum atmosphere. This can prevent the occurrence of adverse influences such as the deterioration of the frequency characteristic of the thin film, both-end-fixed beam (center beam) 4002 when being deformed and the increase of the driving voltage driving the thin film, both-end-fixed beam (center beam) 4002. The pressure of the vacuum space (C) in a vacuum atmosphere is preferably not more than $1 \times 10^{-3}$ (Torr). The higher the degree of vacuum, the greater the above-explained advantages become.

To keep the vacuum atmosphere of the vacuum space (C) by the cover member 4006 of the light modulator 4000 and to prevent the occurrence of a stress to the seal section even with the change of environmental temperature to thereby improve reliability, the coefficient of thermal expansion of the material of the cover member 4006 is set to be the same or close to the that of the substrate 4005.

The coefficient of thermal expansion of the material of the cover member 4006 is preferable about 30% or less, more preferably 10% or less.

To keep the vacuum atmosphere of the vacuum space (C), a getter region can be formed in the portion surrounded by the cover member 4006 and the substrate 4005. The getter region can prevent the deterioration of the degree of vacuum and improve the reliability of the light modulator 4000.

A getter material attracts air and forms the state of the vacuum space (C) in a vacuum atmosphere. As the getter material, thorium (Th), vanadium (V), titanium (Ti) or zirconium (Zr) can be used. Among them, titanium (Ti) or zirconium (Zr) is normally used.

The getter region is formed mostly by sputtering.

In addition, on the cover member 4006, if a lens 4006*b*, an anti-reflection film 4006*c*, a shielding film 4006*d* and the like are formed on each of or one of an incident light path and a reflection light path to improve optical characteristic, it is possible to improve light usage efficiency.

If a convex lens is formed, for example, light passing through the cover member 4006 with the lens 4006*b* is incident on the thin film, both-end-fixed beam (center beam) 4002 while being narrowed down, it is possible to form the thin film, both-end-fixed beam (center beam) 4002 with a smaller air.

In addition, the anti-reflection film 4006*c* can be formed on the cover member 4006 to correspond to each of or one of the incident light path and the reflection light path. If the ant-reflection film 4006*c* is formed on the cover member 4006, the reflection loss on the surface is reduced when light passes through the cover member 4006 and light usage efficiency is improved.

In addition, the anti-reflection film 4006*d* can be formed on the cover member 4006 to correspond to each of or one of the incident light path and the reflection light path. If a plurality of light modulators 4000 are arranged to be used as a light modulator assembly 4000 in the form of a one-directional array 4000*a* or a two-directional array 4000*b*, the shielding film 4006*d* formed for the incident light path or the reflection light path can prevent backlight from the adjacent thin film, both-end-fixed beam (center beam) 4002. It is, therefore, possible to provide the light modulator (or light modulator assembly) 4000 capable of preventing backlight from the adjacent thin film, both-end-fixed beam (center beam) 4002 and improving light modulation contrast.

Therefore, it is possible to provide the light modulator 4000 wherein the-deformation of the thin film, both-end-fixed beam (center beam) 4002 is not influenced by the compressive resistance of gas in the air or by the degree of humidity changing according to the change of the external environment, the structure of modulating light by changing the reflection direction of incident light is simple, response is fast, operation is stable, reliability is high, the number of manufacturing steps is small and cost is low.

In FIGS. 144 and 145, when no electrostatic force acts on the thin film, both-end-fixed beam (center beam) 4002, the fixed sections on the both ends of the thin film, both-end-fixed beam (center beam) 4002 are held by and fixed to the substrate 4005.

Incident light beams (R) at that moment are regularly reflected by the surface of the reflection unit 4001 which is constituted to be combined with the thin film, both-end-fixed beam (center beam) 4002 and which is provided on the side surface of the thin film, both-end-fixed beam (center beam) 4002, and moved as indicated by arrows (see FIG. 144).

If viewed from the direction in which the incident light beams (R) are reflected in this state, the light modulator 4000 becomes bright and turns into an ON state by the regular reflection of light on the surface of the reflection unit 4001 constituted to be combined with the thin film, both-end-fixed beam (center beam) 4002 and provided on the side surface thereof.

If a driving voltage is applied between the thin film, both-end-fixed beam (center beam) 4002 and the substrate electrode 4003 to act an electrostatic force on the thin film, both-end-fixed beam (center beam) 4002, the thin film, both-end-fixed beam (center beam) 4002 is bent as while being attracted toward the substrate electrode 4003 and the surface of the reflection unit 4001 constituted to be combined with the thin film, both-end-fixed beam (center beam) 4002 and provided on the side surface thereof is bent. As a result, the incident light beams (R) are influenced by the bending of the thin film, both-end-fixed beam (center beam) 4002 and the reflection directions of the incident light beams (R) are disturbed (see FIG. 146).

In this state, the light modulator 4000 is dark and in an OFF state because of the disturbance of the reflection directions of the incident light beams (R), whereby the light modulator 4000 performs light modulation.

The thin film, both-end-fixed beam (center beam) 4002 of the light modulator 4000 in this embodiment is the thin film, both-end-fixed beam (center beam) 4002 which switches light and which has the both ends held by and fixed to the substrate 4005.

The thin film, both-end-fixed beam (center beam) 4002 of the light modulator 4000 is superior to the cantilever first in stability and the second in response speed.

1. Stability

The cantilever oscillates when an electrostatic force is released and the bending of the cantilever is recovered. This is because only one end of the cantilever is fixed and free oscillation thereby occurs to the cantilever.

In addition, if the cantilever is formed out of a thin film, a residual stress occurs. The cantilever is deformed by the residual stress. Besides, the residual stress is lessened with the passage of time and the deformation state of the cantilever, therefore, changes with the passage of time.

For the above reasons, the cantilever is low in stability.

In case of the thin film, both-end-fixed beam (center beam) 4002 having the fixed both ends, by contrast, since the fixed sections on the both ends of the thin film, both-end-fixed beam (center beam) 4002 are held by, fixed to and thereby constrained by the substrate 4005, free oscillation hardly occurs.

Further, even if there is a residual stress, the position of the thin film, both-end-fixed beam (center beam) 4002 is determined by the constraint points of the fixed sections on the both ends thereof and the thin film, both-end-fixed beam (center beam) 4002 is not deformed and the deformation of the thin film, both-end-fixed beam (center beam) 4002 does not change with the passage of time.

2. Response speed

The signal response of the cantilever deteriorates due to the free oscillation of the cantilever.

Since the thin film, both-end-fixed beam (center beam) 4002 having the fixed both ends does not have the free oscillation problem, the response speed thereof is fast.

In FIGS. 146 and 147, the gap 4004 formed below the thin film, both-end-fixed beam (center beam) 4002 is formed non-parallel to the thin film, both-end-fixed beam (center beam) 4002 (see FIG. 146).

The non-parallel shape of the gap 4004 relative to the thin film, both-end-fixed beam (center beam) 4002 is effective to decrease voltage required to deform the thin film, both-end-fixed beam (center beam) 4002. The electrostatic force acting on the thin film, both-end-fixed beam (center beam) 4002 is inversely proportional to the distance between the thin film, both-end-fixed beam (center beam) 4002 and the substrate electrode 4003.

Namely, the shorter the distance between the thin film, both-end-fixed beam (center beam) 4002 and the substrate electrode 4003, the higher the electrostatic force acting on the thin film, both-end-fixed beam (center beam) 4002. For that reason, if a driving voltage is applied to the thin film, both-end-fixed beam (center beam) 4002, the deformation of the thin film, both-end-fixed beam (center beam) 4002 starts in the narrower portion of the gap 4004.

In addition, the gap 4004 becomes narrower in accordance with the deformation of the thin film, both-end-fixed beam (center beam) 4002. The deformation of the thin film, both-end-fixed beam (center beam) 4002 progresses at a lower voltage than that applied the beam in a case in which the gap is parallel and the deformed thin film, both-end-fixed beam (center beam) 4002 is in contact with the bottom of the gap 4004 (see FIG. 147).

By this deformation state, the deformed thin film, both-end-fixed beam (center beam) 4002 is always kept in a fixed shape by the shape of the gap 4004, thereby making the reflection directions of the incident light beams (R) fixed.

In FIGS. 148 and 149, in a plurality of light modulators 4000 explained above, the thin film, both-end-fixed beams (center beams) 4002 each of a hexagonal shape formed on the respective substrates 4005 are arranged in a staggered fashion in the form of a one-dimensional array 4000$a$ (see FIG. 148) or in the form of a two-dimensional array 4000$b$ (see FIG. 149). It is, therefore, possible to provide the small-sized, high density light modulators 4000 capable of line light modulation or plane light modulation.

In FIGS. 150 to 163, the light modulator 4000 is manufactured as follows. The gap 4004, formed by opposing the thin film, both-end-fixed beams (center beams) 4002 to the substrate electrode 4003, is formed on the substrate 4005, a sacrificial material layer 4007 made of a sacrificial material is formed to thereby flatten the substrate 4005, the thin film, both-end-fixed beams (center beams) 4002 is formed, the sacrificial material layer 4007 is removed and then the cover member 4006 is attached onto the substrate 4005. Namely, the light modulator 4000 is manufactured by a gap formation step (a) of forming the gap 4004, formed by opposing the thin film, both-end-fixed beams (center beams) 4002 to the substrate 4003, on the substrate 4005 by a thin film formation method or a micromachining method; a substrate electrode formation step (b) of forming all of or a part of the substrate electrode 4003 on the bottom of the gap 4004 on the substrate 4005; a sacrificial material layer formation step (c) of, after forming the sacrificial material layer 4007 made of a sacrificial material in the gap 4004 on the substrate 4005, polishing and thereby flattening the sacrificial material layer; a thin film, both-end-fixed beams (center beams) formation step (d) of forming the thin film, both-end-fixed beams (center beams) 4002 on the sacrificial material layer 4007; a sacrificial material layer removal step (E) of removing the sacrificial material layer 4007 in the gap 4004; an opening section formation step (f) of forming an opening section 4008 which connects the substrate electrode 4003 to an external signal; and a cover member attachment step (g) of attaching the cover member 4006 onto the substrate 4005.

At the gap formation step (a), the substrate 4005 is a silicon substrate on which an oxide film is formed. The gap 4004 is formed on the substrate 4005 by photolithography and dry etching. If a photomask on which an area gradation pattern is formed is used or a resist material thermal deformation method or the like is used, it is possible to form the non-parallel gap 4004. The gap 4004 is formed to have a width of 20 μm and a depth of 2.4 μm (see FIG. 150 and 151).

At the substrate electrode formation step (b), the substrate electrode 4003 is formed out of a TiN thin film in the gap 4004. The TiN thin film is formed to have a thickness of 0.01 μby sputtering with Ti as a target. The Ti thin film is formed into the substrate electrode 4003 having a width of 20 μm by photolithography and dry etching. A part of the substrate electrode 4003 is projected from the gap 4004 to the surface of the substrate 4005 since the substrate electrode 4003 is connected to an external signal (see FIGS. 152 and 153).

At the sacrificial material layer formation step (c), an oxide film serving as the protection film 4003a is formed by the plasma CVD method. An amorphous silicon layer serving as the sacrificial material layer 4007 is formed on the substrate 4005 as to cover the substrate electrode 4003 and the protection film 4003a until the gap 4004 is buried. The sacrificial material layer 4007 is removed and flattened by polishing or dry etching by etch-back except for the portion on the gap 4004 (see FIGS. 154 and 155).

At the thin film, both-end-fixed beams (center beams) formation step (d), a silicon nitride film which is the material of the thin film, both-end-fixed beams (center beams) 4002 is formed to have a thickness of 0.04 ∞m on the entire surface of the protection film 4003a by the thermal CVD method.

The Al thin film of the reflection unit 4001 which becomes the incident light beam reflection surface is formed to have a thickness of 1.0 μm on the silicon nitride film by sputtering.

The silicon nitride film including the reflection film layer of the reflection unit 4001 is formed into the thin film, both-end-fixed beams (center beams) 4002 having the both ends fixed by photolithography and dry etching.

The thin film, both-end-fixed beams (center beams) 4002 has a width of 20 μm and a length of 27 μm (see FIGS. 156 and 157).

At the sacrificial material layer removal step (E), after the formation of the thin film, both-end-fixed beams (center beams) 4002, the sacrificial material layer 4007 on the protection film 4003a which flattens the gap 4004 is etched away. As a result, the both ends of the thin film, both-end-fixed beams (center beams) 4002 are fixed and the thin film, both-end-fixed beams (center beams) is thereby held and fixed through the gap 4004 (see FIGS. 158 and 159).

At the opening section formation step (f), the opening section 4008 which connects the substrate electrode 4003 to an external signal is formed in the protection film 4003a and the thin film, both-end-fixed beams (center beams) 4002 is formed (see FIGS. 160 and 161).

At the cover member attachment step (g), the attachment section 4006a of the cover member 4006 which is separately formed, is connected to the substrate 4005 by anodic junction in a vacuum, thereby completing the light modulator 4000 (see FIGS. 162 and 163).

In FIGS. 164 to 171, the cover member 4006 which is attached to the substrate 4005 on the attachment section 4006a by anodic junction, is manufactured at a cover member substrate formation step (h), a lens formation step (i), an engraved section formation step (j) and a shielding film formation step (k).

At the cover member substrate formation step (h), a cover member substrate 4006e is formed out of Pyrex glass having a thickness of 500 μm. The difference in the coefficient of thermal expansion between the Pyrex glass of the cover member substrate 4006e and the silicon wafer of the substrate 4005 is not more than 0 to 30%, preferably not more than 10% (see FIGS. 164 and 165).

At the lens formation step (i), a convex lens for the lens 4006b is formed on the cover member substrate 4006e by photolithography and dry etching.

If a density gradation photomask or a photomask on which an area gradation pattern is formed, a resist material thermal deformation method or the like is used, then the lens 4006b having a desired size can be shaped.

In this example, the convex lens for the lens 4006b having a diameter of 25 μm and a height of 17 μm is formed and further the anti-reflection film 4006c is formed out of an SiO/SiN multilayer film (see FIGS. 166 and 167).

At the engraved section formation step (j), the engraved section 4006f having a depth of 200 μm is formed on the surface of the cover member substrate 4006e opposite to the surface on which the convex lens for the lens 4006b is formed, by photolithography and dry etching (see FIGS. 168 and 169).

At the shielding film formation step (k), which is a final step, a chromium thin film serving as the shielding film 4006d is formed to have a thickness of 0.15 nm on the engraved section 4006f by sputtering. The chromium thin film on the convex lens portion for the lens 4006b is removed by photolithography and dry etching, thereby completing the cover member 4006 (see FIG. 170).

Therefore, it is possible to provide a light modulator manufacturing method of manufacturing the light modulator 4000 wherein the simple of modulating light by changing the reflection direction of incident light is simple, response is fast, the wavelength of the incident light to be used is not limited, the driving voltage is low, operation is stable, reliability is high, the number of manufacturing steps is small and cost is low.

In FIG. 172, an image formation apparatus 4100 which forms an image by writing optical data by an electrophotographic process, consists of a drum-shaped photosensitive body of an image carrier 4101 which is held rotatably in an arrow A direction and carries an image to be formed and a latent image formation unit 4102 which consists of a plurality of light modulators 4000. The image formation apparatus 4100 forms a latent image by writing optical data on the drum-shaped photosensitive body of the image carrier 4101 uniformly charged by a charge unit 4105, by the latent image formation unit 4102. The image formation apparatus 4100 develops the latent image formed by the light modulators 400 of the latent image formation unit 4102 by a development unit 4103 to thereby form a toner image. The toner image formed by the development unit 4103 is transferred to a to-be-transferred body (P) by a transfer unit 4103. After the toner image transferred to the to-be-transferred body (P) is fixed by a fixing unit 4106, the to-be-transferred body (P) is discharged to a paper discharge tray 4107 and stored.

The drum-shaped photosensitive body of the image carrier 4101 after the toner image is transferred to the to-be-transferred body (P) by the transfer unit 4104, is cleaned by a cleaning unit 4108 to be prepared for image formation at the next step.

The latent image formation unit 4102 applies incident light beams (R) from a light source 4102a to a plurality of light modulators 4000 arranged in the form of a one-dimensional array 4000*a*, through the first lens system 4102*b*. Each of the light modulators 4000 directs the light beams (R) to the surface of the drum-shaped photosensitive body of the image carrier 4101 through the light reflection unit 4001 to thereby form an image on the surface of the drum-shaped photo sensitive body of the image carrier 4101 through the second lens system 4102*c*. Therefore, it is possible to provide the image formation apparatus 4100 including the light modulators 4000 each of which has a simple structure of modulating light by changing the reflection direction of the incident light beams (R), which has fast response, does not limit the wavelength of incident light beams (R) to be used, performs a stable operation, ensures high reliability, has fewer manufacturing steps and can reduce cost.

In FIG. 173, an image projection and display apparatus 4200 which displays and projects an image includes a light switching unit 4201. The light switching unit 4201 consists of the light modulator 4000 which modulates light by changing the reflection direction of incident light beams (R) of projected image data. The light modulator 4000 projects an image to a projection screen 4202 and displays the image on the projection screen 4202.

In the light switching unit 4201, the incident light beams (R) from a light source 4201*a* are applied to a plurality of light modulators 4000 arranged in the form of a two-dimensional array, reflected by the mirror of the reflection unit 4001 of each light modulator 4000 and projected to the projection screen 4202 through a projection lens 4201*b* and a diaphragm 4201*c*.

For color display, a rotary color hole 4201*d* may be provided in front of the light source 4201*a* or a micro-lens array 4201*e* may be used to improve performance.

Therefore, it is possible to provide the image projection and display apparatus 4200 which includes the light modulators each of which has a simple structure of modulating light by changing the reflection direction of the incident light beams (R), has fast response, does not limit the wavelength of incident light beams (R) to be used, performs a stable operation, ensures high reliability, has fewer manufacturing steps and can reduce cost.

It is noted that the present invention is not limited to the embodiments explained above but can be executed while appropriately modifying the invention within the scope of the invention.

As explained so far, according to the present invention, the substrate has the substrate electrode, which is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which can use the light reflection film as an electrode, which can make the structure of modulating light by changing the reflection direction of the incident light simpler, which has fast response, which uses the incident light without limiting the wavelength thereof, which operation is stable and which has high reliability.

Further, according to the present invention, the substrate has the substrate electrode, which is opposed to the center beam, formed out of a thin film constituted to be combined with the light reflection film regularly reflecting incident light, formed out of a metallic thin film and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which allows the light reflection film to also function as an electrode, which can make the structure of modulating light by changing the reflection direction of the incident light simpler, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film provided on one surface of the center beam, having both ends fixed, made of a low resistance material and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which allows the center beam to also function as an electrode, which can make the structure of modulating light by changing the reflection direction of the incident light simpler, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed by decreasing resistance of silicon by injecting impurities into the silicon, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which allow the center beam to also function as an electrode, which can make the structure of modulating light by changing the reflection direction of the incident light simpler, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a monocrystalline silicon film, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which has the center beam which has fewer defects and sustains longer life, which has the simple structure of modulating light by changing the reflection direction of the incident light, which has fast response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a polycrystalline silicon film, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which can reduce cost since the CVD method or the like can be employed for the formation of the center beam, which has the simple structure of modulating light by changing the reflection direction of the incident light, which has fast response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which can accelerate switching response speed by the action of a tensile stress, which has the simple structure of modulating light by changing the reflection direction of the incident light, which has faster response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. Therefore, it is possible to provide the light modulator which has the both ends of the center beam constrained to thereby suppress the occurrence of free oscillation, decrease deformation and the change of the deformation with the passage of time and to accelerate response speed, which can make the structure of modulating light by changing the reflection direction of the incident light simpler, which has faster response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. In addition, the distance between one edge and the other edge of the two edges on the both ends, opposed each other, of the center beam held by the substrate is fixed to be equal to or larger than a length of one of the one edge and the other edge of the two edges. Therefore, it is possible to provide the light modulator which can be driven at a low voltage, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. In addition, a plurality of light reflection films, a plurality of center beams and a plurality of substrate electrodes are arranged in a form of a one-dimensional array on the substrate. Therefore, it is possible to provide the light modulator which can perform line-shaped light modulation, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the parallel opposed surface, which is a parallel surface opposed to the center beam opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. Therefore, it is possible to provide the light modulator which turns into a dark, OFF state since the direction of the reflection light of the incident light is disturbed, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the parallel opposed surface, which is a partially non-parallel opposed surface which is a partially non-parallel surface opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. Therefore, it is possible to provide the light modulator which can be driven at a low driving voltage, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has a plurality of non-parallel opposed surfaces which are non-parallel surfaces opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has an entirely non-parallel opposed surface which is an entirely non-parallel surface opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate made of a light transmission glass material has the substrate electrode, which is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which allows observing the state of the center beam from the rear side of the substrate, which is advantageous to product inspection, which has the simple structure of modulating light by changing the reflection direction of the incident light, which has fast response, which uses the incident light without limiting the wavelength thereof, which operation is stable and which has high reliability.

According to the present invention, the substrate made of a monocrystalline silicon material has the substrate electrode, which is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which allows forming the electrode by diffusing impurities into the monocrystalline silicon of the substrate, which has the simple structure of modulating light by changing the reflection direction of the incident light, which has fast response, which uses the incident light without limiting the wavelength thereof, which operation is stable and which has high reliability.

According to the present invention, the substrate made of a monocrystalline silicon material and having a driving circuit thereon has the substrate electrode, which is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which allows forming the electrode by diffusing impurities into the monocrystalline silicon of the substrate, which allows forming a part of or all of the electronic circuits of the driving circuit on the substrate by the diffusion method, which can make the structure of modulating light by changing the reflection direction of the incident light simpler, which has fast response, which uses the incident light without limiting the wavelength thereof, which operation is stable and which has high reliability.

According to the present invention, the substrate holds the to-be-held section of the center beam, the substrate which is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section. In addition, the gap formed between the center beam held by the substrate and the substrate electrode opposed to the center beam and formed on the concave section of the substrate, consists of a non-parallel inclined surface. Therefore, it is possible to provide the light modulator which allows forming the electrode by diffusing impurities into the monocrystalline silicon of the substrate, which allows forming a part of or all of the electronic circuits of the driving circuit on the substrate by the diffusion method, which has the simple structure of modulating light by changing the reflection direction of the incident light, which has fast response, which uses the incident light without limiting the wavelength thereof, which operation is stable and which has high reliability.

According to the present invention, the substrate holds the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section. In addition, the gap formed between the center beam and the substrate electrode opposed to the center beam, consists of a non-parallel inclined surface between two edges on the both ends, opposed each other, of the center beam held by the substrate. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate holds the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section. In addition, the gap formed between the center beam and the substrate electrode opposed to the center beam and consisting of the non-parallel inclined surface, is shaped to be the largest in a central section of the center beam held by the substrate and to gradually enlarge from the two edges on the opposed both ends of the center beam toward the central section of the center beam. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate holds the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section. In addition, the gap formed between the center beam and the substrate electrode opposed to the center beam and consisting of the non-parallel inclined surface, is shaped to be the largest in a central section of the center beam held by the substrate and to gradually enlarge from the two edges on the opposed both ends of the center beam and other two edges of the center beam toward the central section of the center beam. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate holds the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section. In addition, the gap formed between the center beam and the substrate electrode opposed to the center beam and consisting of the non-parallel inclined surface, is shaped to be the largest near one of the two edges on the opposed both ends of the center beam held by the substrate and to gradually enlarge from the other edge of the two edges on the opposed both ends of the center beam held by the substrate toward the one edge. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate holds a plurality of divided to-be-held sections divided from the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section. In addition, the gap formed between the center beam and the substrate electrode opposed to the center beam and consisting of the non-parallel inclined surface, is shaped to be the largest near one of the two edges on the opposed both ends of the center beam held by the substrate and to gradually enlarge from the other edge of the two edges on the opposed both ends of the center beam held by the substrate toward the one edge. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate holds a plurality of divided to-be-held sections divided from the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate has a plurality of divided to-be-held sections divided from the to-be-held section of the center beam, arranged in a corner section of the center beam and holds the plurality of divided to-be-held sections. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is more stable and which has high reliability.

According to the present invention, the substrate holds a plurality of divided to-be-held sections divided from the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds a plurality of divided to-be-held sections divided from the to-be-held section of the center beam by a smooth outline section. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable, which prevents the concentration of stress and which has higher reliability.

According to the present invention, the substrate holds a plurality of divided to-be-held sections divided from the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate has a plurality of divided to-be-held sections divided from the to-be-held section of the center beam, arranged in a corner section of the center beam and holds the plurality of divided to-be-held sections. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is more stable and which has high reliability.

According to the present invention, the substrate holds a plurality of divided to-be-held sections divided from the to-be-held section of the center beam, the substrate is opposed to the center beam, formed out of a thin film constituted to be combined with the light reflection film regularly reflecting incident light and provided on one surface of the center beam, having both ends fixed and deformed by an electronic force, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section, consisting of a folded structure section, of the center beam. Therefore, it is possible to provide the light modulator which has the simple structure of modulating light by changing the reflection direction of the incident light, which has fast response, which uses the incident light without limiting the wavelength thereof, which operation is stable and which has higher reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the parallel opposed surface, which is a partially non-parallel opposed surface which is a partially non-parallel surface opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. In addition, the to-be-held section of the center beam held by the substrate near a portion, in which a gap formed between at least the center beam and the substrate electrode opposed to the center beam and consisting of a non-parallel inclined surface has a largest clearance, consists of a plurality of divided to-be-held sections. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and formed out of a silicon nitride thin film, through a gap formed on the other surface of the center beam and which substrate electrode has the parallel opposed surface, which is a partially non-parallel opposed surface which is a partially non-parallel surface opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds and fixes the two edges on the both ends, opposed each other, of the to-be-held section of the center beam. In addition, the to-be-held section of the center beam held by the substrate near a portion, in which a gap formed between at least the center beam and the substrate electrode opposed to the center beam and consisting of a non-parallel inclined surface has a largest clearance, consists of a folded structure section. Therefore, it is possible to provide the light modulator which can be driven at a lower driving voltage, which has the simple structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. Therefore, it is possible to provide the light modulator which can obtain a higher driving frequency, which has the simple structure of modulating light by changing the reflection direction of the incident light, which has fast response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam alight reflection film regularly reflecting incident light, formed in the concave section, and the substrate holds the to-be-held section of the center beam. In addition, if combinations of thicknesses (t) of a plurality of members constituted to be combined with the center beam and stresses (s) including a tensile stress with a plus sign and a compressive stress with a minus sign are $(t_1, s_1)$, $(t_2, s_2)$, ... $(t_n, s_n)$, the center beam satisfies $t_1 \cdot s_1 + t_2 \cdot s_2 + \ldots + t_n \cdot s_n / t_1 + t_2 + \ldots + t_n = 0$. Therefore, it is possible to provide the light modulator which can make a driving frequency high, which has the simple structure of modulating light by changing the reflection direction of the incident light, which has fast response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. In addition, the center beam has a relationship of $(t/1)^2 = s/E$ with respect to a tensile stress (s), a thickness (t), Young's modulus(E) of a formation material, a distance (1) between one edge and the other edge of two edges on the both ends, opposed each other, of the center beam. Therefore, it is possible to provide the light modulator which can be driven at a lower driving voltage, which has the structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam light reflection film regularly reflecting incident light, formed in the concave section, and the substrate holds the to-be-held section of the center beam. In addition, all of or a part of a driving circuit driving the center beam is formed on the substrate. Therefore, it is possible to provide the light modulator which can be driven at a lower driving voltage, which has the structure of modulating light by changing the reflection direction of the incident light, which has fast response, which uses the incident light without limiting the wavelength thereof, which operation is stable, which has high reliability and which is compact.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. In addition, the center beam is abutted on a surface of the substrate and deformed along a clearance shape of a gap formed on the other surface of the center beam by the electronic force generated by the application of the driving voltage to a portion between the center beam and the substrate electrode. Therefore, it is possible to provide the light modulator which can be driven at a lower driving voltage, which has the structure of modulating light by changing the reflection direction of the incident light, which has fast response, which uses the incident light without limiting the wavelength thereof, which operation is stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam.

In addition, after the center beam is deformed by the electronic force generated by the application of the driving voltage to a portion between the center beam and the substrate electrode, a voltage opposite in polarity to the driving voltage is applied to the portion between the center beam and the substrate electrode to an extent not to deform the center beam. Therefore, it is possible to provide the light modulator which can be driven with a high frequency, which has the structure of modulating light by changing the reflection direction of the incident light, which has fast response, which uses the incident light without limiting the wavelength thereof, which operation is more stable and which has high reliability.

According to the present invention, the substrate has the substrate electrode, which is opposed to the center beam, formed out of a thin film constituted to be combined with the light reflection film regularly reflecting incident light and provided on one surface of the center beam, having both ends fixed, deformed by an electronic force and consisting of a member having a tensile stress, through a gap formed on the other surface of the center beam and which substrate electrode has the opposed surface, which is the surface of the substrate electrode opposed to the center beam modulating the incident light on the light reflection film, and which restricts the deformation of the center beam due to application of a driving voltage to the substrate electrode by abutting on the center beam a light reflection film regularly reflecting incident light, formed in the concave section, and the substrate holds the to-be-held section of the center beam. In addition, the center beam is deformed by alternately applying, as the driving voltage, a positive voltage and a negative voltage to a portion between the center beam and the substrate electrode with reference to a potential of the center beam. Therefore, it is possible to provide the light modulator which can be driven with a high frequency, which has the structure of modulating light by changing the reflection direction of the incident light, which has fast response, which uses the incident light without limiting the wavelength thereof, which operation is more stable and which has high reliability.

According to the present invention, after forming the gap on the substrate, a sacrificial material layer made of a sacrificial material is formed to flatten the substrate, the center beam is formed, and then the sacrificial material layer is removed to thereby manufacture the light modulator. Therefore, it is possible to provide the light modulator manufacturing method which has a small number of manufacturing steps and high yield.

According to the present invention, the light modulator manufacturing method includes: a concave section formation step of forming the concave section on the substrate by a thin film formation method or a micromachining method; a substrate electrode formation step of forming all of or a part of the substrate electrode in the concave section on the substrate; a sacrificial material layer formation step of forming the sacrificial material layer made of the sacrificial material, in the concave section on the substrate; a center beam formation step of forming the center beam on the sacrificial material layer; and a sacrificial material layer removal step of removing the sacrificial material layer in the concave section. In addition, after forming the gap on the substrate, a sacrificial material layer made of a sacrificial material is formed to flatten the substrate, the center beam is formed, and then the sacrificial material layer is removed to thereby manufacture the light modulator. Therefore, it is possible to provide the light modulator manufacturing method which has a small number of manufacturing steps and high yield.

According to the present invention, after forming the gap on the substrate, a sacrificial material layer, which is a silicon oxide film, made of a sacrificial material is formed to flatten the substrate, the center beam is formed, and then the sacrificial material layer is removed to there by manufacture the light modulator. Therefore, it is possible to provide the light modulator manufacturing method of using a stable sacrificial material layer, which has a small number of manufacturing steps and high yield.

According to the present invention, after forming the gap on the substrate, a sacrificial material layer, which is one of a polycrystalline silicon film and an amorphous silicon film, made of a sacrificial material is formed to flatten the substrate, the center beam is formed, and then the sacrificial material layer is removed to thereby manufacture the light modulator. Therefore, it is possible to provide the light modulator manufacturing method which has a small number of manufacturing steps and high yield, at low cost since the CVD method can be used.

According to the present invention, after forming the gap on the substrate, a sacrificial material layer, which is an organic material film, made of a sacrificial material is formed to flatten the substrate, the center beam is formed, and then the sacrificial material layer is removed to thereby manufacture the light modulator. Therefore, it is possible to provide the light modulator manufacturing method which can form the sacrificial material layer easily, which cost is low, has a small number of manufacturing steps and high yield.

According to the present invention, a plurality of the light modulators are driven by the independent driving unit, independently of one another. Therefore, it is possible to provide the light information processing apparatus which includes the small-sized light modulators each of which has the simple structure of modulating light by changing the reflection direction of the incident light simpler, which has fast response, which uses the incident light without limiting the wavelength thereof, which operation is stable, which has high reliability and which is low in voltage to, therefore, require low consumption power.

According to the present invention, the toner image formed by the development unit which develops the latent image formed by the above-explained light modulator of the latent image formation unit, which forms the latent image by writing the optical data on the image carrier rotatably held and carrying a to-be-formed image, is transferred onto the to-be-transferred body by the transfer unit and the image is formed. Therefore, it is possible to provide the image formation apparatus which includes the small-sized light modulator which has the simple structure of modulating light by changing the reflection direction of the incident light simpler, which has fast response, which uses the incident light without limiting the wavelength thereof, which operation is stable, which has high reliability and which is low in voltage to, therefore, require low consumption power.

According to the present invention, the image projected by the light modulator of the light switching unit consisting of the above-explained light modulator which modulates light by changing the reflection direction of the incident light on the image projection data and which projects an image, is displayed on the projection screen. Therefore, it is possible to provide the image projection and display apparatus which includes the small-sized light modulator which has the simple structure of modulating light by changing the reflection direction of the incident light simpler, which has fast response, which uses the incident light without limiting the wavelength thereof, which operation is stable, which has high reliability and which is low in voltage to, therefore, require low consumption power.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light, made of a metallic thin film and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which allows the reflection unit to also function as one electrode to thereby reduce cost, which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve further cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed, deformed by an electronic force and consisting of monocrystalline silicon, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which uses the thin film, both-end-fixed beam having fewer defects and sustaining longer life, which has the simple structure of modulating light by changing the reflection direction of the incident light, which has fast response, which uses the incident light without limiting the wavelength thereof, which uses a low driving voltage, which operation is more stable, which has high reliability, which has a small number of manufacturing steps and requires short time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed, deformed by an electronic force and consisting of polycrystalline silicon, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which uses the thin film, both-end-fixed beam which can be formed by the CVD method or the like to thereby reduce cost, which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve further cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed, deformed by an electronic force and consisting of silicon nitride, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which uses the thin film, both-end-fixed beam having accelerated switching response speed by the action of the tensile stress of the silicon nitride thin film, which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, the gap is non-parallel between the thin film, both-end-fixed beam and the substrate electrode. Therefore, it is possible to provide the light modulator which makes the thin film, both-end-fixed beam more deformable, which has the simple structure of modulating light by changing the reflection direction of the incident light, which has fast response, which uses the incident light without limiting the wavelength thereof, which uses a lower driving voltage, which operation is stable, which has high reliability, which has a small number of manufacturing steps and requires short time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, the gap has an apex angle section on a substrate electrode-side bottom. Therefore, it is possible to provide the light modulator which can easily control the bending position of the both-end-fixed beam to thereby improve the reproducibility of the thin film, both-end-fixed beam if the thin film, both-end-fixed beam is bent and to improve an S/N ratio in light modulation, which has the simple structure of modulating light by changing the reflection direction of the incident light, which has fast response, which uses the incident light without limiting the wavelength thereof, which uses a lower driving voltage, which operation is stable, which has higher reliability, which has a smaller number of manufacturing steps and requires shorter time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a rectangular hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which facilitates the deformation of the rectangular section of the thin film, both-end-fixed beam, which has the simple structure of modulating light by changing the reflection direction of the incident light, which has fast response, which uses the incident light without limiting the wavelength thereof, which uses a lower driving voltage, which operation is stable, which has high reliability, which has a small number of manufacturing steps and requires short time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a rectangular hole section which is formed in the thin film, both-end-fixed beam above the gap, and which makes a section of the thin film, both-end-fixed beam corresponding to the hole section deformed more easily than remaining sections of the hole section. Therefore, it is possible to provide the light modulator which facilitates the prevention of the concentration of stress on the hole section and working, which facilitates the deformation of the circular section of the thin film, both-end-fixed beam, which has the simple structure of modulating light by changing the reflection direction of the incident light, which has fast response, which uses the incident light without limiting the wavelength thereof, which uses a lower driving voltage, which operation is stable, which has high reliability, which has a small number of manufacturing steps and requires short time to execute the manufacturing steps, and which can achieve further cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, a plurality of the hole sections are arranged in a direction equal to a tangential direction of a fixed end of the thin film, both-end-fixed beam. Therefore, it is possible to provide the light modulator which facilitates the deformation of the thin film, both-end-fixed beam, which can shorten time required to etch away the sacrificial material layer, which has the simple structure of modulating light by changing the reflection direction of the incident light, which has fast response, which uses the incident light without limiting the wavelength thereof, which uses a lower driving voltage, which operation is stable, which has high reliability, which has a small number of manufacturing steps and requires shorter time to execute the manufacturing steps, and which can achieve further cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, a plurality of the hole sections are arranged in a direction perpendicular to a tangential direction of a fixed end of the thin film, both-end-fixed beam. Therefore, it is possible to provide the light modulator which further facilitates the deformation of the thin film, both-end-fixed beam, which can further shorten time required to etch away the sacrificial material layer, which has the simple structure of modulating light by changing the reflection direction of the incident light, which has fast response, which uses the incident light without limiting the wavelength thereof, which uses a lower driving voltage, which operation is stable, which has high reliability, which has a small number of manufacturing steps and requires shorter time to execute the manufacturing steps, and which can achieve further cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, the hole section is arranged so that one of a long diameter direction and a long edge direction is equal to a tangential direction of a fixed end of the thin film, both-end-fixed beam. Therefore, it is possible to provide the light modulator which further facilitates the deformation of the thin film, both-end-fixed beam due to the concentrated acting force, which can shorten time required to etch away the sacrificial material layer, which has the simple structure of modulating light by changing the reflection direction of the incident light, which has fast response, which uses the incident light without limiting the wavelength thereof, which uses a lower driving voltage, which operation is stable, which has high reliability, which has a smaller number of manufacturing steps and requires shorter time to execute the manufacturing steps, and which can achieve further cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, the hole section is arranged at an opposed position near an apex angle section of the gap. Therefore, it is possible to provide the light modulator which allows easily controlling the bending position of the both-end-fixed beam to thereby improve the reproducibility of the thin film, both-end-fixed beam if the thin film, both-end-fixed beam is bent and to improve an S/N ratio in light modulation, which has the simple structure of modulating light by changing the reflection direction of the incident light, which has fast response, which uses the incident light without limiting the wavelength thereof, which uses a lower driving voltage, which operation is more stable, which has higher reliability, which has a small number of manufacturing steps and requires short time to execute the manufacturing steps, and which can achieve cost reduction.

According to the present invention, the substrate electrode, which is opposed to the thin film, both-end-fixed beam formed out of a thin film constituted to be combined with the reflection unit regularly reflecting incident light and provided on one surface of the thin film, both-end-fixed beam, having both ends fixed and deformed by an electronic force, which substrate electrode applies a driving voltage and which is formed on a bottom of a gap formed by opposing the substrate electrode to the thin film, both-end-fixed beam and formed on the other side surface of the thin film, both-end-fixed beam, is formed in a concave section, and the substrate holds and fixes the both ends of the thin film, both-end-fixed beam. In addition, a hole section which is formed in the thin film, both-end-fixed beam above the gap, and which makes a section of the thin film, both-end-fixed beam corresponding to the hole section deformed more easily than remaining sections of the hole section. Further, the reflection unit is arranged at a position of the hole section in contact with an edge. Therefore, it is possible to provide the light modulator which can enlarge the light reflection region of the mirror of the reflection unit in one element as much as possible, thereby increasing the intensity of an optical signal and improving an S/N ratio when the image formation apparatus such as an optical writing device or the image projection and display apparatus such as a projector which includes the light modulator is in an ON operation state in a photo-engraving process. It is possible to provide the light modulator which has the simple structure of modulating light by changing the reflection direction of the incident light, which has fast response, which uses the incident light without limiting the wavelength thereof, which uses a low driving voltage, which operation is more stable, which has higher reliability, which has a small number of manufacturing steps and requires short time to execute the manufacturing steps, and which can achieve cost reduction.

Further, according to the present invention, the light modulator is manufactured by, after forming a gap, which become the gap, on the substrate, forming a sacrificial material layer made of a sacrificial material to flatten the substrate, forming the thin film, both-end-fixed beam and the hole section and then removing the sacrificial material layer. Therefore, it is possible to provide the light modulator which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve cost reduction.

According to the present invention, the light modulator is manufactured by, after forming a gap, which become the gap, on the substrate, forming a sacrificial material layer made of a sacrificial material to flatten the substrate, forming the thin film, both-end-fixed beam and the hole section and then removing the sacrificial material layer. Namely, the light modulator is manufactured by the manufacturing method which includes: a concave section formation step of forming the concave section, which becomes the gap, on the substrate by a thin film formation method or a micromachining method; a substrate electrode formation step of forming all of or a part of the substrate electrode in the concave section on the substrate; a sacrificial material layer formation step of forming the sacrificial material layer made of the sacrificial material, in the concave section on the substrate; a flattening step of polishing and flattening the sacrificial material layer; a thin film, both-end-fixed beam formation step of forming the thin film, both-end-fixed beam and the hole section on the sacrificial material layer; and a sacrificial material layer removal step of removing the sacrificial material layer in the concave section on the substrate. Therefore, it is possible to provide the light modulator which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve cost reduction.

According to the present invention, the toner image formed by the development unit which develops the latent image formed by the above-explained light modulator of the latent image formation unit, which forms the latent image by writing the optical data on the image carrier rotatably held and carrying a to-be-formed image, is transferred onto the to-be-transferred body by the transfer unit and the image is formed. Therefore, it is possible to provide the image formation apparatus which includes the light modulator which has the simple structure of modulating light by changing the reflection direction of the incident light, which has fast response, which uses the incident light without limiting the wave length thereof, which uses a low driving voltage, which operation is stable, which has high reliability, which has a small number of manufacturing steps and requires short time to execute the manufacturing steps, and which can achieve cost reduction.

According to the present invention, the image projected by the light modulator of the light switching unit consisting of the above-explained light modulator which modulates light by changing the reflection direction of the incident light on the image projection data and which projects an image, is displayed on the projection screen. Therefore, it is possible to provide the image projection and display apparatus which includes the light modulator which has the simple structure of modulating light by changing the reflection direction of the incident light, which has fast response, which uses the incident light without limiting the wavelength thereof, which uses a low driving voltage, which operation is stable, which has high reliability, which has a small number of manufacturing steps and requires short time to execute the manufacturing steps, and which can achieve cost reduction.

Further, according to the present invention, since the beam is formed to be projected from the substrate surface so as to form the generally rectangular gap above the substrate plane, the deformation of the beam due to the rotation thereof about the fixed end of the beam easily occurs and the substantial length of the beam is further increased. This facilitates the bending of the beam by the electrostatic force and allows the deformation of the beam, i.e., light modulation at a lower driving voltage. In other words, by manufacturing the light modulator by this manufacturing method, the residual internal stress of the beam is lessened at the time of removing the sacrificial layer. This facilitates the bending of the beam by an electrostatic force and can lower the driving voltage. Moreover, the non-parallel gap is formed in the concave section of the substrate. Therefore, compared with a case in which the formed gap is a parallel gap, it is possible to lower the driving voltage. It is, therefore, possible to lower the voltage of the image device such as an optical writing device or the picture device such as a projector in an electrophotographic process using this light modulator. In addition, since it is not necessary to flatten the sacrificial layer by the ordinary CMP technique in the manufacturing steps of the light modulator, it is possible to reduce cost required in the manufacturing steps. Moreover, the irregularity of the distance between the beam and the electrode is determined by that of engraving by etching the concave region formed in the substrate and that of the film formation of the sacrificial layer. It is not, therefore, necessary to employ the CMP technique which is largely dependent on a pattern, thereby advantageously facilitating the suppression of the irregularity of the driving voltage and improving manufacturing yield.

According to the present invention, the beam is formed to be projected from the substrate surface and the fixed ends of the beam fixed to the substrate surface are L-shaped. This advantageously facilitates the deformation of the beam by the rotation thereof about the fixed end of the beam and can lower the driving voltage.

According to the present invention, the beam is formed to be projected from the substrate surface and the support is provided in proximity to each fixed end of the beam. This advantageously facilitates the recovery of the beam to the original plane after the beam is bent by an electrostatic attracting force, can suppress the irregularity of light modulation characteristic (i.e., that of the directionality of reflection light) and can accelerate response speed. In addition, this can advantageously improve the mechanical strength of the fixed ends of the beam and improve manufacturing yield.

According to the present invention, since the support and the beam are made of the same material, the adhesion between the support and the beam can be improved. In addition, if the light modulator is manufactured by the above-explained manufacturing method, an etchant for the beam and the sacrificial layer at the time of removing the sacrificial layer can be set without consideration to the support (i.e., without consideration to the possible damage of the support by etching), advantageously improving the degree of freedom for process design.

According to the present invention, the beam is formed out of the film having a tensile residual stress. Therefore, if the light modulator is manufactured by the above-explained manufacturing method, the beam is pulled from the both fixed ends by the tensile residual stress of the beam, advantageously flattening the beam surface in parallel to the substrate plane.

According to the present invention, the above-explained light modulator can be realized. Particularly, by patterning the sacrificial layer and flattening the beam at the time of removing the sacrificial layer, it is advantageously possible to lower the driving voltage, reduce manufacturing cost, improve yield.

According to the present invention, the above-explained light modulator can be realized. Particularly, by including the step of depositing a support constituent layer on an entire surface of the substrate and the step of etching-back support constituent layer by anisotropic dry etching, it is advantageously possible to provide the support to be proximate to the fixed end of the beam.

According to the present invention, the light switch consisting of the beam and the light emission element serving as the light source are formed in the same package. Therefore, it is not necessary to position the light source and the light switch relative to each other. In addition, it is not necessary to interpose a special optical system between the light source and the light switch. It is, therefore, possible to save space which may be occupied by the optical system, to improve productivity and to reduce cost. Further, since many light switches which switch light emitted from the common light source are easily formed densely, the light modulator is appropriate as, for example, an optical writing device in an electrophotographic process.

According to the present invention, since the beam is a both-end-fixed beam, excess oscillation is generated less frequently when the beam returns to the flat state than the one-end-fixed beam, thereby making it possible to drive the beam at higher speed.

According to the present invention, if the light emission element is an electroluminescence element, the light emission element can be easily formed on the silicon substrate or the glass substrate and a sufficient quantity of light can be secured.

According to the present invention, by opposing the light emission element to the beam, it is possible to efficiently apply the light emitted from the light emission element to the light switch.

According to the present invention, by forming the convex section or concave mirror which converges light, on the package upper cover, it is possible to efficiently apply the light emitted from the light emission element to the light switch.

According to the present invention, by forming the waveguide path on the substrate, it is possible to efficiently apply the light emitted from the light emission element to the light switch.

According to the present invention, by outputting light from the window of the shielding film formed in the package upper cover, output light can be limited to a predetermined light quantity.

According to the present invention, the driving method can advantageously prevent light from being outputted unnecessarily during the deformation of the light switch.

Furthermore, according to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film both-end-fixed beam and the gap in a vacuum space. Therefore, it is possible to provide the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed, which is made of a monocrystalline silicon thin film and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which uses the thin film, both-end-fixed beam having fewer defects and sustaining longer life, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed, which is made of a polycrystalline silicon thin film and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which uses the thin film, both-end-fixed beam which can be formed by the CVD method or the like to thereby reduce cost, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed, which is made of an amorphous silicon thin film and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which uses the thin film, both-end-fixed beam which can be formed by the CVD method or the like to thereby reduce cost, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed, which is made of a silicon nitride thin film and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which uses the thin film, both-end-fixed beam having accelerated switching response speed by the action of the tensile stress of the silicon nitride thin film, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has faster response, which uses the incident light without limiting the wavelength thereof, which uses a driving voltage which is stably low, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed, which is made of a metallic thin film and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which uses the thin film, both-end-fixed beam which can also function as the electrode section or the reflection unit thereof, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the gap which is formed by opposing the substrate electrode to the thin film, both-end-fixed beam, is non-parallel. Therefore, it is possible to provide the light modulator which can lower a voltage required to deform the thin film, both-end-fixed beam, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stable and lower, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, a part of or all of the thin film, both-end beam is abutted on a bottom of the gap formed on the substrate when the thin film, both-end beam is deformed by an electronic force which is generated when the substrate electrodes applies the driving voltage. Therefore, it is possible to provide the light modulator which can always keep the shape of the deformed thin film, both-end-fixed thin film to be a certain shape by the shape of the gap to there by keep the reflection direction of the incident light beams constant, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably lower, which operation is more stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which is made of monocrystalline silicon, which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which can form a wiring matrix in the substrate advantageously to the formation of many complex wirings, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably lower, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the substrate is made of optical glass. Therefore, it is possible to provide the light modulator which allows observing the state of the thin film, both-end-fixed beam from the rear side of the substrate advantageously to the inspection, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably lower, which operation is more stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the substrate is made of optical glass and the substrate electrode is made of a transparent conductive film. Therefore, it is possible to provide the light modulator which allows observing the state of the thin film, both-end-fixed beam from the rear side of the substrate further advantageously to the inspection, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably lower, which operation is more stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a glass material as a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Therefore, it is possible to provide the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has higher reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, a getter material is formed in the vacuum space formed by the substrate and the cover member. Therefore, it is possible to provide the light modulator which can prevent the deterioration of the degree of vacuum of the vacuum space surrounded by the cover member and the substrate, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has higher reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, an attachment section which attaches the substrate to the cover member, consists of a metallic seal layer. Therefore, it is possible to provide the light modulator which can ensure preventing the occurrence of vacuum leakage since the seal section is strongly fixed, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has higher reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, a difference in coefficient of thermal expansion between the cover member and the substrate is not more than 0 to 30%. Therefore, it is possible to provide the light modulator which can prevent the generation of stress even with the change of the environmental temperature, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has higher reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the cover member has at least one of a lens, an anti-reflection film and a shielding film formed in a path of the incident light on the reflection unit. Therefore, it is possible to provide the light modulator which can improve light usage efficiency, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the cover member has at least one of a lens, an anti-reflection film and a shielding film formed in a path of reflection light from the reflection unit. Therefore, it is possible to provide the light modulator which can improve light usage efficiency, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the cover member comprises an engraved section formed in an attachment section attached to the substrate. Therefore, it is possible to provide the light modulator which can facilitate and ensure the attachment of the cover member to the substrate, which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve further cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the thin film, both-end-fixed beam formed on the substrate is hexagonal-shaped. Therefore, it is possible to provide the light modulator which can increase the density of the thin film, both-end-fixed beams formed on the substrate, which can prevent the deformation of the thin film, both-end-fixed beam by an electrostatic force from being influenced by the compressive resistance of gas in the residual air or the degree of humidity changing according to the change of the external environment, which has the simple and small structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, a plurality of light modulators are arranged in a form of one of a one-dimensional array and a two-dimensional array. Therefore, it is possible to provide the light modulator which can arrange the high-density thin film, both-end-fixed beams in the form of a one-dimensional array or two-dimensional array, which can prevent the deformation of the thin film, both-end-fixed beam by an electrostatic force from being influenced by the compressive resistance of gas in the residual air or the degree of humidity changing according to the change of the external environment, which has the simple and small structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the substrate electrode, which is opposed to the other side surface of the thin film, both-end-fixed beam, which is formed out of a thin film constituted to be combined with the reflection unit, regularly reflecting the incident light and provided on one surface of the thin film, both-end-fixed beam, which beam has both ends fixed and which is deformed by an electronic force, and which applies a driving voltage, is formed in the bottom of the gap which is formed by opposing the substrate electrode to the thin film, both-end-fixed beam. In addition, the cover member made of a light transmission material is formed to be attached onto the substrate which has the substrate electrode formed in a bottom of the gap and which holds both ends of the thin film, both-end-fixed beam, and the cover includes the thin film, both-end-fixed beam and the gap in a vacuum space. Further, the plurality of light modulators are arranged in a staggered fashion in the form of one of the one-dimensional array and the two-dimensional array. Therefore, it is possible to provide the light modulator which can arrange the high-density thin film, both-end-fixed beams in a staggered fashion in the form of a one-dimensional array or two-dimensional array, which can prevent the deformation of the thin film, both-end-fixed beam by an electrostatic force from being influenced by the compressive resistance of gas in the residual air or the degree of humidity changing according to the change of the external environment, which has the simple and small structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

Further, according to the present invention, the light modulator is manufactured by forming the gap, which is formed by opposing the substrate electrode to the thin film, both-end-fixed beam, on the substrate, forming a sacrificial material layer made of a sacrificial material to flatten the substrate, forming the thin film, both-end-fixed beam, removing the sacrificial material layer and then attaching the cover member onto the substrate. Therefore, it is possible to provide the manufacturing method of the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, to form the gap, which is formed by opposing the substrate electrode to the thin film, both-end-fixed beam, on the substrate, to form a sacrificial material layer made of a sacrificial material to flatten the substrate, to form the thin film, both-end-fixed beam, to remove the sacrificial material layer and then to attach the cover member onto the substrate, a gap formation step of forming the gap which is formed on the substrate by opposing the thin film, both-end-fixed beam to the substrate electrode, by a thin film formation method or a micromachining method; a substrate electrode formation step of forming all of or a part of the substrate electrode on the bottom of the gap on the substrate; a sacrificial material layer formation step of forming the sacrificial material layer made of the sacrificial material, in the gap on the substrate, and then polishing and flattening the sacrificial material layer; a thin film, both-end-fixed beam formation step of forming the thin film, both-end-fixed beam on the sacrificial material layer; a sacrificial material layer removal step of removing the sacrificial material layer in the gap; an opening section formation step of forming an opening section which connects the substrate electrode to an outside; and a cover member attachment step of attaching the cover member onto the substrate, are executed, thereby forming the light modulator. Therefore, it is possible to provide the manufacturing method of the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the cover member attached onto the substrate by the attachment section after forming the gap, which is formed by opposing the substrate electrode to the thin film, both-end-fixed beam, on the substrate, forming a sacrificial material layer made of a sacrificial material to flatten the substrate, forming the thin film, both-end-fixed beam and removing the sacrificial material layer, is formed at a cover member substrate formation step; a lens formation step; an engraved section formation step; and a shielding film formation step. Thereafter, the light modulator is manufactured. Therefore, it is possible to provide the manufacturing method of the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the toner image formed by the development unit which develops the latent image formed by the above-explained light modulator of the latent image formation unit, which forms the latent image by writing the optical data on the image carrier rotatably held and carrying a to-be-formed image, is transferred onto the to-be-transferred body by the transfer unit and the image is formed. Therefore, it is possible to provide the image formation apparatus which includes the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

According to the present invention, the image projected by the light modulator of the light switching unit consisting of the above-explained light modulator which modulates light by changing the reflection direction of the incident light on the image projection data and which projects an image, is displayed on the projection screen. Therefore, it is possible to provide the image projection and display apparatus which includes the light modulator which can prevent the deformation of the thin film, both-end-fixed beam by an electrostatic force from being influenced by the compressive resistance of gas in the residual air or the degree of humidity changing according to the change of the external environment, which has the simple structure of modulating light by changing the reflection direction of the incident light, which has fast response, which uses the incident light without limiting the wavelength thereof, which uses a driving voltage which is stably low, which operation is stable, which has high reliability, which has a small number of manufacturing steps and which can achieve cost reduction.

The present document incorporates by reference the entire contents of Japanese priority documents, 2001-010870 filed in Japan on Jan. 18, 2001, 2001-070303 filed in Japan on Mar. 13, 2001, 2001-077614 filed in Japan on Mar. 19, 2001, 2001-097590 filed in Japan on Mar. 29, 2001 and 2001-133709 filed in Japan on Apr. 27, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A light modulator modulating light by changing a reflection direction of an incident light, comprising:
   a light reflection film regularly reflecting the incident light;
   a center beam which is formed out of a thin film constituted to be combined with said light reflection film, which has both ends fixed, and which is configured to be deformed by an electrostatic force, wherein said reflection film is provided on a first surface of said center beam;
   a substrate electrode which is opposed to said center beam through a gap formed on a second surface of said center beam;
   an opposed surface which is a surface of said substrate electrode opposed to said center beam modulating the incident light on said light reflection film, said opposed surface restricting a deformation of said center beam due to application of a driving voltage to said substrate electrode by abutting on said center beam; and
   a substrate which has a concave section in which said substrate electrode having said opposed surface is formed, and said substrate holds a to-be-held section of said center beam, wherein
   said center beam is configured to deform along said concave section of said substrate such that said light reflection film has an irregular shape when said center beam is driven by said driving voltage and the incident light is reflected by said light reflection film in random directions when said center beam is driven by said driving voltage and the incident light is reflected in one direction when said center beam is not driven.

2. The light modulator according to claim 1, wherein said light reflection film is formed out of a metallic thin film.

3. The light modulator according to claim 1, wherein said center beam is formed out of a low resistance material.

4. The light modulator according to claim 3, wherein the low resistance material of said center beam is formed by decreasing a resistance of silicon by diffusing impurities into said silicon.

5. The light modulator according to claim 1, wherein said center beam is formed out of a monocrystalline silicon film.

6. The light modulator according to claim 1, wherein said center beam is formed out of a polycrystalline silicon film.

7. The light modulator according to claim 1, wherein said center beam is formed out of a silicon nitride thin film.

8. The light modulator according to claim 1, wherein two edges of ends opposed to each other of the to-be-held section of said center beam are fixed to the substrate.

9. The light modulator according to claim 1, wherein a distance between the two edges of said center beam held by the substrate is equal to or larger than a length of one edge of said two edges.

10. The light modulator according to claim 1, wherein a plurality of light reflection films, a plurality of center beams and a plurality of substrate electrodes are arranged in a form of a one-dimensional array on said substrate.

11. The light modulator according to claim 1, wherein a plurality of light reflection films, a plurality of center beams and a plurality of substrate electrodes are arranged in a form of a two-dimensional array on said substrate.

12. The light modulator according to claim 1, wherein the opposed surface of said substrate electrode comprises a parallel opposed surface which is parallel to said center beam.

13. The light modulator according to claim 1, wherein the opposed surface of said substrate electrode comprises a partially non-parallel opposed surface which is partially non-parallel to said center beam.

14. The light modulator according to claim 13, wherein the to-be-held section of said center beam, near a portion of the gap formed between at least said center beam and the substrate electrode opposed to said center beam and comprising a non-parallel inclined surface that has a largest clearance, comprises a plurality of divided to-be-held sections.

15. The light modulator according to claim 13, wherein the to-be-held section of said center beam, near a portion of the gap formed between at least said center beam and the substrate electrode opposed to said center beam and comprising a non-parallel inclined surface that has a largest clearance, comprises a folded structure section.

16. The light modulator according to claim 1, wherein the opposed surface of said substrate electrode comprises a plurality of non-parallel opposed surfaces which are non-parallel to said center beam.

17. The light modulator according to claim 1, wherein the opposed surface of said substrate electrode comprises an entirely non-parallel opposed surface which is entirely non-parallel to said center beam.

18. The light modulator according to claim 1, wherein said substrate is made of a light transmission glass material.

19. The light modulator according to claim 1, wherein said substrate is made of a monocrystalline silicon material.

20. The light modulator according to claim 19, wherein a part of or all of a driving circuit is formed in the monocrystalline silicon material of said substrate.

21. The light modulator according to claim 1, wherein the gap formed between said center beam held by said substrate and the substrate electrode opposed to said center beam and formed on the concave section of said substrate, comprises a non-parallel inclined surface.

22. The light modulator according to claim 21, wherein the gap formed between said center beam and the substrate electrode opposed to said center beam and comprising the non-parallel inclined surface, is shaped to be largest in a central section of said center beam and to gradually enlarge from two opposed edges of said center beam toward said central section of said center beam.

23. The light modulator according to claim 21, wherein the gap formed between said center beam and the substrate electrode opposed to said center beam and comprising the non-parallel inclined surface, is shaped to be largest in a central section of said center beam and to gradually enlarge from two opposed edges of said center beam and other two edges of said center beam toward said central section of said center beam.

24. The light modulator according to claim 21, wherein the gap formed between said center beam and the substrate electrode opposed to said center beam and comprising the non-parallel inclined surface, is shaped to be largest near one of two opposed edges of said center beam held by said substrate and to gradually enlarge from the other edge of said two opposed edges of said center beam toward said one edge.

25. The light modulator according to claim 1, wherein the gap formed between said center beam and the substrate electrode opposed to said center beam, comprises a non-parallel inclined surface between two edges on both ends opposed to each other of said center beam.

26. The light modulator according to claim 25, wherein the gap formed between said center beam and the substrate electrode opposed to said center beam and comprising the non-parallel inclined surface, is shaped to be largest in a central section of said center beam held by said substrate and to gradually enlarge from said two opposed edges of said center beam toward said central section of said center beam.

27. The light modulator according to claim 25, wherein the gap formed between said center beam and the substrate electrode opposed to said center beam and comprising the non-parallel inclined surface, is shaped to largest in a central section of said center beam held by said substrate and to gradually enlarge from said two opposed edges of said center beam and other two edges of said center beam toward said central section of said center beam.

28. The light modulator according to claim 25, wherein the gap formed between said center beam and the substrate electrode opposed to said center beam and comprising the non-parallel inclined surface, is shaped to be largest near one of the two opposed edges of said center beam held by said substrate and to gradually enlarge from the other edge of said two edges of said center beam toward said one edge.

29. The light modulator according to claim 1, wherein the to-be-held section of said center beam comprises a plurality of divided to-be-held sections.

30. The light modulator according to claim 29, wherein said divided to-be-held sections are arranged in a corner section of said center beam.

31. The light modulator according to claim 29, wherein said divided to-be-held sections each has a connection section connected to said center beam having a smooth outline section.

32. The light modulator according to claim 1, wherein the to-be-held section of said center beam held by the substrate comprises a folded structure section.

33. The light modulator according to claim 1, wherein said center beam comprises a member having a tensile stress.

34. The light modulator according to claim 1, wherein combinations of (i) thicknesses (t) of a plurality of members constituted to be combined with said center beam and (ii) stresses ($\sigma$) including a tensile stress with a plus sign and a compressive stress with a minus sign are (t1, σ1), (t2, σ2), . . . (tn, σn) said center beam satisfies $(t_1*\sigma_1+t_2*\sigma_2+ \ldots +t_n*\sigma'')/(t_1+t_2+ \ldots +t_n)=0$.

35. The light modulator according to claim 1, wherein said center beam has a relationship of $(t/1)2 \geq \sigma/E$ with respect to a tensile stress (σ), a thickness (t), Young's modulus(E) of a formation material, and a distance (1) between two edges on both ends opposed to each other of said center beam.

36. The light modulator according to claim 1, wherein all of or a part of a driving circuit driving the center beam is formed on said substrate.

37. The light modulator according to claim 1, wherein said center beam is abutted on a surface of said substrate and deformed along a clearance shape of a gap formed on the second surface of said center beam by the electrostatic force generated by the application of the driving voltage to a portion between said center beam and said substrate electrode.

38. The light modulator according to claim 1, wherein after said center beam is deformed by the electrostatic force generated by the application of the driving voltage to a portion between said center beam and said substrate electrode, a voltage opposite in polarity to the driving voltage is applied to the portion between said center beam and said substrate electrode to an extent not to deform said center beam.

39. The light modulator according to claim 1, wherein said center beam is deformed by alternately applying, as the driving voltage, a positive voltage and a negative voltage to a portion between said center beam and said substrate electrode with reference to a potential of said center beam.

40. A light information processing apparatus processing light information using a light modulator modulating light by changing a reflection direction of an incident light beam, comprising:
   a plurality of light modulators each of which modulates the light by changing the reflection direction of the incident light beam, and each of which comprises:
      a light reflection film regularly reflecting the incident light,
      a center beam which is formed out of a thin film constituted be combined with said light reflection film, which has both ends fixed, and which is configured to be deformed by an electrostatic force, wherein said reflection film is provided on a first surface of said center beam,
      a substrate electrode which is opposed to said center beam through a gap formed on a second surface of said center beam,
      an opposed surface which is a surface of said substrate electrode opposed to said center beam modulating the incident light on said light reflective film, said opposed surface restricting a deformation of said center beam due to application of a driving voltage to said substrate electrode by abutting on said center beam, and
      a substrate which has a concave section in which said substrate electrode having said opposed surface is formed, and said substrate holds a to-be-held section of said center beam, wherein
      said center beam is configured to deform along said concave section of said substrate such that said light reflection film has an irregular shape when said center beam is driven by said driving voltage and the incident light is reflected by said light reflection film in random directions when said center beam is driven by said driving voltage and the incident light is reflected in one direction when said center beam is not driven; and
   an independent driving unit which drives said plurality of light modulators independently of one another.

41. An image formation apparatus forming an image by wiring optical data by an electrophotographic process, comprising:
   an image carrier which is rotatably held, and which carries a to-be-formed image;
   a latent image formation unit which forms a latent image by writing the optical data on said image carrier, and which comprises a light modulator, said light modulator modulates light by changing a reflection direction of an incident light, and comprises:
      a light reflection film regularly reflecting the incident light,
      a center beam which is formed out of a thin film constituted to be combined with said light reflection film, which has both ends fixed, and which is configured to be deformed by an electrostatic force, wherein said reflection film is provided on a first surface of said center beam,
      a substrate electrode which is opposed to said center beam through a gap formed on a second surface of said center beam,
      an opposed surface which is a surface of said substrate electrode opposed to said center beam modulating the incident light on said light reflection film, said opposed surface restricting a deformation of said center beam due to application of a driving voltage to said substrate electrode by abutting on said center beam, and
      a substrate which has a concave section in which said substrate electrode having said opposed surface is formed, and said substrate holds a to-be-held section of said center beam, wherein
      said center beam is configured to deform along said concave section of said substrate such that said light reflection film has an irregular shape when said center beam is driven by said driving voltage and the incident light is reflected by said light reflection film in random directions when said center beam is driven by said driving voltage and the incident light is reflected in one direction when said center beam is not driven;
   a development unit which develops the latent image formed by said light modulator of said latent image formation unit, and which forms a toner image; and
   a transfer unit which transfers the toner image formed by said development unit onto a to-be-transferred body.

42. An image projection and display apparatus projecting and displaying an image, comprising:
   a light switching unit which comprises a light modulator, said light modulator modulating light by changing a reflection direction of an incident light, and comprising:
      a light reflection film regularly reflecting the incident light,
      a center beam which is formed out of a thin film constituted to be combined with said light reflection film, which has both ends fixed, and which is configured to be deformed by an electrostatic force, wherein said reflection film is provided on a first surface of said center beam, a substrate electrode which is opposed to said center beam through a gap formed on a second surface of said center beam, an opposed surface which is a surface of said substrate electrode opposed to said center beam modulating the incident light on said light reflection film, said opposed surface restricting a deformation of said center beam due to application of a driving voltage to said substrate electrode by abutting on said center beam, and a substrate which has a concave section in which said substrate electrode having said opposed surface is formed, and said substrate holds a to-be-held section of said center beam, wherein said center beam is configured to deform along said concave section of said substrate such that said light reflection film has an irregular shape when said center beam is driven by said driving voltage and the incident light is reflected by said light reflection film in random directions when said center beam is driven by said driving voltage and the incident light is reflected in one direction when said center beam is not driven; and a projection screen displaying the image projected by said light modulator of said light switching unit.

43. A light modulator modulating light by changing a reflection direction of an incident light, comprising:

a reflection unit which regularly reflects light;

a thin film both-end-fixed beam which is formed out of a thin film constituted to be combined with said reflection unit provided on a first side surface of said thin film both-end-fixed beam, which has both ends fixed, and which is configured to be deformed by an electrostatic force;

a substrate electrode which is opposed to said thin film both-end-fixed beam, and which applies a driving voltage;

a gap which is formed by opposing said substrate electrode to said thin film both-end-fixed beam, and which is formed on a second side surface of said thin film both-end-fixed beam;

a substrate which has a concave section in which said substrate electrode is formed on a bottom of said gap-and the substrate holds and fixes said both ends of said thin film both-end-fixed beam; and a hole section which is formed in said thin film both-end-fixed beam above said gap, and which makes a section of said thin film both-end-fixed beam corresponding to said hole section to deform more easily than remaining sections of said hole section, wherein said thin film both-end-fixed beam is configured to deform along said concave section of said substrate such that said reflection unit has an irregular shave when said thin film both-end-fixed beam is driven by said driving voltage and the incident light is reflected by said reflection unit in random directions when said thin film both-end-fixed beam is driven by said driving voltage and the incident light is reflected in one direction when said thin film both-end-fixed beam is not driven.

44. The light modulator according to claim 43, wherein the reflection unit is made of a metallic thin film.

45. The light modulator according to claim 43, wherein the thin film both-end-fixed beam is made of monocrystalline silicon.

46. The light modulator according to claim 43, wherein the thin film both-end-fixed beam is made of polycrystalline silicon.

47. The light modulator according to claim 43, wherein the thin film both-end-fixed beam is made of silicon nitride.

48. The light modulator according to claim 43, wherein the gap is non-parallel between the thin film both-end-fixed beam and the substrate electrode.

49. The light modulator according to claim 48, wherein the gap has an apex angle section on a substrate electrode-side bottom.

50. The light modulator according to claim 43, wherein the hole section is rectangular.

51. The light modulator according to claim 43, wherein the hole section is circular.

52. The light modulator according to claim 43, wherein a plurality of the hole sections are arranged in a direction corresponding to a tangential direction of a fixed end of the thin film both-end-fixed beam.

53. The light modulator according to claim 43, wherein a plurality of the hole sections are arranged in a direction perpendicular to a tangential direction of a fixed end of the thin film both-end-fixed beam.

54. The light modulator according to claim 43, wherein the hole section is arranged so that one of a long diameter direction and a long edge direction corresponds to a tangential direction of a fixed end of the thin film both-end-fixed beam.

55. The light modulator according to claim 43, wherein the hole section is arranged at an opposed position near an apex angle section of the gap.

56. The light modulator according to claim 43, wherein the reflection unit is arranged at a position of the hole section in contact with an edge.

57. An image formation apparatus forming an image by wiring optical data by an electrophotographic process, comprising:

an image carrier which is rotatably held, and which carries a to-be-formed image;

a latent image formation unit which forms a latent image by writing the optical data on said image carrier, and which comprises a light modulator, said light modulator which modulates light by changing a reflection direction of an incident light comprises:

a reflection unit which regularly reflects light, a thin film both-end-fixed beam which is formed out of a film constituted to be combined with said reflection unit provided on a first side surface of said thin film both-end-fixed beam, which has both ends fixed, and which is configured to be deformed by an electrostatic force, a substrate electrode which is opposed to said thin film both-end-fixed beam, and which applies a driving voltage, a gap which is formed by opposing said substrate electrode to said thin film both-end-fixed beam, and which is formed on a second side surface of said thin film both-end-fixed beam, a substrate which has a concave section in which said substrate electrode is formed on a bottom of said gap, and the substrate holds and fixes said both ends of said thin film both-end-fixed beam, and a hole section which is formed in said thin film both-end-fixed beam above said gap, and which makes a section of said thin film both-end-fixed team corresponding to said hole section to deform more easily than remaining sections of said hole section, wherein said thin film both-end-fixed beam is configured to deform along said concave section of said substrate such that said reflection unit has an irregular shape when said thin film both-end-fixed beam is driven by said driving voltage and the incident light is reflected by said reflection unit in random directions when said thin film both-end-fixed beam is driven by said driving voltage and the incident light is reflected in one direction when said thin film both-end-fixed beam is not driven;

a development unit which develops the latent image formed by said light modulator of said latent image formation unit, and which forms a toner image; and a transfer unit which transfers the toner image formed by said development unit onto a to-be-transferred body.

58. An image projection and display apparatus projecting and displaying an image, comprising:

a light switching unit which comprises a light modulator, said light modulator modulates light by changing a reflection direction of an incident light, and comprises:

a reflection unit which regularly reflects light, a thin film both-end-fixed beam which is formed out of a thin film constituted to be combined with said reflection unit provided on a first side surface of said thin film both-end-fixed beam, which has both ends fixed, and which is configured to be deformed by an electrostatic force, a substrate electrode which is opposed to said thin film both-end-fixed beam, and which applies a driving voltage, a gap which is formed by opposing said substrate electrode to said thin film both-end-fixed beam, and which is formed on a second side surface of said thin film both-end-fixed beam, a substrate which has a concave section in which said substrate electrode is formed on a bottom of said gap, and the substrate holds and fixes said both ends of said thin film both-end-fixed beam, and a hole section which is formed in said thin film both-end-fixed beam above said gap, and which makes a section of said thin film both-end-fixed beam corresponding to said hole section to deform more easily than remaining sections of said hole section, wherein said thin film both-end-fixed beam is configured to deform along said concave section of said substrate such that said reflection unit has an irregular shape when said thin film both-end-fixed beam is driven by said driving voltage and the incident light is reflected by said reflection unit in random directions when said film both-end-fixed beam is driven by said driving voltage and the incident light is reflected in one direction when said thin film both-end-fixed beam is not driven; and a projection screen displaying the image projected by said light modulator of said light switching unit.

59. A light modulator modulating light by deforming a beam which reflects light, by an electrostatic force, comprises:

an electrode acting the electrostatic force on said beam is provided inside a recess of a substrate opened to an upper surface of said substrate, said beam is held by said substrate at a position opposed to said electrode so as to be projected from the upper surface of said substrate; and a non-parallel gap is formed between said beam and said recess in a state in which no electrostatic force acts on said beam, said non-parallel gap being generally rectangular in a plane including the upper surface of said substrate and said beam, wherein said beam is configured to deform along said non-parallel gap such that said beam has an irregular share when said beam is driven by a driving voltage and incident light is reflected by said beam in random directions when said beam is driven by said driving voltage and the incident light is reflected in one direction when said beam is not driven.

60. The light modulator according to claim 59, wherein said beam is a both-end-fixed beam having both ends fixed to the upper surface of said substrate, the fixed both ends of said beam being generally L-shaped.

61. The light modulator according to claim 59, comprising:

a support proximate to a fixed end of said beam to assist in recovery of said beam when the electrostatic force acting on said beam is released.

62. The light modulator according to claim 61, wherein said support is made of a same material as a material of the beam.

63. The light modulator according to claim 59, wherein said beam comprises a film having a tensile residual stress.

64. A light modulator, comprising:

a fixed electrode;

a beam which is opposed to said fixed electrode through a gap and which has a light reflection surface; and a light emission element, wherein said fixed electrode, said beam, and said light emission element are formed in a same package, and said beam is held to be deformable toward said fixed electrode by an electrostatic force when said beam is driven by a driving voltage, said beam is configured to deform along said gap such that said light reflection surface has an irregular shape when said beam is driven and a light emitted from said light emission element is reflected by said light reflection surface in random directions when said beam is driven and in one direction when said beam is not driven, and the reflection light from said reflection surface is outputted to an outside of the package when said beam is driven or not driven.

65. The light modulator according to claim 64, wherein said beam is a both-end-fixed beam.

66. The light modulator according to claim 64, wherein said light emission element is an electroluminescence element.

67. The light modulator according to claim 64, wherein said fixed electrode and said beam are formed on a same substrate, and said light emission element is formed on a package upper cover connected to said substrate while being opposed to said beam.

68. The light modulator according to claim 67, wherein a convex section which converges the light emitted from said light emission element on said beam, is formed on said package upper cover.

69. The light modulator according to claim 64, wherein said fixed electrode, said beam and said light emission element are formed on a same substrate, and a concave mirror, which converges the light emitted from said light emission element on said beam, is formed on a package upper cover connected to said substrate.

70. The light modulator according to claim 64, wherein said fixed electrode, said beam and said light emission element are formed on a same substrate, and a waveguide path, which guides the light emitted from said light emission element into said gap, is formed in said substrate.

71. The light modulator according to claim 64, wherein a shielding film is formed on a package upper cover, and the light reflected by the light reflection surface on said beam is outputted to an outside of the package through a window provided in the shielding film.

72. The light modulator according to claim 64, wherein the light emission element does not emit light while the beam is deformed.

73. A light modulator modulating light by changing a reflection direction of an incident light, comprising:
a reflection unit which regularly reflects the incident light;
a thin film both-end-fixed beam which is formed out of a thin film constituted to be combined with said reflection unit, which has both ends fixed, and which is configured to be deformed by an electrostatic force, said light reflection unit provided on a first surface of said thin film both-end-fixed beam;
a substrate electrode which is opposed to a second surface of said thin film both-end-fixed beam, and which applies a driving voltage;
a gap which is formed by opposing said substrate electrode to said thin film both-end-fixed beam;
a substrate which has said substrate electrode formed in a bottom of said gap, and which holds both ends of said thin film both-end-fixed beam; and
a cover member which is formed to be attached onto said substrate, encloses said thin film both-end-fixed beam and said gap in a vacuum space, and which is made of a light transmission material, wherein
said thin film both-end-fixed beam is configured to deform along said gap such that said reflection unit has an irregular shape when said thin film both-end-fixed beam is driven by said driving voltage and the incident light is reflected by said reflection unit in random directions when said thin film is driven by said driving voltage and the incident light is reflected in one direction when said thin film is not driven.

74. The light modulator according to claim 73, wherein said thin film both-end beam is made of a monocrystalline silicon thin film.

75. The light modulator according to claim 73, wherein said thin film both-end beam is made of a polycrystalline silicon thin film.

76. The light modulator according to claim 73, wherein said thin film both-end beam is made of an amorphous silicon thin film.

77. The light modulator according to claim 73, wherein said thin film both-end beam is made of a silicon nitride thin film.

78. The light modulator according to claim 73, wherein said thin film both-end beam is made of a metallic thin film.

79. The light modulator according to claim 73, wherein the gap which is formed by opposing said substrate electrode to said thin film both-end-fixed beam, is non-parallel.

80. The light modulator according to claim 73, wherein a part of or all of said thin film both-end beam is abutted on a bottom of the gap formed on said substrate when said thin film both-end beam is deformed by an electrostatic force which is generated when said substrate electrodes applies the driving voltage.

81. The light modulator according to claim 73, wherein said substrate is made of monocrystalline silicon.

82. The light modulator according to claim 73, wherein said substrate is made of optical glass.

83. The light modulator according to claim 82, wherein said substrate is made of a transparent conductive film.

84. The light modulator according to claim 73, wherein said cover member is made of a glass material.

85. The light modulator according to claim 73, wherein a getter material is formed in the vacuum space formed by said substrate and said cover member.

86. The light modulator according to claim 73, wherein an attachment section which attaches said substrate to said cover member, comprises a metallic seal layer.

87. The light modulator according to claim 73, wherein a difference in coefficient of thermal expansion between said cover member and said substrate is not more than 0 to 30%.

88. The light modulator according to claim 73, wherein said cover member has at least one of a lens, an anti-reflection film and a shielding film formed in a path of the incident light on said reflection unit.

89. The light modulator according to claim 73, wherein said cover member has at least one of a lens, an anti-reflection film and a shielding film formed in a path of reflection light from said reflection unit.

90. The light modulator according to claim 73, wherein said cover member comprises an engraved section formed in an attachment section attached to said substrate.

91. The light modulator according to claim 73, wherein said thin film both-end-fixed beam formed on said substrate is hexagonal-shaped.

92. The light modulator according to claim 73, wherein a plurality of light modulators are arranged in a form of one of a one-dimensional array and a two-dimensional array.

93. The light modulator according to claim 92, wherein said plurality of light modulators are arranged in a staggered fashion in the form of one of the one-dimensional array and the two-dimensional array.

94. An image formation apparatus forming an image by wiring optical data by an electrophotographic process, comprising:
an image carrier which is rotatably held, and which carries a to-be-formed image;
a latent image formation unit which forms a latent image by writing the optical data on said image carrier, and which comprises a light modulator, said light modulator which modulates light by changing a reflection direction of an incident light, and which comprises:
a reflection unit which regularly reflects the incident light,
a thin film both-end-fixed beam which is formed out of a thin film constituted to be combined with said reflection unit, which has both ends fixed, and which is configured to be deformed by an electrostatic force, said light reflection unit provided on a first surface of said thin film both-end-fixed beam,
a substrate electrode which is opposed to a second surface of said thin film both-end-fixed beam, and which applies a driving voltage,
a gap which is formed by opposing said substrate electrode to said thin film both-end-fixed beam,
a substrate which has said substrate electrode formed in a bottom of said gap, and which holds both ends of said thin film both-end-fixed beam, and a cover member which is formed to be attached onto said substrate, encloses said thin film both-end-fixed beam and said gap in a vacuum space, and is made of a light transmission material, wherein said thin film both-end-fixed beam is configured to deform along said gap such that said reflection unit has an irregular shape when said thin film both-end-fixed beam is driven by said driving voltage and the incident light is reflected by said reflection unit in random directions when said thin film both-end-fixed beam is driven by said driving voltage and the incident light is reflected in one direction when said thin film both-end-fixed beam is not driven;

a development unit which develops the latent image formed by said light modulator of said latent image formation unit, and which forms a toner image; and a transfer unit which transfers said toner image formed by said development unit onto a to-be-transferred body.

95. An image projection and display apparatus projecting and displaying an image, comprising:

a light switching unit which comprises a light modulator, said light modulator modulating light by changing a reflection direction of an incident light, and comprising:

a reflection unit which regularly reflects the incident light, a thin film both-end-fixed beam which is formed out of a thin film constituted to be combined with said reflection unit, which has both ends fixed, and which is configured to be deformed by an electrostatic force, said light reflection unit provided on a first surface of said thin film both-end-fixed beam, a substrate electrode which is opposed to a second surface of said thin film both-end-fixed beam, and which applies a driving voltage, a gap which is formed by opposing said substrate electrode to said thin film both-end-fixed beam, a substrate which has said substrate electrode formed in a bottom of said gap, and which holds both ends of said thin film both-end-fixed beam, and a cover member which is formed to be attached onto said substrate, encloses said thin film both-end-fixed beam and said gap in a vacuum space, and is made of a light transmission material, wherein said thin film both-end-fixed beam is configured to deform along said such that said reflection unit has an irregular shape when said thin film both-end-fixed beam is driven by said driving voltage and the incident light is reflected by said reflection unit in random directions when said thin film is driven by said driving voltage and the incident light is reflected in one direction when said thin film is not driven; and a projection screen displaying the image projected by said light modulator of said light switching unit.

* * * * *